United States Patent
Winarski

(10) Patent No.: US 11,018,873 B1
(45) Date of Patent: May 25, 2021

(54) COLLISION RESISTANT DIGITAL SIGNATURES

(71) Applicant: Tyson York Winarski, Mountain View, CA (US)

(72) Inventor: Tyson York Winarski, Mountain View, CA (US)

( * ) Notice: Subject to any disclaimer, the term of this patent is extended or adjusted under 35 U.S.C. 154(b) by 0 days.

(21) Appl. No.: 16/926,646

(22) Filed: Jul. 11, 2020

Related U.S. Application Data

(60) Provisional application No. 62/961,824, filed on Jan. 16, 2020.

(51) Int. Cl.
*H04L 9/32* (2006.01)
*H04L 9/30* (2006.01)
*H04L 9/00* (2006.01)

(52) U.S. Cl.
CPC ............ *H04L 9/3247* (2013.01); *H04L 9/002* (2013.01); *H04L 9/3033* (2013.01); *H04L 9/3239* (2013.01)

(58) Field of Classification Search
CPC combination set(s) only.
See application file for complete search history.

(56) References Cited

U.S. PATENT DOCUMENTS

| | | | |
|---|---|---|---|
| 8,644,620 B1 * | 2/2014 | Lam ........................ G06F 13/10 382/209 |
| 9,374,373 B1 | 6/2016 | Chan et al. | |
| 9,594,678 B1 * | 3/2017 | Karr ....................... G06F 3/0685 |
| 10,721,073 B2 | 7/2020 | Lampkins et al. | |
| 2005/0050332 A1 * | 3/2005 | Serret-Avila ....... H04N 1/32144 713/176 |
| 2008/0046741 A1 * | 2/2008 | Mironov ............... H04L 9/3236 713/176 |
| 2013/0101118 A1 | 4/2013 | Seleznev et al. | |
| 2013/0339665 A1 * | 12/2013 | Alexander ............ G06F 9/3814 712/207 |
| 2016/0080146 A1 * | 3/2016 | Gauravaram ......... H04L 9/0869 380/46 |
| 2017/0180134 A1 | 6/2017 | King | |
| 2018/0343271 A1 * | 11/2018 | Tenorio ............... H04L 63/1425 |
| 2019/0179804 A1 * | 6/2019 | Chittaro .............. G06F 16/1873 |

(Continued)

FOREIGN PATENT DOCUMENTS

| CN | 110941673 A | 3/2020 |
|---|---|---|
| WO | 2020106219 A1 | 5/2020 |

OTHER PUBLICATIONS

Mozafari et al., "A new collision resistant hash function based on optimum dimensionality reduction using Walsh-Hadamard transform," 9th International Conference on Information Technology (ICIT'06) Year: 2006 | Conference Paper | Publisher: IEEE.*

(Continued)

*Primary Examiner* — Roderick Tolentino
(74) *Attorney, Agent, or Firm* — The Winarski Firm, PLLC

(57) ABSTRACT

The present specification discloses a computer tangible medium storing instructions for a collision resistant process for signing a digital message with a digital signature using different hash digests derived from the same message data with the same hashing algorithm by hashing the message data in different ways. The collision resistant process protects networks from hacking attacks based different files having the same hash digest, commonly referred to as birthday attacks.

20 Claims, 82 Drawing Sheets

| Descriptor 201 | Hexadecimal Value 202 |
|---|---|
| Message M1 (128-Bytes) 103 | d131dd02 c5e6eec4 693d9a06 98aff95c<br>2fcab587 12467eab 4004583e b8fb7f89<br>55ad3406 09f4b302 83e48883 2571415a<br>085125e8 f7cdc99f d91dbdf2 80373c5b<br>d8823e31 56348f5b ae6dacd4 36c919c6<br>dd53e2b4 87da03fd 02396306 d248cda0<br>e99f3342 0f577ee8 ce54b670 80a80d1e<br>c69821bc b6a88393 96f9652b 6ff72a70<br>104 |
| Blockchain MD5 Hash Digest M1 203 | 79054025 255FB1A2 6E4BC422 AEF54EB4<br>108 |
| M1R<br>Message M1 Hexadecimal Reverse (128-Bytes) 204 | 07a27ff6 b2569f69 39388a6b cb12896c<br>e1d08a08 076b45ec 8ee775f0 2433f99e<br>0adc842d 60369320 df30ad78 4b2e35dd<br>6c919c63 4dcad6ea b5f84365 13e3288d<br>b5c37308 2fdbd19d f99cdc7f 8e521580<br>a5141752 38884e38 203b4f90 6043da55<br>98f7bf8b e3854004 bae76421 785bacf2<br>c59ffa89 60a9d396 4cee6e5c 20dd131d<br>205 |
| Blockchain MD5 Hash Digest M1R 206 | 1FE11FD0 8C5AADC2 B70059FB 097C4433<br>207 |

(56) References Cited

U.S. PATENT DOCUMENTS

2020/0099926 A1\*  3/2020  Tanner .................. H04N 19/142
2020/0104393 A1\*  4/2020  Setty ..................... G06F 16/951

OTHER PUBLICATIONS

Li et al. "A sufficient condition for constructing some XOR-based iterative target collision resistant hash functions," 2010 International Conference on Computer Design and Applications Year: 2010 | vol. 1 | Conference Paper | Publisher: IEEE.\*

\* cited by examiner

| Descriptor 201 | Hexadecimal Value 202 |
|---|---|
| Message M1 (128-Bytes) 103 | d131dd02 c5e6eec4 693d9a06 98aff95c<br>2fcab587 12467eab 4004583e b8fb7f89<br>55ad3406 09f4b302 83e48883 2571415a<br>085125e8 f7cdc99f d91dbdf2 80373c5b<br>d8823e31 56348f5b ae6dacd4 36c919c6<br>dd53e2b4 87da03fd 02396306 d248cda0<br>e99f3342 0f577ee8 ce54b670 80a80d1e<br>c69821bc b6a88393 96f9652b 6ff72a70<br>104 |
| Blockchain MD5 Hash Digest M1 203 | 79054025 255FB1A2 6E4BC422 AEF54EB4<br>108 |
| M1R<br>Message M1 Hexadecimal Reverse (128-Bytes)<br>204 | 07a27ff6 b2569f69 39388a6b cb12896c<br>e1d08a08 076b45ec 8ee775f0 2433f99e<br>0adc842d 60369320 df30ad78 4b2e35dd<br>6c919c63 4dcad6ea b5f84365 13e3288d<br>b5c37308 2fdbd19d f99cdc7f 8e521580<br>a5141752 38884e38 203b4f90 6043da55<br>98f7bf8b e3854004 bae76421 785bacf2<br>c59ffa89 60a9d396 4cee6e5c 20dd131d<br>205 |
| Blockchain MD5 Hash Digest M1R 206 | 1FE11FD0 8C5AADC2 B70059FB 097C4433<br>207 |

| Descriptor 211 | Hexadecimal Value 212 |
|---|---|
| Message M2 (128-Bytes)<br><br>105 | d131dd02 c5e6eec4 693d9a06 98aff95c<br>2fcab507 12467eab 4004583e b8fb7f89<br>55ad3406 09f4b302 83e48883 25f1415a<br>085125e8 f7cdc99f d91dbd72 80373c5b<br>d8823e31 56348f5b ae6dacd4 36c919c6<br>dd53e234 87da03fd 02396306 d248cda0<br>e99f3342 0f577ee8 ce54b670 80280d1e<br>c69821bc b6a88393 96f965ab 6ff72a70<br>106 |
| Blockchain MD5 Hash Digest M2 213 | 79054025 255FB1A2 6E4BC422 AEF54EB4<br><br>108 |
| M2R<br><br>Message M2 Hexadecimal Reverse (128-Bytes)<br><br>214 | 07a27ff6 ba569f69 39388a6b cb12896c<br>e1d08208 076b45ec 8ee775f0 2433f99e<br>0adc842d 60369320 df30ad78 432e35dd<br>6c919c63 4dcad6ea b5f84365 13e3288d<br>b5c37308 27dbd19d f99cdc7f 8e521580<br>a5141f52 38884e38 203b4f90 6043da55<br>98f7bf8b e3854004 bae76421 705bacf2<br>c59ffa89 60a9d396 4cee6e5c 20dd131d<br>215 |
| Blockchain MD5 Hash Digest M2R 216 | 3573EA2B BB9AEF10 2E7C236A 66B8028D<br><br>217 |

```perl
#!/usr/bin/perl
open(my $out, '>:raw', 'M1.bin') or die "Unable to open: $!";
my $M1hex =
'd131dd02c5e6eec4693d9a0698aff95c2fcab58712467eab4004583eb8fb7f89' .
'55ad340609f4b30283e488832571415a085125e8f7cdc99fd91dbdf280373c5b' .
'd8823e3156348f5bae6dacd436c919c6dd53e2b487da03fd02396306d248cda0' .
'e99f33420f577ee8ce54b67080a80d1ec69821bcb6a8839396f9652b6ff72a70';
my ($hex) = pack( 'H*', $M1hex);
print $out "$hex";
close($out);
use Digest::MD5 qw(md5_hex);
$hash = md5_hex($hex);
printf ("md5_M1:%s\n",$hash);
#-----------------------------------------------------------------
open(my $out, '>:raw', 'M1R.bin') or die "Unable to open: $!";
my $M1Rhex = reverse $M1hex;
my ($hex) = pack( 'H*', $M1Rhex);
print $out "$hex";
close($out);
$hash = md5_hex($hex);
printf ("md5_M1R:%s\n",$hash);
#-----------------------------------------------------------------
open(my $out, '>:raw', 'M1B.bin') or die "Unable to open: $!";
my $M1Bhex =
'702af76f2b65f9969383a8b6bc2198c61e0da88070b654cee87e570f42339fe9' .
'a0cd48d206633902fd03da87b4e253ddc619c936d4ac6dae5b8f3456313e82d8' .
'5b3c3780f2bd1dd99fc9cdf7e82551085a4171258388e48302b3f4090634ad55' .
'897ffbb83e580440ab7e461287b5ca2f5cf9af98069a3d69c4eee6c502dd31d1';
my ($hex) = pack( 'H*', $M1Bhex);
print $out "$hex";
close($out);
$hash = md5_hex($hex);
printf ("md5_M1B:%s\n",$hash);
#-----------------------------------------------------------------
exit 0 ;
```

```perl
#!/usr/bin/perl
open(my $out, '>:raw', 'M2.bin') or die "Unable to open: $!";
my $M2hex =
'd131dd02c5e6eec4693d9a0698aff95c2fcab50712467eab4004583eb8fb7f89' .
'55ad340609f4b30283e4888325f1415a085125e8f7cdc99fd91dbd7280373c5b' .
'd8823e3156348f5bae6dacd436c919c6dd53e23487da03fd02396306d248cda0' .
'e99f33420f577ee8ce54b67080280d1ec69821bcb6a8839396f965ab6ff72a70';
my ($hex) = pack( 'H*', $M2hex);
print $out "$hex";
close($out);
use Digest::MD5 qw(md5_hex);
$hash = md5_hex($hex);
printf ("md5_M2:%s\n",$hash);
#-----------------------------------------------------------
open(my $out, '>:raw', 'M2R.bin') or die "Unable to open: $!";
my $M2Rhex = reverse $M2hex;
my ($hex) = pack( 'H*', $M2Rhex);
print $out "$hex";
close($out);
$hash = md5_hex($hex);
printf ("md5_M2R:%s\n",$hash);
#-----------------------------------------------------------
open(my $out, '>:raw', 'M2B.bin') or die "Unable to open: $!";
my $M2Bhex =
'702af76fab65f9969383a8b6bc2198c61e0d288070b654cee87e570f42339fe9' .
'a0cd48d206633902fd03da8734e253ddc619c936d4ac6dae5b8f3456313e82d8' .
'5b3c378072bd1dd99fc9cdf7e82551085a41f1258388e48302b3f4090634ad55' .
'897ffbb83e580440ab7e461207b5ca2f5cf9af98069a3d69c4eee6c502dd31d1';
my ($hex) = pack( 'H*', $M2Bhex);
print $out "$hex";
close($out);
$hash = md5_hex($hex);
printf ("md5_M2B:%s\n",$hash);
#-----------------------------------------------------------
exit 0 ;
```

FIG. 3C

520 

| Descriptor 521 | Hexadecimal Value 522 |
|---|---|
| Message M2 (128-Bytes) 105 | d131dd02 c5e6eec4 693d9a06 98aff95c<br>2fcab507 12467eab 4004583e b8fb7f89<br>55ad3406 09f4b302 83e48883 25f1415a<br>085125e8 f7cdc99f d91dbd72 80373c5b<br>d8823e31 56348f5b ae6dacd4 36c919c6<br>dd53e234 87da03fd 02396306 d248cda0<br>e99f3342 0f577ee8 ce54b670 80280d1e<br>c69821bc b6a88393 96f965ab 6ff72a70<br>106 |
| Blockchain MD5 Hash Digest M2 525 | 79054025 255FB1A2 6E4BC422 AEF54EB4<br>108 |
| M2B<br>Message M2 Bytes Reverse (128-Bytes)<br>527 | 702af76f ab65f996 9383a8b6 bc2198c6<br>1e0d2880 70b654ce e87e570f 42339fe9<br>a0cd48d2 06633902 fd03da87 34e253dd<br>c619c936 d4ac6dae 5b8f3456 313e82d8<br>5b3c3780 72bd1dd9 9fc9cdf7 e8255108<br>5a41f125 8388e483 02b3f409 0634ad55<br>897ffbb8 3e580440 ab7e4612 07b5ca2f<br>5cf9af98 069a3d69 c4eee6c5 02dd31d1<br>528 |
| Blockchain MD5 Hash Digest M2B 529 | BF5BF87F 65E79B98 AF798588 5F3E5EE0<br>530 |

| Blockchain Block Bytes 601 | Description 602 |
|---|---|
| Byte 0: 00h-FFh | 602A: Reverse Blockchain(s) Used<br>10h denotes Hexadecimal    11h denotes Byte<br>12h denotes Bit              13h denotes Sector<br>14h denotes Hexadecimal Forward-Reverse Multiplex<br>20h denotes Hexadecimal and Byte<br>21h denotes Byte and Bit<br>22h denotes Bit and Sector<br>23h denotes Hexadecimal and Bit<br>24h denotes Hexadecimal and Sector<br>25h denotes Hexadecimal and Hexadecimal Forward-Reverse Multiplex<br>30h denotes Hexadecimal and Byte and Bit<br>31h denotes Byte and Bit and Sector<br>32h denotes Hexadecimal and Byte and Hexadecimal Forward-Reverse Multiplex<br>40h denotes Hexadecimal and Byte and Bit and Sector<br>50h denotes Hexadecimal and Byte and Bit and Sector and Hexadecimal Forward-Reverse Multiplex |
| Bytes 1-4 | 602B: Date Stamp (year, month, day YYYY:MM:DD) |
| Bytes 5-7 | 602C: Time Stamp (hours, minutes, seconds HH:mm:SS) |
| Byte 8: 0h-FFh<br>00h<br>01h<br>02h<br>03h<br>04h<br>05h<br>06h | 602D: Blockchain Hash Algorithm identifier:<br>SHA-224 algorithm identifier<br>SHA-256 algorithm identifier<br>SHA-384 algorithm identifier<br>SHA-512 algorithm identifier<br>SHA-512/224 algorithm identifier<br>SHA-512/256 algorithm identifier<br>MD5 algorithm identifier |
| Bytes 9...<br>Bytes 9-36<br>Bytes 9-40<br>Bytes 9-56<br>Bytes 9-72<br>Bytes 9-24 | 602E: Forward Blockchain HASH digest:<br>SHA-224 and SHA-512/224 digests (224-bits or 28-Bytes)<br>SHA-256 and SHA-512/256 digests (256-bits or 32-Bytes)<br>SHA-384 digest (384-bits or 48-Bytes)<br>SHA-512 digest (512-bits or 64-Bytes)<br>MD-5 digest     (128-bits or 16-Bytes) |

FIG. 5A

Message M1 (128-Bytes)

```
d131dd02  c5e6eec4  693d9a06  98aff95c
2fcab587  12467eab  4004583e  b8fb7f89
55ad3406  09f4b302  83e48883  2571415a
085125e8  f7cdc99f  d91dbdf2  80373c5b
d8823e31  56348f5b  ae6dacd4  36c919c6
dd53e2b4  87da03fd  02396306  d248cda0
e99f3342  0f577ee8  ce54b670  80a80d1e
c69821bc  b6a88393  96f9652b  6ff72a70
```
104

600E

600

602A: 20h denotes hexadecimal-reverse blockchain digest and byte reverse blockchain digest.

602B: Date Stamp: YYYY:MM:DD

602C: Time Stamp: HH:mm:SS

602D: 06h (MD5 Algorithm)

602E-M1: Forward Blockchain HASH MD5 digest of message M1:
  79054025  255FB1A2  6E4BC422  AEF54EB4

602F-M1R: Hexadecimal-Reverse Blockchain HASH MD5 digest of message M1:
  1FE11FD0  8C5AADC2  B70059FB  097C4433

602F-M1B: Byte-Reverse Blockchain HASH MD5 digest of message M1:
  63692F88  2033B4E2  C13D437F  35E33271

602H: Collision Resistant Blockchain Hash Digest Set from Prior Block in the Collision Resistant Blockchain 602I: Logical-End-of-Blockchain-Block Byte: BC(h)

FIG. 5E

Message M2 (128-Bytes)
```
d131dd02  c5e6eec4  693d9a06  98aff95c
2fcab507  12467eab  4004583e  b8fb7f89
55ad3406  09f4b302  83e48883  25f1415a
085125e8  f7cdc99f  d91dbd72  80373c5b
d8823e31  56348f5b  ae6dacd4  36c919c6
dd53e234  87da03fd  02396306  d248cda0
e99f3342  0f577ee8  ce54b670  80280d1e
c69821bc  b6a88393  96f965ab  6ff72a70
```
106

600F

| |
|---|
| 602A: 20h denotes hexadecimal-reverse blockchain digest and byte reverse blockchain digest. |
| 602B: Date Stamp: YYYY:MM:DD |
| 602C: Time Stamp: HH:mm:SS |
| 602D: 06h (MD5 Algorithm) |
| 602E-M2: Forward Blockchain HASH MD5 digest of message M2:<br>　79054025  255FB1A2  6E4BC422  AEF54EB4 |
| 602F-M2R: Hexadecimal-Reverse Blockchain HASH MD5 digest of message M2:<br>　3573EA2B  BB9AEF10  2E7C236A  66B8028D |
| 602F-M2B: Byte-Reverse Blockchain HASH MD5 digest of message M2:<br>　BF5BF87F  65E79B98  AF798588  5F3E5EE0 |
| 602H: Collision Resistant Blockchain Hash Digest Set from Prior Block in the Collision Resistant Blockchain |
| 602I: Logical-End-of-Blockchain-Block Byte: BC(h) |

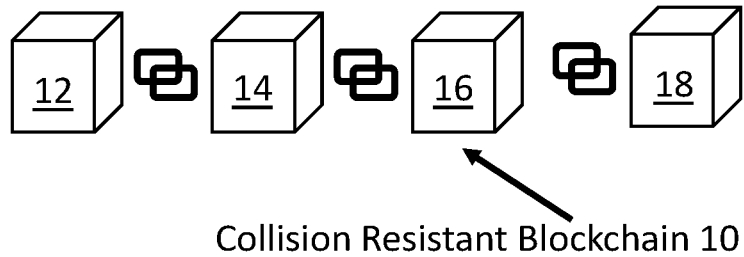

Collision Resistant Blockchain 10

| COLLISION RESISTANT BLOCKCHAIN BLOCK 12 | INFORMATION IN BLOCK:<br>*Blockchain Data: Message<br>*Blockchain Metadata: Metadata wrapper 600 (collision resistant blockchain hash digest pair of block 12) |
|---|---|
| COLLISION RESISTANT BLOCKCHAIN BLOCK 14 | INFORMATION IN BLOCK:<br>*Blockchain Data: Message<br>*Blockchain Metadata: Metadata wrapper 600 (collision resistant blockchain hash digest pair of block 12 [prior block] and collision resistant blockchain hash digest pair of block 14 [current block]) |
| COLLISION RESISTANT BLOCKCHAIN BLOCK 16 | INFORMATION IN BLOCK:<br>*Blockchain Data: Message<br>*Blockchain Metadata: Metadata wrapper 600 (collision resistant blockchain hash digest pair of block 14 [prior block] and collision resistant blockchain hash digest pair of block 16 [current block]) |
| COLLISION RESISTANT BLOCKCHAIN BLOCK 18 | INFORMATION IN BLOCK:<br>*Blockchain Data: Message<br>*Blockchain Metadata: Metadata wrapper 600 (collision resistant blockchain hash digest pair of block 16 [prior block] and collision resistant blockchain hash digest pair of block 18 [current block]) |

FIG. 5G

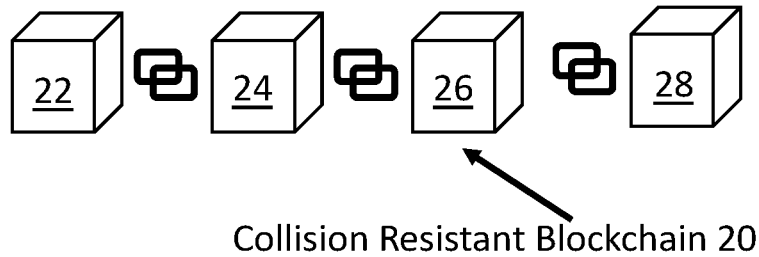

Collision Resistant Blockchain 20

| COLLISION RESISTANT BLOCKCHAIN BLOCK 20 | INFORMATION IN BLOCK:<br>*Blockchain Data: Message<br>*Blockchain Metadata: Metadata wrapper 600 (collision resistant blockchain hash digest set of block 22) |
|---|---|
| COLLISION RESISTANT BLOCKCHAIN BLOCK 24 | INFORMATION IN BLOCK:<br>*Blockchain Data: Message<br>*Blockchain Metadata: Metadata wrapper 600 (collision resistant blockchain hash digest set of block 22 [prior block] and collision resistant blockchain hash digest set of block 24 [current block]) |
| COLLISION RESISTANT BLOCKCHAIN BLOCK 26 | INFORMATION IN BLOCK:<br>*Blockchain Data: Message<br>*Blockchain Metadata: Metadata wrapper 600 (collision resistant blockchain hash digest set of block 24 [prior block] and collision resistant blockchain hash digest set of block 26 [current block]) |
| COLLISION RESISTANT BLOCKCHAIN BLOCK 28 | INFORMATION IN BLOCK:<br>*Blockchain Data: Message<br>*Blockchain Metadata: Metadata wrapper 600 (collision resistant blockchain hash digest set of block 26 [prior block] and collision resistant blockchain hash digest set of block 28 [current block]) |

| Descriptor 741 | Hexadecimal Value 742 |
|---|---|
| Message M4 (64Bytes) 705 | 4dc968ff 0ee35c20 9572d477 7b721587<br>d36fa7b2 1bdc56b7 4a3dc078 3e7b9518<br>afbfa202 a8284bf3 6e8e4b55 b35f4275<br>93d84967 6da0d1d5 5d8360fb 5f07fea2<br>706 |
| MD5 Digest of M4 707 | 008EE33A 9D58B51C FEB425B0 959121C9<br>708 |
| M4R Message M4 Hexadecimal Reverse 743 | 2aef70f5 bf0638d5 5d1d0ad6 76948d39<br>5724f53b 55b4e8e6 3fb4828a 202afbfa<br>8159b7e3 870cd3a4 7b65cdb1 2b7af63d<br>785127b7 774d2759 02c53ee0 ff869cd4<br>744 |
| MD5 Digest of M4R 745 | 492D677A 1CD91F27 02422DD9 0B0B6622<br>746 |
| M4B Message M4 Byte Reverse 747 | a2fe075f fb60835d d5d1a06d 6749d893<br>75425fb3 554b8e6e f34b28a8 02a2bfaf<br>18957b3e 78c03d4a b756dc1b b2a76fd3<br>8715727b 77d47295 205ce30e ff68c94d<br>748 |
| MD5 Digest of M4B 749 | 67BB5250 7618FE4E E6B23577 270BD599<br>750 |

```perl
#!/usr/bin/perl
open(my $out, '>:raw', 'M3.bin') or die "Unable to open: $!";
my $M3hex =
'4dc968ff0ee35c209572d4777b721587d36fa7b21bdc56b74a3dc0783e7b9518' .
'afbfa200a8284bf36e8e4b55b35f427593d849676da0d1555d8360fb5f07fea2';
my ($hex) = pack( 'H*', $M3hex);
print $out "$hex";
close($out);
use Digest::MD5 qw(md5_hex);
$hash = md5_hex($hex);
printf ("md5_M3:%s\n",$hash);
#-----------------------------------------------------------------
open(my $out, '>:raw', 'M3R.bin') or die "Unable to open: $!";
my $M3Rhex = reverse $M3hex;
my ($hex) = pack( 'H*', $M3Rhex);
print $out "$hex";
close($out);
$hash = md5_hex($hex);
printf ("md5_M3R:%s\n",$hash);
#-----------------------------------------------------------------
open(my $out, '>:raw', 'M3B.bin') or die "Unable to open: $!";
my $M3Bhex =
'a2fe075ffb60835d55d1a06d6749d89375425fb3554b8e6ef34b28a800a2bfaf' .
'18957b3e78c03d4ab756dc1bb2a76fd38715727b77d47295205ce30eff68c94d';
my ($hex) = pack( 'H*', $M3Bhex);
print $out "$hex";
close($out);
$hash = md5_hex($hex);
printf ("md5_M3B:%s\n",$hash);
#-----------------------------------------------------------------
exit 0 ;
```

```perl
#!/usr/bin/perl
open(my $out, '>:raw', 'M4.bin') or die "Unable to open: $!";
my $M4hex =
'4dc968ff0ee35c209572d4777b721587d36fa7b21bdc56b74a3dc0783e7b9518' .
'afbfa202a8284bf36e8e4b55b35f427593d849676da0d1d55d8360fb5f07fea2';
my ($hex) = pack( 'H*', $M4hex);
print $out "$hex";
close($out);
use Digest::MD5 qw(md5_hex);
$hash = md5_hex($hex);
printf ("md5_M4:%s\n",$hash);
#---------------------------------------------------------------
open(my $out, '>:raw', 'M4R.bin') or die "Unable to open: $!";
my $M4Rhex = reverse $M4hex;
my ($hex) = pack( 'H*', $M4Rhex);
print $out "$hex";
close($out);
$hash = md5_hex($hex);
printf ("md5_M4R:%s\n",$hash);
#---------------------------------------------------------------
open(my $out, '>:raw', 'M4B.bin') or die "Unable to open: $!";
my $M4Bhex =
'a2fe075ffb60835dd5d1a06d6749d89375425fb3554b8e6ef34b28a802a2bfaf' .
'18957b3e78c03d4ab756dc1bb2a76fd38715727b77d47295205ce30eff68c94d';
my ($hex) = pack( 'H*', $M4Bhex);
print $out "$hex";
close($out);
$hash = md5_hex($hex);
printf ("md5_M4B:%s\n",$hash);
#---------------------------------------------------------------
exit 0 ;
```

FIG. 6E

308Multiplex

```perl
#!/usr/bin/perl
my $M3Mhex =
'42dace9f6780fff50befe03653c82d059555712dd04a7d7677b67924185d8379' .
'd53762f4af75b32b15b5dbc45e68be7643af3bd4c802788a30e072ba9f5b1f8a';
my ($hex) = pack( 'H*', $M3Mhex);
use Digest::MD5 qw(md5_hex);
$hash = md5_hex($hex);
printf ("md5_M3Multiplex:%s\n",$hash);
#------------------------------------------------------------------------
my $M4Mhex =
'42dace9f6780fff50befe03653c82d05955d712dd04a7d7677b67924185d8379' .
'd53762f4af75b32b15b5dbc45e68be7643af3bd4c802788a32e072ba9f5b1f8a';
my ($hex) = pack( 'H*', $M4Mhex);
$hash = md5_hex($hex);
printf ("md5_M4Multiplex:%s\n",$hash);
exit 0 ;
```

FIG. 6I

X.509 Certificate-1 Hexadecimal Contents (1301-Bytes)
1201

| | | | |
|---|---|---|---|
| 30820511a0030201 | 020204010c000130 | 0d06092a864886f7 | 0d0101040500303d |
| 311a301806035504 | 0313114861736820 | 436f6c6c6973696f | 6e20434131123010 |
| 0603550407130945 | 696e64686f76656e | 310b300906035504 | 0613024e4c301e17 |
| 0d30363031303130 | 30303030315a170d | 3037313233313233 | 353935395a305431 |
| 1930170603550403 | 131041726a656e20 | 4b2e204c656e7374 | 7261311630140603 |
| 55040a130d436f6c | 6c6973696f6e6169 | 7273311230100603 | 550407130945696e |
| 64686f76656e310b | 3009060355040613 | 024e4c3082042230 | 0d06092a864886f7 |
| 0d01010105000382 | 040f003082040a02 | 82040100ee73e7d6 | b3b34fbaa1393d02 |
| a47425818dc84f86 | 736e907228bbe877 | 0203858d8cf1837a | ff5e6c2213036af3 |
| d95c77e9c2237d60 | 8cc4a9fb97308bbf | 9828612f1599e261 | 5bccdeda5930532f |
| b3dd117278e49440 | 1433630e7461c1dc | 9b801b2e552015a5 | 13ff7ae7973ef44b |
| 8352e4e04979b31e | b600654d51f4a381 | cebe3f0bd099d130 | d1456fabe04a3e98 |
| 85c8c4fb297b86b5 | 7752cd6419809fe3 | 7e6286f07732d1e0 | 69a5b4e56670b8bb |
| bae5c211742a131d | 05711cf1fe32af93 | 3f1eef224762e3aa | dac17c40e448ca41 |
| a879a03d3cf665f2 | 39c7f3fe82b384e8 | 35e7c9e8bdee30c2 | 68a2121284789df4 |
| 2f44906f19b79026 | 464436e1da65fa0c | 53a377fa0d2b012b | 7ddc2855dae5b551 |
| 51e28034112120b5 | e79ec5f26a9f69da | 85d74ef6a97a0b11 | 64efa25fb1ae26ba |
| 451ccda7a2e78433 | 9c447d560549a60b | f0676294bf580c91 | 9ec457025d3c7860 |
| b98296c0ab9fe5b1 | d353882e26c1f721 | b41899d972b5a1d5 | 050b684536448010 |
| af8c7aff7ce8eacc | b9b1fbbdd129d4f5 | d499fb812924df30 | 2cb3c45023386297 |
| 9396b3a46cd0ff7f | 1426711c459297b6 | 5d1cef66c18751e0 | 94bf08f3b2981c5c |
| ce52d963d5a4259a | 64557e4d1b9efe2d | 9a516d1e6ec8bb37 | 066825aea6361660 |
| 2bd7d11625a06a90 | 739b4d0a06ea872a | 3af9eba12629bed6 | 7940561bd9374a89 |
| d60f0d722c9feb68 | 33ec53f0b0fd76aa | 047b66c90fceb1d2 | e22cc099b9a4b93e |
| 0000000f54a89517 | 6e4c295a405faf54 | cee82d043a45ce40 | b155be34ebde7847 |
| 85a25b7f894d424f | a127b157a8a120f9 | 9fe53102c81fa90e | 0b9bda1ba775df75 |
| d9152a80257a1ed3 | 52dd49e57e068ff3 | f02cabd4ac97dbbc | 3fa0205a74302f65 |
| c7f49a419e08fd54 | bfafc14d78abaab3 | 0ddb3fc848e3df02 | c5a40eda248c9ff4 |
| 7482850cfdfbdd9b | c55547b7404f5803 | c1bb81632173127e | 1a93b24afb6e7a80 |
| 450865db374676d5 | 76ba5296ccc6c130 | 82d1ab36521f1a8a | d945466b9ef06af4 |
| 3a02d70b7fb8b7dc | 6d268c3dba6898f6 | 552fa3fbb33dcbfa | da7b33fa75d93afe |
| 262bd37aff75995f | d0e9774ba5a26a7c | 443ff34e461502a2 | cb777e982d007375 |
| 14b88ed28d61f428 | e88387df2bf02230 | ad17a9d44ff36485 | 0a07db42a7826ac2 |
| ee3899cac3ec2747 | 21d476d96658f537 | 16676587f8ff14db | 8de6741afa2206db |
| a3b11828ba87c6e1 | e88a022f1aa8ddd0 | 37eab049b5c7d305 | 3d0a63d7861dea07 |
| b3d8b720de068cf4 | 7e657bb44450b85d | 52f749d59572df0c | 0e3433b47c9aa19a |
| 856f1dc3cdadbafb | 143035c85a53af57 | 22038f765c0d621b | 66b69ffffd091d4a |
| 661a453bf1daed1a | 3a2341b37d7f623b | 158f6ec02b49a253 | 64430fcb5861483e |
| 1e9543ed2ee7e54a | 4c108a6e64194098 | 0ee60d14aee559af | 30037e75b2309ce0 |
| 21ffe3109bf20538 | 92ab0ae403516e2a | b58067f702030100 | 01a31a3018300906 |
| 03551d1304023000 | 300b0603551d0f04 | 04030205e0 | |

FIG. 7A (Prior Art)

| X.509 Certificate-2 Hexadecimal Contents (1301-Bytes) |
| :---: |
| 1202 |

| | | | |
|---|---|---|---|
| 30820511a0030201 | 020204020c000130 | 0d06092a864886f7 | 0d0101040500303d |
| 311a301806035504 | 0313114861736820 | 436f6c6c6973696f | 6e20434131123010 |
| 0603550407130945 | 696e64686f76656e | 310b300906035504 | 0613024e4c301e17 |
| 0d30363031303130 | 30303030315a170d | 3037313233313233 | 353935395a305431 |
| 1530130603550403 | 130c4d6172632053 | 746576656e73311a | 3018060355040a13 |
| 11436f6c6c697369 | 6f6e20466163746f | 7279311230100603 | 550407130945696e |
| 64686f76656e310b | 3009060355040613 | 024e4c3082042230 | 0d06092a864886f7 |
| 0d01010105000382 | 040f003082040a02 | 820401001a09b4cb | 40c7267aaf017f9b |
| a47425818dc84f86 | 736e907228bbe877 | 0203858d8cf1837a | ff5e6c2213036af3 |
| d95c77e9c2237d60 | 8cc4a9fb97307bbf | 9828612f1599e261 | 5bccdeda5930532f |
| b3dd117278e49440 | 1433630e7461c1dc | 9b801b2e552015a5 | 13ff7ae7973ef44b |
| 8352e4e04979b31e | b600654d51f4a481 | cebe3f0bd099d130 | d1456fabe04a3e98 |
| 85c8c4fb297b86b5 | 7752cd6419809fe3 | 7e6286f07732d1e0 | 69a5b4e56670b8bb |
| bae5c211742a131d | 05711cf1fe22af93 | 3f1eef224762e3aa | dac17c40e448ca41 |
| a879a03d3cf665f2 | 39c7f3fe82b384e8 | 35e7c9e8bdee30c2 | 68a2121284789df4 |
| 2f44906f19b79026 | 464436e1da64fa0c | 53a377fa0d2b012b | 7ddc2855dae5b551 |
| 51e28034112120b5 | e79ec5f26a9f69da | 85d74ef6a97a0b11 | 64efa25fb1ae26ba |
| 451ccda7a2e78433 | 9c447d562549a60b | f0676294bf580c91 | 9ec457025d3c7860 |
| b98296c0ab9fe5b1 | d353882e26c1f721 | b41899d972b5a1d5 | 050b684536448010 |
| af8c7aff7ce8eacc | b9b1fbbdc929d4f5 | d499fb812924df30 | 2cb3c45023386297 |
| 9396b3a46cd0ff7f | 1426711c459297b6 | 5d1cef66c18751e0 | 94bf08f3b2981c5c |
| ce52d963d5a4259a | 64557e4d1b9efe0d | 9a516d1e6ec8bb37 | 066825aea6361660 |
| 2bd7d11625a06a90 | 739b4d0a06ea872a | 3af9eba12629bed6 | 7940561bd9374a89 |
| d60f0d722c9feb68 | 33ec53f0b0fd76a2 | 047b66c90fceb1d2 | e22cc099b9a4b93e |
| 0000000f54a89517 | 6e4c295a405faf54 | cee82d043a45ce40 | b155be34ebde7847 |
| 85a25b7f894d424f | a127b157a8a120f9 | 9fe53102c81fa90e | 0b9bda1ba775df75 |
| d9152a80257a1ed3 | 52dd49e57e068ff3 | f02cabd4ac97dbbc | 3fa0205a74302f65 |
| c7f49a419e08fd54 | bfafc14d78abaab3 | 0ddb3fc848e3df02 | c5a40eda248c9ff4 |
| 7482850cfdfbdd9b | c55547b7404f5803 | c1bb81632173127e | 1a93b24afb6e7a80 |
| 450865db374676d5 | 76ba5296ccc6c130 | 82d1ab36521f1a8a | d945466b9ef06af4 |
| 3a02d70b7fb8b7dc | 6d268c3dba6898f6 | 552fa3fbb33dcbfa | da7b33fa75d93afe |
| 262bd37aff75995f | d0e9774ba5a26a7c | 443ff34e461502a2 | cb777e982d007375 |
| 14b88ed28d61f428 | e88387df2bf02230 | ad17a9d44ff36485 | 0a07db42a7826ac2 |
| ee3899cac3ec2747 | 21d476d96658f537 | 16676587f8ff14db | 8de6741afa2206db |
| a3b11828ba87c6e1 | e88a022f1aa8ddd0 | 37eab049b5c7d305 | 3d0a63d7861dea07 |
| b3d8b720de068cf4 | 7e657bb44450b85d | 52f749d59572df0c | 0e3433b47c9aa19a |
| 856f1dc3cdadbafb | 143035c85a53af57 | 22038f765c0d621b | 66b69ffffd091d4a |
| 661a453bf1daed1a | 3a2341b37d7f623b | 158f6ec02b49a253 | 64430fcb5861483e |
| 1e9543ed2ee7e54a | 4c108a6e64194098 | 0ee60d14aee559af | 30037e75b2309ce0 |
| 21ffe3109bf20538 | 92ab0ae403516e2a | b58067f702030100 | 01a31a3018300906 |
| 03551d1304023000 | 300b0603551d0f04 | 04030205e0 | |

```perl
#!/usr/bin/perl
open(my $out, '>:raw', 'C1.bin') or die "Unable to open: $!";
my $C1hex =
'30820511a0030201020204010c0001300d06092a864886f70d0101040500303d311a30180603550403131148617368
20436f6c6c6973696f6e20434131123010' .
'060355040713094569656e64686f76656e310b30090603550406130244e4c301e170d30363031303130303030303135a170
d303731323331323335393539a305431' .
'193017060355040313104172a656e204b2e204c656e7374726131163014060355040a130d436f6c6c6973696f6e6169
7273311230100603550407130945696e6' .
'64686f76656e310b30090603550406130244e4c30820422300d06092a864886f70d0101010500038204f003082040a02
82040100ee73e7d6b3b34fbaa1393d02' .
'a47425818dc84f86736e907228bbe8770203858d8cf1837aff5e6c2213036af3d95c77e9c2237d608cc4a9fb97308bbf982
8612f1599e2615bccdeda5930532f' .
'b3dd117278e494401433630e7461c1dc9b801b2e552015a513ff7ae7973ef44b8352e4e04979b31eb600654d51f4a381c
ebe3f0bd099d130d1456fabe04a3e98' .
'85c8c4fb297b86b57752cd6419809fe37e6286f07732d1e069a5b4e56670b8bbbae5c211742a131d05711cf1fe32af933f
1eef224762e3aadac17c40e448ca41' .
'a879a03d3cf665f239c7f3fe82b384e835e7c9e8bdee30c268a2121284789df42f44906f19b79026464436e1da65fa0c53a
377fa0d2b012b7ddc2855dae5b551' .
'51e28034112120b5e79ec5f26a9f69da85d74ef6a97a0b1164efa25fb1ae26ba451ccda7a2e784339c447d560549a60bf0
676294bf580c919ec457025d3c7860' .
'b98296c0ab9fe5b1d353882e26c1f721b41899d972b5a1d5050b684536448010af8c7aff7ce8eaccb9b1fbbdd129d4f5d4
99fb812924df302cb3c45023386297' .
'9396b3a46cd0ff7f1426711c459297b65d1cef66c18751e094bf08f3b2981c5cce52d963d5a4259a64557e4d1b9efe2d9a5
16d1e6ec8bb37066825aea6361660' .
'2bd7d11625a06a90739b4d0a06ea872a3af9eba12629bed67940561bd9374a89d60f0d722c9feb6833ec53f0b0fd76aa0
47b66c90fceb1d2e22cc099b9a4b93e' .
'0000000f54a895176e4c295a405faf54cee82d043a45ce40b155be34ebde784785a25b7f894d424fa127b157a8a120f99f
e53102c81fa90e0b9bda1ba775df75' .
'd9152a80257a1ed352dd49e57e068ff3f02cabd4ac97dbbc3fa0205a74302f65c7f49a419e08fd54bfafc14d78abaab30dd
b3fc848e3df02c5a40eda248c9ff4' .
'7482850cfdfbdd9bc55547b7404f5803c1bb81632173127e1a93b24afb6e7a80450865db374676d576ba5296ccc6c1308
2d1ab36521f1a8ad945466b9ef06af4' .
'3a02d70b7fb8b7dc6d268c3dba6898f6552fa3fbb33dcbfada7b33fa75d93afe262bd37aff75995fd0e9774ba5a26a7c443ff
34e461502a2cb777e982d007375' .
'14b88ed28d61f428e88387df2bf02230ad17a9d44ff364850a07db42a7826ac2ee3899cac3ec274721d476d96658f53716
676587f8ff14db8de6741afa2206db' .
'a3b11828ba87c6e1e88a022f1aa8ddd037eab049b5c7d3053d0a63d7861dea07b3d8b720de068cf47e657bb44450b85d
52f749d59572df0c0e3433b47c9aa19a' .
'856f1dc3cdadbafb143035c85a53af5722038f765c0d621b66b69ffffd091d4a661a453bf1daed1a3a2341b37d7f623b158f
6ec02b49a25364430fcb5861483e' .
'1e9543ed2ee7e54a4c108a6e641940980ee60d14aee559af30037e75b2309ce021ffe3109bf2053892ab0ae403516e2ab
58067f70203010001a31a3018300906' .
'03551d1304023000300b0603551d0f0404030205e0';
my ($hex) = pack( 'H*', $C1hex);
print $out "$hex";
close($out);
use Digest::MD5 qw(md5_hex);
$hash = md5_hex($hex);
printf ("md5_X509-C1:%s\n",$hash);
#-----------------------------------------------------------
open(my $out, '>:raw', 'C1R.bin') or die "Unable to open: $!";
my $C1Rhex = reverse $C1hex;
my ($hex) = pack( 'H*', $C1Rhex);
print $out "$hex";
close($out);
$hash = md5_hex($hex);
printf ("md5_X509-C1R:%s\n",$hash);
#-----------------------------------------------------------
exit 0 ;
```

```perl
#!/usr/bin/perl
open(my $out, '>:raw', 'C2.bin') or die "Unable to open: $!";
my $C2hex =
'30820511a0030201020204020c0001300d06092a864886f70d0101040500303d311a30180603550403131148617368 2
0436f6c6c6973696f6e20434131123010' .
'060355040713094569656e64686f76656e310b30090603550406130244e4c301e170d30363031303130303030303030315a170
d303731323333313233353935395a305431' .
'1530130603550403130c4d6172632053746576656e73311a3018060355040a1311436f6c6c6973696f6e20466163746f
72793112301006035504071309456962e' .
'64686f76656e310b3009060355040613024e4c30820422300d06092a864886f70d01010105000382040f003082040a02
820401001a09b4cb40c7267aaf017f9b' .
'a47425818dc84f86736e907228bbe8770203858d8cf1837aff5e6c2213036af3d95c77e9c2237d608cc4a9fb97307bbf982
8612f1599e2615bccdeda5930532f' .
'b3dd117278e494401433630e7461c1dc9b801b2e552015a513ff7ae7973ef44b8352e4e04979b31eb600654d51f4a481c
ebe3f0bd099d130d1456fabe04a3e98' .
'85c8c4fb297b86b57752cd6419809fe37e6286f07732d1e069a5b4e56670b8bbbae5c211742a131d05711cf1fe22af933f
1eef224762e3aadac17c40e448ca41' .
'a879a03d3cf665f239c7f3fe82b384e835e7c9e8bdee30c268a2121284789df42f44906f19b79026464436e1da64fa0c53a
377fa0d2b012b7ddc2855dae5b551' .
'51e28034112120b5e79ec5f26a9f69da85d74ef6a97a0b1164efa25fb1ae26ba451ccda7a2e784339c447d562549a60bf0
676294bf580c919ec457025d3c7860' .
'b98296c0ab9fe5b1d353882e26c1f721b41899d972b5a1d5050b684536448010af8c7aff7ce8eaccb9b1fbbdc929d4f5d49
9fb812924df302cb3c45023386297' .
'9396b3a46cd0ff7f11426711c459297b65d1cef66c18751e094bf08f3b2981c5cce52d963d5a4259a64557e4d1b9efe0d9a5
16d1e6ec8bb37066825aea6361660' .
'2bd7d11625a06a90739b4d0a06ea872a3af9eba12629bed67940561bd9374a89d60f0d722c9feb6833ec53f0b0fd76a20
47b66c90fceb1d2e22cc099b9a4b93e' .
'0000000f54a895176e4c295a405faf54cee82d043a45ce40b155be34ebde784785a25b7f894d424fa127b157a8a120f99f
e53102c81fa90e0b9bda1ba775df75' .
'd9152a80257a1ed352dd49e57e068ff3f02cabd4ac97dbbc3fa0205a74302f65c7f49a419e08fd54bfafc14d78abaab30dd
b3fc848e3df02c5a40eda248c9ff4' .
'7482850cfdfbdd9bc55547b7404f5803c1bb81632173127e1a93b24afb6e7a80450865db374676d576ba5296ccc6c1308
2d1ab36521f1a8ad945466b9ef06af4' .
'3a02d70b7fb8b7dc6d268c3dba6898f6552fa3fbb33dcbfada7b33fa75d93afe262bd37aff75995fd0e9774ba5a26a7c443ff
34e461502a2cb777e982d007375' .
'14b88ed28d61f428e88387df2bf02230ad17a9d44ff364850a07db42a7826ac2ee3899cac3ec274721d476d96658f53716
676587f8ff14db8de6741afa2206db' .
'a3b11828ba87c6e1e88a022f1aa8ddd037eab049b5c7d3053d0a63d7861dea07b3d8b720de068cf47e657bb44450b85d
52f749d59572df0c0e3433b47c9aa19a' .
'856f1dc3cdadbafb143035c85a53af5722038f765c0d621b66b69ffffd091d4a661a453bf1daed1a3a2341b37d7f623b158f
6ec02b49a25364430fcb5861483e' .
'1e9543ed2ee7e54a4c108a6e641940980ee60d14aee559af30037e75b2309ce021ffe3109bf2053892ab0ae403516e2ab
58067f70203010001a31a3018300906' .
'03551d1304023000300b0603551d0f0404030205e0';
my ($hex) = pack( 'H*', $C2hex);
print $out "$hex";
close($out);
use Digest::MD5 qw(md5_hex);
$hash = md5_hex($hex);
printf ("md5_X509-C2:%s\n",$hash);
#-----------------------------------------------------------------
open(my $out, '>:raw', 'C2R.bin') or die "Unable to open: $!";
my $C2Rhex = reverse $C2hex;
my ($hex) = pack( 'H*', $C2Rhex);
print $out "$hex";
close($out);
$hash = md5_hex($hex);
printf ("md5_X509-C2R:%s\n",$hash);
#-----------------------------------------------------------------
exit 0 ;
```

FIG. 7D

| Multiple Digital Signature Set (MDSS) 3330 |
|---|
| Forward Signature = (Forward Hash Digest)$^E$mod(N) 3332 |
| Hexadecimal-Reverse Signature = (Hexadecimal-Reverse Hash Digest)$^E$mod(N) 3334 |
| Byte-Reverse Signature = (Byte-Reverse Hash Digest)$^E$mod(N) 3336 |
| Bit-Reverse Signature = (Bit-Reverse Hash Digest)$^E$mod(N) 3338 |
| Hex Fwd-Rev-Multiplex-Reverse Signature = (Hex Fwd-Rev-Multiplex -Reverse Hash Digest)$^E$mod(N) 3340 |
| Sector-Reverse Signature = (Sector-Reverse Hash Digest)$^E$mod(N) 3342 |

| X.509 CERTIFICATE WITH MDSS 3350 |
|---|
| Version 3352 |
| Certificate Serial Number 3354 |
| Certificate Algorithm Identifier for Certificate Issuer's Signature 3356 |
| Issuer 3358 |
| Validity Period 3360 |
| Subject 3362 |
| Subject Public Key Information (Algorithm Identifier and Public-Key Value) 3364 |
| Issuer Unique Identifier (optional) 3366 |
| Subject Unique Identifier (optional) 3368 |
| Extensions (optional) 3370 |
| Certificate Authority's Multiple Digital Signature Set (MDSS) 3330 (Includes Listing Of All Hash Digest Types Used) |

FIG. 7H

X.509 CERTIFICATE WITH MHDS 3350

| |
|---|
| Version 3352 |
| Certificate Serial Number 3354 |
| Certificate Algorithm Identifier for Certificate Issuer's Signature 3356 |
| Issuer 3358 |
| Validity Period 3360 |
| Subject 3362 |
| Subject Public Key Information (Algorithm Identifier and Public-Key Value) 3364 |
| Issuer Unique Identifier (optional) 3366 |
| Subject Unique Identifier (optional) 3368 |
| Extensions (optional) 3370 |

Certificate Authority's Multiple Hash Digital Signature (MHDS) 3372 (Includes listing and order of Hash Digest Types Used to Form Concatenated Hash Digest)

FIG. 7K

Today's Hash Digests
(Hashed Only Once, in the Forward Direction)

| Hash Algorithm<br><br>1501 | Digest Length "L" Bits (Bytes)<br>1502 | Preimage Attack $2^L$<br><br>1503 | Security Claim (Birthday Attack) $2^{L/2}$<br>1504 | Best Known Attack<br><br>1505 |
|---|---|---|---|---|
| MD5 | 128b (16B) | $2^{128}$ | $2^{64}$ | $2^{18}$ |
| SHA-1 | 160b (20B) | $2^{160}$ | $2^{80}$ | $2^{63.1}$ |
| SHA-256 | 256b (32B) | $2^{256}$ | $2^{128}$ | |
| SHA-512 | 512b (64B) | $2^{512}$ | $2^{256}$ | |

Improving the Preimage Attack and Security Claim By Using "R" Reverse Digests

| Hash Algorithm 1511 | Number of Reverse Digests "R" Each of Length "L" 1512 | Total Digest Length "(1+R)*L" Bits (Bytes) 1513 | Preimage Attack $2^{(1+R)*L}$ 1514 | Security Claim $2^{(1+R)*L/2}$ 1515 |
|---|---|---|---|---|
| MD5 | 0 | 128 (16) | $2^{128}$ | $2^{64}$ |
| MD5 | 1 | 256 (32) | $2^{256}$ | $2^{128}$ |
| MD5 | 2 | 384 (48) | $2^{384}$ | $2^{192}$ |
| MD5 | 3 | 512 (64) | $2^{512}$ | $2^{256}$ |
| MD5 | 4 | 640 (80) | $2^{640}$ | $2^{320}$ |
| SHA-1 | 0 | 160 (20) | $2^{160}$ | $2^{80}$ |
| SHA-1 | 1 | 320 (40) | $2^{320}$ | $2^{160}$ |
| SHA-1 | 2 | 480 (60) | $2^{480}$ | $2^{240}$ |
| SHA-1 | 3 | 640 (80) | $2^{640}$ | $2^{320}$ |
| SHA-1 | 4 | 800 (100) | $2^{800}$ | $2^{400}$ |
| SHA-256 | 0 | 256 (32) | $2^{256}$ | $2^{128}$ |
| SHA-256 | 1 | 512 (64) | $2^{512}$ | $2^{256}$ |
| SHA-256 | 2 | 768 (96) | $2^{768}$ | $2^{384}$ |
| SHA-256 | 3 | 1024 (128) | $2^{1024}$ | $2^{512}$ |
| SHA-256 | 4 | 1280 (160) | $2^{1280}$ | $2^{640}$ |
| SHA-512 | 0 | 512 (64) | $2^{512}$ | $2^{256}$ |
| SHA-512 | 1 | 1024 (128) | $2^{1024}$ | $2^{512}$ |
| SHA-512 | 2 | 1536 (192) | $2^{1536}$ | $2^{768}$ |
| SHA-512 | 3 | 2048 (256) | $2^{2048}$ | $2^{1024}$ |
| SHA-512 | 4 | 2560 (320) | $2^{2560}$ | $2^{1280}$ |

| Hash Digest 1121 | Stored Contents 1122 |
|---|---|
| M1 MD5 Forward Digest<br>79054025<br>255FB1A2<br>6E4BC422<br>AEF54EB4<br>Hex Reverse Digest<br>1FE11FD0<br>8C5AADC2<br>B70059FB<br>097C4433<br>1123 | Message M1 (128-Bytes)<br><br>d131dd02  c5e6eec4  693d9a06  98aff95c<br>2fcab587  12467eab  4004583e  b8fb7f89<br>55ad3406  09f4b302  83e48883  2571415a<br>085125e8  f7cdc99f  d91dbdf2  80373c5b<br>d8823e31  56348f5b  ae6dacd4  36c919c6<br>dd53e2b4  87da03fd  02396306  d248cda0<br>e99f3342  0f577ee8  ce54b670  80a80d1e<br>c69821bc  b6a88393  96f9652b  6ff72a70<br><br>104 |
| M2 MD5 Forward Digest<br>79054025<br>255FB1A2<br>6E4BC422<br>AEF54EB4<br>Hex Reverse Digest<br>3573EA2B<br>BB9AEF10<br>2E7C236A<br>66B8028D<br>1125 | Message M2 (128-Bytes)<br><br>d131dd02  c5e6eec4  693d9a06  98aff95c<br>2fcab507  12467eab  4004583e  b8fb7f89<br>55ad3406  09f4b302  83e48883  25f1415a<br>085125e8  f7cdc99f  d91dbd72  80373c5b<br>d8823e31  56348f5b  ae6dacd4  36c919c6<br>dd53e234  87da03fd  02396306  d248cda0<br>e99f3342  0f577ee8  ce54b670  80280d1e<br>c69821bc  b6a88393  96f965ab  6ff72a70<br><br>106 |

FAST SEARCH INDEX

| FAST SEARCH INDEX BLOCKCHAIN IDENTIFIER | PRIME NUMBERS USED TO GENERATE MODULO-HASH INDIRECT-ADDRESSING POINTER: Pa = 7, Pb = 7 | | | | | | |
|---|---|---|---|---|---|---|---|
| | a = 0 | a = 1 | a = 2 | a = 3 | a = 4 | a = 5 | a = 6 |
| b = 0 | | M1 ACTUAL STORAGE ADDRESS | | | | | |
| b = 1 | | | | | | | |
| b = 2 | | | X509 C2 ACTUAL STORAGE ADDRESS | | | | |
| b = 3 | | M2 ACTUAL STORAGE ADDRESS | X509 C1 ACTUAL STORAGE ADDRESS | | | | M4 ACTUAL STORAGE ADDRESS |
| b = 4 | | | | | | | |
| b = 5 | | | | | | | M3 ACTUAL STORAGE ADDRESS |
| b = 6 | | | | | | | |

FAST SEARCH INDEX

| FAST SEARCH INDEX BLOCKCHAIN IDENTIFIER | PRIME NUMBERS USED TO GENERATE MODULO-HASH INDIRECT-ADDRESSING POINTER: Pa = 3, Pb = 3, Pc = 3 |
|---|---|
| | |

| c = 0 | a = 0 | a = 1 | a = 2 |
|---|---|---|---|
| b = 0 | | M3 Actual Storage Address | |
| b = 1 | | | M1 Actual Storage Address |
| b = 2 | | | |

| c = 1 | a = 0 | a = 1 | a = 2 |
|---|---|---|---|
| b = 0 | | | |
| b = 1 | | | |
| b = 2 | | | |

| c = 2 | a = 0 | a = 1 | a = 2 |
|---|---|---|---|
| b = 0 | | M4 Actual Storage Address | |
| b = 1 | | | |
| b = 2 | | | M2 Actual Storage Address |

FAST SEARCH INDEX

3020

| FAST SEARCH INDEX BLOCKCHAIN IDENTIFIER | PRIME NUMBERS USED TO GENERATE MODULO-HASH INDIRECT-ADDRESSING POINTER: Pa = 5, Pb = 5, Pc = 5, Pd = 5 |
|---|---|
| | |

|  | a = 0 | a = 1 | a = 2 | a = 3 | a = 4 |
|---|---|---|---|---|---|
| b = 0 | | | | | |
| b = 1 | | | | | |
| b = 2 | | | | | |
| b = 3 | | | | | |
| b = 4 | | | | | |

| a = 1<br>b = 1 | c = 0 | c = 1 | c = 2 | c = 3 | c = 4 |
|---|---|---|---|---|---|
| d = 0 | | | | | |
| d = 1 | | | M4 ACTUAL STORAGE ADDRESS | M3 ACTUAL STORAGE ADDRESS | |
| d = 2 | | | | | |
| d = 3 | | | | | |
| d = 4 | | | | | |

```
#Search Pointers based on Blockchain hash digests of Message M1
M1F  = 0x79054025255FB1A26E4BC422AEF54EB4;
M1RH = 0x1FE11FD08C5AADC2B70059FB097C4433;
M1RB = 0x63692F882033B4E2C13D437F35E33271;
print(M1F % 7, M1RH % 7);
print(M1F % 3, M1RH % 3, M1RB % 3);
#Search Pointers based on Blockchain hash digests of Message M2
M2F  = 0x79054025255FB1A26E4BC422AEF54EB4;
M2RH = 0x3573EA2BBB9AEF102E7C236A66B8028D;
M2RB = 0xBF5BF87F65E79B98AF7985885F3E5EE0;
print(M2F % 7, M2RH % 7);
print(M2F % 3, M2RH % 3, M2RB % 3);
#Search Pointers based on Blockchain hash digests of Message M3
M3F  = 0x008EE33A9D58B51CFEB425B0959121C9;
M3RH = 0x3727C41294872D676AA94C9D7AF81BFC;
M3RB = 0x2058DE3D4C8C4928C530DDAD2E1EB753;
M3M  = 0xB4D921B30512C4541516EDABF0199A40;
print(M3F % 7, M3RH % 7);
print(M3F % 3, M3RH % 3, M3RB % 3);
print(M3F % 5, M3RH % 5, M3RB % 5, M3M % 5);
#Search Pointers based on Blockchain hash digests of Message M4
M4F  = 0x008EE33A9D58B51CFEB425B0959121C9;
M4RH = 0x492D677A1CD91F2702422DD90B0B6622;
M4RB = 0x67BB52507618FE4EE6B23577270BD599;
M4M  = 0xA06B45BBB0FF623C9AF645093C98BB11;
print(M4F % 7, M4RH % 7);
print(M4F % 3, M4RH % 3, M4RB % 3);
print(M4F % 5, M4RH % 5, M4RB % 5, M4M % 5);
#Search Pointer based on Blockchain hash digests of Certificate X.509-C1
X509C1F  = 0xC6B2FE88912770FC6F2DB71F58C7D251;
X509C1RH = 0x2FE7102C86A057AD3443F860BF909A80;
print(X509C1F % 7, X509C1RH % 7);
#Search Pointer based on Blockchain hash digests of Certificate X.509-C2
X509C2F  = 0xC6B2FE88912770FC6F2DB71F58C7D251;
X509C2RH = 0x55DDD509996B983247DFB52E7F8784F9;
print(X509C2F % 7, X509C2RH % 7);
```

```
>>> #Search Pointers based on Blockchain hash digests of Message M1
... M1F = 0x79054025255FB1A26E4BC422AEF54EB4;
>>> M1RH = 0x1FE11FD08C5AADC2B70059FB097C4433;
>>> M1RB = 0x63692F882033B4E2C13D437F35E33271;
>>> print(M1F % 7, M1RH % 7);
(1L, 0L)
>>> print(M1F % 3, M1RH % 3, M1RB % 3);
(2L, 1L, 0L)
>>> #Search Pointers based on Blockchain hash digests of Message M2
... M2F = 0x79054025255FB1A26E4BC422AEF54EB4;
>>> M2RH = 0x3573EA2BBB9AEF102E7C236A66B8028D;
>>> M2RB = 0xBF5BF87F65E79B98AF7985885F3E5EE0;
>>> print(M2F % 7, M2RH % 7);
(1L, 3L)
>>> print(M2F % 3, M2RH % 3, M2RB % 3);
(2L, 2L, 2L)
>>> #Search Pointers based on Blockchain hash digests of Message M3
... M3F = 0x008EE33A9D58B51CFEB425B0959121C9;
>>> M3RH = 0x3727C41294872D676AA94C9D7AF81BFC;
>>> M3RB = 0x2058DE3D4C8C4928C530DDAD2E1EB753;
>>> M3M  = 0xB4D921B30512C4541516EDABF0199A40;
>>> print(M3F % 7, M3RH % 7);
(6L, 5L)
>>> print(M3F % 3, M3RH % 3, M3RB % 3);
(1L, 0L, 0L)
>>> print(M3F % 5, M3RH % 5, M3RB % 5, M3M % 5);
(1L, 1L, 3L, 1L)
```

FIG. 12Q

3034 

```
>>> #Search Pointers based on Blockchain hash digests of Message M4
... M4F = 0x008EE33A9D58B51CFEB425B0959121C9;
>>> M4RH = 0x492D677A1CD91F2702422DD90B0B6622;
>>> M4RB = 0x67BB52507618FE4EE6B23577270BD599;
>>> M4M  = 0xA06B45BBB0FF623C9AF645093C98BB11;
>>> print(M4F % 7, M4RH % 7);
(6L, 3L)
>>> print(M4F % 3, M4RH % 3, M4RB % 3);
(1L, 0L, 2L)
>>> print(M4F % 5, M4RH % 5, M4RB % 5, M4M % 5);
(1L, 1L, 2L, 1L)
>>> #Search Pointer based on Blockchain hash digests of Certificate X.509-C1
... X509C1F = 0xC6B2FE88912770FC6F2DB71F58C7D251;
>>> X509C1RH = 0x2FE7102C86A057AD3443F860BF909A80;
>>> print(X509C1F % 7, X509C1RH % 7);
(2L, 3L)
>>> #Search Pointer based on Blockchain hash digests of Certificate X.509-C2
... X509C2F = 0xC6B2FE88912770FC6F2DB71F58C7D251;
>>> X509C2RH = 0x55DDD509996B983247DFB52E7F8784F9;
>>> print(X509C2F % 7, X509C2RH % 7);
(2L, 2L)
```

FIG. 12R

Number of Individual Data Cells/Storage Sectors Identified by Pointers

| Prime Number P | Two Dimensional Array Cells P^2 | Three Dimensional Array Cells P^3 | Four Dimensional Array Cells P^4 |
|---|---|---|---|
| Fp(n=0) = 3 | 9 | 27 | 81 |
| Fp(n=1) = 5 | 25 | 125 | 625 |
| M(n=3) = 7 | 49 | 343 | 2,401 |
| Fp(n=2) = 17 | 289 | 4,913 | 83,512 |
| Fp(n=3) = 257 | 66,049 | 16,974,593 | 4,362,470,401 |
| Fp(n=4) = 65537 | 4,295,098,369 | 2.8 * 10^14 | 1.8 * 10^19 |
| M(n=17) = 131071 | 1.7 * 10^10 | 2.2 * 10^15 | 2.9 * 10^20 |
| M(n=19) = 524287 | 2.7 * 10^11 | 1.4 * 10^14 | 7.5 * 10^22 |
| M(n=31) = 2147483647 | 4.6 * 10^18 | 9.9 * 10^27 | 2.1 * 10^37 |

COLLISION RESISTANT DIGITAL SIGNATURES

FIELD OF THE INVENTION

The present invention relates to the field of collision resistant digital signatures.

BACKGROUND

Blockchain technology is finding increasing use for insuring the error-free transfer of information. A key part of a blockchain is the hash digest. Hash algorithms take input data and converts it to, at a very high probability, a unique series of digits called a hash digest. The hash function demonstrates the avalanche effect, where a tiny change in the input, no matter how small, creates a significant change to the output digest. A variety of hashing algorithms are used to form hash digests for blockchains including MD5, SHA-1, SHA-224, SHA-512/224, SHA-256, SHA-512/256, SHA-384, SHA-512, and SHA-3. SHA stands for Secure Hash Algorithm. Hash algorithms and hash digest have a variety of uses for cryptography, a checksum to verify data integrity, and other non-cryptographic uses such as determining the partition for a key in a partitioned database. One basic requirement of any cryptographic hash function is that it should be computationally infeasible to find two distinct sets of data that produce the same hash digest when hashed. When two distinct sets of data do produce the same hash digest when hashed, the result is termed a "collision." The more digits in this hash digest, the less likely that there would be a collision, where different input had the same hash digest. MD5, for example, produces hash digests having a length of 128 bits. SHA-256, on the other hand, produces hash digests having a length of 256 bits. Collisions can be exploited by hackers to thwart cryptographic security, such as with the Flame malware in 2012. For example, the MD5 hash algorithm was initially designed to be used as a cryptographic hash function but has been found to suffer from extensive vulnerabilities due to collisions. Specifically, the MD5 blockchain hash digest algorithm has been proven to have weaknesses that allow for two different files, each the same length of bytes, to have the same MD5 hash digest, which is called a collision. MD5 and SHA-1 have both published techniques more efficient than brute force for finding collisions. SHA-256 is known to possess collisions. Every hash function with more inputs than outputs will necessarily have collisions. The objective for security applications is to generate hashing algorithms that are free of collisions to eliminate that potential vulnerability that can be exploited by others.

SUMMARY

The objective of this patent specification is to provide a specific implementation of blockchain technology that utilizes known hash algorithms to produce hash digests in a manner that avoids the occurrence of collisions, thereby producing a high security collision resistant blockchain. The idea of using hash algorithms to produce hash digests to secure data in blockchain technology is known. For example, all of the following algorithms have been used to produce hash digests for blockchains: MD5, SHA-1, SHA-224, SHA-512/224, SHA-256, SHA-512/256, SHA-384, SHA-512, and SHA-3. However, as discussed in the background, vulnerabilities exist in these hash algorithms that give bad actors the opportunity to thwart the security of blockchain technology. The present application produces a collision resistant blockchain by utilizing known hash algorithms in multiple different configurations. Specifically, the present application discloses a technological technique to create a collision resistant blockchain by hashing a digital data file in two directions, the first direction being from front-to-back as is done today, and the second direction is from back-to-front. This bidirectional approach as taught by the present application involves two hash digests, a forward blockchain hash digest and a reverse blockchain hash digest. The forward blockchain hash digest is one in which the data of a file is hashed with a hash algorithm in the front-to-back direction as is done today. The present application discloses the use of an additional hash digest, the reverse blockchain hash digest, that hashes the data file in the back-to-front direction. Both of these hash digests, the forward blockchain hash digest and the reverse blockchain has digest, are then incorporated together as a set within a block of the collision resistant blockchain. When two different data sets that have their data hashed front-to-back produce a collision, the same collision will not result when those same two different data sets have their data hashed back-to-front. This bidirectional approach is shown by the following specification to distinguish between published pairs of files having actual MD5 collisions. This bidirectional approach involves the parallel use of a first hash digest processor in the front-to-back "forward" direction and a second hash digest processor in the back-to-front "reverse" direction. Because a file may have multiple simultaneous read accesses, hashing-in-parallel means the bidirectional approach takes no additional time, while providing additional protection against collisions. This hashing-in-parallel by multiple processors may occur simultaneously to eliminate additional computing time. Each digital data file is then identified by multiple hash digests, specifically a front-to-back forward blockchain hash digest, which is today's method, and at least one back-to-front reverse blockchain hash digest. Hashing the data for two different sets of data in both the front-to-back direction and the back-to-front direction to produce separate hash digests, forward hash digests and reverse hash digests, greatly reduces the occurrence of collisions in hashing the two different data sets. When using both a forward blockchain hash digest and a reverse blockchain hash digest to uniquely identify a set of data, a collision would only occur when both the forward blockchain hash digest and reverse blockchain hash digest of that data set match the forward blockchain hash digest and reverse blockchain hash digest of a different data set. The combination of a forward blockchain hash digest and a reverse blockchain hash digest form a collision resistant hash digest pair.

The present application discloses a collision resistant blockchain network that includes a network formed of a plurality of nodes and a collision resistant blockchain formed of a plurality of blocks redundantly stored across the nodes of the network. Each block of the collision resistant blockchain contains data. Each block also contains a forward blockchain hash digest formed from hashing the data front-to-back and a reverse blockchain hash digest formed from hashing the data back-to-front, whereby collisions that occur when two different sets of data are hashed front-to-back do not reoccur when those two different sets of data are also hashed back-to-front, thereby distinguishing the two different sets of data. The reverse blockchain hash digest is formed by reversing the data for hashing by hexadecimal-reverse, byte-reverse, bit-reverse, hard-disk-drive sector reverse, or forward-reverse multiplex. The network also includes Network Attached Storage that stores the data that is incorporated into the collision resistant blockchain. The network also a collision resistant blockchain appliance that includes a hashing system, wherein the collision resistant blockchain appliance accesses the data from the Network Attached Storage to generate the forward blockchain hash digest and the reverse blockchain hash digest. The hashing system includes a first hash processor configured to process the data from front-to-back and generate the forward blockchain hash digest, wherein the hashing system includes a second hash processor configured to process the data from back-to-front and generate the reverse blockchain hash digest. The forward blockchain hash digest and the reverse blockchain hash digest are formed from the data by the hashing system using a hash process such as MD5, SHA-1, SHA-224, SHA-512/224, SHA-256, SHA-512/256, SHA-384, SHA-512, and SHA-3. The forward blockchain hash digest and the reverse blockchain hash digest combine to form a total digest that has double the number of bytes compared to just the length of a forward hash digest alone, thereby increasing the preimage attack strength of each of the above hash processes from $2^L$ to $2^{2L}$ where L is the hash digest length. The first and second hash processors generate the forward blockchain hash digest and the reverse blockchain hash digest in parallel and simultaneously. Each block may contain a pair of reverse blockchain hash digests. The forward blockchain hash digest and the pair of reverse blockchain hash digests combine to form a total digest that has triple the number of bytes compared to just the length of a forward hash digest alone, thereby increasing the preimage attack strength of each of the above hash processes from $2^L$ to $2^{3L}$ where L is the hash digest length. Each reverse blockchain hash digest of the pair is formed differently by reversing the data differently by hexadecimal-reverse, byte-reverse, bit-reverse, hard-disk-drive sector reverse, or forward-reverse multiplex, thereby further reducing the occurrence that collisions could result from two different sets of data. In this configuration, each data set is uniquely identified by three different hash digests, one forward blockchain hash digest, a first reverse blockchain hash digest using a hash based on reversing the data by hexadecimal-reverse, byte-reverse, bit-reverse, hard-disk-drive sector reverse, or forward-reverse multiplex, and a second reverse blockchain hash digest that uses a hash based on reversing the data using one of the data reversing techniques available for the first reverse blockchain hash digest that was not selected to produce the first reverse blockchain hash digest. With this triple-hash digest configuration, a collision would only occur when two sets of data produce the same forward hash digests, the same first reverse hash digests, and the same second reverse hash digests. As such, the occurrence of collisions is greatly reduced. The blocks of the collision resistant blockchain contain a metadata wrapper that includes hash metadata identifying the hash algorithm used to form the forward blockchain hash digest and the reverse blockchain hash digest. The metadata wrapper also includes reverse process metadata identifying whether the data was reversed by hexadecimal-reverse, byte-reverse, bit-reverse, hard-disk-drive sector reverse, or forward-reverse multiplex. The hash metadata and reverse process metadata are generated by the collision resistant blockchain appliance. The collision resistant blockchain forms a cryptocurrency, a security certificate, a smart contract, or supports data deduplication.

A non-transitory computer tangible medium containing instructions for executing a collision resistant blockchain process for data is disclosed by the present application. This process includes accessing a stored data file from a digital data storage device and generating a forward blockchain hash digest based on the stored file with a first processor by hashing the data front-to-back. The process also includes generating a reverse blockchain hash digest based on the stored file with a second processor by hashing the data back-to-front and storing both the forward blockchain hash digest and the reverse blockchain hash digest together with the data file in a block of a collision resistant blockchain. Collisions that occur when two different sets of data are hashed front-to-back do not reoccur when those two different sets of data are also hashed back-to-front, thereby distinguishing the two different sets of data. The reverse blockchain hash digest is formed by reversing the data for hashing by hexadecimal-reverse, byte-reverse, bit-reverse, hard-disk-drive sector reverse, or forward-reverse multiplex. The forward blockchain hash digest and reverse blockchain hash digest are formed simultaneously in parallel by the first and second processors. The forward blockchain hash digest and the reverse blockchain hash digest are formed from the data by the hashing system using a hash process such as MD5, SHA-1, SHA-224, SHA-512/224, SHA-256, SHA-512/256, SHA-384, SHA-512, and SHA-3. The forward blockchain hash digest and the reverse blockchain hash digest combine to form a total digest that has double the number of bytes compared to just the length of a forward hash digest alone, thereby increasing the preimage attack strength of each of the above hash processes from $2^L$ to $2^{2L}$ where L is the hash digest length. The process also includes generating first metadata on the type of hash process used to generate the forward blockchain hash digest and generating second metadata on whether the data was reversed by hexadecimal-reverse, byte-reverse, bit-reverse, hard-disk-drive sector reverse, or forward-reverse multiplex. The process stores the first and second metadata in the block of the collision resistant blockchain. The collision resistant blockchain may form a cryptocurrency, a security certificate, a smart contract, or supports data deduplication.

The present application discloses a method of distributing a collision resistant blockchain across a distributed network. This method includes accessing a stored data file from a Network Attached Storage device and generating a forward blockchain hash digest based on the stored file with a first processor by hashing the data front-to-back. The method also includes generating a reverse blockchain hash digest based on the stored file with a second processor by hashing the data back-to-front and storing both the forward blockchain hash digest and the reverse blockchain hash digest together with the data file in a block of a collision resistant blockchain. Collisions that occur when two different sets of data are hashed front-to-back do not reoccur when those two different sets of data are also hashed back-to-front, thereby distinguishing the two different sets of data. The method also includes distributing copies of the collision resistant blockchain to a plurality of nodes of a distributed network for storage. The Network Attached Storage device is connected to the distributed network. The method also includes generating the forward blockchain hash digest and the reverse blockchain hash digest using a hash process such as MD5, SHA-1, SHA-224, SHA-512/224, SHA-256, SHA-512/256, SHA-384, SHA-512, and SHA-3. The forward blockchain hash digest and the reverse blockchain hash digest combine to form a total digest that has double the number of bytes compared to just the length of a forward hash digest alone, thereby increasing the preimage attack strength of each of the above hash processes from $2^L$ to $2^{2L}$ where L is the hash digest length. The method includes generating hash metadata on the type of hash process used to generate the forward blockchain hash digest and storing the hash metadata in the block of the collision resistant blockchain. The method also includes generating the reverse blockchain hash digest by reversing the data for hashing by hexadecimal-reverse, byte-reverse, bit-reverse, hard-disk-drive sector reverse, or forward-reverse multiplex. The forward blockchain hash digest and reverse blockchain hash digest are generated simultaneously in parallel by the first and second processors. The method also includes generating reverse process metadata on whether the data was reversed by hexadecimal-reverse, byte-reverse, bit-reverse, hard-disk-drive sector reverse, or forward-reverse multiplex and storing the reverse process metadata in the block of the collision resistant blockchain. The method may also include generating a second reverse blockchain hash digest based on the stored file. The reverse blockchain hash digest and second reverse blockchain hash digest select different processes to reverse the data in the stored file for hashing such as hexadecimal-reverse, byte-reverse, bit-reverse, hard-disk-drive sector reverse, or forward-reverse multiplex. The method then includes storing the second reverse blockchain hash digest in the block of the collision resistant blockchain. The collision resistant blockchain forms a cryptocurrency, a security certificate, a smart contract, or supports data deduplication.

To demonstrate the joint forward blockchain hash digest and reverse blockchain technology disclosed by this application, the present specification examines three pairs of files exhibiting MD5 collisions. The first pair of files, each 128-Bytes, exhibiting an MD5 collision was found in a laboratory exercise from the Computer Science Department of Boston University https://www.cs.bu.edu/~goldbe/teaching/CS558517/Lab1.pdf, which is incorporated by reference in its entirety. The second pair of files, each 64-Bytes, exhibiting an MD5 collision, was published in "Single-block collision attack on MD5," by Marc Stevens, Cryptology Group, CWI P.O. Box 94079, NL-1090 GB Amsterdam, The Netherlands, Jan. 29, 2012, which is incorporated by reference in its entirety. The third pair of files exhibiting an MD5 X.509 certificate collision, each 1301-Bytes, was published in "Chosen-prefix Collisions for MD5 and Colliding X.509 Certificates for Different Identities," by Marc Stevens, Arjen Lenstra, and Benne de Weger. The actual contents of the colliding X.509 certificate files were found at https://www.win.tue.nl/hashclash/ChosenPrefixCollisions/ under the heading of "The Collision Example," which is hereby incorporated by reference in its entirety. Each of these three pairs of files herein was independently confirmed to have an MD5 hash digest collision in the front-to-back "forward" direction as shown in the following specification. Subsequently, this application discloses that each of these three pairs of "colliding" files is distinguished by non-identical MD5 hash digests in the back-to-front "reverse" direction. One set of back-to-front direction MD5 hash digests is calculated for all three pairs of files by reading each hexadecimal character in reverse. For the first two pairs of files, which are considerably shorter than the third pair of files, a second set of back-to-front direction MD5 hash digests is calculated by reading each byte, a pair hexadecimal characters, in reverse. A metadata wrapper is used to associate multiple hash digests with each file. This metadata wrapper is then stored in a block of the collision resistant blockchain. This bidirectional blockchain hash digest generation has utility for applications such as data deduplication, X.509 certificate security, smart contracts, cryptocurrencies, and the like.

This bidirectional blockchain hash digest technology is not limited to the MD5 hash algorithm, as a SHA-1 collision was reported in "The First Collision for full SHA-1," by Marc Stevens, Elie Bursztein, Pierre Karpman, Ange Albertini, and Yarik Markov, https://shattered.io. The MD5 hash algorithm was chosen for this patent application because there are multiple pairs of equal-length files having an MD5 collision in the forward-to-reverse direction and these colliding pairs of files are small in size, 128-bits, suitable for use in figures within this patent application. The improvements achieved for this bidirectional approach for MD5 may also be achieved by any blockchain hash algorithm, including but not limited to SHA-1, SHA-224 and SHA-512/224, SHA-256 and SHA-512/256, SHA-384, SHA-512, SHA-3, and the like.

The present specification also discloses a data deduplication process for storage based on collision resistant hash digests. The process accesses a first data message from a data storage appliance and accesses a second data message from the data storage appliance. The process then compares a forward hash digest of the first data message to a forward hash of the second data message. The forward hash digests are formed from hashing message data front-to-back. The process then compares a reverse hash digest of the first data message to a reverse hash of the second data message when there is a collision between the forward hash digests of the first and second data messages. The reverse hash digests are formed from hashing message data back-to-front. The process then replaces the second data message with a data pointer to the first data message and deletes the second data message from the storage appliance when there is a collision between the forward and reverse hash digests of the first and second data messages for deduplication. The second data message is not deduplicated when there is no collision between the forward hash digests of the first and second data messages, or when there is no collision between the reverse hash digests of the first and second data messages. The reverse hash digest is formed by reversing the hexidecimal data within a data message to form a new reverse message by a process such as hexadecimal-reverse, byte-reverse, bit-reverse, hard-disk-drive sector reverse, or forward-reverse multiplex and hashing the new reverse message with a hash algorithm. The hash algorithms include MD5, SHA-1, SHA-224, SHA-512/224, SHA-256, SHA-512/256, SHA-384, SHA-512, and SHA-3. The forward and reverse hash digests are computer simultaneously in parallel by a pair of hash core processors. The process may further include comparing a second reverse hash digest of the first data message to a second reverse hash of the second data message when there is a collision between the reverse hash digests of the first and second data messages. The second reverse hash digest is formed by a different method than the reverse hash digest. The process then replaces the second data message with a data pointer to the first data message and deletes the second data message from the storage appliance when there is a collision between the second reverse hash digests of the first and second data messages for deduplication.

The present specification also discloses a data deduplication process for file transmission based on collision resistant hash digests. The process includes accessing a data message from data storage appliance at a sender network node and accessing a forward hash digest of the data message. The process then determines whether the forward hash digest of the data message is contained within a ledger at a receiver network node. The process then accesses a reverse hash digest of the data message and determines whether the reverse hash digest of the data message is contained within the ledger at the receiver network node if the forward hash digest is contained within the ledger. Finally, the process then determines not to transmit the data message from the sender network node to the receiver network node when the receiver network node contains both the forward and reverse hash digests to prevent data duplication, where the sender and receiver network nodes are in communication with each other through a distributed network. The forward hash digest is formed from hashing the data message front-to-back. The reverse hash digest is formed from hashing the data message back-to-front. The reverse hash digest is formed by reversing the hexadecimal data within a data message to form a new reverse message by a process such as hexadecimal-reverse, byte-reverse, bit-reverse, hard-disk-drive sector reverse, or forward-reverse multiplex and then hashing the new reverse message with a hash algorithm. The hash algorithm for the forward and reverse hash digests may be MD5, SHA-1, SHA-224, SHA-512/224, SHA-256, SHA-512/256, SHA-384, SHA-512, or SHA-3.

The present specification also discloses a data deduplication process for data backup and restore based on collision resistant hash digests. The process accesses a data message from data storage appliance at a network node for data backup at a data backup storage system. The process then accesses a forward hash digest of the data message and determines whether the forward hash digest of the data message is contained within a ledger at the data backup storage system. The system then accesses a reverse hash digest of the data message and determines whether the reverse hash digest of the data message is contained within the ledger at the data backup storage system if the forward hash digest is contained within the ledger. The process then determines not to transmit the data message from the network node to the data backup storage system when the data backup storage system contains both the forward and reverse hash digests to prevent data duplication. The network node and the data backup storage system are in communication with each other through a distributed network. The forward hash digest is formed from hashing the data message front-to-back. The reverse hash digest is formed from hashing the data message back-to-front. The reverse hash digest is formed by reversing the hexadecimal data within a data message to form a new reverse message by a process such as hexadecimal-reverse, byte-reverse, bit-reverse, hard-disk-drive sector reverse, or forward-reverse multiplex and hashing the new reverse message with a hash algorithm. The hash algorithm for the forward and reverse hash digests may be MD5, SHA-1, SHA-224, SHA-512/224, SHA-256, SHA-512/256, SHA-384, SHA-512, and SHA-3.

The present specification also discloses a computer tangible medium storing instructions for a collision resistant process for signing a digital message with a Digital Signature. The process includes reading a digital message from memory, generating a forward hash digest of the digital message formed from hashing the digital message front-to-back as well as generating a reverse hash digest of the digital message formed from hashing the digital message back-to-front, generating a forward digital signature based on the forward hash digest and a reverse digital signature based on the reverse hash digest, and appending both the forward and reverse digital signatures to the digital message as a Multiple Digital Signature Set (MDSS), whereby collisions that occur when two different digital messages are hashed front-to-back do not reoccur when those two different digital messages are also hashed back-to-front, thereby distinguishing the two different digital messages. The forward digital signature is formed with the equation where N is a public Modulus and E is a public Exponent and a prime number:

$$\text{forward digital signature} = (\text{forward hash digest})^E \bmod (N).$$

The reverse digital signature is formed with the equation where N is a public Modulus and E is a public Exponent and a prime number:

$$\text{reverse digital signature} = (\text{reverse hash digest})^E \bmod (N).$$

The hash digests are formed using a hash process such as MD5, SHA-1, SHA-224, SHA-512/224, SHA-256, SHA-512/256, SHA-384, SHA-512, and SHA-3. The reverse hash digest is a hash digest set is formed of two or more different types of reverse hash digests such as hexadecimal-reverse, byte-reverse, bit-reverse, hard-disk-drive sector reverse, and forward-reverse multiplex. Each different type of reverse hash digest is a basis for a different digital signature for the MDSS.

The present specification also discloses a computer tangible medium storing instructions for a collision resistant process for signing a digital message with a Digital Signature that includes reading a digital message from memory, generating a forward hash digest of the digital message formed from hashing the digital message front-to-back, generating a reverse hash digest of the digital message formed from hashing the digital message back-to-front, and generating a multiple-hash digital-signature based on a concatenation of the forward hash digest to the reverse hash digest and appending the multiple hash digital signature to the digital message, whereby collisions that occur when two different digital messages are hashed front-to-back do not reoccur when those two different digital messages are also hashed back-to-front, thereby distinguishing the two different digital messages. The multiple-hash digital-signature is formed with the equation where N is a public Modulus and E is a public Exponent and a prime number:

$$\text{forward digital signature} = (\text{forward hash digest\_reverse hash digest})^E \bmod(N).$$

The hash digests are formed using a hash process such as MD5, SHA-1, SHA-224, SHA-512/224, SHA-256, SHA-512/256, SHA-384, SHA-512, and SHA-3. The reverse hash digest is a hash digest set formed of two or more different types of reverse hash digests such as hexadecimal-reverse, byte-reverse, bit-reverse, hard-disk-drive sector reverse, and forward-reverse multiplex. The present specification also discloses a digital signature for a digital data message formed of a single digital signature based on a concatenation of two or more different hash digests formed from the same digital data message. The two or more different hash digests may include a forward and a reverse hash digest. The forward hash digest may be a hexadecimal-reverse hash digest, byte-reverse hash digest, bit-reverse hash digest, hexadecimal forward-reverse multiplex hash digest, and sector-reverse hash digest. The forward hash digest may be a hexadecimal-forward hash digest, a byte-forward hash digest, a bit-forward hash digest, a hexadecimal reverse-forward hash digest, or a sector-forward hash digest. The two different hash digests may be generated from two different hash algorithms such as MD5, SHA-1, SHA-224, SHA-512/224, SHA-256, SHA-512/256, SHA-384, SHA-512, and SHA-3.

The present specification also discloses a computer tangible medium storing instructions for a collision resistant process for verifying a Digital Signature. This process includes accessing a digitally signed message having a Multiple Digital Signature Set having a first signature based on a forward hash digest that hashed the message front-toback and a second signature based on a reverse hash digest that hashed the message back-to-front, generating a new forward hash digest from the message by hashing the digital message front-to-back and a new reverse hash digest from the message by hashing the digital message back-to-front, retrieving the forward and reverse hash digests from the Multiple Digital Signature Set using a key, and verifying the digitally signed message by comparing the new forward and reverse hash digests generated from the message to the retrieved forward and reverse hash digests from the Multiple Digital Signature Set. The reverse hash digest is a hash digest set formed of two or more different types of reverse hash digests such as hexadecimal-reverse, byte-reverse, bit-reverse, hard-disk-drive sector reverse, and forward-reverse multiplex. The hash digests are formed using a hash process selected such as MD5, SHA-1, SHA-224, SHA-512/224, SHA-256, SHA-512/256, SHA-384, SHA-512, and SHA-3. The forward hash digest is retrieved from the forward digital signature using the equation wherein D is a key and N is a public Modulus:

$$\text{Forward Hash Digest} = (\text{forward signature})^D \bmod(N).$$

The reverse hash digest is retrieved from the reverse digital signature using the equation wherein D is a key and N is a public Modulus:

$$\text{Reverse Hash Digest} = (\text{reverse signature})^D \bmod(N).$$

The Multiple Digital Signature Set is VALID when all of the new forward and reverse hash digests match the forward and reverse hash digests retrieved from the Multiple Digital Signature Set. The Multiple Digital Signature Set is INVALID when any one of the new forward and reverse hash digests do not match the forward and reverse hash digests retrieved from the Multiple Digital Signature Set.

The present specification also discloses a computer tangible medium storing instructions for a collision resistant process for verifying a Digital Signature. This process includes accessing a digitally signed message having a Multiple Hash Digital Signature based on a concatenation of a forward hash digest that hashed the message front-to-back and a reverse hash digest that hashed the message back-to-front, generating a new forward hash digest from the message by hashing the digital message front-to-back and a new reverse hash digest from the message by hashing the digital message back-to-front, retrieving the forward and reverse hash digests from the Multiple Hash Digital Signature using a key and undoing the concatenation of them, and verifying the digitally signed message by comparing the new forward and reverse hash digests generated from the message to the retrieved forward and reverse hash digests from the Multiple Hash Digital Signature. The forward hash digest and reverse hash digests are retrieved from the Multiple Hash Digital Signature using the equation wherein D is a key and N is a public Modulus:

$$\text{Forward Hash Digest\_Reverse Hash Digest} = (\text{Multiple Hash Digital Signature})^D \bmod(N).$$

The reverse hash digest may be a hash digest set comprised of two or more different types of reverse hash digests such as hexadecimal-reverse, byte-reverse, bit-reverse, hard-disk-drive sector reverse, and forward-reverse multiplex. The hash digests are formed using a hash process such as MD5, SHA-1, SHA-224, SHA-512/224, SHA-256, SHA-512/256, SHA-384, SHA-512, and SHA-3. The process may also include undoing the concatenation of the forward and reverse hash digests. The Multiple Hash Digital Signature is VALID when all of the new forward and reverse hash digests match the forward and reverse hash digests retrieved from the Multiple Digital Signature Set. The Multiple Digital Signature Set is INVALID when any one of the new forward and reverse hash digests do not match the forward and reverse hash digests retrieved from the Multiple Digital Signature Set.

The present specification also discloses a computer tangible medium for storing instructions for a process for storing big blockchain data using an indirect addressing process with indirect addressing pointers derived from blockchain hash digests. This process includes generating an indirect addressing pointer for blockchain block data from a blockchain hash digest from that blockchain block, storing the blockchain block data within a data store at a storage address, and storing the storage address within a big blockchain data search index at a location pointed to by the indirect addressing pointer. The indirect addressing pointer is formed based on a modulo of the blockchain hash digest of the blockchain block. The indirect addressing pointer is given by the equation where P is a prime number:

$$\text{indirect addressing pointer} = (\text{blockchain hash digest}) \bmod(P).$$

Each blockchain block contains multiple hash digests based on data within the blockchain block. The multiple hash digests include a forward blockchain hash digest based on hashing the blockchain block data front-to-back and a reverse blockchain hash digest based on hashing the blockchain block data back-to-front. A first indirect addressing pointer is based on the forward blockchain hash digest and a second indirect addressing pointer is based on the reverse blockchain hash digest. Each blockchain block includes multiple different reverse blockchain hash digests such as reverse-bit blockchain hash digest, a reverse-byte blockchain hash digest, a reverse-hexadecimal blockchain hash digest, a reverse hard-disk-drive sector blockchain hash digest, and a forward-reverse multiplex blockchain hash digest, each of which can generate a different indirect addressing pointer. The process may also include generating a blockchain metadata table containing a blockchain identifier and blockchain hash digests for each blockchain block. The process can further include searching for the blockchain block data for a particular blockchain block by first accessing the blockchain metadata table for blockchain hash digests for that particular blockchain block, generating new indirect addressing pointers from the accessed blockchain hash digests for that particular blockchain block, accessing a storage address for the blockchain block data for that particular blockchain block from the big blockchain data search index using the new indirect addressing pointers, and reading the blockchain block data. Each blockchain block within the blockchain contains multiple hash digests based on data within the blockchain block. The multiple hash digests include a forward blockchain hash digest based on hashing the blockchain block data front-to-back and a reverse blockchain hash digest based on hashing the blockchain block data back-to-front. The process may also include using the blockchain hash digests from the blockchain metadata table to identify the blockchain block data for the particular blockchain if more than one set of blockchain block data is pointed to by the indirect addressing pointer.

The present specification also discloses a method for searching for stored blockchain block data within a big blockchain data set using indirect addressing pointers generated from blockchain block hash digests. The method includes accessing a blockchain metadata table containing blockchain hash digests for each blockchain block, using the blockchain hash digests to generate an indirect addressing pointer, using the indirect addressing pointer to locate a storage address of blockchain block data from a big data storage index, and reading the blockchain block data from the storage address in a data store. Each blockchain block of the blockchain contains multiple blockchain hash digests. The multiple hash digests include a forward blockchain hash digest based on hashing the blockchain block data front-to-back and a reverse blockchain hash digest based on hashing the blockchain block data back-to-front. The method may also include using the forward and reverse blockchain hash digests to generate a set of indirect addressing pointers, using the set of indirect addressing pointer to locate a storage address of blockchain block data from a big data storage index, and reading the blockchain block data from the storage address in the data store. Each blockchain block includes multiple different reverse blockchain hash digests such as reverse-bit blockchain hash digest, a reverse-byte blockchain hash digest, a reverse-hexadecimal blockchain hash digest, a reverse hard-disk-drive sector blockchain hash digest, and a forward-reverse multiplex blockchain hash digest, each of which can generate a different indirect addressing pointer. The indirect addressing pointers are formed based on a modulo of the blockchain hash digest of each blockchain block. The indirect addressing pointer is given by the equation where P is a prime number:

indirect addressing pointer=(blockchain hash digest) modulo($P$).

The method may also include using the blockchain hash digests from the blockchain metadata table to identify the blockchain block data for a particular blockchain if more than one set of blockchain block data is pointed to by the indirect addressing pointer.

The present specification also discloses a computer tangible medium for storing instructions for a process for storing big blockchain data using a direct addressing process with direct addressing pointers derived from blockchain hash digests. The process includes generating a direct addressing pointer for blockchain block data directly from a blockchain hash digest from that blockchain block and storing the blockchain block data within a data store at a storage address directly pointed to by the direct addressing pointer. The direct addressing pointer is formed based on a modulo of the blockchain hash digest of the blockchain block. The direct addressing pointer is given by the equation where P is a prime number:

direct addressing pointer=(blockchain hash digest) modulo($P$).

Each blockchain block contains multiple hash digests based on data within the blockchain block. The multiple hash digests include a forward blockchain hash digest based on hashing the blockchain block data front-to-back and a reverse blockchain hash digest based on hashing the blockchain block data back-to-front. The direct addressing pointer is a direct addressing pointer set formed of a first direct addressing pointer based on the forward blockchain hash digest and a second direct addressing pointer based on the reverse blockchain hash digest. Each blockchain block includes multiple different reverse blockchain hash digests such as a reverse-bit blockchain hash digest, a reverse-byte blockchain hash digest, a reverse-hexadecimal blockchain hash digest, a reverse hard-disk-drive sector blockchain hash digest, and a forward-reverse multiplex blockchain hash digest, each of which can generate a different direct addressing pointer.

The present specification also discloses a method for searching for stored blockchain block data within a big blockchain data set using direct addressing pointers generated from blockchain block hash digests. The method includes accessing a blockchain metadata table containing a blockchain identifier and blockchain hash digests for each blockchain block, using the blockchain hash digests to generate a direct addressing pointer, and reading the blockchain block data from a storage address within a data store pointed to by the direct addressing pointer. Each blockchain block of the blockchain contains multiple blockchain hash digests. The multiple hash digests include a forward blockchain hash digest based on hashing the blockchain block data front-to-back and a reverse blockchain hash digest based on hashing the blockchain block data back-to-front. The process also includes using the forward and reverse blockchain hash digests to generate a set of direct addressing pointers and using the set of direct addressing pointer to read the blockchain block data from the storage address in the data store. Each blockchain block includes multiple different reverse blockchain hash digests such as a reverse-bit blockchain hash digest, a reverse-byte blockchain hash digest, a reverse-hexadecimal blockchain hash digest, a reverse hard-disk-drive sector blockchain hash digest, and a forward-reverse multiplex blockchain hash digest, each of which can generate a different direct addressing pointer. The direct addressing pointers are given by the equation where P is a prime number:

direct addressing pointer=(blockchain hash digest) modulo($P$).

The process may also include using the blockchain hash digests from the blockchain metadata table to identify the blockchain block data for a particular blockchain if more than one set of blockchain block data is pointed to by the direct addressing pointer.

Further aspects of the invention will become apparent as the following description proceeds and the features of novelty, which characterize this invention, are pointed out with particularity in the claims annexed to and forming a part of this specification.

BRIEF DESCRIPTION OF THE DRAWINGS

The novel features that are considered characteristic of the invention are set forth with particularity in the appended claims. The invention itself; however, both as to its structure and operation together with the additional objects and advantages thereof are best understood through the following description of the preferred embodiment of the present invention when read in conjunction with the accompanying drawings, wherein:

FIGS. 1-5 demonstrate a first collision between two different 128-byte messages with MD5 hashing the message front-to-back and how no corresponding collision occurs when those two different messages are hashed with MD5 back-to-front along with blockchaining the data using a collision resistant blockchain pair formed of a forward blockchain hash digest and a reverse blockchain hash digest that form a collision resistant blockchain;

FIG. 2A illustrates two MD5 blockchain hash digests for a first 128-Byte message, one front-to-back (forward) and one back-to-front (reverse) by hexadecimal number;

FIG. 2C illustrates two MD5 blockchain hash digests for a second 128-Byte message, one front-to-back (forward) and one back-to-front (reverse) by hexadecimal number;

FIGS. 3A-D demonstrate software executable on a non-transitory computer tangible medium for generating forward blockchain hash digests and reverse blockchain hash digests in accordance with collision resistant blockchain technology;

FIG. 3A illustrates a flowchart for creating a workspace to create a PERL program on an iMAC computer;

FIG. 3B illustrates a PERL program for converting ASCII characters to hexadecimal and then to binary and then calculating MD5 hash digests for a first 128-Byte message: once front-to-back (forward), once back-to-front (reverse) by hexadecimal number, and once back-to-front (reverse) by byte;

FIG. 3C illustrates a PERL program for converting ASCII characters to hexadecimal and then to binary and then calculating MD5 hash digests for a second 128-Byte message: once front-to-back (forward), once back-to-front (reverse) by hexadecimal number, and once back-to-front (reverse) by byte;

FIG. 3D illustrates a flowchart for a terminal session on an iMAC computer for running a Perl program;

FIG. 4B further illustrates two MD5 blockchain hash digests for a second 128-Byte message, one front-to-back (forward) and one back-to-front (reverse) by byte;

FIGS. 5A-5H illustrate the blockchaining of data using pairs of hash digests, a forward blockchain hash digest and reverse blockchain hash digest, which form a collision resistant blockchain pair, for a collision resistant blockchain;

FIGS. 5A and 5B illustrate a metadata wrapper for forward and reverse blockchain hash digests that form a collision resistant blockchain hash digest pair;

FIG. 5C illustrates an exemplary blockchain block data structure that includes message data and a metadata wrapper for a first 128-Byte message with a forward blockchain hash MD5 digest and a hexadecimal-reverse blockchain hash digest;

FIG. 5D illustrates an exemplary blockchain block data structure that includes message data and a metadata wrapper for a second 128-Byte message with a forward blockchain hash MD5 digest and a hexadecimal-reverse blockchain hash digest;

FIG. 5E illustrates an exemplary blockchain block data structure that includes message data and a metadata wrapper for a first 128-Byte message with a forward blockchain hash MD5 digest and two reverse blockchain hash digests, one a hexadecimal-reverse and the other a hexadecimal-reverse;

FIG. 5F illustrates an exemplary data structure for a blockchain block that includes message data and a metadata wrapper for a second 128-Byte message with a forward blockchain hash MD5 digest and two reverse blockchain hash digests, one a hexadecimal-reverse and the other a byte-reverse;

FIG. 5G illustrates a collision resistant blockchain where each block in the collision resistant blockchain is chained together by a collision resistant blockchain hash digest pair as shown in FIGS. 5C and 5D;

FIG. 5H illustrates a collision resistant blockchain where each block in the collision resistant blockchain is chained together by a collision resistant blockchain hash digest set as shown in FIGS. 5E and 5F.

FIGS. 6A-K demonstrates a second collision between two different 64-byte messages with MD5 hashing the message front-to-back and how no corresponding collision occurs when those two different messages are hashed with MD5 back-to-front;

FIG. 6A illustrates prior art first and second 64-Byte messages with identical MD5 blockchain hash digests;

FIG. 6B illustrates three MD5 blockchain hash digests for a first 64-Byte message, one front-to-back (forward), one back-to-front (reverse) by hexadecimal number, and one back-to-front (reverse) by byte;

FIG. 6C illustrates three MD5 blockchain hash digests for a second 64-Byte message, one front-to-back (forward), one back-to-front (reverse) by hexadecimal number, and one back-to-front (reverse) by byte;

FIG. 6D illustrates a PERL program for converting ASCII characters to hexadecimal and then to binary and then calculating MD5 hash digests for a first 64-Byte message: once front-to-back (forward), once back-to-front (reverse) by hexadecimal number, and once back-to-front (reverse) by byte;

FIG. 6E illustrates a PERL program for converting ASCII characters to hexadecimal and then to binary and then calculating MD5 hash digests for a second 64-Byte message: once front-to-back (forward), once back-to-front (reverse) by hexadecimal number, and once back-to-front (reverse) by byte;

FIG. 6F illustrates an exemplary data structure for a blockchain block that includes message data and a metadata wrapper for a first 64-Byte message with a forward blockchain hash MD5 digest and a hexadecimal-reverse blockchain hash digest;

FIG. 6G illustrates an exemplary data structure for a blockchain block that includes message data and a metadata wrapper for a second 64-Byte message with a forward blockchain hash MD5 digest and a hexadecimal-reverse blockchain hash digest;

FIGS. 6H-6K illustrate the creation of reverse blockchain hash digests made using a hexadecimal forward-reverse multiplex operation;

FIG. 6H depicts a flow chart illustrating the generation of a hash digest using a hexadecimal forward-reverse-multiplex process;

FIG. 6I illustrates a PERL program for creating a hash digest by a hexadecimal forward-reverse-multiplex process;

FIG. 6J depicts an exemplary data structure for a blockchain block that includes message data and a metadata wrapper for a first 64-Byte message with a forward blockchain hash MD5 digest and a hexadecimal forward-reverse-multiplex blockchain hash digest;

FIG. 6K illustrates an exemplary data structure for a blockchain block that includes message data and a metadata wrapper for a second 64-Byte message with a forward blockchain hash MD5 digest and a hexadecimal forward-reverse-multiplex blockchain hash digest;

FIGS. 7A-F demonstrates a third collision between two different 1301-Byte messages, a pair of X.509 certificates, with MD5 hashing the message front-to-back and how no corresponding collision occurs when those two different messages are hashed with MD5 back-to-front;

FIG. 7A illustrates a prior art first 1301-Byte message, an X.509 certificate, with an identical MD5 blockchain hash digest with a second 1301-Byte message;

FIG. 7B illustrates a prior art second 1301-Byte message, an X.509 certificate, with an identical MD5 blockchain hash digest with a first 1301-Byte message;

FIG. 7C illustrates a PERL program for converting ASCII characters to hexadecimal and then to binary and then calculating MD5 hash digests for a first 1301-Byte message: once front-to-back (forward), and once back-to-front (reverse) by hexadecimal number;

FIG. 7D illustrates a PERL program for converting ASCII characters to hexadecimal and then to binary and then calculating MD5 hash digests for a second 1301-Byte message: once front-to-back (forward), and once back-to-front (reverse) by hexadecimal number;

FIG. 7E illustrates an exemplary data structure for a blockchain block that includes message data and a metadata wrapper for a first 1301-Byte message with a forward blockchain hash MD5 digest and a hexadecimal-reverse blockchain hash digest; and FIG. 7F illustrates an exemplary data structure for a blockchain block that includes message data and a metadata wrapper for a second 1301-Byte message with a forward blockchain hash MD5 digest and a hexadecimal reverse blockchain hash digest.

FIGS. 7G-7L demonstrate a process for creating and verifying digital signatures for digital messages such as X.509 certificates to prevent two different X.509 certificates from having the same digital signature resulting from a collision;

FIG. 7G depicts a flowchart illustrating a process for digitally signing a file such as an X.509 certificate with a collision resistant multiple digital signature operation;

FIG. 7H illustrates a Multiple Digital Signature Set (MDSS) and an X.509 certificate signed with a Multiple Digital Signature Set (MDSS);

FIG. 7I depicts a flow chart illustrating a collision resistant multiple digital signature verification process;

FIG. 7J depicts a flow chart illustrating a collision resistant Multiple Hash Digest Signature (MHDS) operation;

FIG. 7K illustrates an X.509 certificate signed with a Multiple Hash Digest Signature (MHDS);

FIG. 7L depicts a flow chart illustrating a collision resistant Multiple Hash Digest Signature (MHDS) verification process;

FIG. 9A illustrates the preimage attack and security claim (birthday attack) for MD5, SHA-1, SHA-256, and SHA-512;

FIG. 9B illustrates the improvements on preimage attack for MD5, SHA-1, SHA-256, and SHA-512 when they are used with R reverse hash digests;

FIG. 10A illustrates a block diagram of a collision resistant blockchain appliance in communication with a cache-tier, a disk-tier, and a tape-tier;

FIG. 10B illustrates a software block diagram of a collision resistant blockchain appliance;

FIG. 10C illustrates an exemplary distributed network for a collision resistant blockchain including Network Attached Storage (NAS), a network connected collision resistant blockchain appliance, and a network connected terminal that can all communicate with each other via satellite communications links, wireless terrestrial communications links, and communications links provided by the distributed network;

FIG. 10D illustrates a prior-art diagram of the Helion Fast Hash Core Application Specific Integrated Circuit (ASIC);

FIGS. 11A-11D illustrate the application of pairs of hash digests formed of forward blockchain hash digests and reverse blockchain hash digests to data deduplication;

FIG. 11A illustrates a process for data deduplication using collision resistant hash digests;

FIG. 11B illustrates a process for data deduplication for storage using collision resistant hash digests;

FIG. 11C illustrates the loss of information that can occur during data deduplication when hash digest collisions exist for both a pair of 128-Byte and a pair of 64-Byte messages;

FIG. 11D illustrates how information is preserved during data deduplication for a pair 128-Byte messages when a forward blockchain hash digest and a hexadecimal-reverse blockchain hash digest are used in combination;

FIG. 12A depicts a flow chart illustrating a process for the storage of big data blockchains using an indirect addressing storage process;

FIG. 12K illustrates a diagram of a Fast Search Index where forward and reverse hash digests of messages are used to generate two-dimensional modulo-hash indirect-addressing pointers with 7 as a common modulo prime number;

FIG. 12M illustrates a diagram of a Fast Search Index where forward, reverse-hex, and reverse-byte hash digests of messages are used to generate three-dimensional modulo-hash indirect-addressing pointers with 3 as a common modulo prime number;

FIG. 12O illustrates a diagram of a Fast Search Index where forward, reverse-hex, reverse-byte, and reverse-multiplex hash digests of messages are used to generate four-dimensional modulo-hash indirect-addressing pointers with 5 as a common modulo prime number;

FIG. 12P illustrates a PYTHON program for generating modulo-hash indirect-addressing pointers;

FIGS. 12Q and 12R provide the output of the PYTHON program in FIG. 12P which is the generated sets of modulo-hash indirect-addressing pointers;

FIG. 12W depicts a flow chart illustrating a process for searching and reading big data blockchain blocks using four-dimensional modulo-hash direct-addressing pointers based on different hash digests.

DETAILED DESCRIPTION

While the invention has been shown and described with reference to a particular embodiment thereof, it will be understood to those skilled in the art, that various changes in form and details may be made therein without departing from the spirit and scope of the invention. FIGS. 1-5 demonstrate a first collision between two different 128-byte messages with MD5 hashing the message front-to-back and how no corresponding collision occurs when those two different messages are hashed with MD5 back-to-front along with blockchaining data using pairs of hash digests formed of a forward blockchain hash digest and a reverse blockchain hash digest for a collision resistant blockchain.

Figure 1A:
FIG. 1A illustrates first and second 128-Byte messages with identical MD5 blockchain hash digests that demonstrate a collision when hashed from front-to-back that is known in the prior art.

FIG. 1A illustrates first and second 128-Byte messages (103 and 105) with identical MD5 blockchain hash digests 107 that demonstrate a collision when hashed from front-to-back that is known in the prior art. FIG. 1A shows table 100, with descriptor column 101 and hexadecimal column 102. Table 100 shows a first 128-Byte message M1 103 with hexadecimal contents 104 and a second 128-Byte message M2 105 with hexadecimal contents 106, and each message has the same MD5 blockchain hash digest 107 as shown in the hexadecimal contents 108. The bytes that are different between message M1 and M2 are highlighted in bold and underlined, to aid in seeing the different content of the two messages. There are only 6 bytes different in each message. Messages M1 and M2 are attributed to Xiaoyun Wang, Dengguo Feng, Xuejia Lai, and Hongbo Yu, Aug. 17, 2004, within the laboratory exercise from the Computer Science Department of Boston University, https://www.cs.bu.edu/~goldbe/teaching/CS558S17/Lab1.pdf. When two messages with different content have the same hash digest, this is called a collision. Collisions, as discussed mean that a hash digest is unable to distinguish between two sets of data in that hashing both sets of data with a particular hash algorithm result in the same hash digest. The presence of collisions represents a serious security flaw in a hash algorithm that undermines its value for cryptographic applications. In FIG. 1A, each byte is composed of two hexadecimal numbers and each individual hexadecimal number is referred to as a nibble. In FIG. 1A, it is the first nibble of each of the changed bytes that is different; however, it is easier to see the changes between M1 and M2 by highlighting the entire byte. In FIG. 1A, and all similar figures, the data comprising a message is shown in lower case hexadecimal numbers, and the blockchain hash digest of that message is shown in upper case hexadecimal numbers, to make the table easier to understand.

Figure 1B:
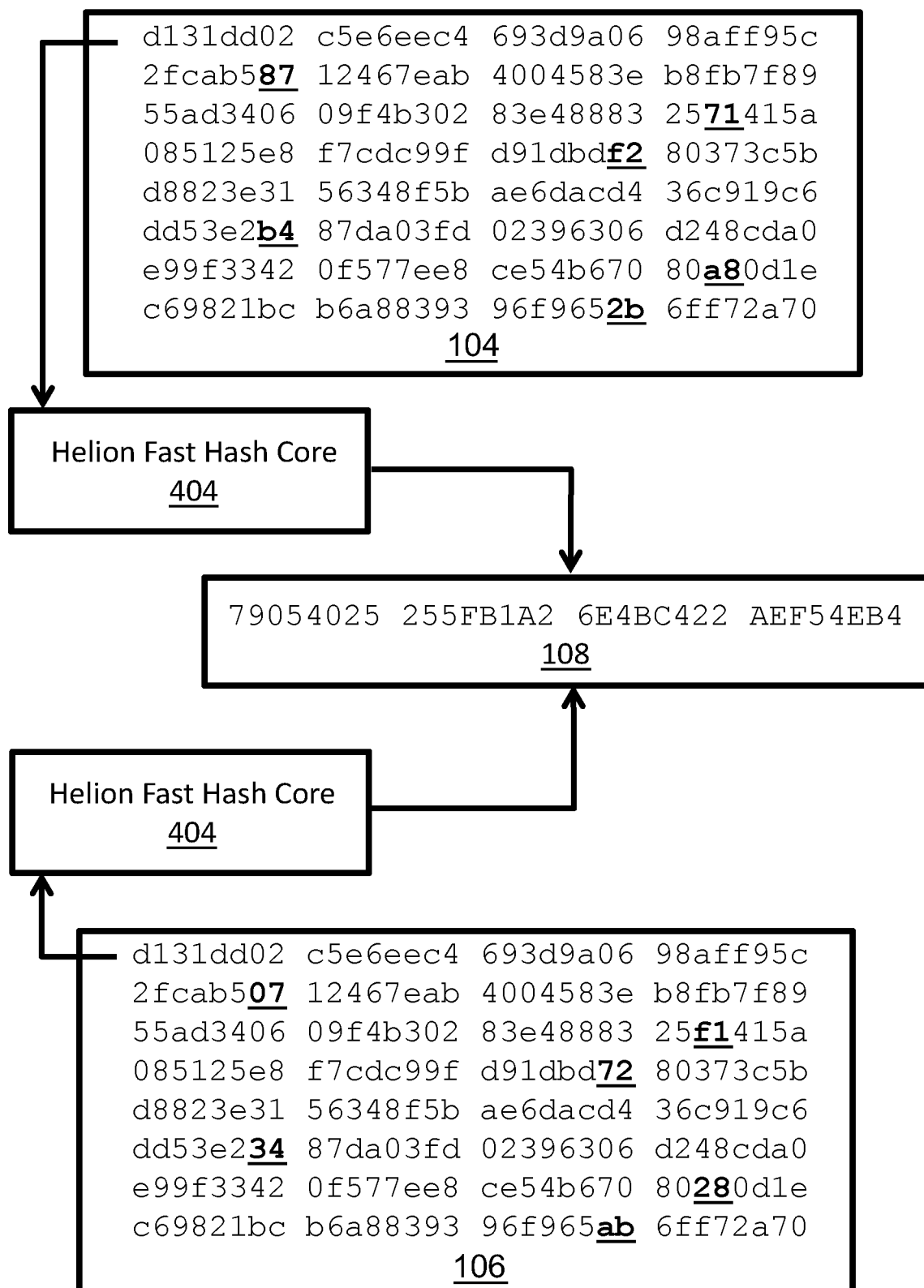
FIG. 1B further illustrates these first and second 128-Byte messages with identical MD5 blockchain hash digests that demonstrate a collision when hashed from front-to-back with hash core processors.

FIG. 1B further illustrates these first and second 128-Byte messages 103 and 105 with identical MD5 blockchain hash digests 107 that demonstrate a collision when hashed from front-to-back with hash core processors. FIG. 1B is a process diagram to further explain FIG. 1A. The contents "104" of Message M1 are processed by a first hash core 404, such as a Helion Fast Hash Core 404, FIG. 10. The contents "106" of Message M2 are processed by a second hash core 404. The contents 108 of the resulting blockchain hash digests are identical, thereby showing a collision. FIGS. 1A and 1B show a weakness in the MD5 blockchain hash digest algorithm as applied today, namely by only hashing data in the front-to-back "forward" direction. This same "collision" weakness has been also shown for the SHA-1 algorithm. SHA-256 is known to possess collisions. Every hash function with more inputs than outputs will necessarily have collisions.

FIG. 2A illustrates two MD5 blockchain hash digests 203 and 206 for a first 128-Byte message 103, one front-to-back (forward) 203 and one back-to-front (reverse) 206 by hexadecimal number. FIG. 2A shows table 200, with descriptor column 201 and hexadecimal column 202. This first message M1 103 is the same message illustrated in FIG. 1A. Table 200 shows Message M1 103 and its hexadecimal contents 104 and its blockchain hash digest in the front-to-back "forward" direction 203 with hexadecimal contents 108. However, Message M1 is then reversed to create message M1R 204 by reading hexadecimal digits 104 from back-to-front and storing these hexadecimal-reversed contents as 205. The back-to-front "reverse" blockchain MD5 hash digest 206 of M1R 205 has hexadecimal contents 207, which is numerically different from the front-to-back "forward" blockchain MD5 hash digest 108. In summary, the direction in which the data is hashed results in a different hash digest. In this example, message M1R is the hexadecimal-reverse of message M1. Message M1R and M1 are both hashed using the same MD5 algorithm. The hash digests resulting from the MD5 hash of messages M1R and M1 are different from each other.

Figure 2B:
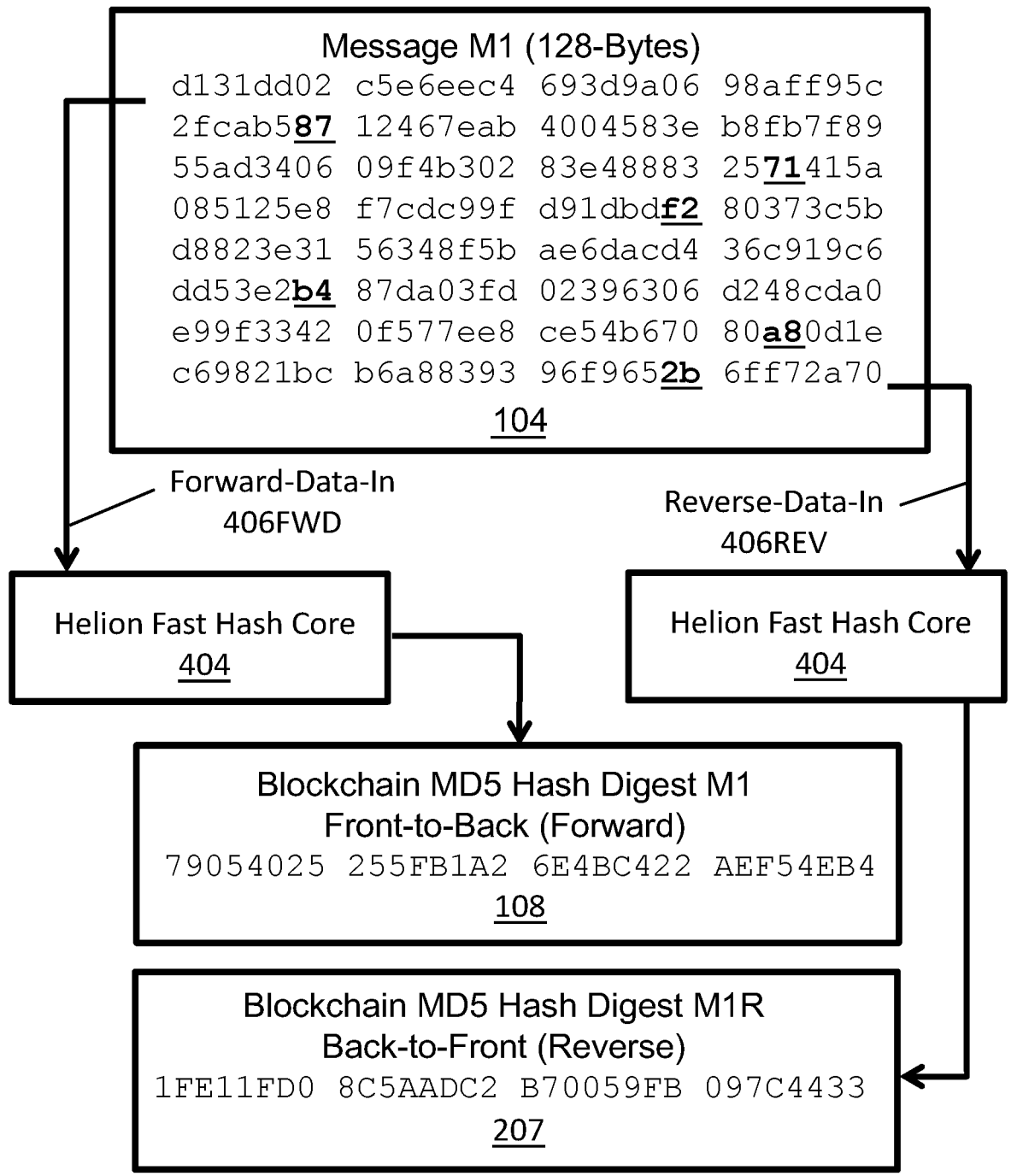
FIG. 2B further illustrates two MD5 blockchain hash digests for a first 128-Byte message, one front-to-back (forward) and one back-to-front (reverse) by hexadecimal number with hash core processors.

FIG. 2B further illustrates two MD5 blockchain hash digests 203 and 205 for a first 128-Byte message 103, one front-to-back (forward) 203 and one back-to-front (reverse) 205 by hexadecimal number with hash core processors 404. The contents of Message M1 104 is read from front-to-back to create Forward-Data-In 406FWD that is transmitted to a first fast hash core 404 for processing to generate a forward blockchain hash digest 108. In parallel, the same contents of Message M1 104 is read from back-to-front by hexadecimal number to create Reverse-Data-In 406REV that is transmitted to a second fast hash core 404 for processing to generate a reverse blockchain hash digest 207. The front-to-back "forward" hash digest output 108 from the first fast hash core is different from the back-to-front "reverse" hash digest output 207 from the second hash core.

FIG. 2C illustrates two MD5 blockchain hash digests 213 and 216 for a second 128-Byte message 105, one front-to-back (forward) 213 and one back-to-front (reverse) 216 by hexadecimal number. This second message 105 is the same message shown in FIG. 1A. FIG. 2C shows table 210, with descriptor column 211 and hexadecimal column 212. Table 210 shows Message M2 105, the contents of Message M2 106, and its blockchain hash digest 213 in the front-to-back "forward" direction 108. The contents of Message M2 is then reversed to create message M2R 214 by reading the hexadecimal digits of M2 106 from back-to-front 215. The back-to-front "reverse" blockchain MD5 hash digest 216 of M2R 215 has contents 217, which is different from the front-to-back "forward" blockchain MD5 hash digest 108. The blockchain hash digests of message M2 105 are different depending on whether the data is hashed front-to-back or back-to-front.

Figure 2D:
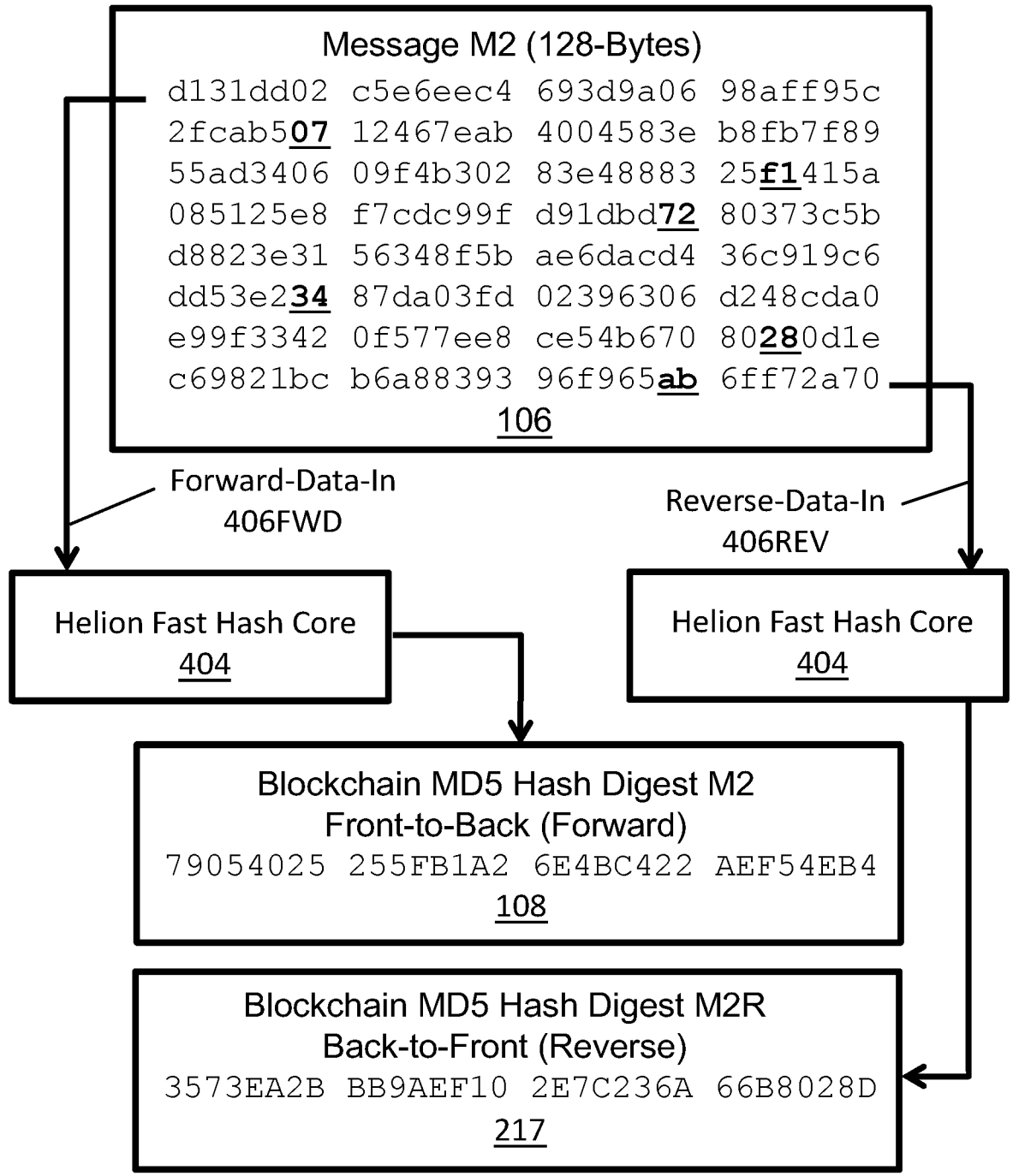
FIG. 2D further illustrates two MD5 blockchain hash digests for a second 128-Byte message, one front-to-back (forward) and one back-to-front (reverse) by hexadecimal number with hash core processors.

FIG. 2D further illustrates two MD5 blockchain hash digests 213 and 216 for a second 128-Byte message 105, one front-to-back (forward) 213 and one back-to-front (reverse) 216 by hexadecimal number with hash core processors 404. The contents of Message M2 106 is read from front-to-back to create Forward-Data-In 406FWD that is transmitted into a first fast hash core 404 for processing to generate forward blockchain hash digest 108. In parallel, the same contents of message M2 106 is read from back-to-front by hexadecimal number to create Reverse-Data-In 406REV that is transmitted into a second fast hash core 404 to generate reverse blockchain hash digest 217. The front-to-back "forward" hash digest output 108 from the first fast hash core 404 is different from the back-to-front "reverse" hash digest output 217 from the second hash core 404. The pair of hash cores 404 may process these forward and reverse blockchain hash digests simultaneously in parallel to reduce computing time to generate the hash digests 108 and 217.

Figure 3A:
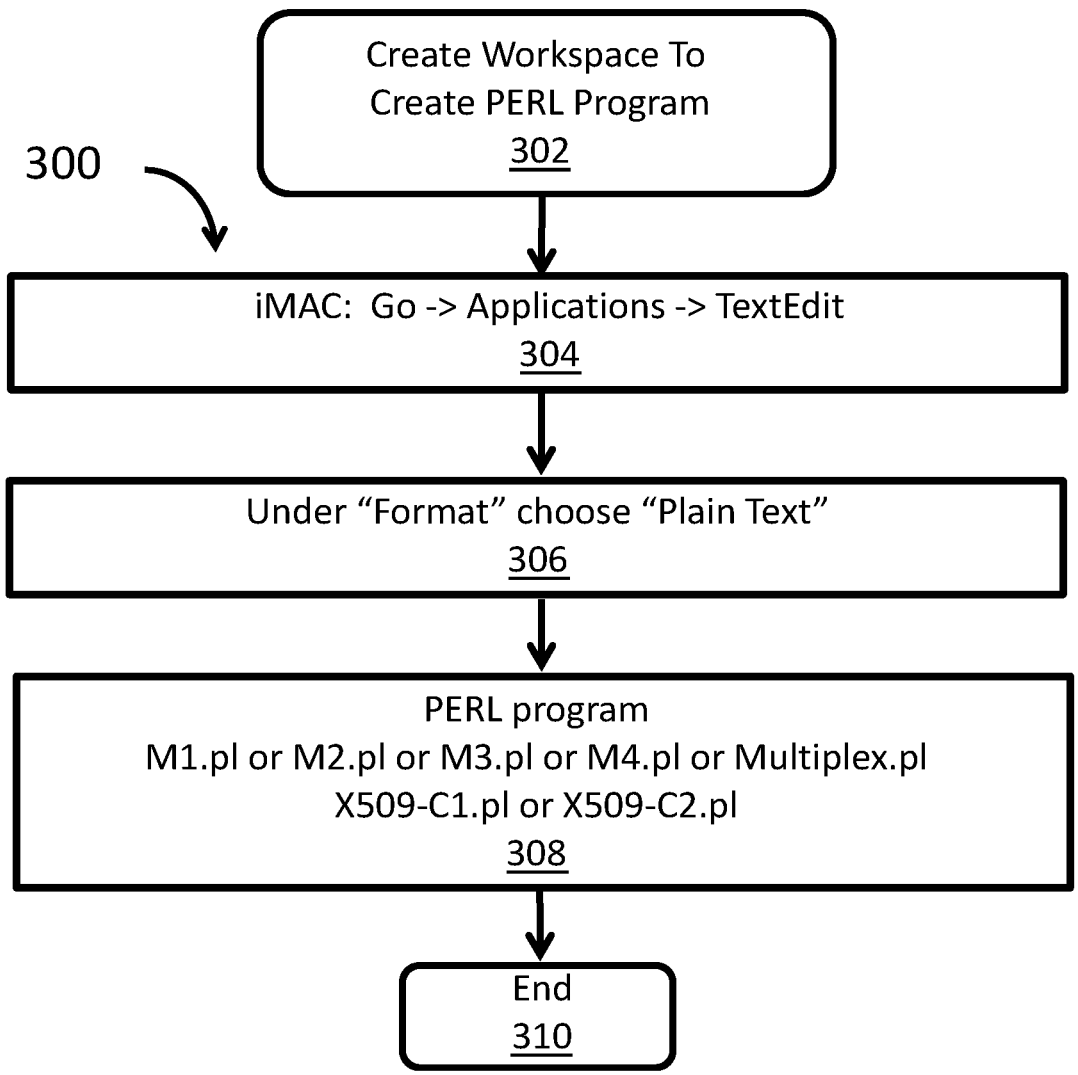

FIGS. 3A-D demonstrate software executable on a non-transitory computer tangible medium for generating forward blockchain hash digests and reverse blockchain hash digests in accordance with collision resistant blockchain technology as described in this specification. FIG. 3A illustrates a flowchart 300, which begins on step 302, to create a workspace on an iMAC computer to create a program in the PERL computing language. In step 304, the iMAC programmer selects GO from the tool bar, then selects APPLICATIONS, then selects TextEdit. In step 306, under FORMAT on the top tool bar, the programmer selects PLAIN TEXT. Then in step 308, the PERL program is created, such as for M1.pl for creating binary files and hash digests for messages M1 "104" (FIG. 1A), M1R "205" (FIG. 2A), and M1B "508" (FIG. 4A). The file type *.pl denotes programs which use the PERL programming language. Step 308 also applies to PERL programs M2.pl for Message 2, M3.pl for Message 3, M4.pl for Message 4, Multiplex.pl multiplexing Message M4, for X509-C1 for certificate C1, and X509-C2 for certificate C2.

FIG. 3B illustrates a PERL 308M1 program for converting ASCII characters to hexadecimal and then to binary and then calculating MD5 hash digests for a first 128-Byte message 103: once front-to-back (forward) 108, once back-to-front (reverse) by hexadecimal number 207, and once back-to-front (reverse) by byte 510 of FIG. 4A. FIG. 3B is the program M1.pl referred to in step 308 of FIG. 3A shown in PERL code 308M1 for messages M1 104, M1R 205, and M1B 508 in FIG. 4A, as all this program is simply too big to fit into FIG. 3A. The first line in any PERL program is the statement #!/usr/bin/perl, as shown in the first line of 308M1 (FIG. 3B). Then, in FIG. 3B, three sets of instructions are used to create binary files for original message M1, hexadecimal-reversed message M1R, and byte-reversed message M1B. These instructions are necessary because FF in a word processor is a pair of ASCII characters which may be read by a human to be a pair of hexadecimal numbers, but a word processor would read FF as 4646 in ASCII, which is to be avoided in hash calculations as it would give the wrong digest. FIG. 3B then opens a binary file or dies (kills the process) if it cannot. Then the contents of 128-Byte message M1 contents 104 are copy-pasted into the program 308M1 (FIG. 3B) and each content is enclosed in 'single quotes.' These contents are read as hexadecimal numbers, not ASCII characters, and stored as output in binary form, in files such as M1.bin, M1R.bin, M1B.bin.

FIG. 3C illustrates a PERL program 308M2 for converting ASCII characters to hexadecimal and then to binary and then calculating MD5 hash digests for a second 128-Byte message 106: once front-to-back (forward) 108, once back-to-front (reverse) by hexadecimal number 217, and once back-to-front (reverse) by byte 530 in FIG. 4B. FIG. 3C is the program M2.pl referred to in step 308 of FIG. 3A shown in PERL code 308M2 for messages M2 106, M2R 215, and M2B 528, as all this program is simply too big to fit into FIG. 3A. The first line in any PERL program is the statement #!/usr/bin/perl, as shown in the first line of 308M2 (FIG. 3C). Then, in FIG. 3C, three sets of instructions are used to create binary files for original message M2, hexadecimal-reversed message M2R, and byte-reversed message M2B. These instructions are necessary because FF in a word processor is a pair of ASCII characters which may be read by a human to be a pair of hexadecimal numbers, but a word processor would read FF as 4646 in ASCII, which is to be avoided in hash calculations as it would give the wrong digest. FIG. 3C then opens a binary file or dies (kills the process) if it cannot. Then the contents of 128-Byte message M2 contents 106 are copy-pasted into the program 308M2 (FIG. 3C) and each content is enclosed in 'single quotes.' These contents are read as hexadecimal numbers, not ASCII characters, and stored as output in binary form, in files such as M2.bin, M2R.bin, M2B.bin.

At this point in FIGS. 3B and 3C, the hash digest may be calculated two ways, as a check. One way is to use the binary files M1.bin, M1R.bin, M1B.bin, as well as M2.bin, M2R.bin, and M2B.bin as manual input to http://onlinemd5.com to calculate the desired MD5 hash digests. A second way is the PERL statement, use Digest::MD5 qw(md5_hex), to initialize the MD5 hash process, $hash=md5_hex($hex), to calculate the hash digests of the contents of message M1 in hexadecimal form (not ASCII), then printf ("md5_M1:% s\n",$hash), to print the MD5 hash digest, M1 in this case, to the PERL workspace.

Figure 3D:
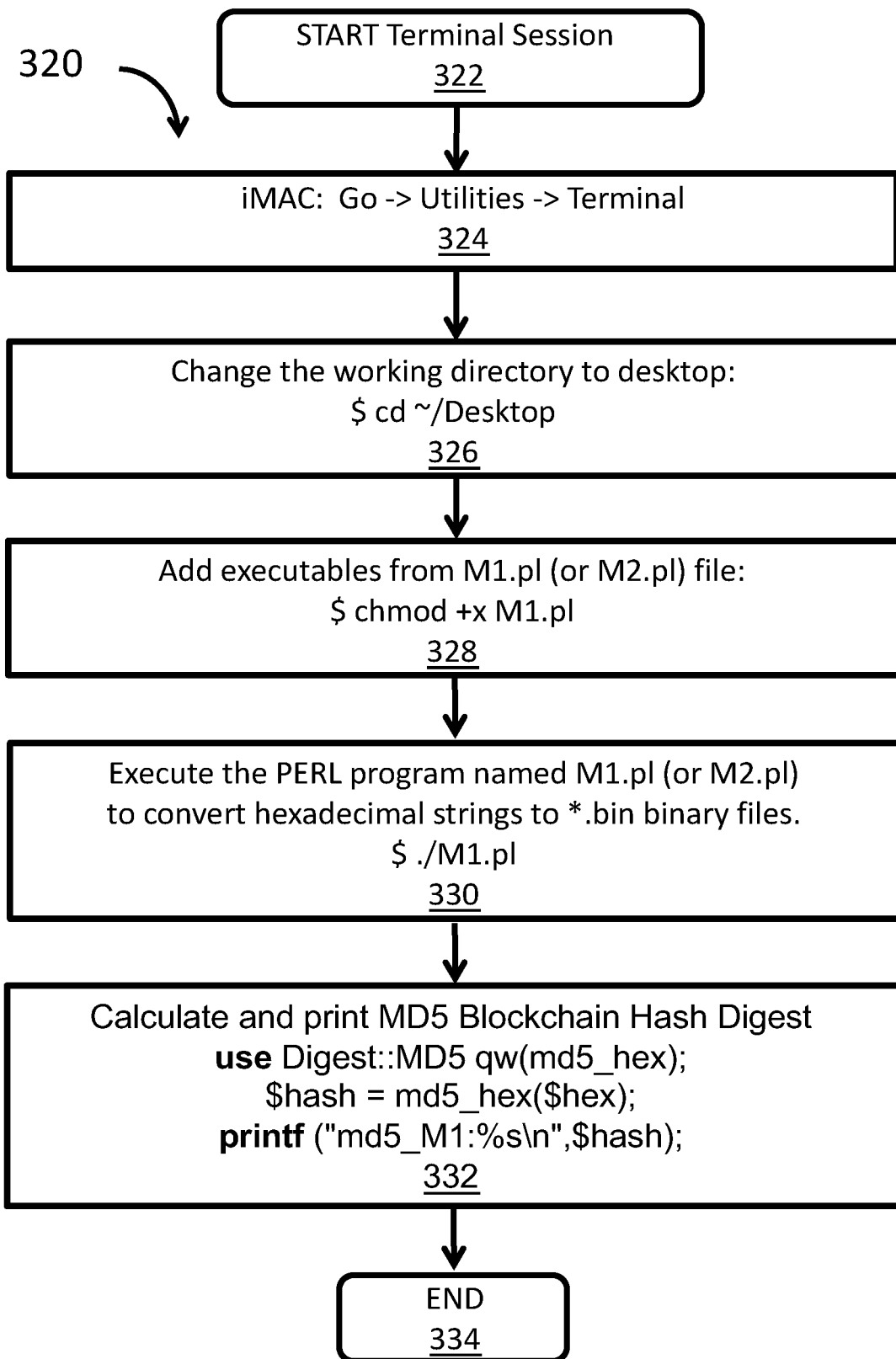
Figure 4A:
FIG. 4A illustrates two MD5 blockchain hash digests for a first 128-Byte message, one front-to-back (forward) and one back-to-front (reverse) by byte.

FIG. 3D illustrates a flowchart 320 of running a terminal session on an iMAC for PERL program 308M1 and 308M2 shown in FIGS. 3B and 3C. The process begins at step 322. The programmer then selects GO on the top toolbar, then selects UTILITIES, and then selects TERMINAL, in step 324. In step 326, the programmer executes $ cd~/Desktop to change the working directory to the desktop screen. In step 328, the programmer executes $ chmod +x M1.pl to add executables from the M1.pl PERL program 308M1. In step 330, the programmer executes the PERL program M1.pl 308 to convert hexadecimal strings into *.bin files by entering $./M1.pl. Finally, in step 332, calculate the MD5 blockchain hash digest. Calculation of MD5 blockchains of the *.bin was done two ways. One via http://onlinemd5.com by manually pointing to the desired *.bin file calculated by PERL program 308 and the corresponding MD5 hash digest is calculated for each *.bin file which have been exported to the desktop of the iMAC computer by the M1.pl and M2.pl PERL programs for FIGS. 1A, 1B, 2A, 2B, 2C, and 2D. The second way, shown in step 332, was via use Digest::MD5 qw(md5_hex), to initialize the MD5 hash process, $hash=md5_hex($hex), to calculate the hash digests of the contents of message M1 in hexadecimal form (not ASCII), then printf ("md5_M1:% s\n",$hash), to print the hash digest to the PERL workspace. Both of the above methods were used to serve as an accuracy check. The contents of M1R and M2R, hexadecimal-reverse of M1 and M2, respectively, were calculated two ways. One way was to manually reverse the hexadecimal contents of M1 and M2, since both messages were short. The other way was to use the PERL reverse command, such as my $M1Rhex=reverse $M1hex, to reverse the hexadecimal content of M1 and store it as M1R. Both hexadecimal-reverse methods produced the same MD5 hash digests, which served as an accuracy check.

FIG. 4A illustrates two MD5 blockchain hash digests for a first 128-Byte message 104, one front-to-back (forward) 108 and one back-to-front (reverse) by byte 510. FIG. 4B further illustrates two MD5 blockchain hash digests for a second 128-Byte message 106, one front-to-back (forward) 108 and one back-to-front (reverse) by byte 530. FIGS. 4A and 4B depict tables 500 and 520, respectively, showing the byte-reverse generation of blockchain hash digests for Messages M1 104 and M2 106. FIG. 4A shows table 500, with descriptor column 501 and hexadecimal column 502. Table 500 shows Message M1 103 and its hexadecimal contents 104 and its blockchain hash digest in the front-to-back "forward" direction "505" with hexadecimal contents 108. However, Message M1 is then reversed to create M1B 507 by reading the bytes (pairs of hexadecimal digits) of Message M1 from back-to-front to create content 508. The back-to-front "byte-reverse" blockchain MD5 hash digest of M1B 509 is the string of hexadecimal digits 510, which is different from the front-to-back "forward" blockchain MD5 hash digest 108 of M1 and different from the hexadecimal-reverse blockchain MD5 hash digest 207 of M1R (FIG. 2A). FIG. 4B shows table 520, with descriptor column 521 and hexadecimal column 522. Table 520 shows Message M2 105 and its hexadecimal contents 106 and its blockchain hash digest in the front-to-back "forward" direction "525" with hexadecimal contents 108. However, Message M2 is then reversed to create M2B 527 by reading the bytes (pairs of hexadecimal digits) of Message M2 from back-to-front with contents 528. The back-to-front "byte-reverse" blockchain MD5 hash digest of M2B 529 is the string of hexadecimal digits 530, which is different from the front-to-back "forward" blockchain MD5 hash digest of "108" of M2 and different from the hexadecimal-reverse blockchain MD5 hash digest 217 of M2R (FIG. 2C). Thus, there is more than one way to calculate reverse blockchain hash digests, and these ways are further discussed in FIGS. 5A-5F.

Figure 5B:

FIGS. 5A-5G illustrate the blockchaining of data using pairs of hash digests, a forward blockchain hash digest and reverse blockchain hash digest, for a collision resistant blockchain. FIGS. 1-4 demonstrate the ability to utilize combinations of forward blockchain hash digests and reverse blockchain hash digests to function as a collision avoidance pair. The combination of a forward blockchain hash digest and a reverse blockchain hash digest forms a collision resistant hash digest pair. FIGS. 5A-5G show the application of collision resistant hash digest pairs to blockchain technology to build a collision resistant blockchain that has a higher degree of security due to the collision resistance of the pairs of forward and reverse blockchain hash digests that are used to chain the blocks together. FIGS. 5A and 5B illustrate a metadata wrapper 600 for forward and reverse blockchain hash digests that form a collision resistant blockchain hash digest pair. Metadata wrapper 600 is incorporated and stored within each block of a collision resistant blockchain. Metadata wrapper 600 contains metadata regarding the forward and reverse blockchain hash digests that form a collision resistant blockchain hash digest pair along with the associated message (data object). In column 601 are the bytes used in the collision resistant blockchain block and column 602 gives the description. Byte-0 (602A) gives the type of reverse blockchain hash digest used along with the number of reverse blockchain hash digests used: with 1×h (hex) denoting one reverse blockchain hash digest being used, 2×h denoting two different reverse blockchain hash digests being used, 3×h denoting three different reverse blockchain hash digests being used, 4×h denoting four different reverse blockchain hash digests being used, and 5×h denoting five different reverse blockchain hash digests being used. The type of reverse blockchain hash digest refers to the manner in which the message (data object) has its data reversed for computation of the hash digest. For example, the message may be reversed by hexadecimal, by bit, by byte, or by sector. Specifically, 10h denotes a hexadecimal-reverse blockchain hash digest, 11h denotes a byte-reverse blockchain hash digest, 12h denotes a bit-reverse blockchain hash digest, 13h denotes a sector-reverse blockchain hash digest, such as in a series of HDD (hard disk drive) sectors, and 14h denotes a hexadecimal forward-reverse multiplex hash digest. 20h denotes a reverse blockchain hash digest pair formed with a hexadecimal-reverse hash digest and a byte-reverse hash digest. 21h denotes a reverse blockchain hash digest pair formed with a byte-reverse hash digest and a bit-reverse hash digest. 22h denotes a reverse blockchain hash digest pair formed with a bit-reverse hash digest and a sector-reverse hash digest. 23h denotes a reverse blockchain hash digest pair formed with a hexadecimal-reverse hash digest and a bit-reverse hash digest. 24h denotes a reverse blockchain hash digest pair formed with a hexadecimal-reverse hash digest and a sector-reverse hash digest. 25h denotes a reverse blockchain hash digest pair formed with a hexadecimal-reverse hash digest and a hexadecimal forward-reverse hash digest. 30h denotes a reverse blockchain hash digest set formed with a hexadecimal-reverse hash digest, a byte-reverse hash digest, and a bit-reverse hash digest. 31h denotes a reverse blockchain hash digest set formed with a byte-reverse hash digest, a bit-reverse hash digest, and a sector-reverse hash digest. 32h denotes a reverse blockchain hash digest set formed with a hexadecimal-reverse hash digest, a byte-reverse hash digest, and a hexadecimal forward-reverse multiplex hash digest. 40h denotes a reverse blockchain hash digest set formed with a hexadecimal-reverse hash digest, a byte-reverse hash digest, a bit-reverse hash digest, and a sector-reverse hash digest. 50h denotes a reverse blockchain hash digest set formed with a hexadecimal-reverse hash digest, a byte-reverse hash digest, a bit-reverse hash digest, a sector-reverse hash digest, and a hexadecimal forward-reverse multiplex hash digest. Bytes 1-4 (602B) are a date stamp comprising year, month, and day in the form YYYY:MM:DD. Bytes 5-7 are a time stamp (602C), comprising hours, minutes, and seconds in the form HH:mm:SS. In one embodiment, the hours, minutes, and seconds are in Greenwich Mean Time. In an alternate embodiment, two bytes could be added to denote the local time zone of the time stamp. In an alternate embodiment, additional bytes could be used to denote fractions of seconds, especially for objects stored in cache.

Continuing with the description of metadata wrapper 600, Byte-8 (602D) defines the hash algorithm used. For example, the SHA-224 algorithm identifier is 00h, the SHA-256 algorithm identifier is 01h, the SHA-384 algorithm identifier is 02h, the SHA-512 algorithm identifier is 03h, the SHA-512/224 algorithm identifier is 04h, the SHA-512/256 algorithm identifier is 05h, and the MD5 algorithm identifier is 06h. Beginning with Byte-9 (602E), the actual forward blockchain hash digest is enclosed. For example, for SHA-224 and SHA-512/224 digests (224-bits or 28-Bytes) use Bytes 9-36 (when Byte-8 equals 00h or 04h), SHA-256 and SHA-512/256 digests (256-bits or 32-Bytes) use Bytes 9-40 (when Byte-8 equals 01h or 05h), SHA-384 digest (384-bits or 48-Bytes) uses Bytes 9-56 (when Byte-8 equals 02h), SHA-512 digest (512-bits or 64-Bytes) uses Bytes 9-72 (when Byte-8 equals 03h), and MD-5 digest (128-bits or 16-Bytes) uses Bytes 9-24 (when Byte-8 equals 06h). These digests may be calculated by a first hash core 404. Referring to 602F in FIG. 5B, the first reverse blockchain hash digest is enclosed within metadata wrapper 600. For example, for SHA-224 and SHA-512/224 digests (224-bits or 28-Bytes) use Bytes 37-64 (when Byte-8 equals 00h or 04h), SHA-256 and SHA-512/256 digests (256-bits or 32-Bytes) use Bytes 41-72 (when Byte-8 equals 01h or 05h), SHA-384 digest (384-bits or 48-Bytes) uses Bytes 57-104 (when Byte-8 equals 02h), SHA-512 digest (512-bits or 64-Bytes) uses Bytes 73-136 (when Byte-8 equals 03h), and MD-5 digest (128-bits or 16-Bytes) uses Bytes 25-40 (when Byte-8 equals 06h). These digests may be calculated by a second hash core 404. In 602G, metadata wrapper 600 may include the reverse blockchain hash digests for additional reverse blockchain hash digests that are formed by different techniques of reversing the data within the message as designated in byte-0 602A. In 602H, metadata wrapper 600 includes the collision resistant blockchain pair or set from the previous collision resistant blockchain block if the metadata wrapper is not for the genesis collision resistant blockchain block. If the collision resistant blockchain uses just a collision resistant blockchain hash digest pair, then only one reverse blockchain hash digest is used. If the collision resistant blockchain uses a collision resistant blockchain hash digest set, then two or more reverse blockchain hash digests are used. The inclusion of the collision resistant blockchain hash digest pair or set from the prior block of the collision resistant blockchain forms that hash digest chain that links the blocks together within the collision resistant blockchain. A Logical-End-of-B-Block Byte (601I) may follow the above information. An exemplary Logical-End-of-B-block Byte is the hexadecimal number "BC" (1011 1100), where "BC" denotes blockchain. Assuming that only one 602F reverse blockchain is used, this Logical-End-of-B-Block byte is byte-65 for SHA-224 and SHA-512/224 (when Byte-8=00h or 04h), byte-73 for SHA-256 and SHA-512/256 (when Byte-8=01h or 05h), byte-105 for SHA-384 digest (when Byte-8=02h), byte-137 for SHA-512 digest (when Byte-8=03h), and byte-41 for MD-5 digest (when Byte-8=06h). Metadata wrapper 600 illustrates a metadata wrapper for a collision resistant blockchain hash digest pair formed of one forward blockchain hash digest and one reverse blockchain hash digest. As noted above with respect to byte-0, the message may be reversed by various techniques of hexadecimal-reverse, bit-reverse, byte-reverse, and sector-reverse. A block of a collision resistant blockchain will include at least one reverse blockchain hash digest. A block of a collision resistant blockchain may include more than one reverse blockchain hash digest where the multiple reverse blockchain hash digests hash the message each using a different technique for reversing the data, thereby producing different reverse blockchain hash digests. A collision will only occur in a collision resistant blockchain pair when there is a simultaneous collision with both the forward blockchain hash digests and the reverse blockchain hash digests for two different sets of data. While collision may occur between two different sets of data when hashed in the front-to-back direction, the likelihood that a corresponding collision will also occur when the same two different sets of data are hashed in the back-to-front direction is fundamentally reduced compared to using just the forward blockchain hash digest, thereby forming the foundation for a collision resistant blockchain. Collision resistant blockchain hash digest sets are formed of a forward blockchain hash digest and two or more reverse blockchain hash digests. For a collision to occur in a collision resistant blockchain hash digest set, there must be a simultaneous collision with the forward blockchain hash digest and the two or more reverse blockchain hash digests between two different sets of data. The likelihood that two different sets of data will produce a collision when hashed front-to-back as well as simultaneously producing a collision when hashed back-to-front using two or more different techniques for reversing the data is fundamentally reduced compared to using just the forward blockchain hash digest, thereby forming the foundation for a collision resistant blockchain.

Figure 5C:
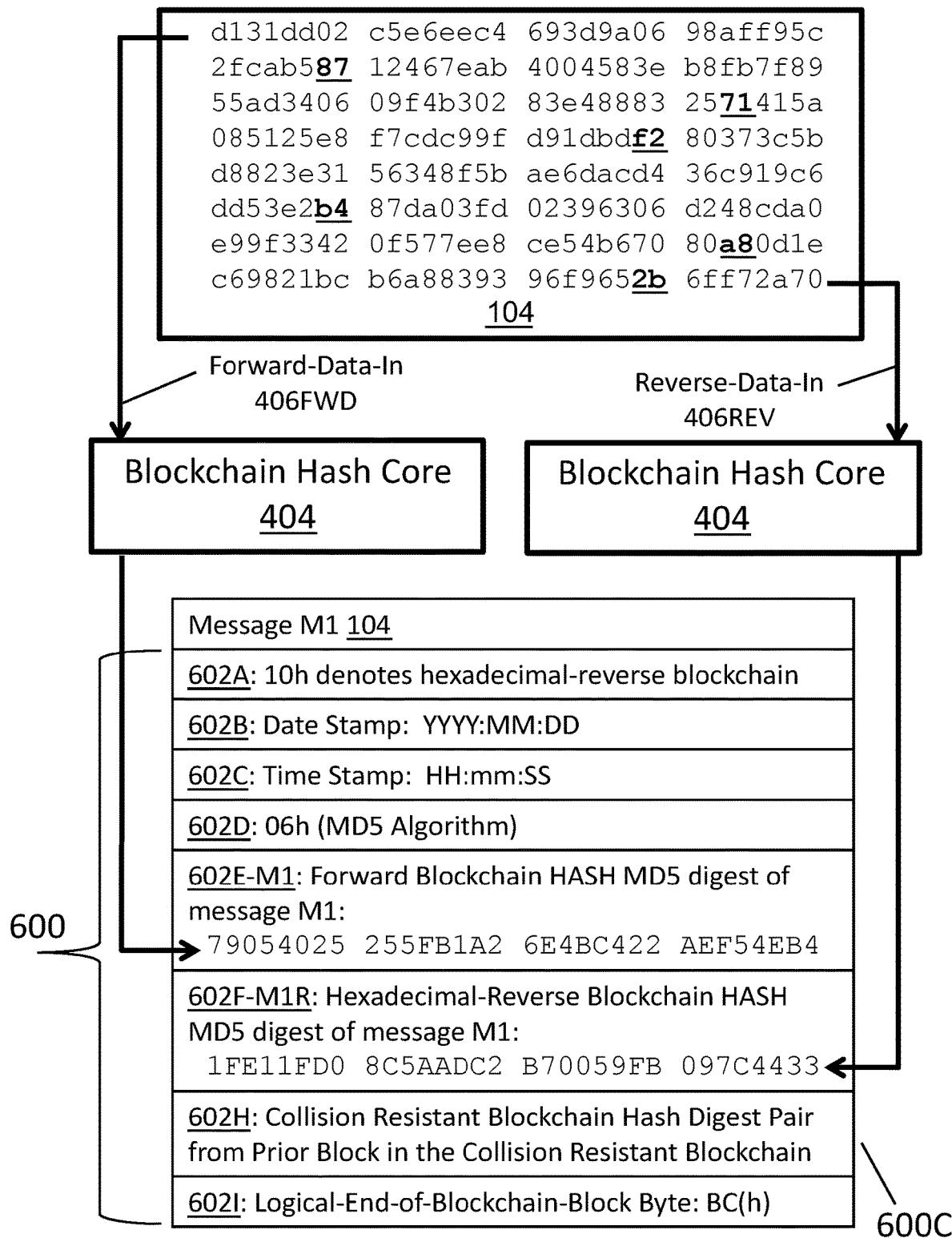

FIG. 5C illustrates an exemplary blockchain block data structure 600C that includes message data 104 and a metadata wrapper 600 for a first 128-Byte message 104 with a forward blockchain hash MD5 digest 108 and a hexadecimal-reverse blockchain hash digest 207. Data structure 600C is for a single block in a collision resistant blockchain. Data structure 600C is shown being constructed from a message 104 that is being processed by a pair of parallel blockchain hash cores 404. The contents of Message M1 104 are provided first in data structure 600C of the blockchain block, followed by the metadata wrapper 600 discussed in FIGS. 4A and 4B. The metadata wrapper includes metadata 602A, with a value of 10h, indicating the use of a single reverse blockchain, namely the hexadecimal-reverse blockchain. Next, metadata 602B, the Date Stamp YYYY:MM:DD and the metadata 602C Time Stamp HH:mm:SS follow. Metadata 602D has a value of 06h to denote the use of the MD5 hash algorithm. The contents of Message M1 "104" are shown at the top of FIG. 5C, where Forward-Data-In Forward-Data-In "406FWD," Message M1 is read from front-to-back into blockchain hash core 404 to produce the forward blockchain hash digest shown in 602E of metadata wrapper 600 of data structure 600C. In Reverse-Data-In "406REV," Message M1 is read from back-to-front into blockchain hash core 404 to produce the reverse blockchain hash digest shown in 602F of metadata wrapper 600 of data structure 600C. Blockchain hash cores 404 may perform the 406FWD and 406REV operations simultaneously in parallel. The forward blockchain hash MD5 digest of the Forward-Data-In of Message M1 104 is stored as 602E-M1. The hexadecimal-reverse blockchain hash MD5 digest of M1R is stored in 602F-M1R. Blockchain block data structure 600C includes metadata 602H on the collision resistant blockchain digest pair from the previous blockchain block in the collision resistant blockchain, thereby linking these two blocks together in a blockchain. Block data structure 600C concludes with logical-end-of-blockchain byte BC(h), 602I. Note that data structure 600C is depicted as having a collision resistant blockchain hash digest pair, which is formed of a forward blockchain hash digest and a reverse blockchain hash digest.

Figure 5D:
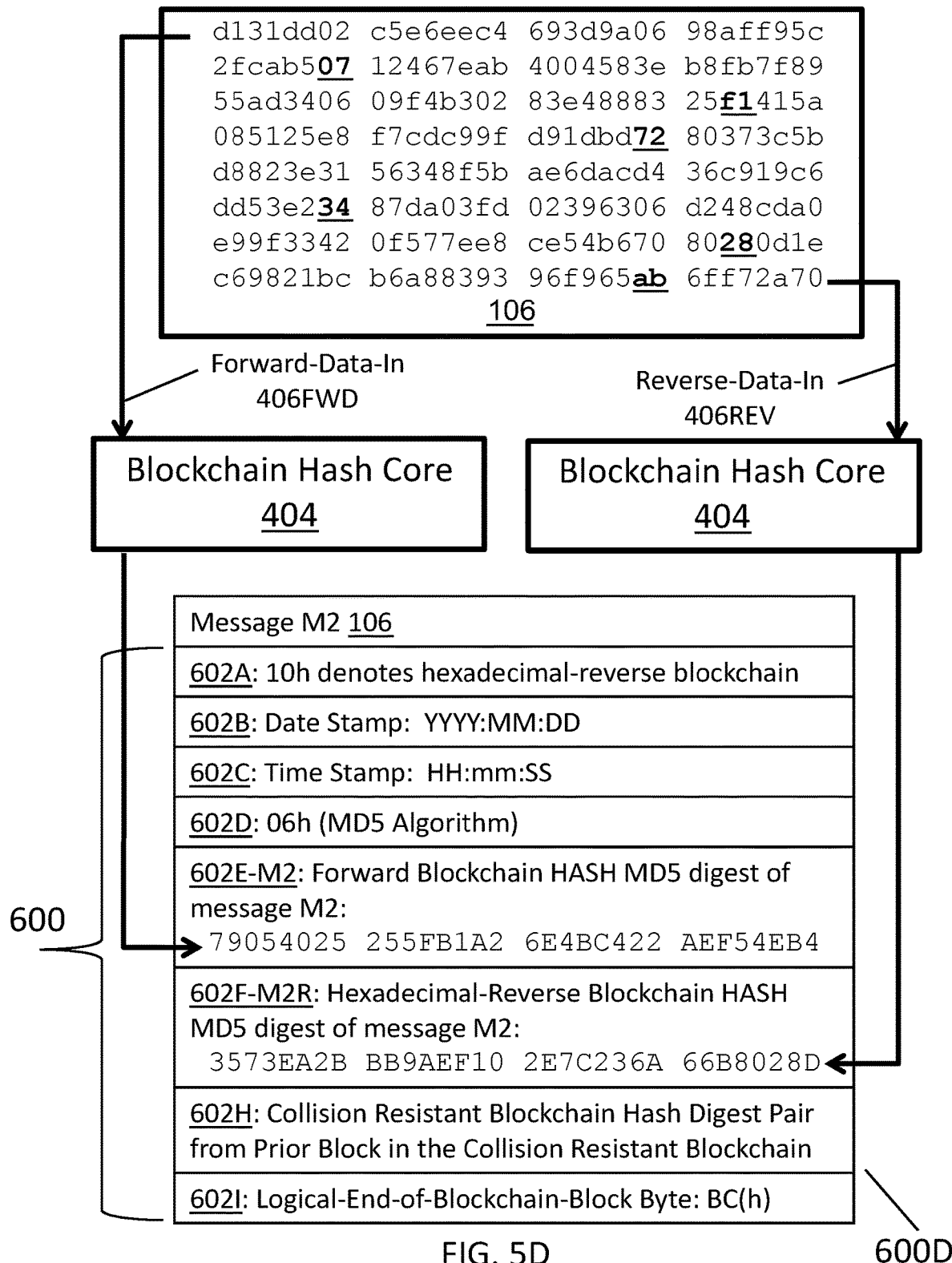

FIG. 5D illustrates an exemplary blockchain block data structure 600D that includes message data 106 and a metadata wrapper 600 for a second 128-Byte message 105 with a forward blockchain hash MD5 digest 213 and a hexadecimal-reverse blockchain hash digest 216. Data structure 600D is for a single block in a collision resistant blockchain. Data structure 600D is shown being constructed from a message 106 that is being processed by a pair of parallel blockchain hash cores 404. Message M2 106 is included first the blockchain block data structure 600D followed by metadata wrapper 600. Within metadata wrapper 600, metadata 602A is provided first with a value of 10h, indicating the use of a single reverse blockchain, namely the hexadecimal-reverse blockchain. In metadata 602B, the Date Stamp YYYY:MM:DD and the metadata 602C Time Stamp HH:mm:SS follow. Metadata 602D has a value of 06h to denote the use of the MD5 hash algorithm. The contents of Message M2 "106" are shown at the top of FIG. 5D being hashed by two separate blockchain hash cores operating simultaneously in parallel. With Forward-Data-In "406FWD," Message M2 is read from front-to-back of into blockchain hash core 404 to produce forward blockchain hash digest 213 listed in 602E. With Reverse-Data-In "406REV," Message M2 is read from back-to-front into blockchain hash core 404 to produce reverse blockchain hash digest 216 included as metadata 602F. 406FWD is input to one blockchain hash core 404 and, in parallel, 406REV is input to a second blockchain hash core 404. These two parallel hash cores 404 may operate simultaneously to reduce processing time. The forward blockchain hash MD5 digest of the Forward-Data-In of Message M2 is stored as 602E-M2. The hexadecimal-reverse blockchain hash MD5 digest of M2R is stored in 602F-M2R. In metadata 600H, the metadata wrapper stores the collision resistant blockchain hash digest pair from the previous block in the blockchain to interlink the two blockchain blocks together. Metadata wrapper 600 concludes with logical-end-of-blockchain byte BC(h), 602I. Note that data structure 600D is depicted as having a collision resistant blockchain hash digest pair, which is formed of a forward blockchain hash digest and a reverse blockchain hash digest.

Comparing blockchain block data structures 600C and 600D indicates that Messages M1 and M2 are now distinguished from one another due to the hexadecimal-reverse blockchain hash digests 602F-M1R and 602F-M2R. These hexadecimal-reverse blockchain hash digests do not replace forward blockchain hash digests 602E-M1 and 602E-M2. Instead, the hexadecimal-reverse blockchain hash digests 602F-M1R and 602F-M2R act in combination with forward blockchain hash digests 602E-M1 and 602E-M2 to distinguish messages M1 and M2 from one another, thus avoiding the collision identified in FIG. 1A. While there is a collision between messages M1 and M2 when the forward hash digests are compared, there is not a similar collision between messages M1 and M2 when the reverse hash digests are compared. As there is not a simultaneous collision between both the forward reverse hash digest and the reverse hash digest of the collision resistant hash digest pair, there is not a collision in the collision resistant hash digest pair and the collision resistant hash digest pair is capable of distinguishing between the messages M1 and M2 using the MD5 algorithm, whereas usage of just the forward blockchain hash digest is incapable of avoiding the collision.

FIG. 5E shows a blockchain block data structure 600E. Blockchain block data structure 600E is a data structure for a single blockchain block. Blockchain data structures 600C and 600D each are provided with a blockchain hash digest pair. Blockchain block data structure 600E is provided with a pair of reverse blockchain hash digests, one formed by hexadecimal-reverse and one by byte-reverse. This pair of reverse blockchain hash digests, combined with the forward blockchain hash digest, forms a collision resistant blockchain hash digest set. The contents of Message M1 104 are included within blockchain block data structure 600E first. Next metadata wrapper 600 is appended to Message M1 104. Metadata wrapper 600 includes metadata 602A, which is shown having a value of 20h, indicating the use of two reverse blockchains, namely the hexadecimal-reverse blockchain hash and the byte-reverse hash. Metadata 602B, the Date Stamp YYYY:MM:DD and metadata 602C Time Stamp HH:mm:SS follow within metadata wrapper 600. Metadata 602D has a value of 06h to denote the use of the MD5 hash algorithm. The forward blockchain hash MD5 digest of the Forward-Data-In of Message M1 is stored as 602E-M1. The hexadecimal-reverse blockchain hash MD5 digest of M1R is stored in 602F-M1R. The byte-reverse blockchain hash MD5 digest of M1B is stored in 602F-M1B. Metadata 602H includes the collision resistant blockchain hash digest set from the previous block in the blockchain to interlink this block with the prior block. Metadata wrapper 600 concludes with logical-end-of-blockchain byte BC(h), 602I.

FIG. 5F shows blockchain block data structure 600F. Blockchain block data structure 600F is a data structure for a single blockchain block. Blockchain data structures 600C and 600D each are provided with a blockchain hash digest pair. Blockchain block data structure 600F is provided with a pair of reverse blockchain hash digests, one formed by hexadecimal-reverse and one by byte-reverse. This pair of reverse blockchain hash digests, combined with the forward blockchain hash digest, forms a collision resistant blockchain hash digest set. The contents of Message M2 106 is first included within blockchain block data structure 600F. Next, metadata wrapper 600 is included within blockchain block data structure 600F. Metadata wrapper 600 includes metadata 602A having a value of 20h, indicating the use of two reverse blockchains, namely the hexadecimal-reverse blockchain hash and the byte-reverse hash. Metadata 602B, the Date Stamp YYYY:MM:DD and metadata 602C Time Stamp HH:mm:SS follow. Metadata 602D has a value of 06h to denote the use of the MD5 hash algorithm. The forward blockchain hash MD5 digest of the Forward-Data-In of Message M2 is stored as 602E-M2. The hexadecimal-reverse blockchain hash MD5 digest of M2R is stored in 602F-M2R. The byte-reverse blockchain hash MD5 digest of M2B is stored in 602F-M2B. Metadata 602H includes the collision resistant blockchain hash digest set from the previous block in the blockchain to interlink this block with the prior block. Metadata wrapper 600 concludes with logical-end-of-blockchain byte BC(h), 602I.

Comparing wrappers 600E and 600F indicates that Messages M1 and M2 are now further distinguished from one another due to the hexadecimal-reverse blockchains hash digests 602F-M1R and 602F-M2R as well as the byte-reverse blockchain hash digests 602F-M1B and 602F-M2B. These hexadecimal-reverse and byte-reverse blockchain hash digests do not replace forward blockchain hash digests 602E-M1 and 602E-M2. Instead, the hexadecimal-reverse blockchain hash digests 602F-M1R and 602F-M2R and byte-reverse blockchain hash digests 602F-M1B and 602F-M2B act in combination with forward blockchains 602E-M1 and 602E-M2 to further distinguish messages M1 and M2 from one another, thus avoiding the collision identified in FIG. 1A. When a forward blockchain hash digest is combined with a reverse blockchain hash digest, the combination is referred to as a collision resistant blockchain hash digest pair. For a collision to occur between two different files each possessing a collision resistant blockchain hash digest pair, there must be a simultaneous collision between both of the forward blockchain hash digests and the reverse blockchain hash digests. When a forward blockchain hash digest is combined with two or more reverse blockchain hash digests that are formed by different methods for reversing the message data, like hexadecimal-reverse and byte-reverse, that combination is referred to as a collision resistant blockchain hash digest set. Blockchain block data structure 600E is a data structure for a single blockchain block. Blockchain block data structure 600F is a data structure for a single blockchain block. Metadata 602H contains collision resistant blockchain hash digests from prior blockchain blocks in the collision resistant blockchain that link the blocks together into a blockchain. Blockchain block data structures 600E and 600F are shown as having a pair of reverse blockchain hash digests, one that is formed by hexadecimal-reverse and byte-reverse. Together with the forward blockchain hash digest, this pair of reverse blockchain hash digests form a collision resistant blockchain hash digest set. For a collision to occur between messages 104 and 106 with a collision resistant blockchain hash digest set, there must be simultaneous collisions between both of the forward hash digests, both of the hexadecimal-reverse hash digests, and both of the byte-reverse hash digests. The inclusion of the additional reverse hash digest in 600E and 600F further limits the number collisions that can occur using MD5 when compared to just using a forward blockchain hash digest.

FIG. 5G illustrates a collision resistant blockchain 10 where each block 12, 14, 16, and 18 in the collision resistant blockchain is chained together by a collision resistant blockchain hash digest pair as shown in FIGS. 5C and 5D. In this exemplary depiction, collision resistant blockchain 10 includes four collision resistant blockchain blocks 12, 14, 16, and 18, commonly referred to as blocks. Block 12 is depicted as being the genesis block, the first block in blockchain 10. Blocks, 12, 14, 16, and 18 are interlinked by collision blockchain hash digest pairs forming them into collision resistant blockchain 10. Collision resistant blockchain block 12 includes a blockchain data structure 600C or 600D as shown in FIGS. 5C and 5D. Collision resistant blockchain block 12 includes a digital message as blockchained data. Blockchained metadata includes metadata wrapper 600. As block 12 is the genesis block, block 12 has a collision resistant blockchain hash digest pair based on block 12. However, for block 12, there is no collision resistant blockchain hash digest pair carried over from the previous block as there is no previous block due to block 12 being the genesis block. Thus, for block 12, metadata 602H is empty. Collision resistant blockchain block 14 includes a blockchain data structure 600C or 600D as shown in FIGS. 5C and 5D. Collision resistant blockchain block 14 includes a digital message as blockchained data. Blockchained metadata includes metadata wrapper 600. For block 14, metadata wrapper 600 includes a collision resistant blockchain hash digest pair based on block 14 as well as the collision resistant blockchain hash digest pair carried over from the previous block, block 12. Collision resistant blockchain block 16 includes a blockchain data structure 600C or 600D as shown in FIGS. 5C and 5D. Collision resistant blockchain block 16 includes a digital message as blockchained data. Blockchained metadata includes metadata wrapper 600. For block 16, metadata wrapper 600 includes a collision resistant blockchain hash digest pair based on block 16 as well as the collision resistant blockchain hash digest pair carried over from the previous block, block 14. Collision resistant blockchain block 18 includes a blockchain data structure 600C or 600D as shown in FIGS. 5C and 5D. Collision resistant blockchain block 18 includes a digital message as blockchained data. Blockchained metadata includes metadata wrapper 600. For block 18, metadata wrapper 600 includes a collision resistant blockchain hash digest pair based on block 18 as well as the collision resistant blockchain hash digest pair carried over from the previous block, block 16. Thus, blocks 12, 14, 16, and 18 form collision resistant blockchain 10. As collision resistant blockchain 10 has each block include a collision resistant blockchain hash digest pair formed of a forward blockchain hash digest and a reverse blockchain hash digest, collision resistant blockchain 10 is less susceptible to collisions that may occur with MD5 when using forward blockchain hash digests only.

FIG. 5H illustrates a collision resistant blockchain 20 where each block 22, 24, 26, and 28 in the collision resistant blockchain 20 is chained together by a collision resistant blockchain hash digest set as shown in FIGS. 5E and 5F. In this exemplary depiction, collision resistant blockchain 20 includes four collision resistant blockchain blocks 22, 24, 26, and 28, commonly referred to as blocks. Block 22 is depicted as being the genesis block, the first block in blockchain 20. Blocks, 22, 24, 26, and 28 are interlinked by collision blockchain hash digest sets forming them into collision resistant blockchain 20. Collision resistant blockchain block 22 includes a blockchain data structure 600E or 600F as shown in FIGS. 5E and 5F. Collision resistant blockchain block 22 includes a digital message as blockchained data. Blockchained metadata includes metadata wrapper 600. As block 22 is the genesis block, block 22 has a collision resistant blockchain hash digest set based on block 22. However, for block 22, there is no collision resistant blockchain hash digest set carried over from the previous block as there is no previous block due to block 22 being the genesis block. Thus, for block 22, metadata 602H is empty. Collision resistant blockchain block 24 includes a blockchain data structure 600E or 600F as shown in FIGS. 5E and 5F. Collision resistant blockchain block 24 includes a digital message as blockchained data. Blockchained metadata includes metadata wrapper 600. For block 24, metadata wrapper 600 includes a collision resistant blockchain hash digest set based on block 24 as well as the collision resistant blockchain hash digest set carried over from the previous block, block 22. Collision resistant blockchain block 26 includes a blockchain data structure 600E or 600F as shown in FIGS. 5E and 5F. Collision resistant blockchain block 26 includes a digital message as blockchained data. Blockchained metadata includes metadata wrapper 600. For block 26, metadata wrapper 600 includes a collision resistant blockchain hash digest set based on block 26 as well as the collision resistant blockchain hash digest set carried over from the previous block, block 24. Collision resistant blockchain block 28 includes a blockchain data structure 600E or 600F as shown in FIGS. 5E and 5F. Collision resistant blockchain block 28 includes a digital message as blockchained data. Blockchained metadata includes metadata wrapper 600. For block 28, metadata wrapper 600 includes a collision resistant blockchain hash digest set based on block 28 as well as the collision resistant blockchain hash digest set carried over from the previous block, block 26. Thus, blocks 22, 24, 26, and 28 form collision resistant blockchain 20. As collision resistant blockchain 20 has each block include a collision resistant blockchain hash digest set formed of a forward blockchain hash digest and a pair of reverse blockchain hash digests formed with different data reversal techniques, collision resistant blockchain 20 is less susceptible to collisions that may occur with MD5 when using forward blockchain hash digests only.

Figure 6A:
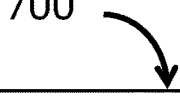

FIGS. 6A-G demonstrates a second collision between two different 64-byte messages with MD5 hashing the message front-to-back and how no corresponding collision occurs when those two different messages are hashed with MD5 back-to-front. FIG. 6A illustrates prior art first and second 64-Byte messages with identical MD5 blockchain hash digests, thereby providing a second example of a hash digest collision. Prior art FIG. 6A shows table 700, with descriptor column 701 and hexadecimal column 702. Table 700 shows a first 64-Byte message M3 "703" with contents 704 and a second 64-Byte message M4 "705" with contents 706, and each message has the same MD5 blockchain hash digest 707 with contents 708. Thus, we have a second example of a collision. Note that messages 704 and 706 are different. The bytes that are different between message M3 and M4 are highlighted in bold and underlined, to aid in seeing the different content of the two messages. There are only 2 bytes different in each message, and although only one nibble is different in each byte, it is easier to see the entire byte than only the changed nibble. Messages M3 and M4 were published in "Single-block collision attack on MD5," by Marc Stevens, Cryptology Group, CWI P.O. Box 94079, NL-1090 GB Amsterdam, The Netherlands, Jan. 29, 2012. Thus, we have a second prior art example of a collision where two messages with different content have the same MD5 hash digest. The first prior art example was in FIG. 1A.

Figure 6B:

FIG. 6B illustrates three MD5 blockchain hash digests for a first 64-Byte message, one front-to-back (forward), one back-to-front (reverse) by hexadecimal number, and one back-to-front (reverse) by byte. FIG. 6B shows table 720, with descriptor column 721 and hexadecimal column 722. Table 720 shows first 64-Byte Message M3 703 with contents 704 which has MD5 blockchain hash digest 707 with contents 708. Digest 707 is the forward blockchain hash digest of message 703. Table 720 also has the hexadecimal-reverse of Message M3, called M3R 723, which has the contents shown in 724. The blockchain MD5 hash digest of M3R is 725 with contents 726, which the hexadecimal-reverse blockchain hash digest of message M3 703. Table 720 also has the byte-reverse of Message M3, called M3B 727, which has the contents shown in 728. The blockchain MD5 hash digest of M3B is 729 with contents 730, which is byte-reverse blockchain hash digest of message M3 703. It is valuable to note that the forward blockchain hash digest 708, hexadecimal-reverse blockchain hash digest 726, and byte-reverse blockchain hash digest 730 all have different values.

FIG. 6C illustrates three MD5 blockchain hash digests for a second 64-Byte message, one front-to-back (forward), one back-to-front (reverse) by hexadecimal number, and one back-to-front (reverse) by byte. FIG. 6C shows table 740, with descriptor column 741 and hexadecimal column 742. Table 740 shows second 64-Byte Message M4 "705" with contents 706, which has MD5 blockchain hash digest 707 with contents 708, which is the forward blockchain hash digest. Table 740 also has the hexadecimal-reverse of Message M4, called M4R "743," which has the contents shown in 744. The blockchain MD5 hash digest of M4R is "745" with content 746, which is the hexadecimal reverse blockchain hash digest. Table 740 also has the byte-reverse of Message M4, called M4B "747," which has the contents shown in 748. The blockchain MD5 hash digest of M4B is "749" with contents 750, which is the byte-reverse blockchain hash digest. It is valuable to note that forward blockchain hash digest 708, hexadecimal-reverse blockchain hash digest 746, and byte-reverse blockchain hash digest 750 all have different values.

FIG. 6D illustrates a PERL program for converting ASCII characters to hexadecimal and then to binary and then calculating MD5 hash digests for a first 64-Byte message: once front-to-back (forward), once back-to-front (reverse) by hexadecimal number, and once back-to-front (reverse) by byte. FIG. 6E illustrates a PERL program for converting ASCII characters to hexadecimal and then to binary and then calculating MD5 hash digests for a second 64-Byte message: once front-to-back (forward), once back-to-front (reverse) by hexadecimal number, and once back-to-front (reverse) by byte. FIG. 6D is the program M3.pl referred to in step 308 of FIG. 3A, expanded to 308M3, for messages M3, M3R, and M3B from FIG. 6B. FIG. 6E is the program M4.pl, also referred to in step 308 of FIG. 3A, expanded to 308M4, for messages M4, M4R, and M4B. In FIG. 6D, three sets of instructions are used to create binary files for message M3, hexadecimal-reversed message M3R, and byte-reversed message M3B, namely M3.bin, M3R.bin, M3B.bin. Also, in FIG. 6E, three sets of instructions are used to create binary files for message M4, hexadecimal-reversed message M4R, and byte-reversed message M4B, namely M4.bin, M4R.bin, and M4B.bin. At this point in FIGS. 6D and 6E, the hash digest may be calculated two ways, as a check. One way is to use the binary files M3.bin, M3R.bin, M3B.bin, as well as M4.bin, M4R.bin, and M4B.bin as manual input to http://onlinemd5.com to calculate the desired hash digests. A second way is the PERL statement, use Digest::MD5 qw(md5_hex), to initialize the MD5 hash process, $hash=md5_hex($hex), to calculate the hash digests of the contents of message M3 in hexadecimal form (not ASCII), then printf ("md5_M3:% s\n",$hash), to print the hash digest, M3 in this case, to the PERL workspace.

Figure 6F:
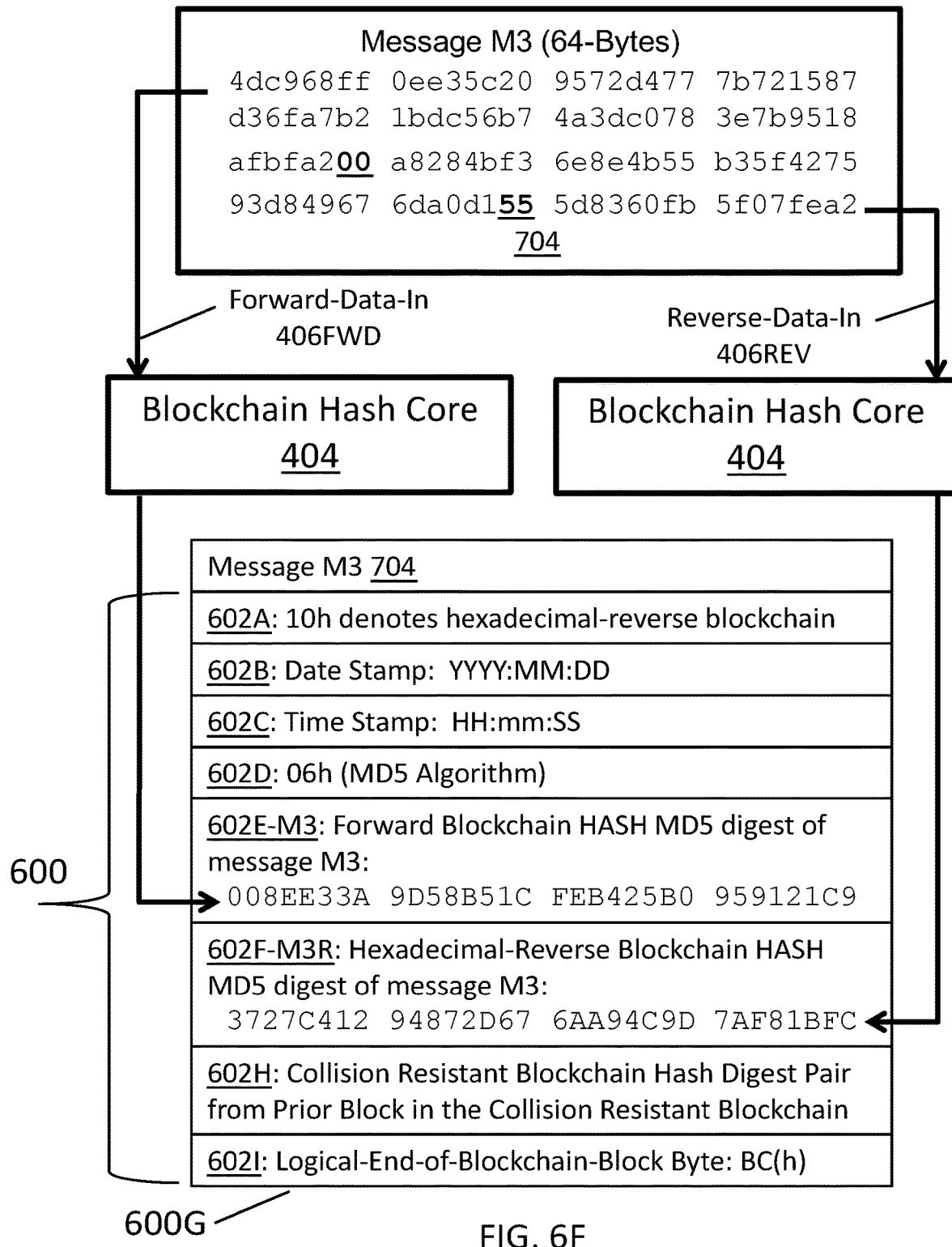

FIG. 6F illustrates an exemplary data structure 600G for a blockchain block that includes message data 704 and a metadata wrapper 600 for a first 64-Byte message 704 with a forward blockchain hash MD5 digest 602E-M3 and a hexadecimal-reverse blockchain hash digest 602F-M3R. Message 704 is showing being processed by a pair of blockchain hash cores 404, which operate in parallel. Blockchain hash core 404 on the left gets input Forward-Data-In "406FWD" where Message M3 704 is read from front-to-back. Blockchain hash core 404 on the right gets input Reverse-Data-In "406REV" where Message M3 is read from back-to-front. 406FWD is input to one blockchain hash core 404 and, in parallel, 406REV is input to a second blockchain hash core 404. The forward blockchain hash MD5 digest of the Forward-Data-In of Message M3 is stored as 602E-M3. The hexadecimal-reverse blockchain hash MD5 digest of MD3 is stored in 602F-M3R. In this manner using multiple hash cores 404 in parallel simultaneously, it is possible to generate the forward and hexadecimal-reverse blockchain hash digests without additional computational time. Data structure 600G provides an exemplary blockchain data structure for an individual blockchain block of a collision resistant blockchain. Data structure 600G begins with Message M3 704 as data. Next, data structure 600G includes metadata wrapper 600. In metadata wrapper 600, the hexadecimal contents of Message M3 704 are provided first. Next, metadata 602A is provided with a value of 10h, indicating the use of a single reverse blockchain, namely the hexadecimal-reverse blockchain. Metadata 602B provides the Date Stamp YYYY:MM:DD and metadata 602C provides the Time Stamp HH:mm:SS follow. Metadata 602D has a value of 06h to denote the use of the MD5 hash algorithm. The forward blockchain hash MD5 digest of the Forward-Data-In of Message M3 is stored as 602E-M3. The hexadecimal-reverse blockchain hash MD5 digest of MD3 is stored in 602F-M3R. Metadata 602H provides the collision resistant blockchain hash digest pair from the prior block in the collision resistant blockchain to chain the two blocks together. Metadata wrapper 600 and block data structure 600G concludes with logical-end-of-blockchain byte BC(h), 602I.

Figure 6G:
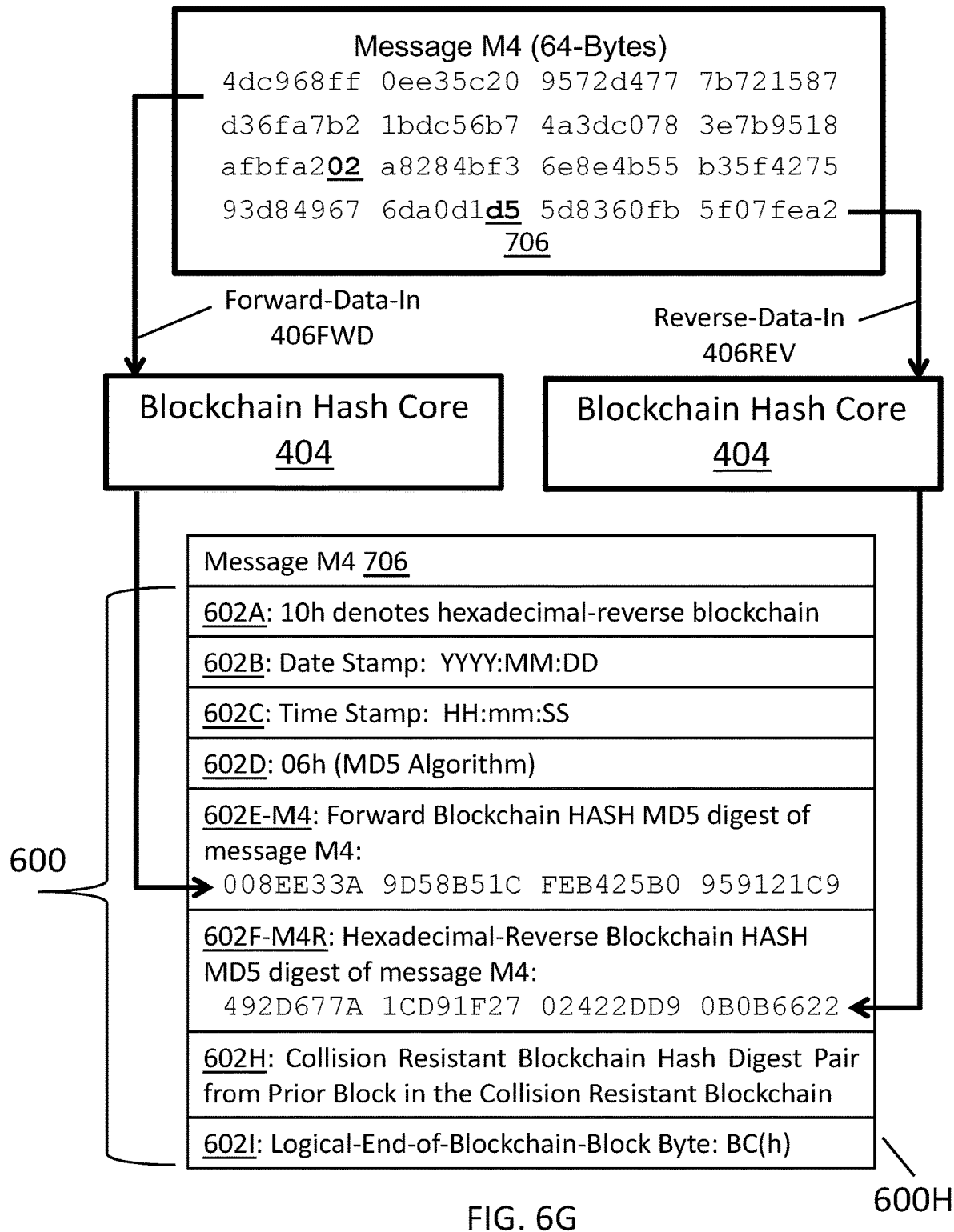

FIG. 6G illustrates an exemplary data structure 600H for a blockchain block that includes message data 706 and a metadata wrapper 600 for a second 64-Byte message with a forward blockchain hash MD5 digest 602E-M4 and a hexadecimal-reverse blockchain hash digest 602F-M4R. Data structure 600H is shown being constructed from a message 706 that is being processed by a pair of parallel blockchain hash cores 404. Blockchain hash core 404 on the left gets input Forward-Data-In "406FWD" where Message M4 706 is read from front-to-back. Blockchain hash core 404 on the right gets input Reverse-Data-In "406REV" where Message M4 706 is read from back-to-front. 406FWD is input to one blockchain hash core 404 and, in parallel, 406REV is input to a second blockchain hash core 404. The forward blockchain hash MD5 digest of the Forward-Data-In of Message M6 is stored as 602E-M4. The hexadecimal-reverse blockchain hash MD5 digest of MD4 is stored in 602F-M4R. In this manner using multiple hash cores 404 in parallel simultaneously, it is possible to generate the forward and hexadecimal-reverse blockchain hash digests without additional computational time. Data structure 600G provides an exemplary blockchain data structure for an individual blockchain block of a collision resistant blockchain. Data structure 600G begins with the hexadecimal contents of Message M4 706. Metadata wrapper 600 is then appended to message data 706. Metadata wrapper 600 includes metadata 602A, which has a value of 10h, indicating the use of a single reverse blockchain, namely the hexadecimal-reverse blockchain. Metadata 602B, the Date Stamp YYYY:MM:DD and metadata 602C Time Stamp HH:mm:SS follow next in metadata wrapper 600. Metadata 602D is then provided and has a value of 06h to denote the use of the MD5 hash algorithm. Metadata 602H provides the collision resistant blockchain hash digest pair from the prior block in the collision resistant blockchain to chain the two blocks together. Data structure 600G concludes with logical-end-of-blockchain byte BC(h), 602I.

Comparing wrappers 600G and 600H indicates that Messages M3 and M4 are now distinguished from one another due to the hexadecimal-reverse blockchain hash digests 602F-M3R and 602F-M4R. These hexadecimal-reverse blockchain hash digests do not replace forward blockchain hash digests 602E-M3 and 602E-M4. Instead, the hexadecimal-reverse blockchain hash digests 602F-M3R and 602F-M4R act in combination with forward blockchain hash digests 602E-M3 and 602E-M4 to distinguish messages M3 and M4 from one another, thus avoiding the collision identified in FIG. 7A. Forward blockchain hash digests 602E-M3 and hexadecimal-reverse blockchain hash digest 602F-M3R form a collision resistant blockchain hash digest pair. Forward blockchain hash digests 602E-M4 and hexadecimal-reverse blockchain hash digest 602F-M4R form another collision resistant blockchain hash digest pair. Together, there is not collision between the collision resistant blockchain hash digest pairs for M3 and M4 because there is not a simultaneous collision between both the forward hash digest and the hexidecimal-reverse hash digest of the collision resistant blockchain hash digest pair. A collision only occurs with collision resistant blockchain hash digest pairs when there is a simultaneous collision between both the forward hash digest and the hexidecimal-reverse hash digest. In this case, while there is a collision between the forward hash digests of M3 and M4, there is not a corresponding simultaneously collision between the hexidecimal-reverse hash digests of M3 and M4. Thus, the use of the collision resistant blockchain hash digest pair avoided the collision while still making use of the MD5 hash digest algorithm.

Figure 6H:
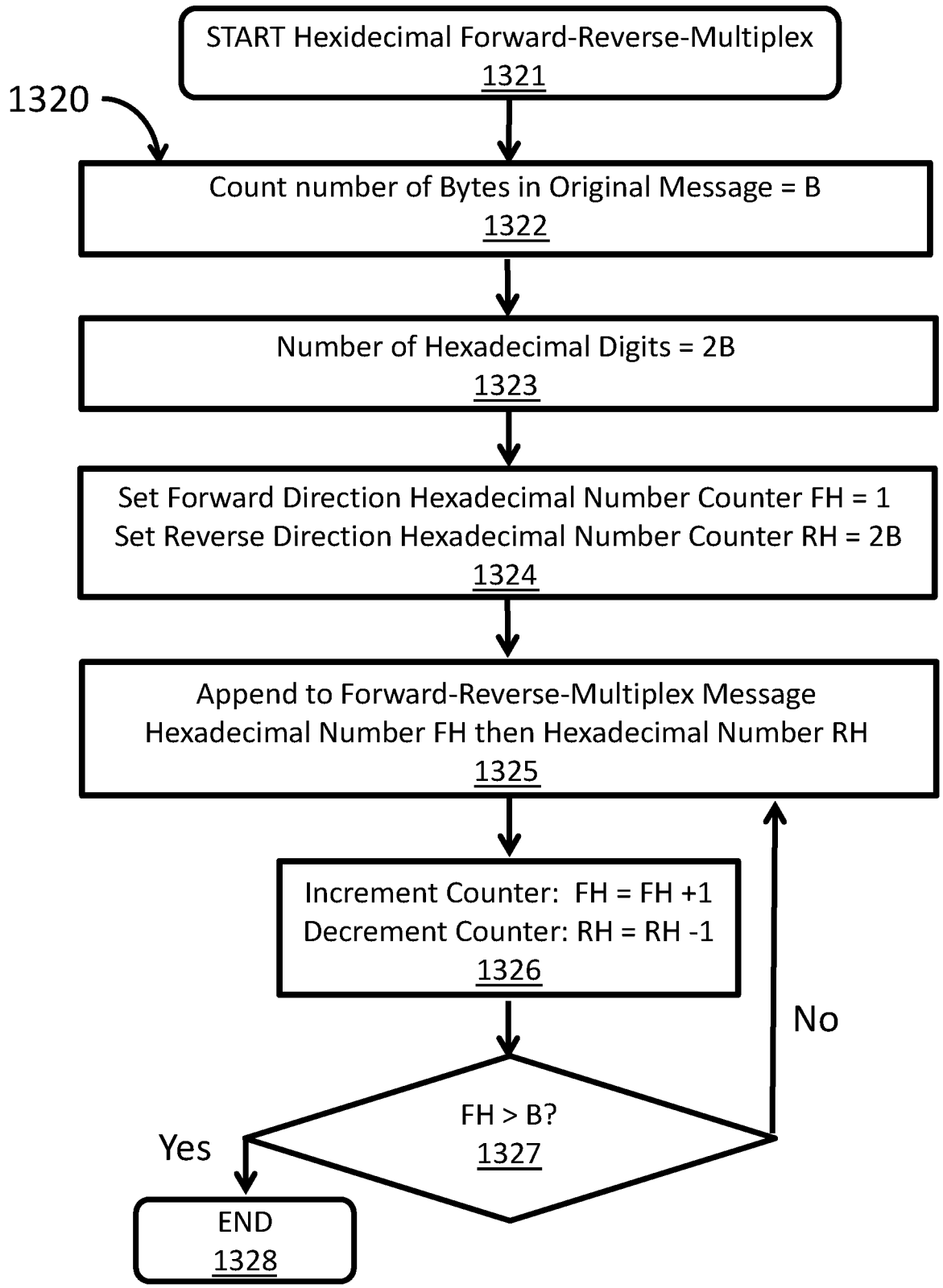

FIGS. 6H-6K illustrate the creation of reverse blockchain hash digests made using a hexadecimal forward-reverse multiplex operation. FIG. 6H depicts a flow chart 1320 illustrating the generation of a reverse hash digest using a hexadecimal forward-reverse-multiplex process. A hexadecimal forward-reverse-multiplex hash digest is a hash digest that is formed by multiplexing the front and back hexadecimal numbers of a message to generate a forward-reverse-multiplex version of the message that is then processed with a hash algorithm to generate the hexadecimal forward-reverse-multiplex hash digest. In essence, it is possible to create hash digests on a message to avoid collisions by rearranging the message in different known configurations to generate alternative hash digests that compliment a conventional forward hash digest to compare two messages and avoid collisions. Rearranging the message by a multiplex process shown in process 1320 is another such way of creating an alternative hash digest that compliments that forward hash digest, analogous to bit-reverse, byte-reverse, sector reverse, and hexadecimal reverse. The process for creating a hexadecimal forward-reverse-multiplex hash digest is started in step 1321. In step 1322, the process counts the number of bytes B in the original message. In step 1323, the process computes the number of hexadecimal digits to the message as being 2B, twice the number of bytes. In step 1324, the process sets the forward direction hexadecimal counter FH to 1 and sets the reverse direction hexadecimal country RH to 2B. In step 1326, the process forms a new version of the original message, a forward-reverse-multiplex message, by a hexadecimal forward-reverse multiplex operation by first appending hexadecimal number FH to the new version and then appending hexadecimal number RH to the new version. In step 1326, the process increments counter FH to FH+1 and decrements counter RH to RH−1. In step 1327, the process determines if FH is greater than B, denoting that the end of the hexadecimal forward-reverse multiplex operation. If FH is not greater than B, then the process returns to step 1325 to continue performing the hexadecimal forward-reverse multiplex operation. If the process has reached a point here FH is greater than B, the hexadecimal forward-reverse multiplex operation ENDS in step 1328.

Figure 6J:
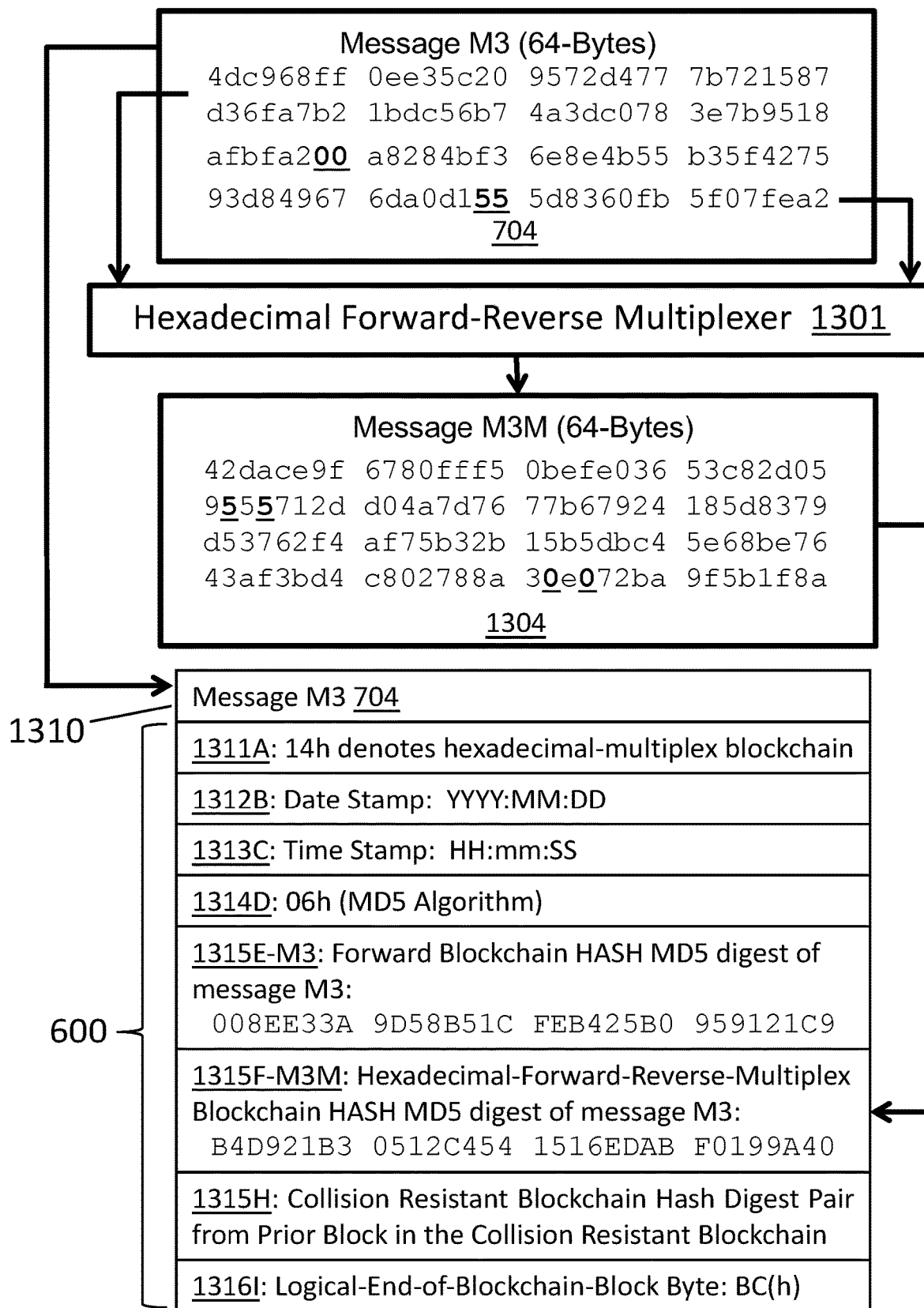
Figure 6K:
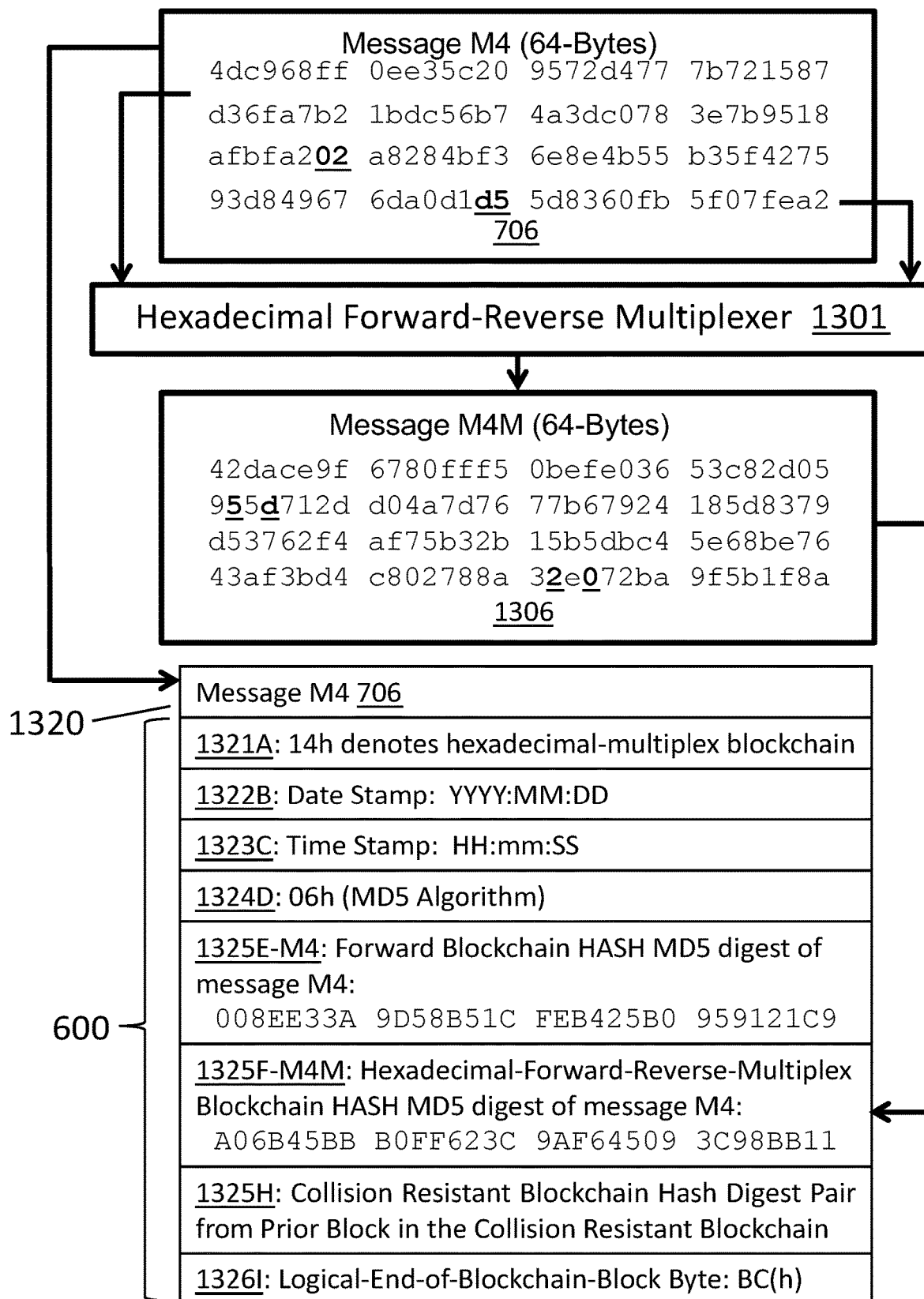

FIG. 6I illustrates a PERL program Multiplex.pl 308Multiplex for creating a hash digest by a hexadecimal forward-reverse-multiplex process shown in flowchart 1320. Multiplex.pl 308Multiplex is the program shown in step 308 of FIG. 3A depicting the generation of hash digests. In program 308Multiplex, the hexadecimal forward-reverse multiplex hash digests above are calculated only one way, for brevity, and these digests are shown in FIGS. 6J and 6K as 1315F-M3M and 1325F-M4M respectively. This program 308Multiplex shows that the previous calculations of the *.bin files was unnecessary, although these previous *.bin files served as a useful check of the hash digest (by calculating the digests two ways, once like above and once by using the *.bin files and http://onlinemd5.com). Program 308Multiplex multiplex.pl was used to calculate the hexadecimal forward-reverse multiplex hash digests for messages M3 704 and M4 706 shown in FIGS. 6J and 6K.

FIG. 6J depicts an exemplary data structure 1310 for a blockchain block that includes message data M3 704 and a metadata wrapper 600 for a first 64-Byte message M3 704 with a forward blockchain hash MD5 digest 1315E-M3 and a hexadecimal forward-reverse-multiplex blockchain hash digest 1315F-M3M. Message M3 704 is processed using an MD5 hash algorithm to generate forward blockchain hash MD5 digest 1315E-M3. Message M3 704 is then also rearranged by a hexadecimal forward-reverse multiplex operation depicted in flowchart 1320 to generate the hexadecimal forward-reverse multiplex message M3M 1304. Message M3M 1304 is then processed with an MD5 hash algorithm to generate hexadecimal forward-reverse-multiplex blockchain hash digest 1315F-M3M. Exemplary data structure 1310 for a blockchain block is formed by first appending the original hexadecimal message M3 704. Exemplary data structure 1310 for a blockchain block is further formed by appending metadata wrapper 600 to the original message M3 704. Metadata wrapper 600 includes metadata 1311A with the value of 14h denoting the use of a hexadecimal forward-reverse-multiplex blockchain hash digest. Metadata 1312B includes the data stamp. Metadata 1313C includes the time stamp. Metadata 1314D includes the value of 06h to designate the use of the MD5 hash algorithm. Metadata 1315E-M3 is the forward blockchain hash MD5 digest of message M3 704. Metadata 1315F-M3M is the hexadecimal forward-reverse-multiplex blockchain hash digest of message M3M 1304. The blockchain block 1310 concludes with logical end of blockchain block byte 1316l having the value of BC(h).

FIG. 6K illustrates an exemplary data structure 1320 for a blockchain block that includes message data M4 706 and a metadata wrapper 600 for a second 64-Byte message M4 706 with a forward blockchain hash MD5 digest 1325E-M4 and a hexadecimal forward-reverse-multiplex blockchain hash digest 1325F-M4M. Message M4 706 is processed using an MD5 hash algorithm to generate forward blockchain hash MD5 digest 1325E-M4. Message M4 706 is then also rearranged by a hexadecimal forward-reverse multiplex operation depicted in flowchart 1320 to generate the hexadecimal forward-reverse multiplex message M4M 1306. Message M4M 1306 is then processed with an MD5 hash algorithm to generate hexadecimal forward-reverse-multiplex blockchain hash digest 1325F-M4M. Exemplary data structure 1320 for a blockchain block is formed by first appending the original hexadecimal message M4 706. Exemplary data structure 1320 for a blockchain block is further formed by appending metadata wrapper 600 to the original message M4 706. Metadata wrapper 600 includes metadata 1321A with the value of 14h denoting the use of a hexadecimal forward-reverse-multiplex blockchain hash digest. Metadata 1322B includes the data stamp. Metadata 1323C includes the time stamp. Metadata 1324D includes the value of 06h to designate the use of the MD5 hash algorithm. Metadata 1325E-M4 is the forward blockchain hash MD5 digest of message M4 706. Metadata 1325F-M4M is the hexadecimal forward-reverse-multiplex blockchain hash digest of message M4M 1306. The blockchain block 1310 concludes with logical end of blockchain block byte 1326l having the value of BC(h).

Figure 7E:
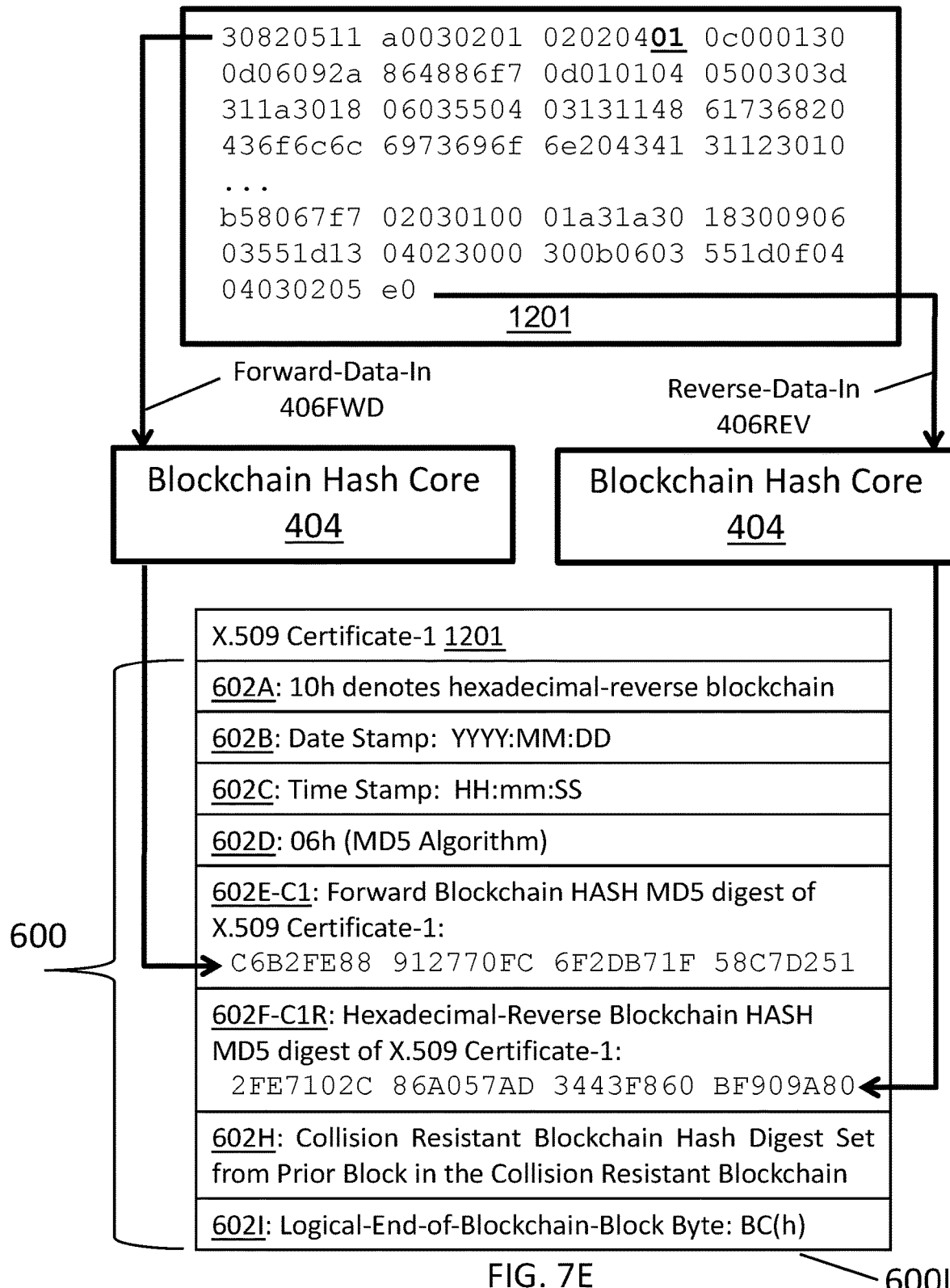

FIGS. 7A-F demonstrates a third collision between two different 1301-Byte messages, a pair of X.509 certificates, with MD5 hashing the message front-to-back and how no corresponding collision occurs when those two different messages are hashed with MD5 back-to-front. FIG. 7A shows a first 1301-Byte X.509 Certificate-1 1201 known in the prior art. FIG. 7B shows a second 1301-Byte X.509 Certificate-2 1202 also known in the prior art. Each of these X.509 Certificate has the same MD5 blockchain hash digest when MD5 is applied to the two certificates message data when read in the forward direction, thereby resulting in a collision. These colliding forward hash digests are shown as 602E-C1, FIG. 7E, and 602E-C2, FIG. 7F. Thus, these two certificates provide a third example of a collision. Sixty-two bytes are different in each of these two X.509 certificates shown in FIGS. 7A and 7B. Unlike FIGS. 1A and 6A, entire bytes may differ in these two X.509 certificates shown in FIGS. 7A and 7B, or just a nibble therein.

In cryptography, X.509 is a standard defining the format of public key certificates. X.509 certificates are used in many Internet protocols, including TLS/SSL, which is the basis for HTTPS, the secure protocol for browsing the web. They are also used in offline applications, like electronic signatures. An X.509 certificate contains a public key and an identity (a hostname, or an organization, or an individual), and is either signed by a certificate authority or self-signed. When a certificate is signed by a trusted certificate authority, or validated by other means, someone holding that certificate can rely on the public key it contains to establish secure communications with another party, or validate documents digitally signed by the corresponding private key. X.509 also defines certificate revocation lists, which are a means to distribute information about certificates that have been deemed invalid by a signing authority, as well as a certification path validation algorithm, which allows for certificates to be signed by intermediate CA (certificate authority) certificates, which are, in turn, signed by other certificates, eventually reaching a trust anchor. X.509 is defined by the International. Telecommunication Union's (ITC) Standardization sector (ITU-T), and is based on ASN.1, another ITU-T standard. X.509 is documented in standard "X.509: Information technology—Open Systems Interconnection— The Directory: Public-key and attribute certificate frameworks," https://www.itu.int/rec/T-REC-X.509, which is hereby incorporated by reference in its entirety. X.509 is also documented in RFC (Request for Comments) 5280, "Internet X.509 Public Key Infrastructure Certificate and Certificate Revocation List (CRL) Profile," https://tools.ietf.org/html/rfc5280, which is hereby incorporated by reference in its entirety.

As described in "Chosen-prefix Collisions for MD5 and Colliding X.509 Certificates for Different Identities," by Marc Stevens, Arjen Lenstra, and Benne de Weger, first 1301-Byte X.509 Certificate-1 1201 and second 1301-Byte X.509 Certificate-2 1202 are special in that these two certificates have different public keys and different distinguished name fields. The problem is that one of the certificates could be used to make malware look acceptable to a computer because the MD5 hash digest is identical with another certificate, such as a trust anchor. The collision therefore is a substantial security risk.

FIG. 7C illustrates a PERL program 308X509-C1 for converting ASCII characters to hexadecimal and then to binary and then calculating MD5 hash digests for a first 1301-Byte message 1201: once front-to-back (forward), and once back-to-front (reverse) by hexadecimal number. FIG. 7D illustrates a PERL program 308X509-C2 for converting ASCII characters to hexadecimal and then to binary and then calculating MD5 hash digests for a second 1301-Byte message 1202: once front-to-back (forward), and once back-to-front (reverse) by hexadecimal number. Perl programs 308X509-C1, FIG. 7C, and Perl program 308C2, FIG. 7D are used to calculate the hexadecimal-reverse hash digest 602F-C1R, FIG. 7E, and 602F-C2R, FIG. 7F. FIG. 7C is the program X509-C1.pl referred to in step 308 of FIG. 3A, expanded to 308X509-C1, for messages C1 and C1R, FIG. 7E. FIG. 7D is the program X509-C2.pl, also referred to in step 308 of FIG. 3A, expanded to 308X509-C2, for messages C2 and C2R, FIG. 7F. In FIG. 7C, two sets of instructions are used to create binary files for message C1 and hexadecimal-reversed message C1R, namely C1.bin and C1R.bin. Also, in FIG. 7D, two sets of instructions are used to create binary files for message C2 and hexadecimal-reversed message C2R, namely C2.bin and C2R.bin. At this point in FIGS. 7C and 7D, the hash digest may be calculated two ways, as a check. One way is to use the binary files C1.bin and C1R.bin, as well as C2.bin and C2R.bin, as manual input to http://onlinemd5.com to calculate the desired hash digests. A second way is the PERL statement, use Digest::MD5 qw(md5_hex), to initialize the MD5 hash process, $hash=md5_hex($hex), to calculate the hash digests of the contents of message C1 in hexadecimal form (not ASCII), then printf ("md5_C1:% s\n",$hash), to print the hash digest, C1 in this case, to the PERL workspace.

FIG. 7E illustrates an exemplary data structure 600I for a blockchain block that includes message data 1201 and a metadata wrapper 600 for a first 1301-Byte message 1201 with a forward blockchain hash MD5 digest 602E-C1 and a hexadecimal-reverse blockchain hash digest 602F-C1R. Data structure 600I is shown being constructed from a message 1201 that is being processed by a pair of parallel blockchain hash cores 404. Blockchain hash core 404 on the left gets input Forward-Data-In "406FWD" where Message 1201 is read from front-to-back. Blockchain hash core 404 on the right gets input Reverse-Data-In "406REV" where Message 1201 is read from back-to-front. 406FWD is input to one blockchain hash core 404 and, in parallel, 406REV is input to a second blockchain hash core 404. The forward blockchain hash MD5 digest of the Forward-Data-In of Message 1201 is stored as 602E-C1. The hexadecimal-reverse blockchain hash MD5 digest of 1201 is stored in 602F-C1R. In this manner using multiple hash cores 404 in parallel simultaneously, it is possible to generate the forward and hexadecimal-reverse blockchain hash digests without additional computational time. Data structure 600I provides an exemplary blockchain data structure for an individual blockchain block of a collision resistant blockchain. Data structure 600I begins with X.509 Certificate "C1" 1201. Message 1201 is appended with metadata wrapper 600. Metadata wrapper includes metadata 602A, which is shown having a value of 10h, indicating the use of a single reverse blockchain, namely the hexadecimal-reverse blockchain. Metadata 602B, the Date Stamp YYYY:MM:DD and metadata 602C Time Stamp HH:mm:SS follow. Metadata 602D has a value of 06h to denote the use of the MD5 hash algorithm. The forward blockchain hash MD5 digest of the Forward-Data-In of Certificate "C1" 1201 is stored as 602E-C1. The hexadecimal-reverse blockchain hash MD5 digest of Certificate "C1" 1201 is stored in 602F-C1R. Metadata 602H provides the collision resistant blockchain hash digest pair from the prior block in the collision resistant blockchain to chain the two blocks together. Metadata wrapper 600I concludes with logical-end-of-blockchain byte BC(h), 602I.

Figure 7F:
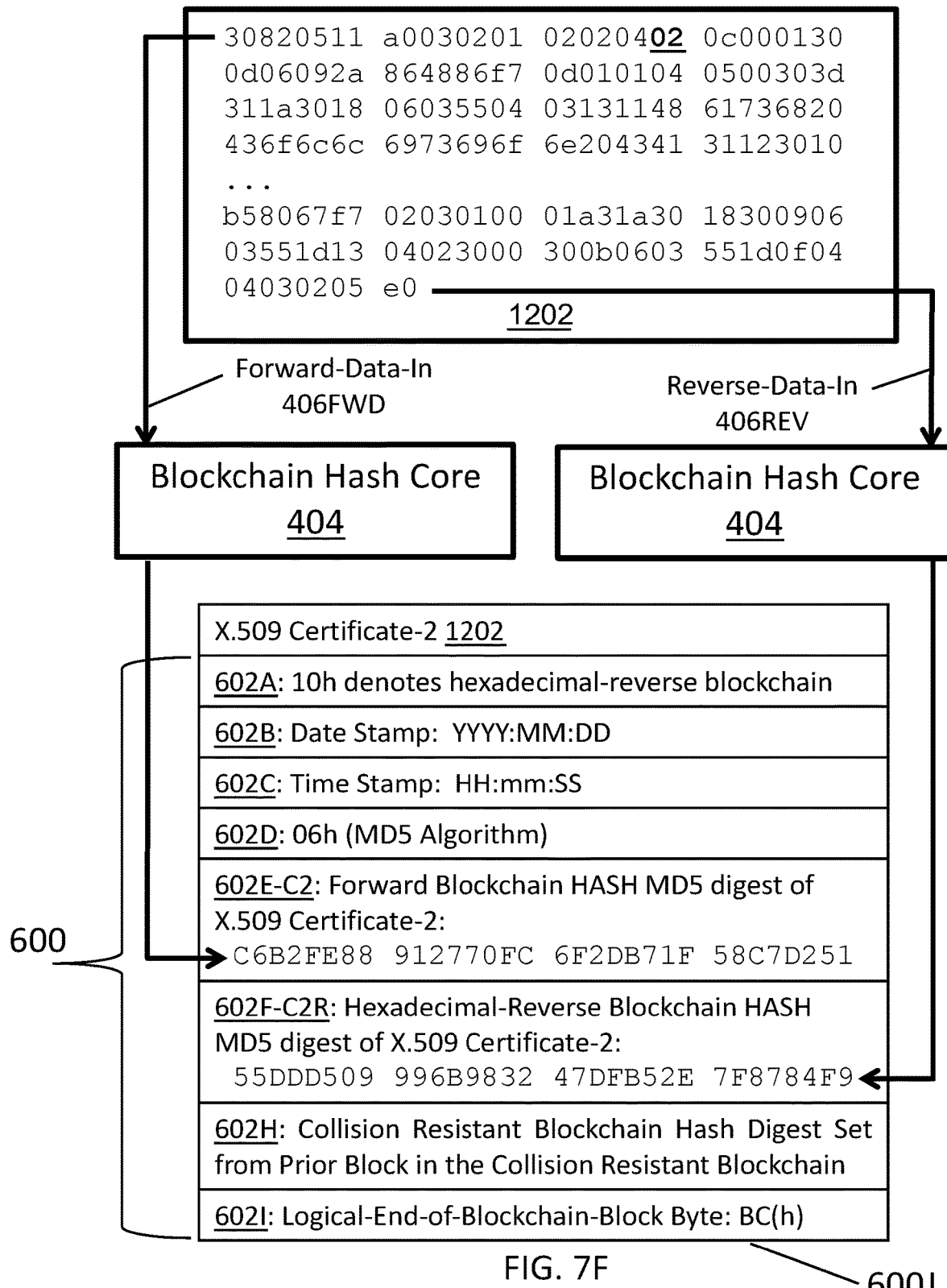

FIG. 7F illustrates an exemplary data structure 600J for a blockchain block that includes message data 1202 and a metadata wrapper 600 for a second 1301-Byte message 1202 with a forward blockchain hash MD5 digest 602E-C2 and a hexadecimal-reverse blockchain hash digest 602F-C2R. Data structure 600J is shown being constructed from a message 1202 that is being processed by a pair of parallel blockchain hash cores 404. Blockchain hash core 404 on the left gets input Forward-Data-In "406FWD" where Message 1202 is read from front-to-back. Blockchain hash core 404 on the right gets input Reverse-Data-In "406REV" where Message 1202 is read from back-to-front. 406FWD is input to one blockchain hash core 404 and, in parallel, 406REV is input to a second blockchain hash core 404. The forward blockchain hash MD5 digest of the Forward-Data-In of Message 1202 is stored as 602E-C2. The hexadecimal-reverse blockchain hash MD5 digest of 1201 is stored in 602F-C2R. In this manner using multiple hash cores 404 in parallel simultaneously, it is possible to generate the forward and hexadecimal-reverse blockchain hash digests without additional computational time. Data structure 600J provides an exemplary blockchain data structure for an individual blockchain block of a collision resistant blockchain. Data structure 600J begins with X.509 Certificate "C2" 1202. Message 1202 is appended with metadata wrapper 600. Metadata wrapper includes metadata 602A, which is shown having a value of 10h, indicating the use of a single reverse blockchain, namely the hexadecimal-reverse blockchain. Metadata 602B, the Date Stamp YYYY:MM:DD and metadata 602C Time Stamp HH:mm:SS follow. Metadata 602D has a value of 06h to denote the use of the MD5 hash algorithm. The forward blockchain hash MD5 digest of the Forward-Data-In of Certificate "C2" 1202 is stored as 602E-C2. The hexadecimal-reverse blockchain hash MD5 digest of Certificate "C2" 1202 is stored in 602F-C2R. Metadata 602H provides the collision resistant blockchain hash digest pair from the prior block in the collision resistant blockchain to chain the two blocks together. Metadata wrapper 600J concludes with logical-end-of-blockchain byte BC(h), 602I. As shown in FIGS. 7E and 7F, the combination of the forward MD5 hash digest 602E-C1 and hexadecimal-reverse MD5 hash digest 602F-C1R in FIG. 7E, as well as the combination of the forward MD5 hash digest 602E-C2 and hexadecimal-reverse MD5 hash digest 602F-C2R in FIG. 7F, shows that the two X.509 certificates can now be distinguished and a collision avoided through the use of a collision resistant blockchain hash digest pair, the use of both the forward and reverse blockchain hash digests. Therefore, the collision resistant blockchain hash digest pair has voided the previous problem of a collision successfully.

FIGS. 7G-7L demonstrate a process for creating and verifying digital signatures for digital messages such as X.509 certificates to prevent two different X.509 certificates from having the same digital signature resulting from a collision. A digital signature is a mathematical scheme for verifying the authenticity of digital messages or documents. RSA (Rivest-Shamir-Adleman) is one of the first public-key cryptosystems and is widely used for secure data transmission. In such a cryptosystem, the encryption key is public and it is different from the decryption key which is kept secret (private). In RSA, this asymmetry is based on the practical difficulty of the factorization of the product of two large prime numbers. The RSA signing of a message, including an X.509 certificate as shown in FIGS. 7A and 7B is augmented in FIGS. 7G-7L where more than one hash digest of the message is used for RSA signatures, for improved security and to avert birthday attacks. A birthday attack is a type of cryptographic attack that exploits mathematical collisions that result when different messages are hashed by a hash algorithm, but produce the same hash digest, which can render computer security systems vulnerable to hacking. Currently, RSA digital signatures utilize a single hash digest. As demonstrated in FIGS. 1-7F, messages M1 and M2, M3 and M4, and X.509C1 and X.509C2 produce collisions when hashed with MD5. A single hash digest proved insufficient to distinguish between these different messages. However, utilizing one or more additional hash digests produced by the same hash algorithm by hashing the messages in a different manner produced different hash digests that were capable of distinguishing between the different messages and avoided mathematical collisions. An RSA digital signature using the MD5 hash algorithm is given by the equation below:

$$[MD5(\text{message})]^E \bmod(N) = \text{RSA Signature}$$

where E is public, and often a Fermat prime number. N is called the modulus and is public. As can be seen from this equation for the RSA signature, certificates X.509-C1 and X.509C2, although being different, in fact produce the same hash digest when hashed with MD5, thereby producing a collision, which can create a security vulnerability. However, as discussed with respect to FIGS. 7A-7F, only a conventional forward-hash digest using MD5 of certificates X.509-C1 and X.509C2 results in a collision. The inclusion of any of the reverse hash digests produced by MD5, such as a byte-reverse, bit-reverse, or hex-reverse, results in the ability to distinguish these different certificates X.509-C1 and X.509C2 from each other and avoid the collision. As such, this present specification provides two different methods for including multiple different hash digests within an RSA digital signature to provide collision resistant digital signatures for enhanced network security. The first method is to sign messages with a Multiple Digital Signature Set that includes multiple digital signatures each of which is based on a different hash digest, such as a forward hash digest, a hex-reverse hash digest, a byte-reverse hash digest, a bit-reverse hash digest, a multiplex-reverse hash digest, or a sector-reverse hash digest. Where a collision may result between two different messages with one digital signature based on one hash digest, multiple signatures based on different hash digests avoid the collision. The second method is to provide a single digital signature that is based on a concatenation of multiple different hash digests. This method also avoids the collision as well.

Figure 7G:
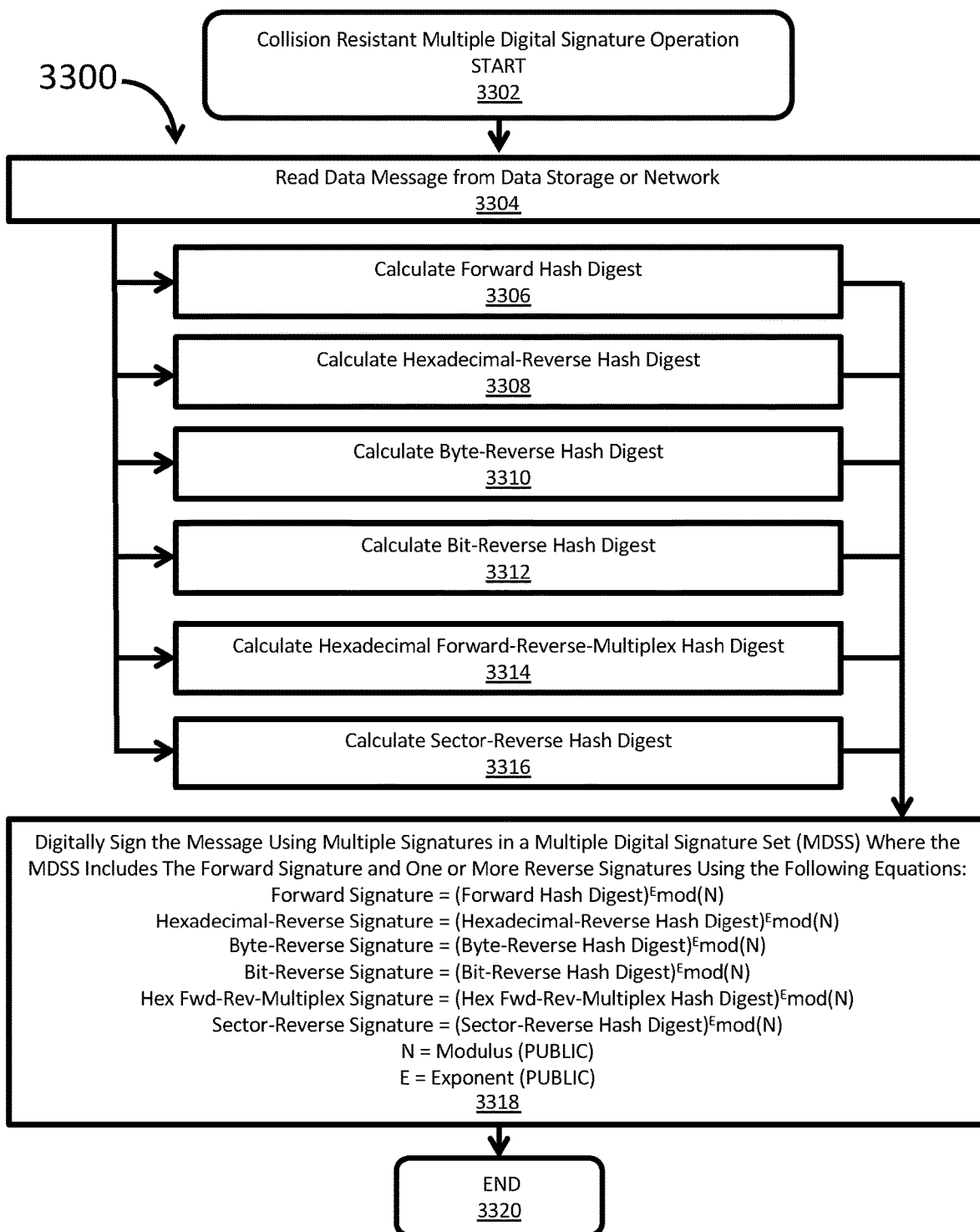
Figure 71:
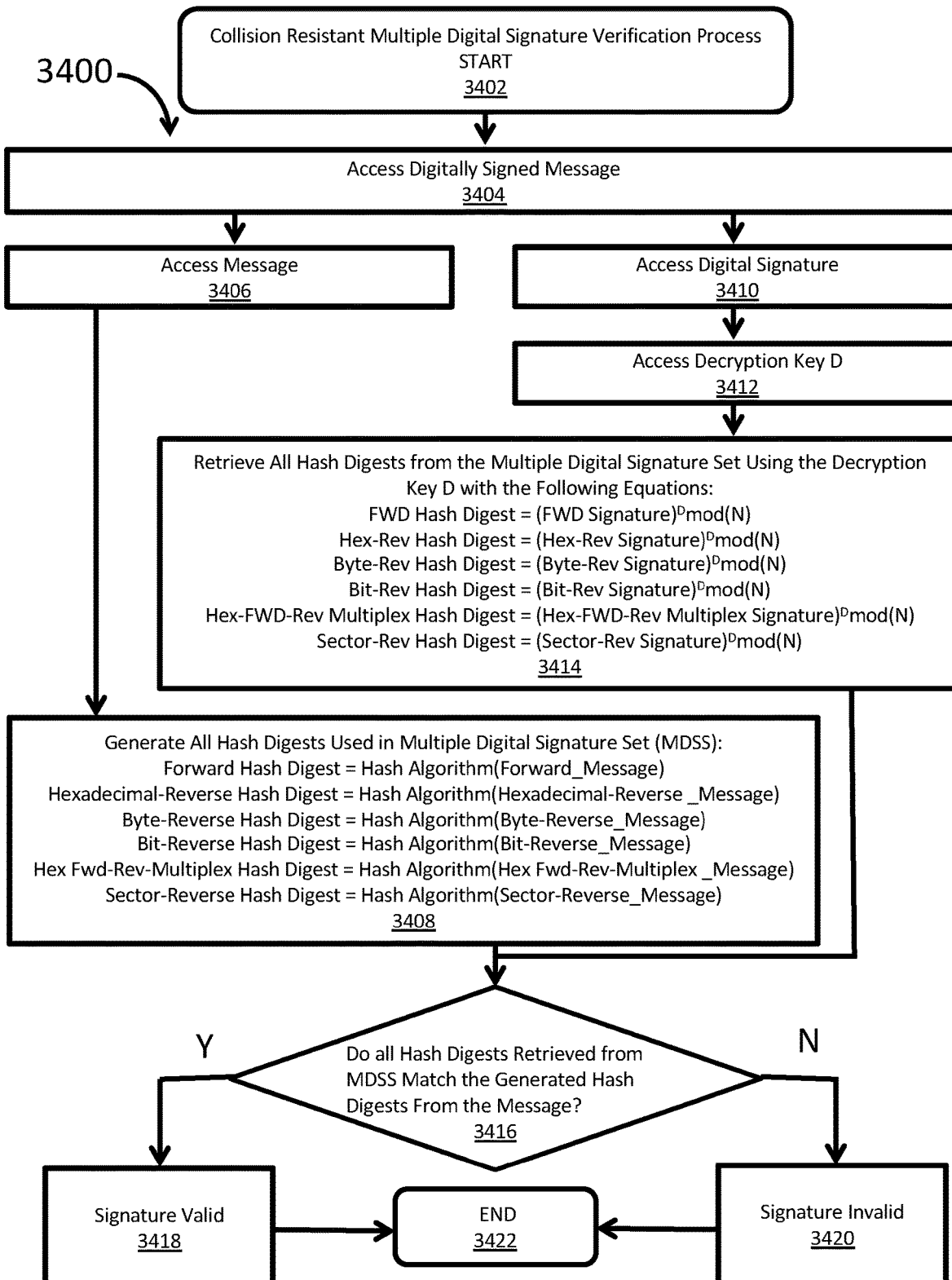

FIG. 7G depicts a flowchart 3300 illustrating a process for digitally signing a file such as an X.509 certificate with a collision resistant multiple digital signature operation that produces a Multiple Digital Signature Set (MDSS). The process begins with step 3302. In step 3304, a data message is read from a data store or network node. The data message may be Messages M1, M2, M3, or M4. The data message may also be certificates X.509-C1 or X.509-C2. Steps 3306, 3308, 3310, 3312, 3314, and 3316 are performed in parallel as shown in FIG. 7G. Step 3306 calculates the forward hash digest of the data message. Step 3308 calculates the hexadecimal-reverse hash digest. Step 3310 calculates the byte-reverse hash digest. Step 3310 calculates the hexadecimal forward-reverse multiplex hash digest. Step 3316 calculates the sector-reverse hash digest. As such, process 3300 produced 6 different hash digests off of the same data message using the same hashing algorithm, such as MD5. In step 3318, the read data message is digitally signed with a Multiple Digital Signature Set (MDSS) that includes multiple different digital signatures each produced from one of the different hash digests calculated in steps 3306, 3308, 3310, 3312, 3314, and 3316. Each digital signature is created with the basic formula given below:

$$[\text{hash digest}]^E \bmod(N) = \text{RSA Signature}$$

The MDSS is created using two or more digital signatures that are produced using different hash digests of the same data message. Here, the process created six different hash digests: a forward hash digest, hexadecimal-reverse hash digest, byte-reverse hash digest, bit-reverse hash digest, hexadecimal forward-reverse multiplex hash digest, and sector-reverse hash digest. As such, up to six different digital signatures can be produced for a single data message off of these six different hash digests from that same data message. The equations for these six different digital signatures are given in step 3318 and reproduced below, where N in a public modulus and E is a public exponent:

Forward Signature=(Forward Hash Digest)$^E$mod($N$)

Hexidecimal-Reverse Signature=(Hexidecimal-Reverse Hash Digest)$^E$mod($N$)

Byte-Reverse Signature=(Byte-Reverse Hash Digest)$^E$mod($N$)

Bit-Reverse Signature=(Bit-Reverse Hash Digest)$^E$mod($N$)

Hex Fwd-Rev-Multiplex Signature=(Hex Fwd-Rev-Multiplex Hash Digest)$^E$mod($N$)

Sector-Reverse Signature=(Sector-Reverse Hash Digest)$^E$mod($N$)

The MDSS may contain any combination of two or more of the above signatures, thereby avoiding a collision that results when only one digital signature based off of a single hash digest is used as is currently the practice known in the art. The MDSS is appended to the data message, such as an X.509 certificate in order to sign it, which thereby completes the digital signature process in with a collision resistant digital signature. The process ENDS in step 3320. It is contemplated that process 3400 may be used on blockchains and blocks within blockchains. Process 3400 may also be used with any type of digital file or set of digital data.

FIG. 7H illustrates a Multiple Digital Signature Set (MDSS) 3330 and an X.509 certificate 3350 signed with a Multiple Digital Signature Set (MDSS) 3330. The MDSS described in FIG. 7G step 3318 is shown in FIG. 7H in table 3300. The Multiple Digital Signature Set (MDSS) 3330 includes up to six different digital signatures produced in process 3300. These signatures include a forward signature 3332, a hexadecimal-reverse signature 3334, a byte-reverse signature 3336, a bit-reverse signature 3338, a hexadecimal forward-reverse multiplex signature 3340, and a sector-reverse signature 3342. While MDSS is shown having these six different signatures, it may include at least any two of these signatures or combination thereof such as three, four, or five different signatures. As such, MDSS is a collision resistant digital signature for digitally signing messages. The present specification discloses five different types of reverse hash digest hashing algorithms. It is possible to replicate those different reverse hashing algorithms with respect to the forward hash and produce a hexadecimal-forward hash digest, a byte-forward hash digest, a bit-forward hash digest, a hexadecimal reverse-forward hash digest, or a sector-forward hash digest. It is contemplated in this application that any of the processes that use a hexadecimal-reverse hash digest, byte-reverse hash digest, bit-reverse hash digest, hexadecimal forward-reverse multiplex hash digest, and sector-reverse hash digest disclosed within FIGS. 1-12 can instead use a hexadecimal-forward hash digest, a byte-forward hash digest, a bit-forward hash digest, a hexadecimal reverse-forward hash digest, or a sector-forward hash digest in its place. The point is to use the same hash algorithm on the same set of data by reading the data into the hash algorithm in different ways to produce different results. These different types of forward hash digests would also avoid collisions as do the different types of reverse hash digests. These different types of forward hash digests may be used interchangeably with the already disclosed different types of reverse hash digests. Another way of producing different hash digests is by using different hashing algorithms. For example, one may use a digital signature produced with MD5 combined with a digital signature produced a different hash algorithm like SHA-1, SHA-224, SHA-512/224, SHA-256, SHA-512/256, SHA-384, SHA-512, or SHA-3 to create a collision resistant MDSS 3330. X.509 certificate 3350 is shown having a table listing the contents of the X.509 certificate consistent with version 3. The X.509 certificate contents include the version 3352, certificate serial number 3354, certificate algorithm identifier for the certificate issuer's signature 3356, the issuer 3358, validity period 3360, and subject public key information 3364. Optional additional information that may be included in the X.509 certificate consistent with version 3 includes the issuer's unique identifier 3366, the subject's unique identifier 3368, and extensions 3370. The X.509 certificate 3350 is signed by a Certificate Authority's (CA) Multiple Digital Signature Set 3330 as described above. Signing X.509 certificate 3350 with MDSS 3330 avoids collisions. Certificate X.509-C1 has a different MDSS than X.509-C2, thereby distinguishing between the two certificates in a way that a single digital signature produced within a single hash digest cannot.

FIG. 7I depicts a flow chart 3400 illustrating a collision resistant multiple digital signature verification process. After a digital signature is produced, it is desirable to verify the digital signature by extracting the hash digest from the digital signature and comparing it to a new hash obtained by rehashing the message to which the digital signature is appended. If the two hashes match, the digital signature is verified. However, if the hashes do not match, then the signature is not verified. Using a single digital signature based with a single hash digest exposes the verification system to collisions where different files produce the same hash digests, which present a security issue by expose networking systems to hacking. Flow chart 3400 illustrates a collision resistant digital signature verification process that is based on a Multiple Digital Signature Set (MDSS) 3330. The process begins with START 3402. In step 3404, a file that is digitally signed with an MDSS 3330 is accessed. In step 3406, the digital message signed by the MDSS 3330 is accessed. In step 3408, new hash digests are generated off of the accessed digital message that correspond to all of the different types of hash digests used to form the MDSS 3330 that is appended to the digital message. The new hash digests are given by the following equations:

Forward Hash Digest=Hash Algorithm(Forward_Message)

Hexadecimal-Reverse Hash Digest=Hash Algorithm(Hexadecimal-Reverse_Message)

Byte-Reverse Hash Digest=Hash Algorithm(Byte-Reverse_Message)

Bit-Reverse Hash Digest=Hash Algorithm(Bit-Reverse_Message)

Hex Fwd-Rev-Multiplex Hash Digest=Hash Algorithm(Hex Fwd-Rev-Multiplex_Message)

Sector-Reverse Hash Digest=Hash Algorithm(Sector-Reverse_Message)

where the hash algorithm may be SHA-1, SHA-224, SHA-512/224, SHA-256, SHA-512/256, SHA-384, SHA-512, or SHA-3. In step 3410, the process accesses the digital signature MDSS 3330 from the digitally signed message. In step 3412, the process accesses a decryption key D to extract the hash digest used to form each different digital signature from the MDSS 3330. The equations used to retrieve the hash digests from each digital signature within the MDSS 3330 are given below:

FWD Hash Digest=(FWD Signature)$^D$mod(N)

Hex-Rev Hash Digest=(Hex-Rev Signature)$^D$mod(N)

Byte-Rev Hash Digest=(Byte-Rev Signature)$^D$mod(N)

Bit-Rev Hash Digest=(Bit-Rev Signature)$^D$mod(N)

Hex-FWD-Rev Multiplex Hash Digest=(Hex-FWD-Rev Multiplex Signature)$^D$mod(N)

Sector-Rev Hash Digest=(Sector-Rev Signature)$^D$mod(N)

where N is a public modulus and D is the decryption key. In step 3416, the process compares the new hash digests created in step 3408 from the digital message to the retrieved hash digests from step 3414 from the digital signature. If all of the corresponding hash digests from these two steps match, then the digital signature is verified in step 3418. If any one of the hash digests from these two steps do not match, then the digital signature is not verified in step 3420. The process ENDS in step 3422. Referring again to FIGS. 7A and 7B, these are two X.509 certificates, X.509-C1 and X.509-C2, that have different values, but none the less produce the same hash digest, which is a collision resulting in a serious security issue for digital signatures that are currently based on one type of hash digest. By using multiple different types of hash digests to form multiple different signatures, it is possible to create different digital signatures for these two X.509 certificates, X.509-C1 and X.509-C2, and avoid the collision.

Figure 7J:
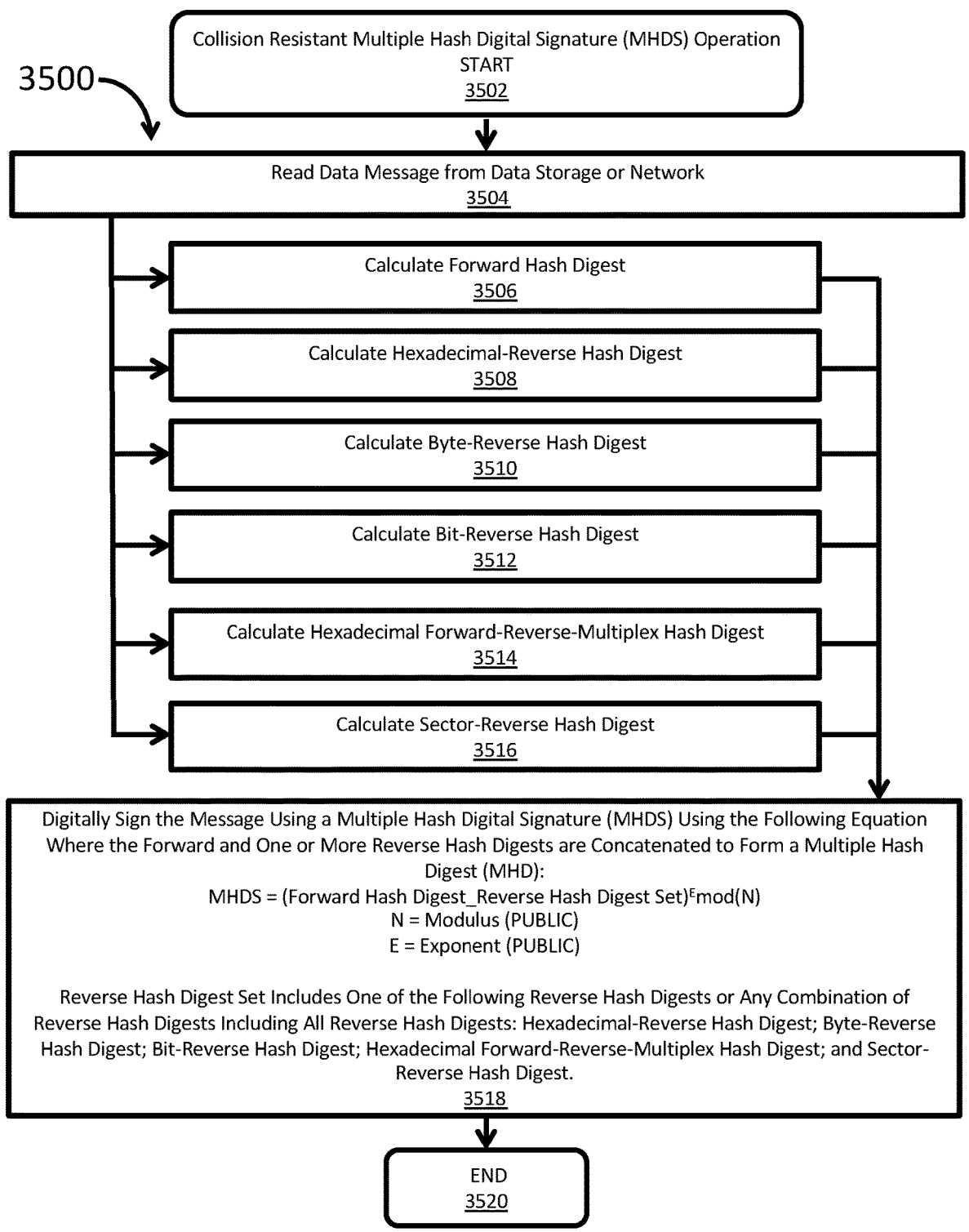

FIG. 7J depicts a flow chart 3500 illustrating a collision resistant Multiple Hash Digest Signature (MHDS) operation. In this alternative embodiment, a collision resistant digital signature process is presented where multiple different hash digests that are capable of avoiding collisions are combined into a long hash digest that is used for a single digital signature. The process begins with step 3502. In step 3504, a data message is accessed and read from a data store or network node. The data message may be any kind of digital message such as a blockchain, blockchain block, X.509 certificate, or any other digital data. In parallel steps 3506, 3508, 3510, 3512, 3514, and 3516, up to six different hash digests may be created in this exemplary embodiment. At least two different hash digests are required for process 3500. Any number of different hash digests over two may be used. In step 3506, a forward hash digest is formed from the data message. In step 3508, a hexadecimal-reverse hash digest is created from the data message. In step 3510, a byte-reverse hash digest is created from the data message. In step 3512, a bit-reverse hash digest is created from the data message. In step 3514, a hexadecimal forward-reverse-multiplex hash digest is created. In step 3516, a sector-reverse hash digest is created. What is important is that two different hash digests are created in order to avoid collisions that occur when only one hash digest is used. Other forms of hash digests may be used in place of these reverse hash digests such as a hexadecimal-forward hash digest, a byte-forward hash digest, a bit-forward hash digest, a hexadecimal reverse-forward hash digest, or a sector-forward hash digest. Also, two different hash algorithms may be used to create to different hash digests to avoid the collision. For example, two different hash algorithms selected from the group SHA-1, SHA-224, SHA-512/224, SHA-256, SHA-512/256, SHA-384, SHA-512, or SHA-3 may produce different hash digests that can be used in place of the forward and reverse hash digests taught in FIGS. 1-12. In step 3518, the data message is digitally signed with a Multiple Hash Digital Signature (MHDS) using the following equation where the forward hash digest and one or more reverse hash digests are concatenated to form a Multiple Hash Digest (MHD):

MHDS=(Forward Hash Digest_Reverse Hash Digest Set)$^E$mod(N)

Where E is a public exponent and N is a public modulus. The reverse hash digest set may be a single reverse hash digest such as a hexadecimal-reverse hash digest, byte-reverse hash digest, bit-reverse hash digest, hexadecimal forward-reverse multiplex hash digest, and sector-reverse hash digest. The forward hash digest may be a single forward hash digest selected such as a hexadecimal-forward hash digest, a byte-forward hash digest, a bit-forward hash digest, a hexadecimal reverse-forward hash digest, or a sector-forward hash digest. The reverse hash digest set may be formed of multiple different reverse hash digests selected from the group of a hexadecimal-reverse hash digest, byte-reverse hash digest, bit-reverse hash digest, hexadecimal forward-reverse multiplex hash digest, and sector-reverse hash digest. The forward hash digest may also be a group of different forward hash digests. Once the MHDS 3372 is created, the MHDS 3372 is appended to the data message in order to sign it in step 3518, thereby completing the digital signature process 3500, which then ENDS in step 3520.

FIG. 7K illustrates an X.509 certificate 3350 signed with a Multiple Hash Digest Signature (MHDS) 3372. X.509 certificate 3350 is in the form of a version 3 certificate. X.509 certificate includes a section for its version 3352, its certificate serial number 3354, certificate algorithm identifier for the certificate issuer's signature 3356, the issuer 3358, validity period 3360, subject 3362, and subject Public Key Information (PKI) 3364 along with the algorithm identifier and public-key value. This public key is formed of modulus N and exponent E. X.509 certificate may also optionally include the issuer's unique identifier 3366, subject unique identifier 3368, and extensions 3370. X.509 certificate 3370 also includes the Certificate Authority's Multiple Hash Digital Signature (MDHS) 3372, which is a single signature based on a concatenation of two or more different hash digests formed from the same data message.

Figure 7L:
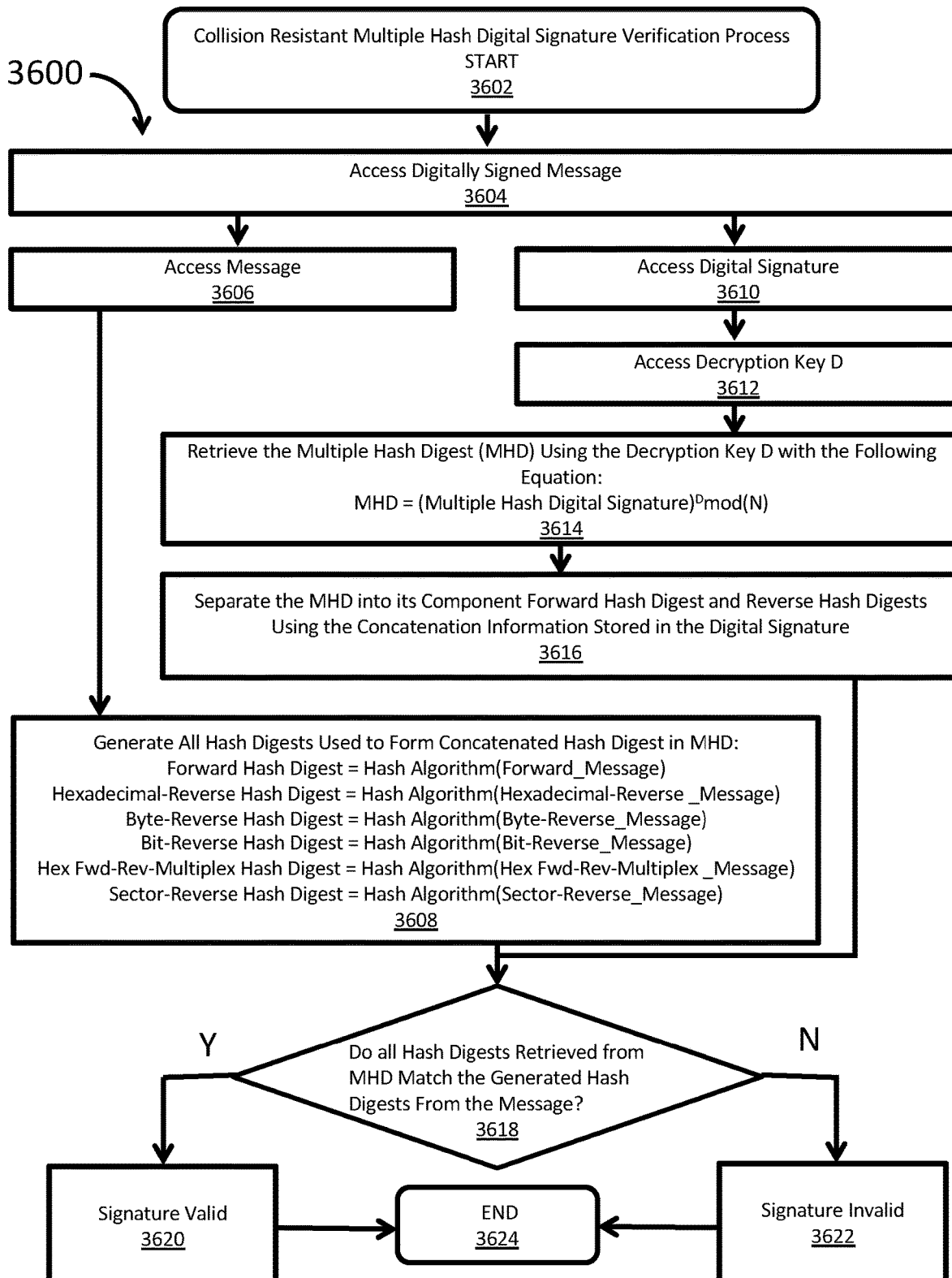

FIG. 7L depicts a flow chart 3600 illustrating a collision resistant Multiple Hash Digest Signature (MHDS) 3372 verification process. The process begins with START 3602. In step 3604, a digitally signed message is accessed from a data store or a network. In step 3606, the digital data message that is digitally signed is accessed in order to produce a new set of hash digests based off of that digital data message in step 3608. In step 3608, new hash digests are generated from the accessed digital data message based upon the following equations:

Forward Hash Digest=Hash Algorithm(Forward_Message)

Hexadecimal-Reverse Hash Digest=Hash Algorithm (Hexadecimal-Reverse_Message)

Byte-Reverse Hash Digest=Hash Algorithm(Byte-Reverse_Message)

Bit-Reverse Hash Digest=Hash Algorithm(Bit-Reverse_Message)

Hex Fwd-Rev-Multiplex Hash Digest=Hash Algorithm(Hex Fwd-Rev-Multiplex_Message)

Sector-Reverse Hash Digest=Hash Algorithm(Sector-Reverse_Message)

Note that the MDHS 3372 may include other types of hash digests such as different forms of a forward hash digest such as a hexadecimal-forward hash digest, a byte-forward hash digest, a bit-forward hash digest, a hexadecimal reverse-forward hash digest, or a sector-forward hash digest. The MDHS 3372 may also be formed of hash digests made from different hash algorithms based off of the same data message. In step 3608, all of the hash digests used to form the concatenated hash digest in the MHDS 3372 are created for the comparison in step 3618. In step 3610, the digital signature is accessed from the digitally signed digital data message. In step 3612, the process accesses a decryption key D in order to retrieve the Multiple Hash Digest (MHD) in step 3614. The process uses decryption key D to retrieve the Multiple Hash Digest (MHD), which is a concatenation of two or more different hash digests, using the following equation:

MHD=(Multiple Hash Digital Signature)$^D$mod($N$)

where N is a public modulus and D is the decryption key. In step 3618, the hash digests generated from the digital data message in step 3608 are compared to the hash digests retrieved from the digital signature in step 3616. If all of the hash digests match, then the digital signature is verified in step 3620. If any one of the hash digests do not match, then the digital signature is not verified in step 3522. The process ENDS in step 3524.

Figure 8A:
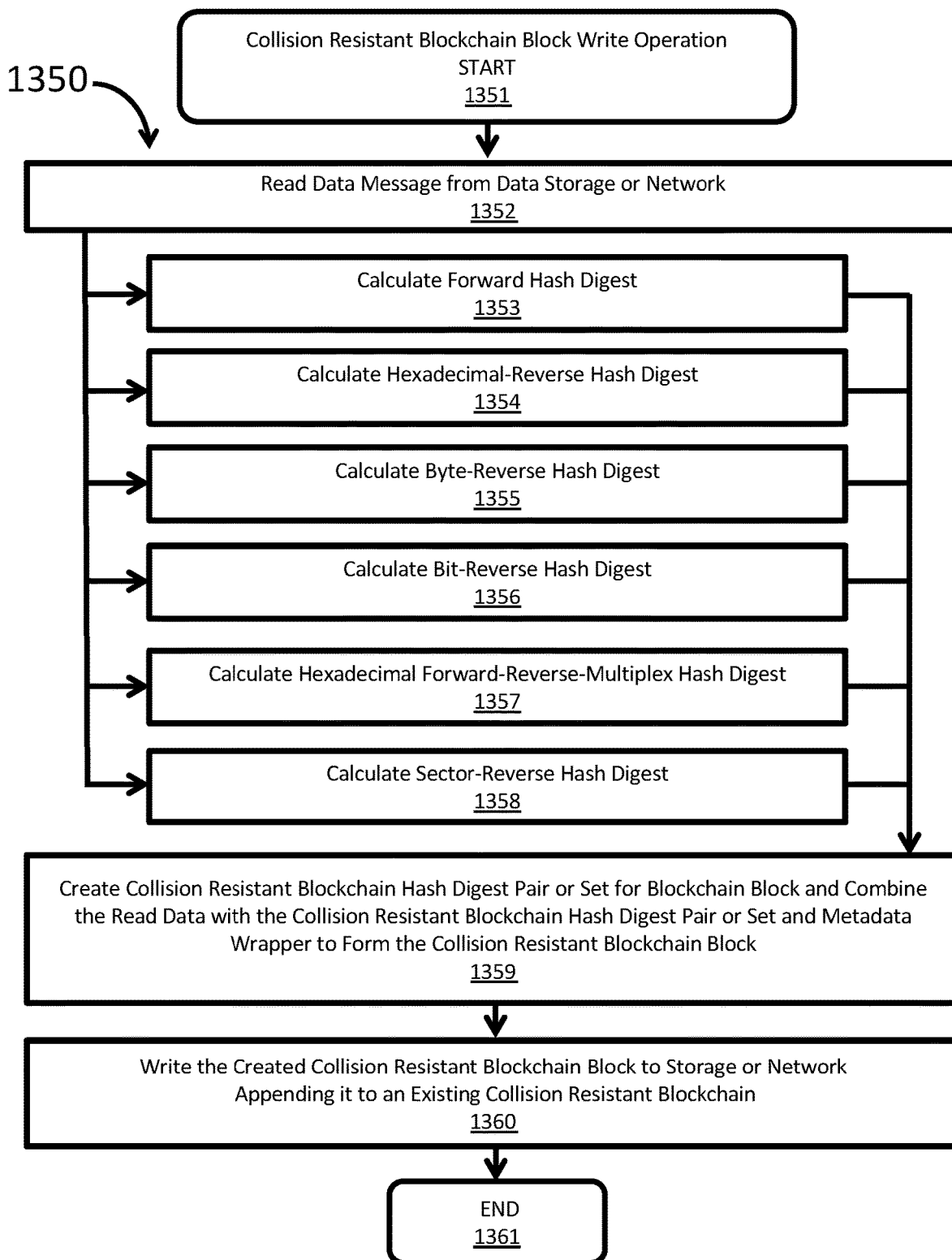
FIGS. 8A and 8B depict processes for creation collision resistant blockchains and data verification of collision resistant blockchains.
Figure 8B:
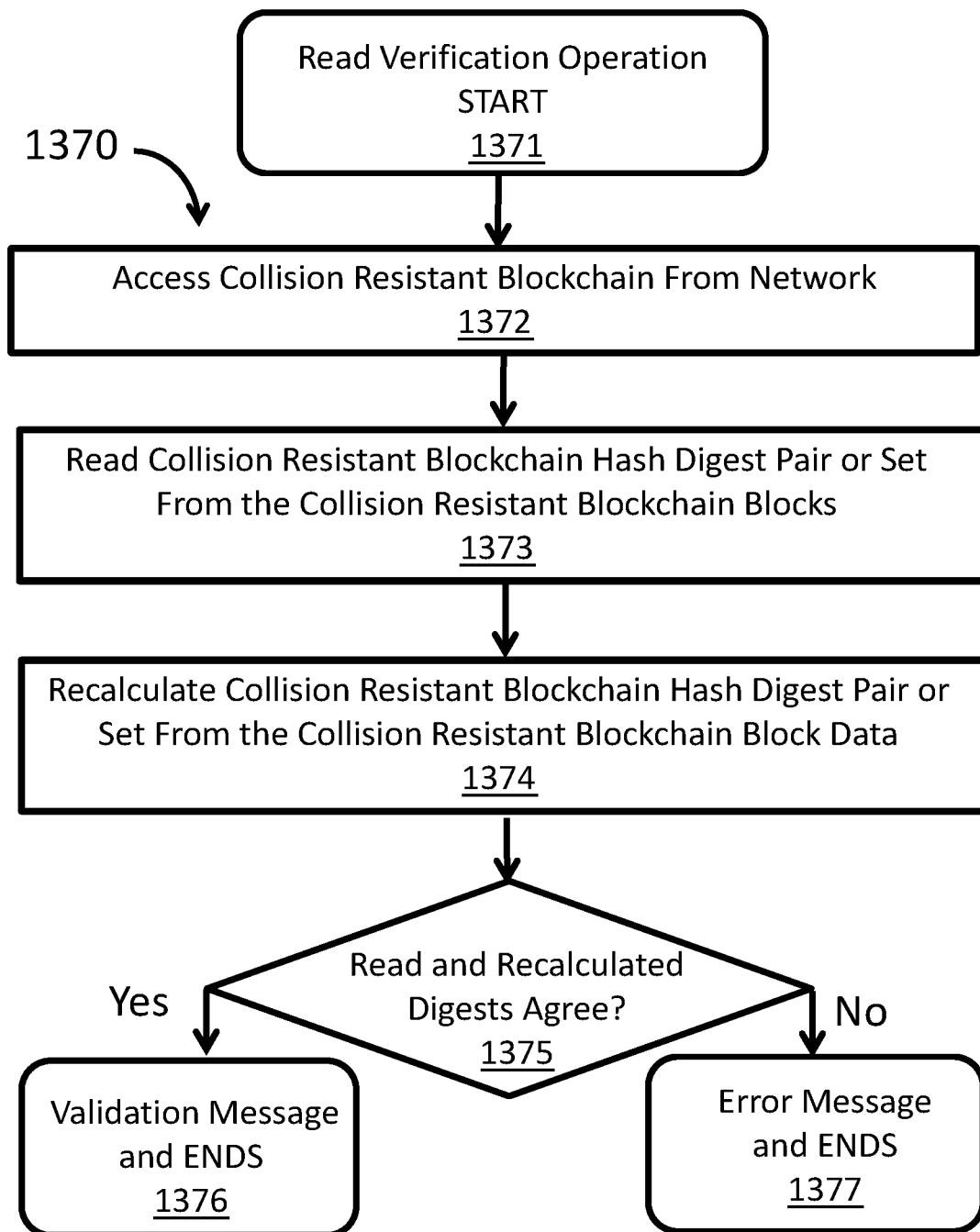

FIGS. 8A and 8B depict processes for creation collision resistant blockchains and data verification of collision resistant blockchains 10 and 20 shown in FIGS. 5G and 5H. FIG. 8A illustrates a flowchart 1350 that depicts a process for generating a collision resistant blockchain block through a write operation. The process STARTS with step 1351. In step 1352, a collision resistant blockchain appliance 1002, shown in FIG. 10B, accesses data storage or network to acquire a data message that is to be formed into a collision resistant blockchain block. In step 1353, a hash core 404 calculates the forward hash digest of the acquired data message. In steps 1354, 1355, 1356, 1357, and 1358, reverse hash digests of the acquired data message are calculated with hash cores 404. Steps 1353, 1354, 1355, 1356, 1357, and 1358 may all be performed simultaneously in parallel by parallel hash cores 404. When creating the collision resistant blockchain block, any one of steps 1354, 1355, 1356, 1357, and 1358 may be used in combination with step 1353 to create a collision resistant blockchain hash digest pair in step 1359. Alternatively, when creating the collision resistant blockchain block, any combination of steps 1354, 1355, 1356, 1357, and 1358 may be used together with step 1353 to create a collision resistant blockchain hash digest set in step 1359. Step 1354 is the process by which a hash core 404 calculates a hexidecimal-reverse hash digest. Step 1355 is the process by which a hash core 404 calculates a byte-reverse hash digest. Step 1356 is the process by which a hash core 404 calculates a bit-reverse hash digest. Step 1357 is the process by which a hash core 404 calculates a hexadecimal forward-reverse-multiplex hash digest. Step 1358 is the process by which a hash core 404 calculates a sector-reverse hash digest. Steps 1353, 1354, 1355, 1356, and 1357 are the processed by which hash cores generate the hash digests. In step 1359, the collision resistant blockchain appliance 1002 generates collision resistant blockchain hash digest pairs (one forward hash digest combined with one reverse hash digest) or collision resistant hash digest sets (one forward hash digest combined with two or more reverse hash digests). Further in step 1359, the collision resistant blockchain appliance 1002 combines the read data message with the generated collision resistant blockchain hash digest pairs or sets with metadata wrapper 600 to form the collision resistant blockchain block. In step 1360, collision resistant blockchain appliance 1002 writes the created collision resistant blockchain block to storage or a network node by appending it to an existing collision resistant blockchain, or by starting a new collision resistant blockchain. The process ENDS in step 1361.

A process for data verification of collision resistant blockchains 10 and 20 shown in FIGS. 5G and 5H is depicted in flowchart 1370 in FIG. 8B. This process provides a means for accessing a created collision resistant blockchain and verifying the integrity of that collision resistant blockchain against tampering or data corruption. The process begins with START in step 1371. In step 1372, the process accesses collision resistant blockchains 10 and 20 from a network node or other storage device. In step 1373, the process reads the collision resistant blockchain hash digest pair or set from the individual blocks of the collision resistant blockchain 10 or 20. In step 1374, the process recalculates the collision resistant hash digest pair or set values from the collision resistant blockchain block data. In step 1375, the process compares the read collision resistant blockchain hash digest pairs or sets to the recalculated collision resistant blockchain hash digest pairs or sets to determine if they agree or not. If they do agree, the process issues a validation message and ENDS with step 1376. If they do not agree, the process sends and error message and ENDS in step 1377.

FIG. 9A illustrates the preimage attack and security claim (birthday attack) for MD5, SHA-1, SHA-256, and SHA-512 through table 1500. Column 1501 lists the hash algorithms examined for the preimage attack and security claim (birthday attack), which are MD5, SHA-1, SHA-256, and SHA-512. Column 1502 lists the digest length in bits and (bytes) for each of the respective hash algorithms, which in this case is 128b (16B) for MD5, 160b (20B) for SHA-1, 256b (32B) for SHA-256, and 215b (64B) for SHA-512. The security strength of each of the hash algorithms in column 1501 is examined in columns 1503, 1504, and 1505. Column 1503 provides the preimage attack $2^L$, which for MD5 is $2^{128}$, for SHA-1 is $2^{160}$, for SHA-256 is $2^{256}$, and for SHA-512 is $2^{512}$. The security claim (birthday attack) shown in column 1504 is given by $2^{L/2}$, which for MD5 is $2^{64}$, for SHA-1 is $2^{80}$, for SHA-256 is $2^{128}$, and for SHA-512 is $2^{256}$. The best-known attack on MD5 is shown in column 1505 at being $2^{18}$. The best-known attack on SHA-1 is $2^{63.1}$. On 23 Feb. 2017, the CWI (Centrum Wiskunde & Informatica) and Google announced the SHAttered attack, in which they generated two different PDF files with the same SHA-1 hash in roughly 263.1 SHA-1 evaluations. This attack is about 100,000 times faster than brute forcing a SHA-1 collision with a birthday attack, which was estimated to take $2^{80}$ SHA-1 evaluations. The attack required "the equivalent processing power of 6,500 years of single-CPU computations and 110 years of single-GPU computations". (https://en.wikipedia.org/wiki/SHA-1) The strength of MD5, SHA-1, SHA-256, and SHA-512 as shown in table 1500 is based solely upon the use of a single forward blockchain hash digest. The use of one or more reverse hash digests as discussed in FIGS. 1-8 improves the robustness of the hashing from the low value of the best-known attack 1505 up to security claim 1504 and preimage attack 1503 levels.

FIG. 9B illustrates the improvements on preimage attack for MD5, SHA-1, SHA-256, and SHA-512 when they are used with R reverse hash digests as shown in table 1510. Column 1510 lists the hash algorithms MD5, SHA-1, SHA-256, and SHA-512 examined with the use of additional reverse blockchain hash digests in conformance with FIGS. 1-8. Column 1512 lists the number of reverse hash digests "R" each having a length "L" examined in table 1510. Column 1512 shows MD5, SHA-1, SHA-256, and SHA-512 each having zero reverse blockchain hash digests identical to the prior art shown in FIG. 9A, one reverse blockchain hash digest, two reverse blockchain hash digests, three reverse blockchain hash digests, and four reverse blockchain hash digests. The total digest length of the collision resistant blockchain hash digest pairs and sets is given in column 1513 by the equation where F equals 1 for one forward hash digest, or more than one for multiple forward hash digests:

TOTAL DIGEST LENGTH=$(F+R)*L$

In the case of MD5 with zero reverse blockchain hash digests, its total digest length is 128 bits/16 bytes. In the case of MD5 with one reverse blockchain hash digests, its total digest length is 256 bits/32 bytes. In the case of MD5 with two reverse blockchain hash digests, its total digest length is 384 bits/48 bytes. In the case of MD5 with three reverse blockchain hash digests, its total digest length is 512 bits/64 bytes. In the case of MD5 with zero reverse blockchain hash digests, its total digest length is 640 bits/80 bytes. In the case of SHA-1 with zero reverse blockchain hash digests, its total digest length is 160 bits/20 bytes. In the case of SHA-1 with one reverse blockchain hash digests, its total digest length is 320 bits/40 bytes. In the case of SHA-1 with two reverse blockchain hash digests, its total digest length is 480 bits/60 bytes. In the case of SHA-1 with three reverse blockchain hash digests, its total digest length is 640 bits/80 bytes. In the case of SHA-1 with four reverse blockchain hash digests, its total digest length is 800 bits/100 bytes. In the case of SHA-256 with zero reverse blockchain hash digests, its total digest length is 256 bits/32 bytes. In the case of SHA-256 with one reverse blockchain hash digests, its total digest length is 512 bits/64 bytes. In the case of SHA-256 with two reverse blockchain hash digests, its total digest length is 768 bits/96 bytes. In the case of SHA-256 with three reverse blockchain hash digests, its total digest length is 1024 bits/128 bytes. In the case of SHA-256 with four reverse blockchain hash digests, its total digest length is 1280 bits/160 bytes. In the case of SHA-512 with zero reverse blockchain hash digests, its total digest length is 512 bits/64 bytes. In the case of SHA-512 with one reverse blockchain hash digests, its total digest length is 1024 bits/128 bytes. In the case of SHA-512 with two reverse blockchain hash digests, its total digest length is 1536 bits/192 bytes. In the case of SHA-512 with zero reverse blockchain hash digests, its total digest length is 2048 bits/256 bytes. In the case of SHA-512 with zero reverse blockchain hash digests, its total digest length is 2560 bits/320 bytes. The preimage attack for collision resistant blockchain hash digests is given by the equation, with F=1:

Preimage Attack=$2^{(1+R)*L}$

For MD5 with zero reverse blockchain hash digests, the attack strength is the same as shown in FIG. 9A, $2^{128}$. For MD5 with a collision resistant blockchain pair having one reverse blockchain hash digest, the attack strength is $2^{256}$. For MD5 with a collision resistant blockchain set having two reverse blockchain hash digests, the attack strength is $2^{384}$. For MD5 with a collision resistant blockchain set having three reverse blockchain hash digests, the attack strength is $2^{512}$. For MD5 with a collision resistant blockchain set having four reverse blockchain hash digests, the attack strength is $2^{640}$. For SHA-1 with zero reverse blockchain hash digests, the attack strength is $2^{160}$, as shown in FIG. 9A. For SHA-1 with a collision resistant blockchain pair having one reverse blockchain hash digest, the attack strength is $2^{320}$. For SHA-1 with a collision resistant blockchain set having two reverse blockchain hash digests, the attack strength is $2^{480}$. For SHA-1 with a collision resistant blockchain set having three reverse blockchain hash digests, the attack strength is $2^{640}$. For SHA-1 with a collision resistant blockchain set having four reverse blockchain hash digests, the attack strength is $2^{800}$. For SHA-256 with zero reverse blockchain hash digests, the attack strength is $2^{256}$, as shown in FIG. 9A. For SHA-256 with a collision resistant blockchain pair having one reverse blockchain hash digest, the attack strength is $2^{512}$. For SHA-256 with a collision resistant blockchain set having two reverse blockchain hash digests, the attack strength is $2^{768}$. For SHA-256 with a collision resistant blockchain set having three reverse blockchain hash digests, the attack strength is $2^{1024}$. For SHA-256 with a collision resistant blockchain set having four reverse blockchain hash digests, the attack strength is $2^{1280}$. For SHA-512 with zero reverse blockchain hash digests, the attack strength is $2^{512}$, as shown in FIG. 9A. For SHA-512 with a collision resistant blockchain pair having one reverse blockchain hash digest, the attack strength is $2^{1024}$. For SHA-512 with a collision resistant blockchain set having two reverse blockchain hash digests, the attack strength is $2^{1536}$. For SHA-512 with a collision resistant blockchain set having three reverse blockchain hash digests, the attack strength is $2^{2048}$. For SHA-512 with a collision resistant blockchain set having four reverse blockchain hash digests, the attack strength is $2^{2560}$. The security claim for MD5 with no reverse hash digests is $2^{60}$, the same as in FIG. 9B. The security claim for MD5 with a collision resistant blockchain pair having one reverse hash digest is $2^{128}$. The security claim for MD5 with a collision resistant blockchain set having two reverse hash digests is $2^{192}$. The security claim for MD5 with a collision resistant blockchain set having three reverse hash digests is $2^{256}$. The security claim for MD5 with a collision resistant blockchain set having four reverse hash digests is $2^{320}$. The security claim for SHA-1 with no reverse hash digests is $2^{80}$, the same as in FIG. 9A. The security claim for SHA-1 with a collision resistant blockchain pair having one reverse hash digest is $2^{160}$. The security claim for SHA-1 with a collision resistant blockchain set having two reverse hash digests is $2^{240}$. The security claim for SHA-1 with a collision resistant blockchain set having three reverse hash digests is $2^{320}$. The security claim for SHA-1 with a collision resistant blockchain set having four reverse hash digests is $2^{400}$. The security claim for SHA-256 with no reverse hash digests is $2^{128}$, the same as in FIG. 9A. The security claim for SHA-256 with a collision resistant blockchain pair having one reverse hash digest is $2^{256}$. The security claim for SHA-256 with a collision resistant blockchain set having two reverse hash digests is $2^{384}$. The security claim for SHA-256 with a collision resistant blockchain set having three reverse hash digests is $2^{512}$. The security claim for SHA-256 with a collision resistant blockchain set having four reverse hash digests is $2^{640}$. The security claim for SHA-512 with no reverse hash digests is $2^{256}$, the same as in FIG. 9A. The security claim for SHA-512 with a collision resistant blockchain pair having one reverse hash digest is $2^{512}$. The security claim for SHA-512 with a collision resistant blockchain set having two reverse hash digests is $2^{768}$. The security claim for SHA-512 with a collision resistant blockchain set having three reverse hash digests is $2^{1024}$. The security claim for SHA-512 with a collision resistant blockchain set having four reverse hash digests is $2^{1280}$. As can be seen from table 1510, collision resistant blockchain pairs and sets dramatically increase the preimage attack and security claim values, thereby enhancing the security value of the MD5, SHA-1, SHA-256, and SHA-512 algorithms making them more resistant to hacking and other malicious threats.

Figure 10A:
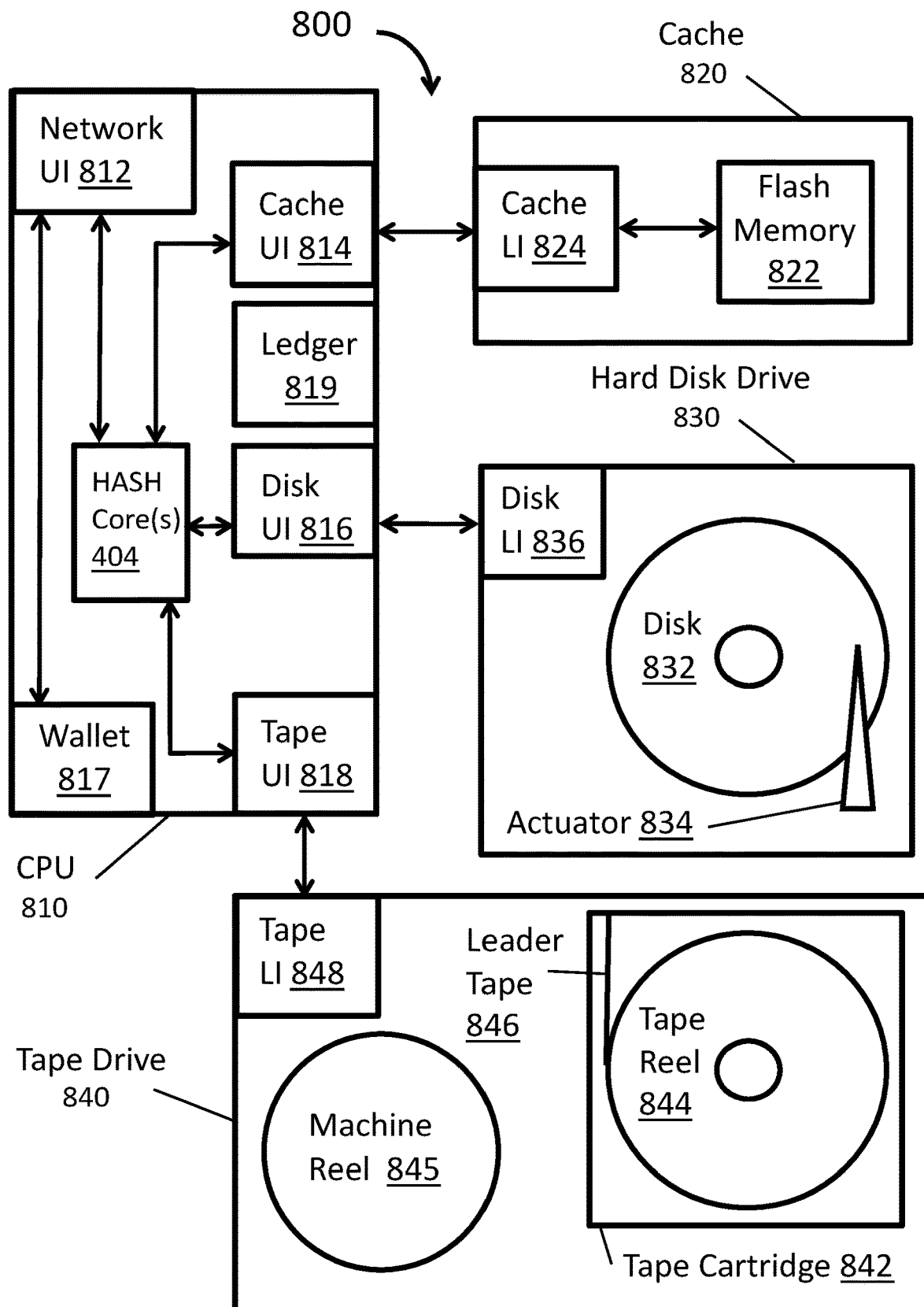
FIGS. 10A-10D depict a collision resistant blockchain appliance and its connection with a distributed network with software modules and processes to generate and distribute collision resistant blockchains.

FIGS. 10A-10D depict a collision resistant blockchain appliance 1002 and its connection with a distributed network 1032 with software modules and processes to generate and distribute collision resistant blockchains 10 and 20 shown in FIGS. 5G and 5H. FIG. 10A illustrates a block diagram of a collision resistant blockchain appliance 800 in communication with a cache-tier 820, a disk-tier 830, and a tape-tier 840. Central Processing Unit (CPU) 810 has a network upper-interface (UI) 812, such as for attaching to network 1032, FIG. 10C. CPU 810 also has a cache UI 814 for bidirectional communications with cache lower-interface (LI) 824 of cache 120, disk UI 816 for bidirectional communications with disk LI 836 of hard disk drive 830, and tape UI 818 for bidirectional communications with tape LI 848 of tape drive 840. CPU 810 also has one or more hash cores, such as hash core 404 of FIG. 10D, a wallet 817 for the security credentials of users, such as X.509 certificates, and a blockchain ledger 819 for storing data-pointers, to include data pointers for data deduplication. Cache 820 contains flash memory 822 that is electrically or optically connected to cache LI 824. While EEPROMs had to be completely erased before being rewritten, NAND-type flash memory may be written and read in blocks (or pages) that are generally much smaller than the entire device. NOR-type flash allows a single machine word (byte) to be written, to an erased location, or read independently. Flash memory 822 may be one or more chips attached to a motherboard, or chips within a solid-state drive (SSD). When SSDs are used as cache 820, cache UI 814 and cache LI 824 may communicate via one of these communication protocols: SATA (Serial Advanced Technology Attachment), FC (Fibre Channel), SAS (Serial Attached SCSI), ATA/IDE (Advanced Technology Attachment/Integrated Drive Electronics), PCIe (Peripheral Component Interconnect Express), USB (Universal Serial Bus), IEEE-1394 (Firewire), and the like. Hard disk drive 830 also contains one or more rotating disks 832 which are accessed via a rotary actuator 834. At the tip of this rotary actuator is a giant magneto-resistive (GMR) read head and a thin-film write head. Disk UI 816 and disk LI 836 may communicate via one of these communication protocols: SATA (Serial Advanced Technology Attachment), PATA (Parallel Advanced Technology Attachment), SCSI (Small Computer System Interface), SAS (Serial Attached SCSI), FC (Fibre Channel), NAS (Network Attached Storage), and the like. Hard disk drive 830 has a slower access time than cache 820 because of the seek time of the rotary actuator to the desired data track and the latency time before the disk rotates into position for I/O. Tape drive 840 houses removable tape cartridge 842.

Tape cartridge 842 houses a single tape reel 844. Tape drive 840 threads leader tape 846 across a read-write head (not shown) to an awaiting machine reel 845 that are both permanent parts of tape drive 840. Tape cartridge 840 may be a Linear Tape Open (LTO) Ultrium, an IBM® 3592, or an Oracle® StorageTek T10000 or T10000-T2 single-reel tape cartridge. Tape UI 818 and tape LI 848 may communicate via one of these communication protocols: SATA (Serial Advanced Technology Attachment), SCSI (Small Computer System Interface), SAS (Serial Attached SCSI), FC (Fibre Channel), IEEE-1394 (Firewire), FICON (IBM Fibre Connection), and the like. The robotic picker in a tape library may take 10 seconds to load tape cartridge 842 into tape drive 840, and the seek time to locate data on the tape may take a minute or more. Thus tape is slower than hard disk 830, although tape cartridge consumes zero power once I/O is completed with it. Disk 832 of hard drive 830 may rotate at 7200 RPM, giving a latency of 4.16 milliseconds (time for ½ revolution) and have a seek time of 8 milliseconds (time for ⅓ stroke of the actuator), giving an access time of 12.16 milliseconds, which is much faster than tape, but is much more expensive than tape to provide. The access time for flash cache might be measured in microseconds or faster, but that flash cache costs more than hard disk and hard disk costs more than tape. So, there are price-performance tradeoffs and that is why there are three storage tiers in FIG. 8.

Figure 10B:
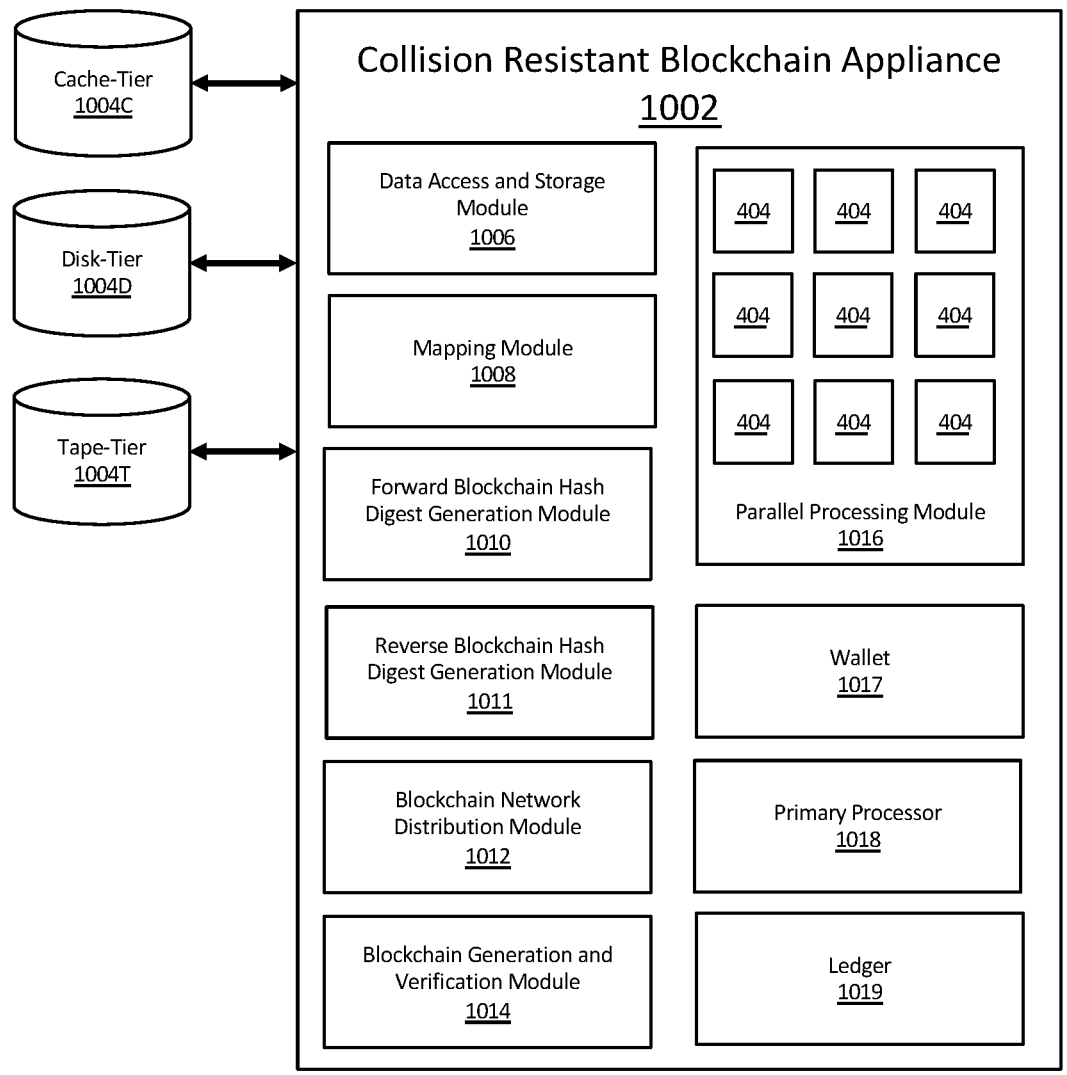

FIG. 10B illustrates a software block diagram of a collision resistant blockchain appliance 1002. Collision resistant blockchain appliance 1002 provides the software modules that interact and manage the hardware of the collision resistant blockchain appliance 800 shown in FIG. 10A. Collision resistant blockchain appliance 1002 is coupled to cache-tier storage 1004C, disk-tier storage 1004D, and tape-tier storage 1004T. Collision resistant blockchain appliance 1002 uses cache-tier storage 1004C, disk-tier storage 1004D, and tape-tier storage 1004T to store data used to build collision resistant blockchains and store subsequently created collision resistant blockchains. Collision resistant blockchain appliance 1002 includes Data Access and Storage Module 2006 that manages the storage of data used to build collision resistant blockchains and built collision resistant blockchains on cache-tier storage 1004C, disk-tier storage 1004D, and tape-tier storage 1004T. The management of storage includes the reading and writing of data, as well as the migration of data between cache-tier storage 1004C, disk-tier storage 1004D, and tape-tier storage 1004T based on storage tier management procedures for the migration of data within a tiered storage system. Mapping module 1008 stores a map or ledger recording the creation of all collision resistant blockchains and their constituent blocks and where they are stored globally on any network including cache-tier storage 1004C, disk-tier storage 1004D, and tape-tier storage 1004T, nodes 1032 on distributed network 1032 shown in FIG. 10C, satellite 1022 shown in FIG. 10C, or terminal 1030 shown in FIG. 10C. Forward Blockchain Hash Digest Generation Module 1010 accesses data from cache-tier storage 1004C, disk-tier storage 1004D, and tape-tier storage 1004T and generates a forward blockchain hash digest using a hash core 404 from Parallel Processing Module 1016 using a hash algorithm such as MD5, SHA-1, SHA-224, SHA-512/224, SHA-256, SHA-512/256, SHA-384, SHA-512, and SHA-3 as shown in FIGS. 2B and 2D for example.

Reverse Blockchain Hash Digest Generation Module 1011 accesses data from cache-tier storage 1004C, disk-tier storage 1004D, and tape-tier storage 1004T and generates a reverse blockchain hash digest using a hash core 404 from Parallel Processing Module 1016 using a hash algorithm such as MD5, SHA-1, SHA-224, SHA-512/224, SHA-256, SHA-512/256, SHA-384, SHA-512, and SHA-3 as shown in FIGS. 2B and 2D for example. Reverse hash digest processes include hexadecimal-reverse, byte-reverse, bit-reverse, hard-disk-drive sector reverse, or forward-reverse multiplex. The forward blockchain hash digest and reverse blockchain hash digest are formed simultaneously in parallel by hash cores 404 in Parallel Processing Module 1016. Blockchain Network Distribution Module 1012 executes the transmission and redundant storage of collision resistant blockchain blocks across distributed network 1032. Blockchain Generation and Verification Module 1014 executes the process of building metadata wrapper 600 and including the forward and reverse blockchain hash digests in it and wrapping a data message with it to create a collision resistant blockchain block pursuant to the process shown in FIG. 8A. Blockchain Generation and Verification Module 1014 then executes a process to verify the contents of a collision resistant blockchain block at any time pursuant to a process shown in FIG. 8B. Wallet 1017 contains all password and public keys necessary for users to access appliance 1002, such as X.509 certificates, and for appliance 1002 to function within the networked environment 1000 shown in FIG. 10C. Primary processor 1018, which includes CPU 810 shown in FIG. 10A, functions to control all of the operations of collision resistant blockchain appliance 1002 pursuant to the processes shown in FIGS. 1-11. Ledger 1019 contains a record of all collision resistant blockchains and their constituent blocks along with their associated metadata and storage locations. Ledger 1019 may also include data pointers for data deduplication. Parallel Processing Module 1016 contains a plurality of hash cores 404 to simultaneously and in parallel process forward and reverse hash digests according to steps 1353, 1354, 1355, 1356, 1357, and 1358 shown in FIG. 8A.

Figure 10C:
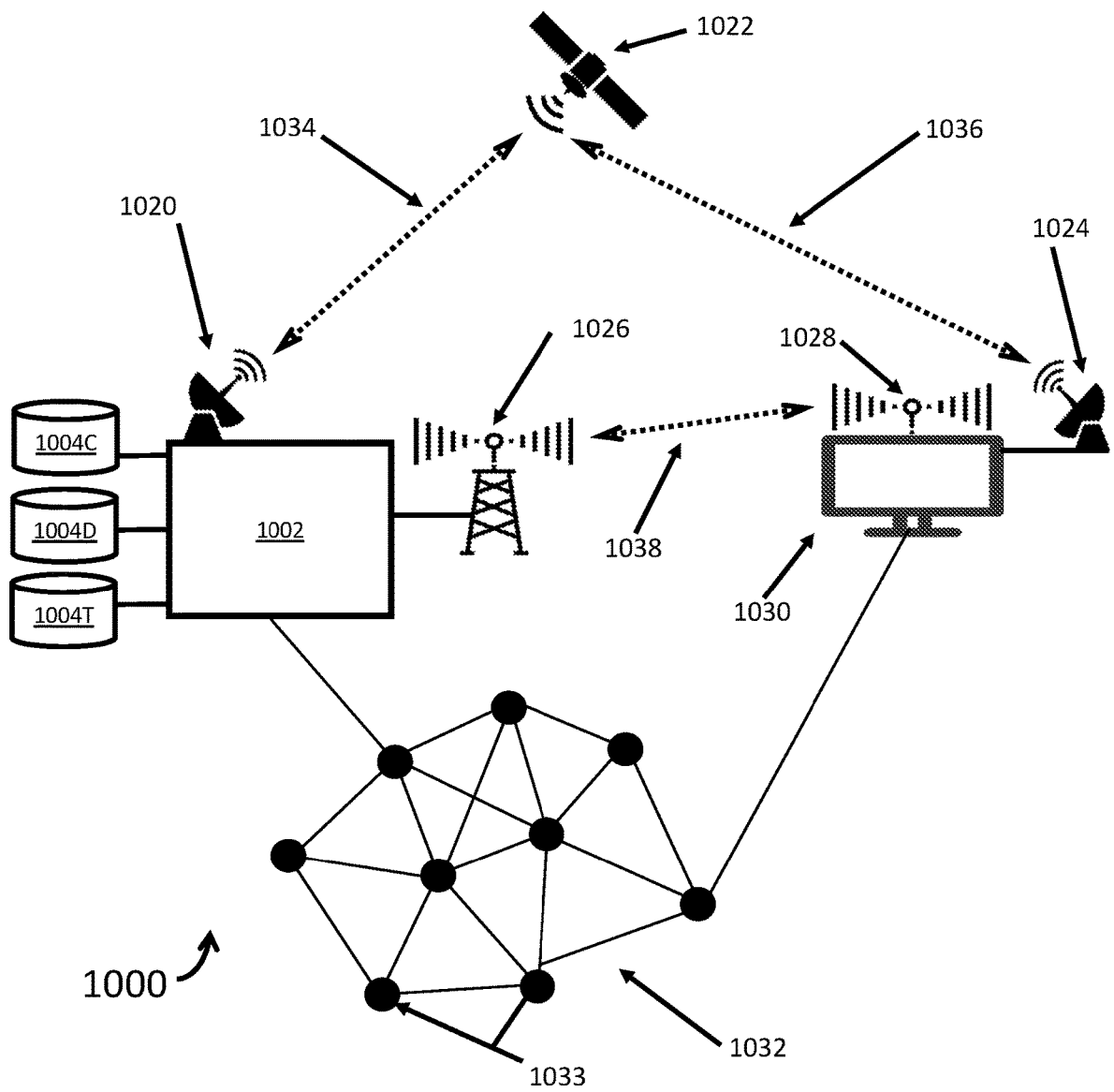

FIG. 10C illustrates an exemplary distributed network 1000 for a collision resistant blockchain including Network Attached Storage (NAS) 1004C, 1004D, and 1004T, a network connected collision resistant blockchain appliance 1002, and a network connected terminal 1030 that can all communicate with each other via satellite communications links 1034 and 1036, wireless terrestrial communications links 1038, and communications links provided by the distributed network 1032. Appliance 1002 is shown having Network Attached Storage (NAS) 1004C, 1004D, and 1004T. Appliance 1002 has a satellite communication device 1020 allowing it to communicate with satellite 1022 through channel 1034. Appliance 1002 also includes a radio antenna 1026 allowing it to communicate wirelessly over channel 1038 with terminal 1030. Appliance 1002 can communicate with terminal 1030 through distributed network 1032 made up of a plurality of nodes 1033. Satellite 1022 may communicate with terminal 1030 through channel 1036 coupled to satellite communication device 1024 coupled to terminal 1030. Terminal 1030 includes a wireless antenna 1028 that may communicate across channel 1038 with appliance 1002. In this environment, appliance 1002 may access data to generate collision resistant blockchains blocks from any storage device in communication with appliance 1002 in networked environment 1000. Similarly, appliance 1002 may store the collision resistant blockchain blocks on any storage device in communication with appliance 1002 in networked environment 1000.

Figure 10D:
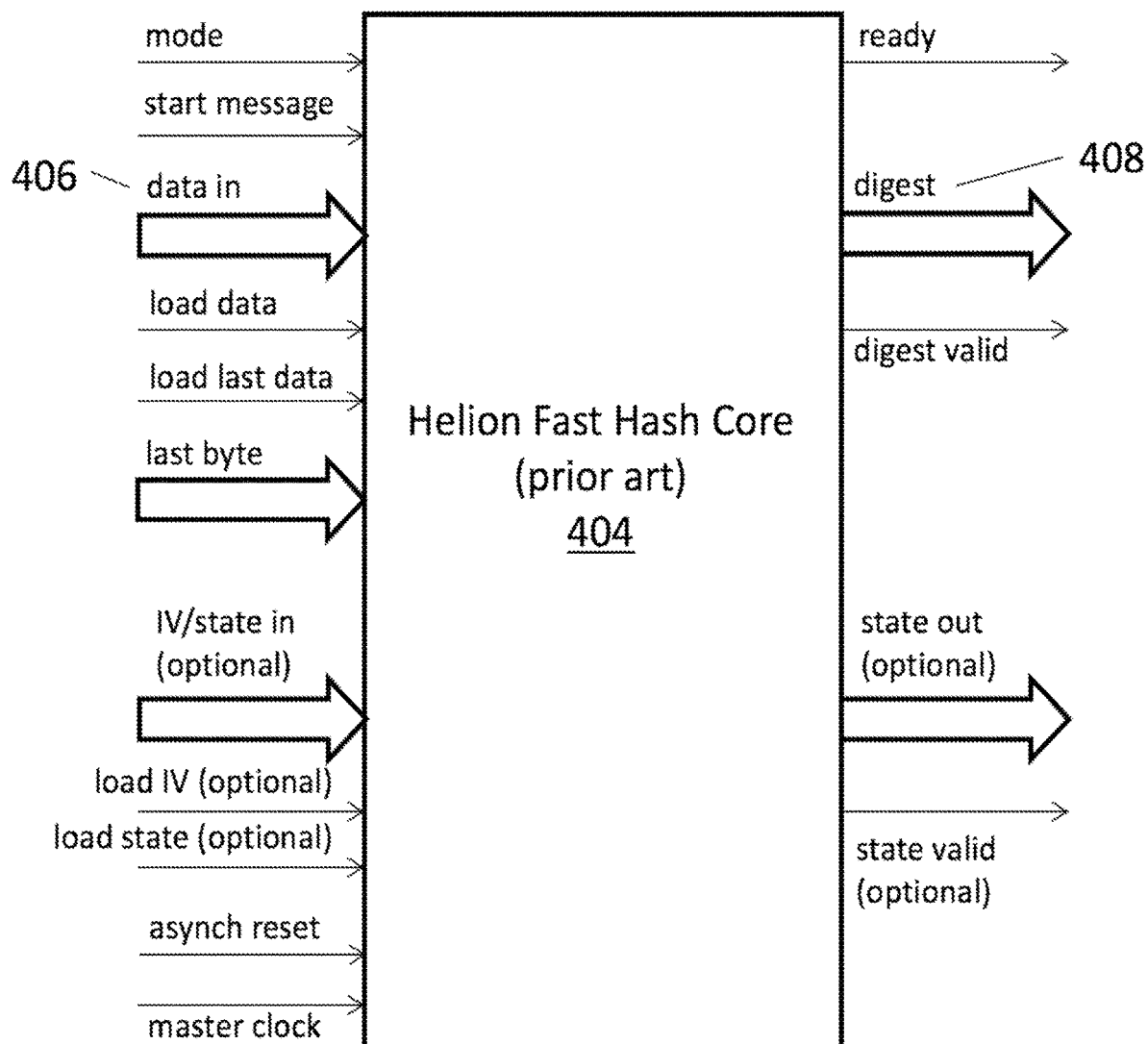

FIG. 10D illustrates a prior-art diagram of the Helion Fast Hash Core Application Specific Integrated Circuit (ASIC) 404, which may be resident in CPU 810, FIG. 10A. The Helion Fast Hash Core family implements the NIST approved SHA-1, SHA-224, SHA-256, SHA-384 and SHA-512 secure hash algorithms to FIPS 180-3 and the legacy MD5 hash algorithm to RFC 1321. These are high performance cores that are available in single or multi-mode versions and have been designed specifically for ASIC. Data to be blockchained into a collision resistant blockchain is fed into this ASIC at 406 and the resulting blockchain hash digest output is 408. Such dedicated hash core ASICs have faster performance than software running in a cloud, or computer memory under an operating system. One hash core 404 could calculate the forward blockchain hash digest, and in parallel, a second hash core 404 calculate the reverse blockchain, as shown in FIGS. 2B and 2D, 5C and 5D, 6F and 6G, as well as 7E and 7F.

Figure 11A:
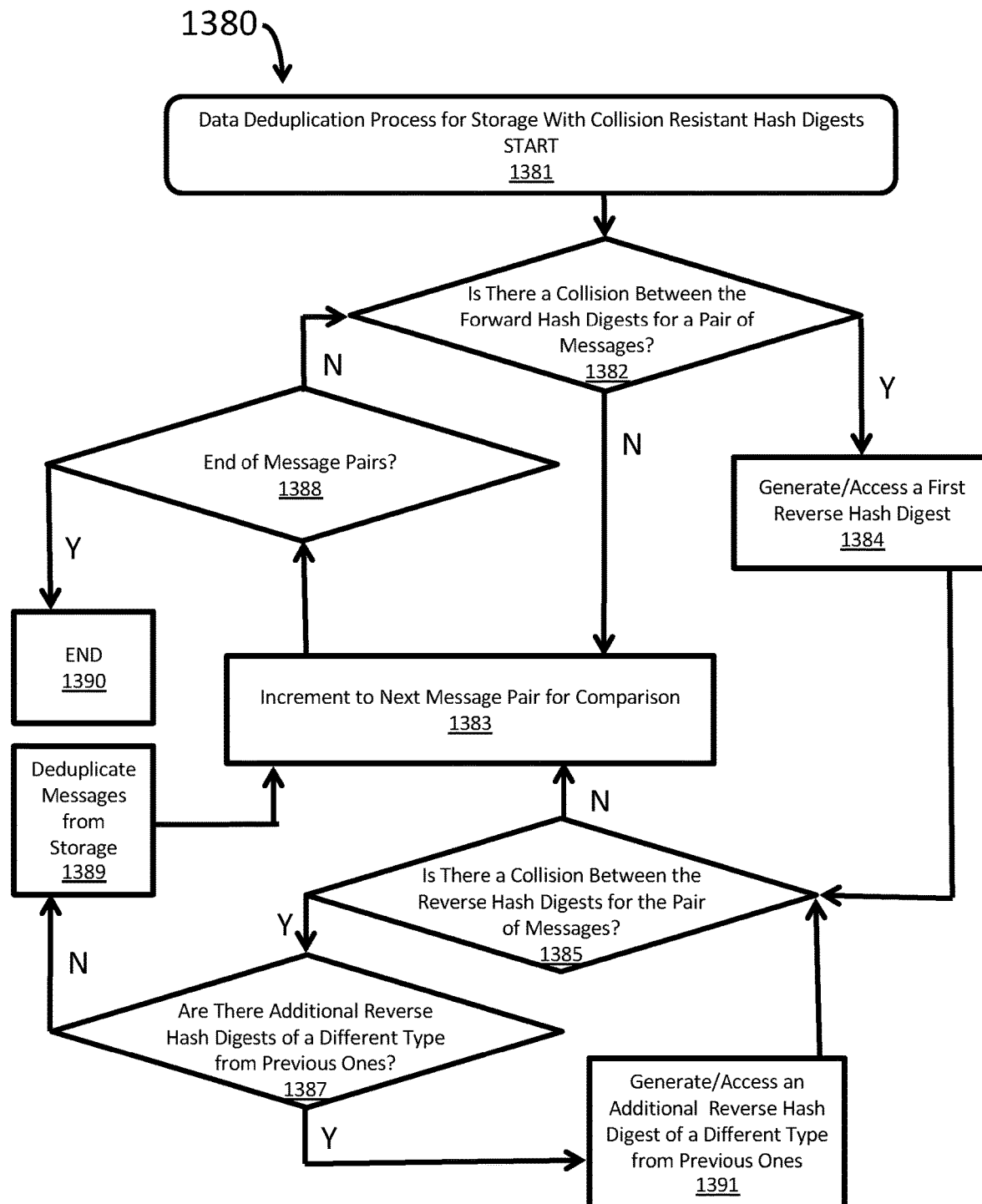

FIGS. 11A-11D illustrate the application of pairs of hash digests formed of forward blockchain hash digests and reverse blockchain hash digests to data deduplication. FIG. 11A illustrates a flowchart 1380 depicting a process for data deduplication using collision resistant hash digests. The process begins with START 1381 for a process of data deduplication for storage with collision resistant hash digests. In step 1382, the process determines whether there is a collision between the forward hash digests for a pair of messages. If there is no collision, the messages in the pair are different and are not duplicates. The process then proceeds to step 1383 where it increments to the next message pair for comparison. Then in step 1388, the process determines if it has reached the end of examining message pairs for data deduplication. If the process has examined the last message pair for data deduplication, the process then ENDS at step 1390. However, if the process has not reached the end of comparing message pairs, the process then returns to step 1382. If in step 1382, the process finds a collision between the forward hash digest pairs, the process proceeds to step 1384 to generate or access a first hash digest on the message pursuant to a process such as hexadecimal-reverse, byte-reverse, bit-reverse, hard-disk-drive sector reverse, or forward-reverse multiplex. The process then proceeds to step 1385 where it determines if there is a collision in the reverse hash digests for the pair of messages. If there is no collision between the reverse hash digests, the two messages in the pair are different and are not duplicates and the process proceeds to step 1383. However, if there is a collision between the reverse hash digests, the process determines in step 1387 if there are other types of reverse hash digests available different from the type of reverse hash digest created in step 1384. If there are additional types of reverse hash digests available, the process accesses or generates those different additional reverse hash digests in step 1391 and compares those new different additional reverse hash digests in step 1385. If in step 1385, the process determines there is a collision in reverse hash digests and the process determines in step 1387 that there are no additional reverse hash digests available of a different type than those already used, then the messages in the pair are duplicates of each other. One of the messages is deleted as a duplicate and a data pointer pointing to the remaining undeleted message is stored in place of the duplicate message to reduce the amount of duplicate storage used.

Figure 11B:
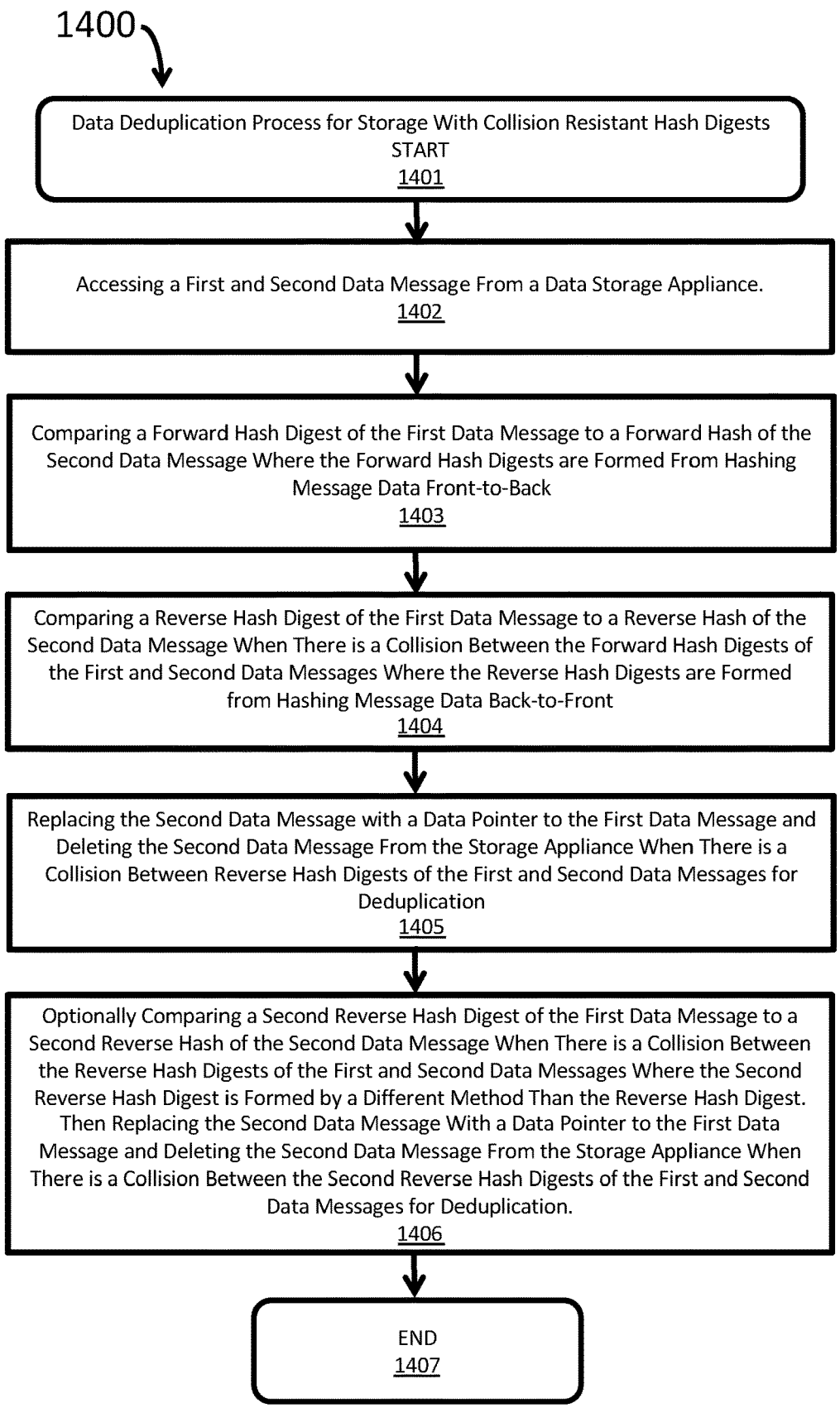

FIG. 11B illustrates a process 1400 for data deduplication for storage using collision resistant hash digests. The process accesses a first data message from a data storage appliance in step 1402. The process also accesses a second data message from the data storage appliance in step 1402. The process then compares a forward hash digest of the first data message to a forward hash of the second data message in step 1403. The forward hash digests are formed from hashing message data front-to-back. The process then compares a reverse hash digest of the first data message to a reverse hash of the second data message when there is a collision between the forward hash digests of the first and second data messages in step 1404. The reverse hash digests are formed from hashing message data back-to-front. The process then replaces the second data message with a data pointer to the first data message and deletes the second data message from the storage appliance when there is a collision between the forward and reverse hash digests of the first and second data messages for deduplication in step 1405. The second data message is not deduplicated when there is no collision between the forward hash digests of the first and second data messages, or when there is no collision between the reverse hash digests of the first and second data messages. The reverse hash digest is formed by reversing the hexadecimal data within a data message to form a new reverse message by a process such as hexadecimal-reverse, byte-reverse, bit-reverse, hard-disk-drive sector reverse, or forward-reverse multiplex and hashing the new reverse message with a hash algorithm. The hash algorithms include MD5, SHA-1, SHA-224, SHA-512/224, SHA-256, SHA-512/256, SHA-384, SHA-512, and SHA-3. The forward and reverse hash digests are computer simultaneously in parallel by a pair of hash core processors 404. The process may further include comparing a second reverse hash digest of the first data message to a second reverse hash of the second data message when there is a collision between the reverse hash digests of the first and second data messages in step 1406. The second reverse hash digest is formed by a different method than the reverse hash digest. The process then replaces the second data message with a data pointer to the first data message and deletes the second data message from the storage appliance when there is a collision between the second reverse hash digests of the first and second data messages for deduplication in step 1406. The process ENDS in step 1407.

Figure 11C:
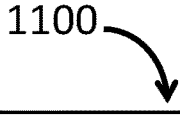

FIG. 11C illustrates the loss of information that can occur during data deduplication when hash digest collisions exist for both a pair of 128-Byte and a pair of 64-Byte messages. Table 1100 of FIG. 11C indicates how collisions of non-identical files with identical hash digests can lead to problems when data deduplication is practiced. The hash digest is shown in column 1101 and the stored contents are shown in column 1102. The MD5 hash digest of Message M1 "1103" is associated with the contents of Message M3 104. However, since the MD5 hash digest of Message M2 "1105" is identical to the MD5 hash digest of Message M1 "1103," the original contents of Message M2 106 (FIG. 1A) are erased (deduplicated) and a data-pointer link 1106 to Message M1 is inserted so that anyone looking to access Message M2 will be redirected to the contents of Message M1 104. Similarly, the MD5 hash digest of Message M3 "1107" is associated with the contents of Message M3 704. However, since the MD5 hash digest of Message M4 "1108" is identical to the MD5 hash digest of Message M3 "1107," the original contents 706 (FIG. 6A) of Message M4 are erased (deduplicated) and a data-pointer link 1109 to Message M3 is inserted so that anyone looking to access Message M4 will be redirected to the contents of Message M3 "704" by the data-pointer link. Thus, table 1100 shows that the contents of Messages M3 and M4 are permanently lost, and worse yet, Messages M1 and M3 are left mimicking Messages M2 and M4, respectively.

Figure 11E:
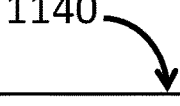
FIG. 11E illustrates how information is preserved during data deduplication for a pair 64-Byte messages when a forward blockchain hash digest and a hexadecimal-reverse blockchain hash digest are used in combination.

FIG. 11D illustrates how information is preserved during data deduplication for a pair 128-Byte messages when a forward blockchain hash digest and a hexadecimal-reverse blockchain hash digest are used in combination. FIG. 11E illustrates how information is preserved during data deduplication for a pair 64-Byte messages when a forward blockchain hash digest and a hexadecimal-reverse blockchain hash digest are used in combination. FIGS. 11D and 11E show the solution to the problem identified in FIG. 11C. In FIG. 11D, Table 1120 has hash digest column 1121 and stored contents 1122. The contents of Message M1 104 now have Forward Hash Digest and Hexadecimal-Reverse Hash Digest 1123, such as shown in FIG. 5C, and the contents of Message M2 106 now have Forward Hash Digest and Hexadecimal-Reverse Hash Digest 1125, such as shown in FIG. 5D. The combination of forward and hexadecimal-reverse hash digests distinguishes Message M1 and Message M2, and no errant data deduplication occurs. Similarly, in FIG. 11C, Table 1140 has hash digest column 1141 and stored contents 1142. The contents of Message M3 704 now has Forward Hash Digest and Hexadecimal-Reverse Hash Digest 1143, such as shown in FIG. 6F, and the contents of Message M4 706 now has Forward Hash Digest and Hexadecimal-Reverse Hash Digest 1145, such as shown in FIG. 6G. The combination of forward and hexadecimal-reverse hash digests distinguishes Message M3 and Message M4, and no errant data deduplication occurs. Thus, FIGS. 11D and 11E show the value of collision avoidance for the application of data deduplication, by augmenting today's forward hash digests with reverse hash digests.

Figure 11F:
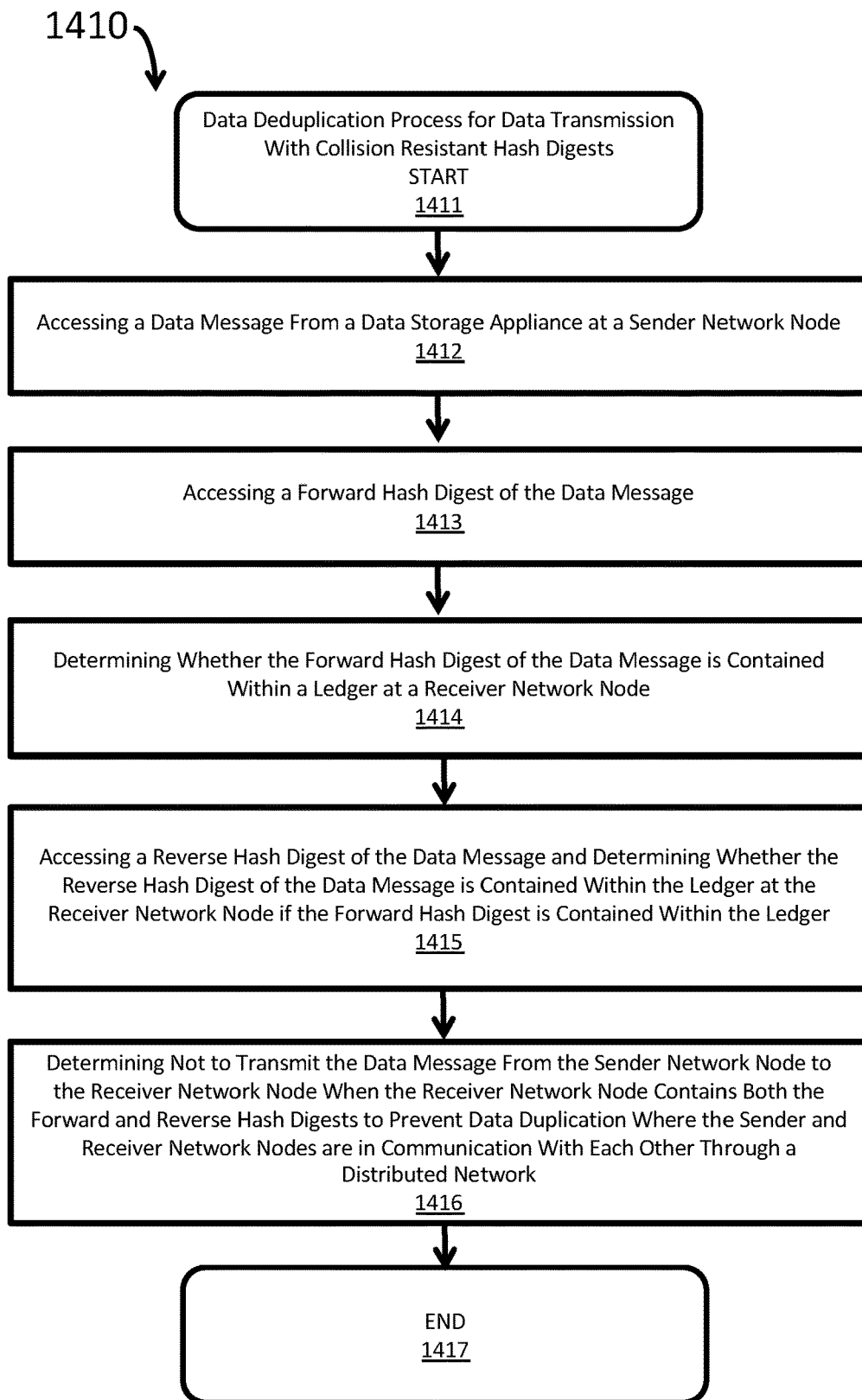
FIG. 11F illustrates a process for data deduplication for data transmission and restore using collision resistant hash digests.

FIG. 11F illustrates a flow chart 1410 depicting a process for data deduplication for data transmission and restore using collision resistant hash digests. The data deduplication process for file transmission based on collision resistant hash digests begins with START 1411. The process includes accessing a data message from data storage appliance at a sender network node in step 1412 and accessing a forward hash digest of the data message in step 1413. The process then determines whether the forward hash digest of the data message is contained within a ledger at a receiver network node in step 1414. The process then accesses a reverse hash digest of the data message and determines whether the reverse hash digest of the data message is contained within the ledger at the receiver network node if the forward hash digest is contained within the ledger in step 1415. Finally, the process then determines not to transmit the data message from the sender network node to the receiver network node when the receiver network node contains both the forward and reverse hash digests to prevent data duplication, where the sender and receiver network nodes are in communication with each other through a distributed network in step 1416. The process then ENDS in step 1417. The forward hash digest is formed from hashing the data message front-to-back. The reverse hash digest is formed from hashing the data message back-to-front. The reverse hash digest is formed by reversing the hexadecimal data within a data message to form a new reverse message by a process such as hexadecimal-reverse, byte-reverse, bit-reverse, hard-disk-drive sector reverse, or forward-reverse multiplex and then hashing the new reverse message with a hash algorithm. The hash algorithm for the forward and reverse hash digests is one of MD5, SHA-1, SHA-224, SHA-512/224, SHA-256, SHA-512/256, SHA-384, SHA-512, and SHA-3.

Figure 11G:
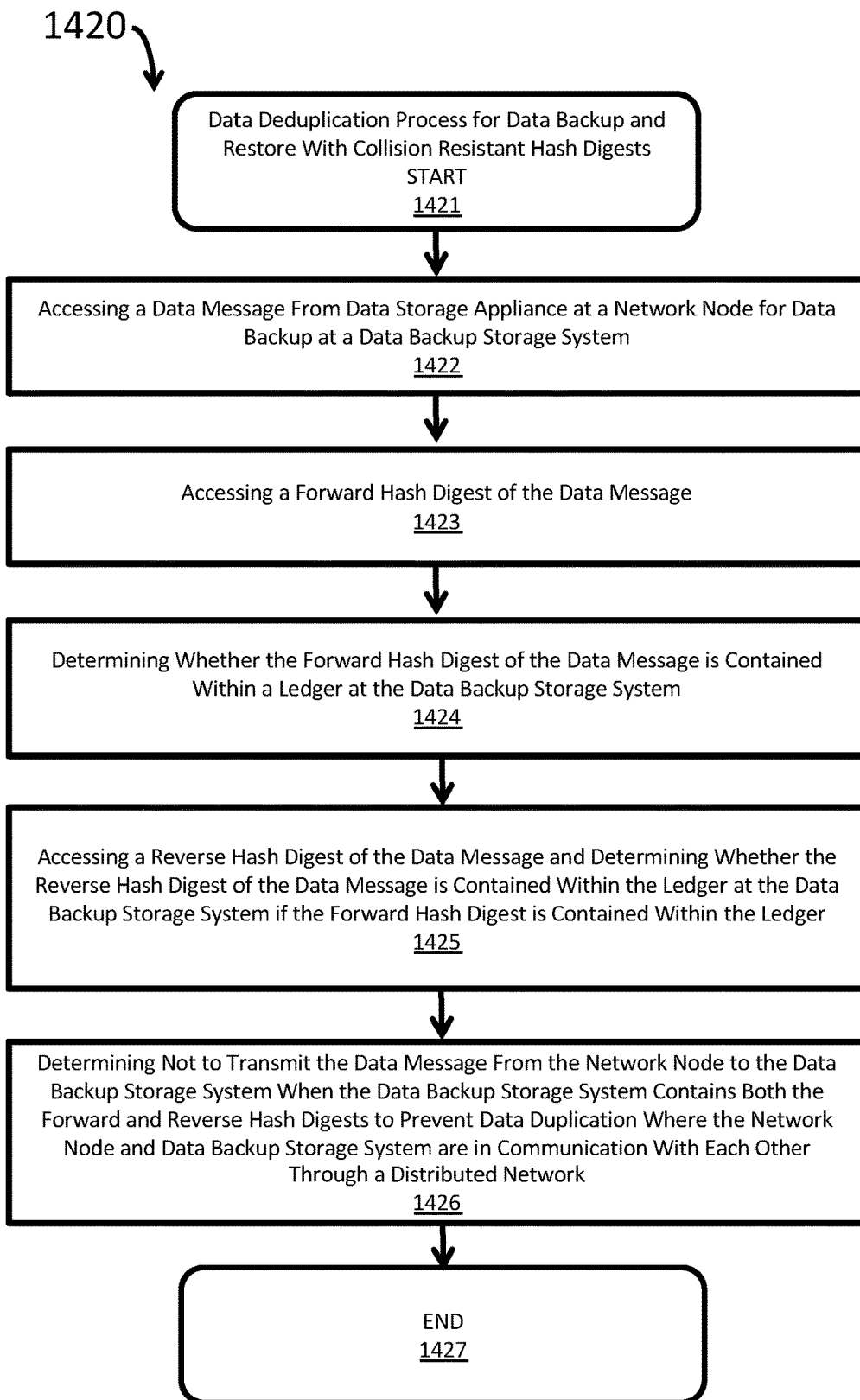
FIG. 11G illustrates a process for data deduplication for data backup and restore using collision resistant hash digests.

FIG. 11G illustrates a flowchart 1420 depicting a process for data deduplication for data backup and restore using collision resistant hash digests. The data deduplication process for data backup and restore based on collision resistant hash digests begins with START 1421. The process accesses a data message from data storage appliance at a network node for data backup at a data backup storage system in step 1422. The process then accesses a forward hash digest of the data message in step 1423 and determines whether the forward hash digest of the data message is contained within a ledger at the data backup storage system in step 1424. The system then accesses a reverse hash digest of the data message and determines whether the reverse hash digest of the data message is contained within the ledger at the data backup storage system if the forward hash digest is contained within the ledger in step 1425. The process then determines not to transmit the data message from the network node to the data backup storage system when the data backup storage system contains both the forward and reverse hash digests to prevent data duplication in step 1426. The network node and the data backup storage system are in communication with each other through a distributed network. The process ENDS in step 1427. The forward hash digest is formed from hashing the data message front-to-back. The reverse hash digest is formed from hashing the data message back-to-front. The reverse hash digest is formed by reversing the hexadecimal data within a data message to form a new reverse message by a process such as hexadecimal-reverse, byte-reverse, bit-reverse, hard-disk-drive sector reverse, or forward-reverse multiplex and hashing the new reverse message with a hash algorithm. The hash algorithm for the forward and reverse hash digests such as MD5, SHA-1, SHA-224, SHA-512/224, SHA-256, SHA-512/256, SHA-384, SHA-512, and SHA-3.

Figure 12A:
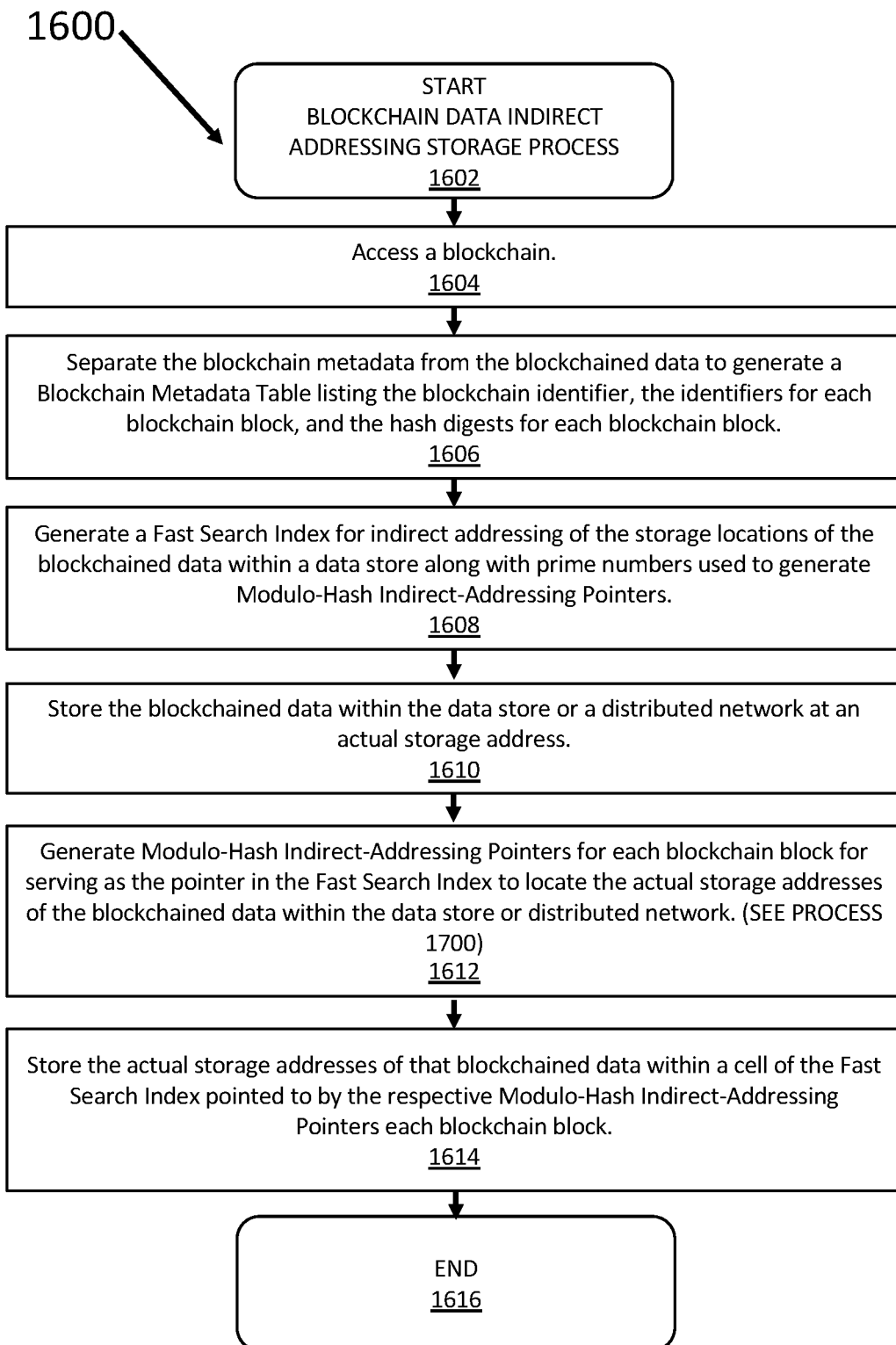
FIGS. 12A-12W illustrate a series of flow charts and diagrams depicting the storage of big data blockchains using indirect and direct data pointers that are created based on hash digests from each blockchain block.
Figure 12B:
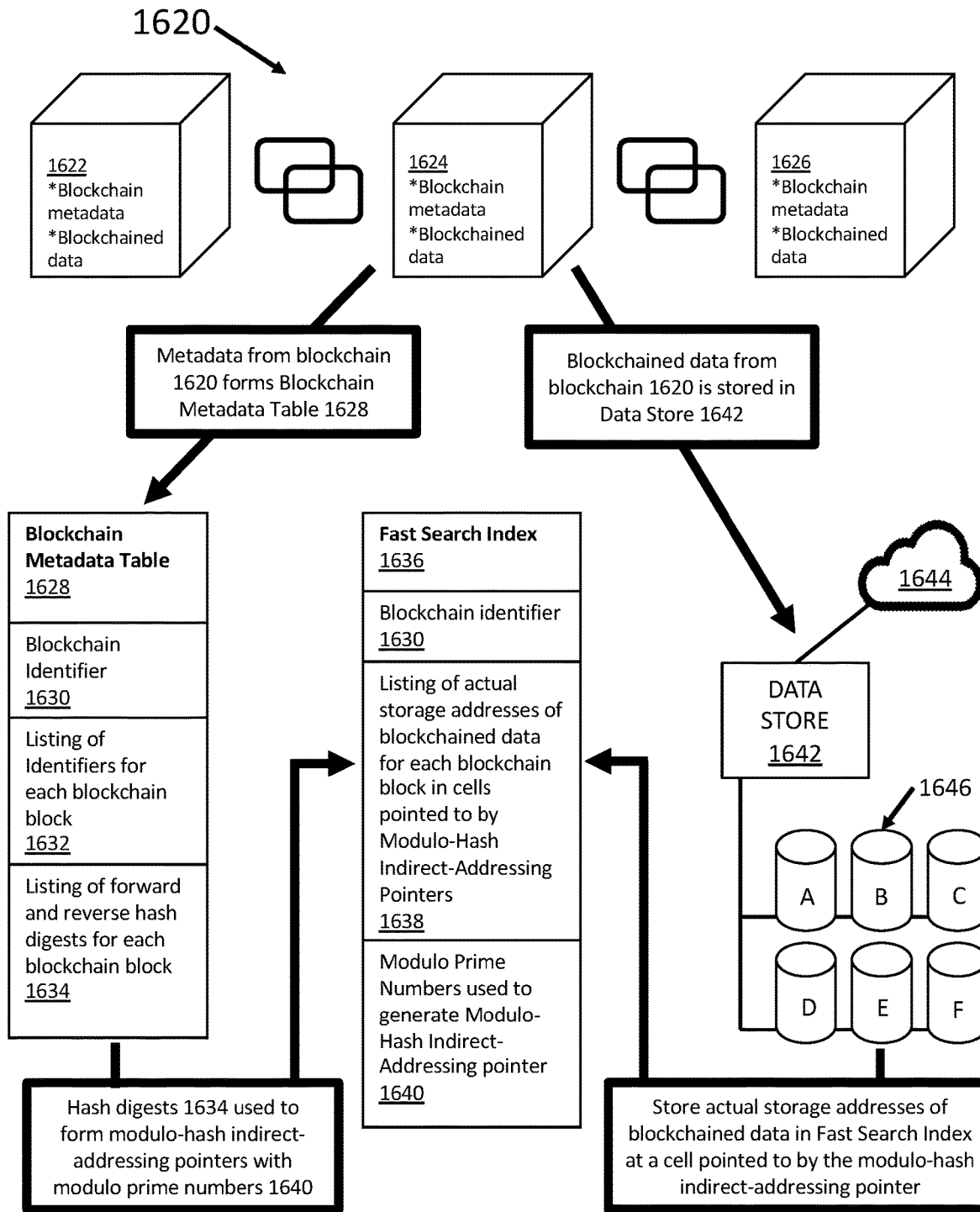
FIG. 12B illustrates a blockchain diagram along with a Blockchain Metadata Table, a big data blockchain Fast Search Index, and a block diagram of an exemplary data store connected to the cloud that includes a plurality of disk drives.
Figure 12C:
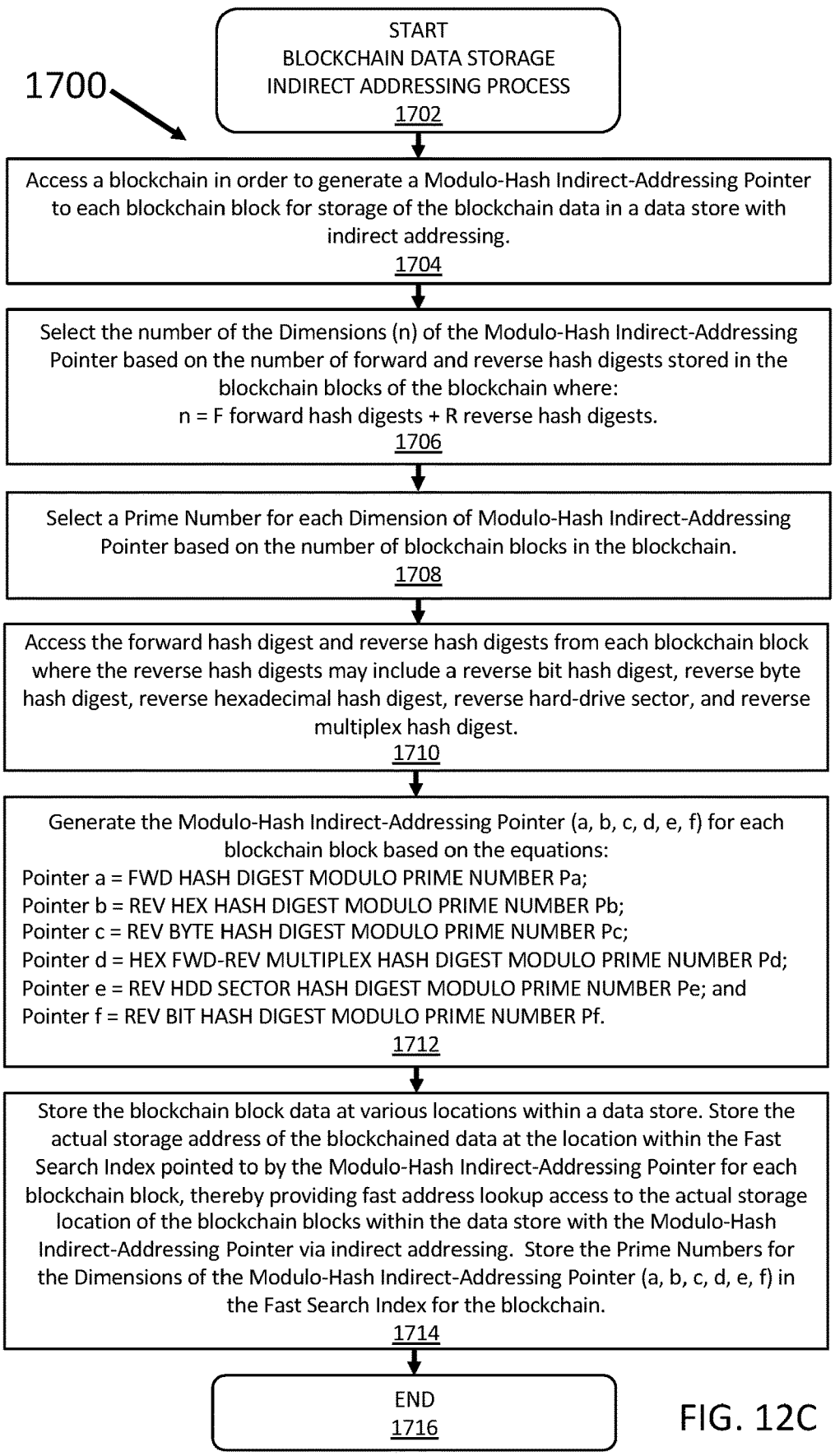
FIG. 12C depicts a flow chart illustrating a process for the storage of big data blockchains using an indirect storage process.
Figure 12D:
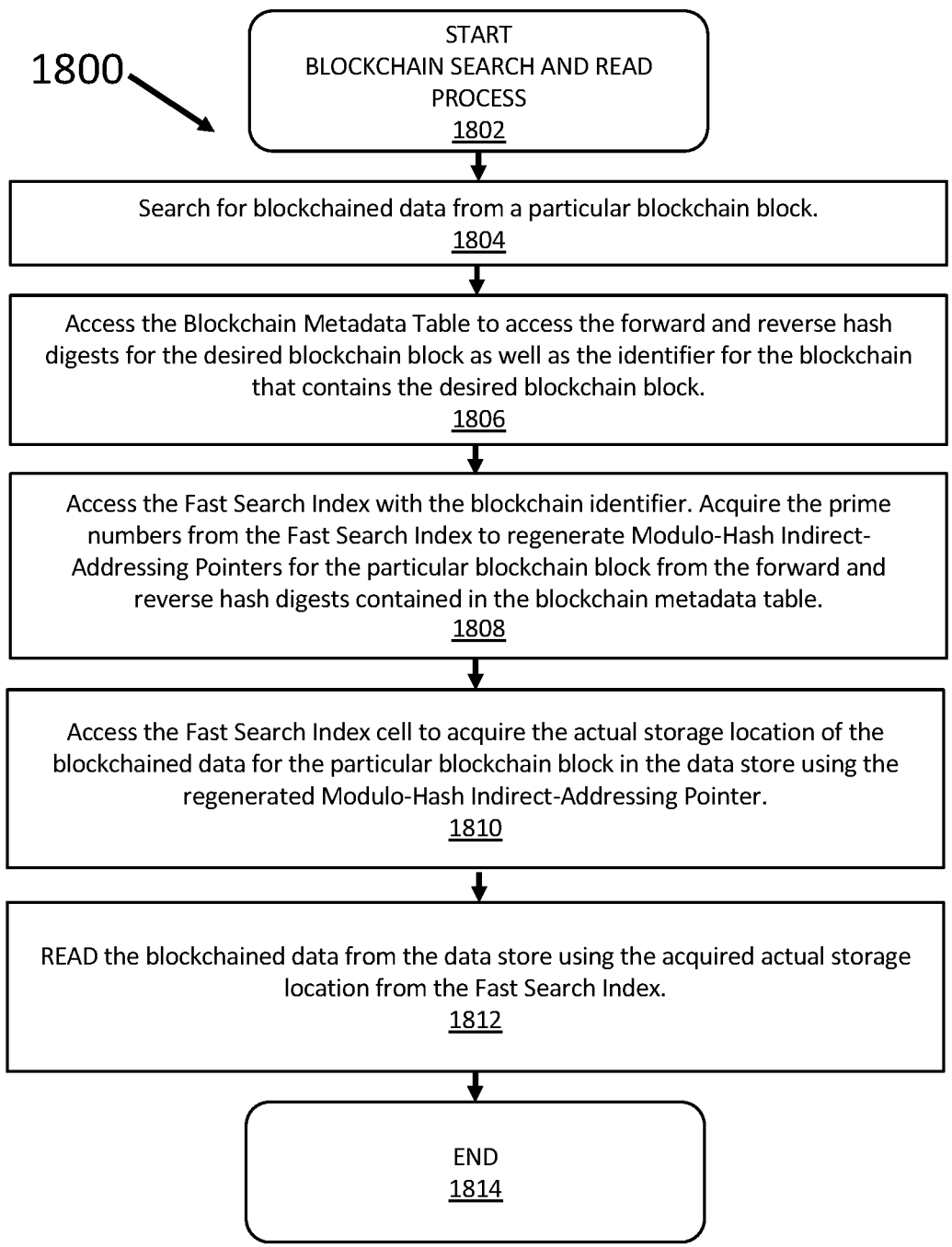
FIG. 12D depicts a flow chart illustrating a process for searching for and reading a stored big data blockchain using indirect address pointers based on blockchain hash digests.
Figure 12E:
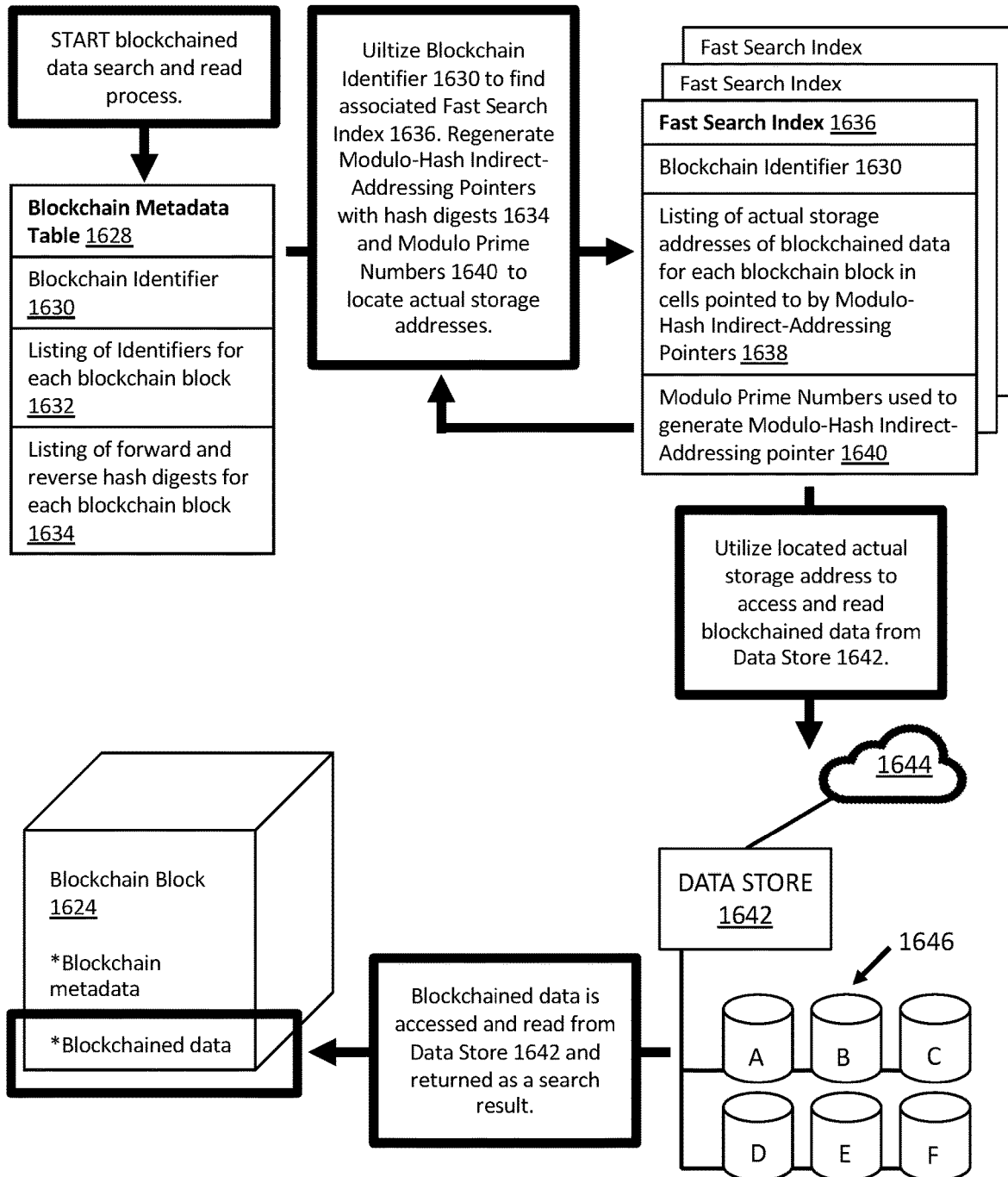
FIG. 12E illustrates a block diagram illustrating a process for searching for and reading a stored big data blockchain using indirect address pointers based on blockchain hash digests through the use of a blockchain diagram, a blockchain metadata table, fast search index, and block diagram of a data store.
Figure 12F:
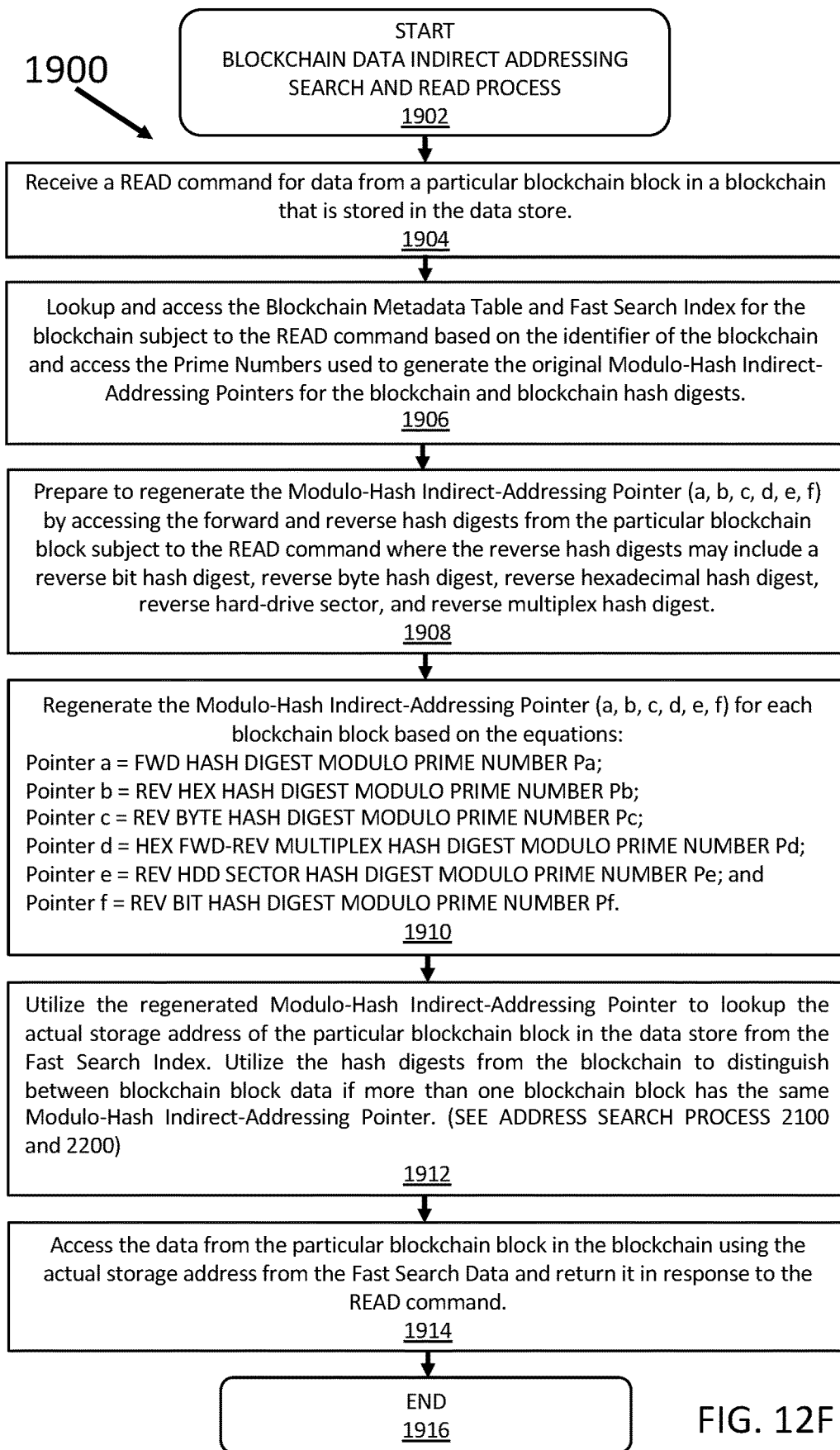
FIG. 12F depicts a flow chart illustrating a process for searching and reading a big data blockchain with indirect addressing pointers based on hash digests.
Figure 12G:
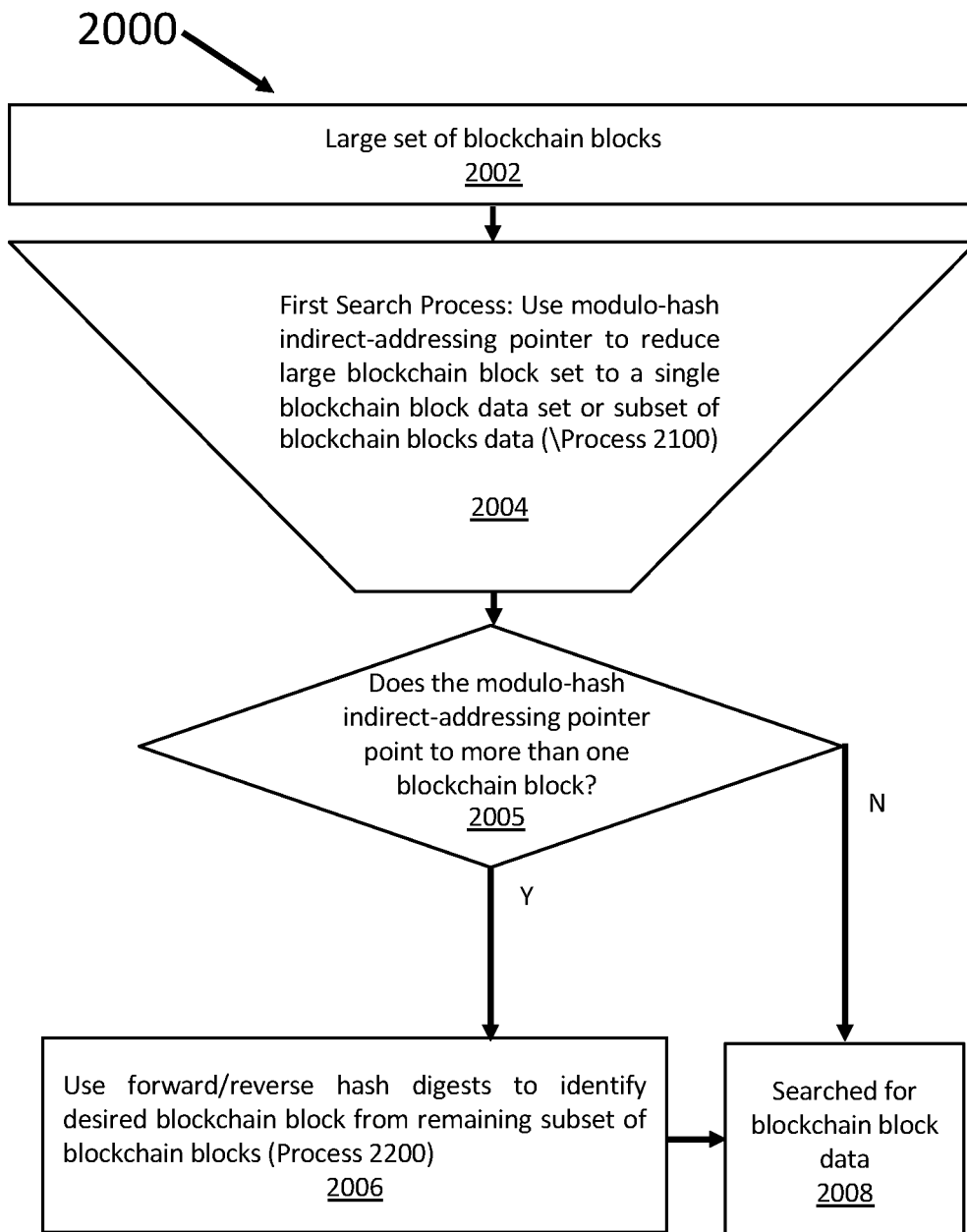
FIG. 12G illustrates a block diagram for the search of blockchain block data from a large set of big data blockchain blocks using a two-step search process that first includes the use of indirect addressing pointers derived from hash digests of the blockchain blocks and then secondly include the use of hash digests to identify the desired blockchain block data if necessary.
Figure 12H:
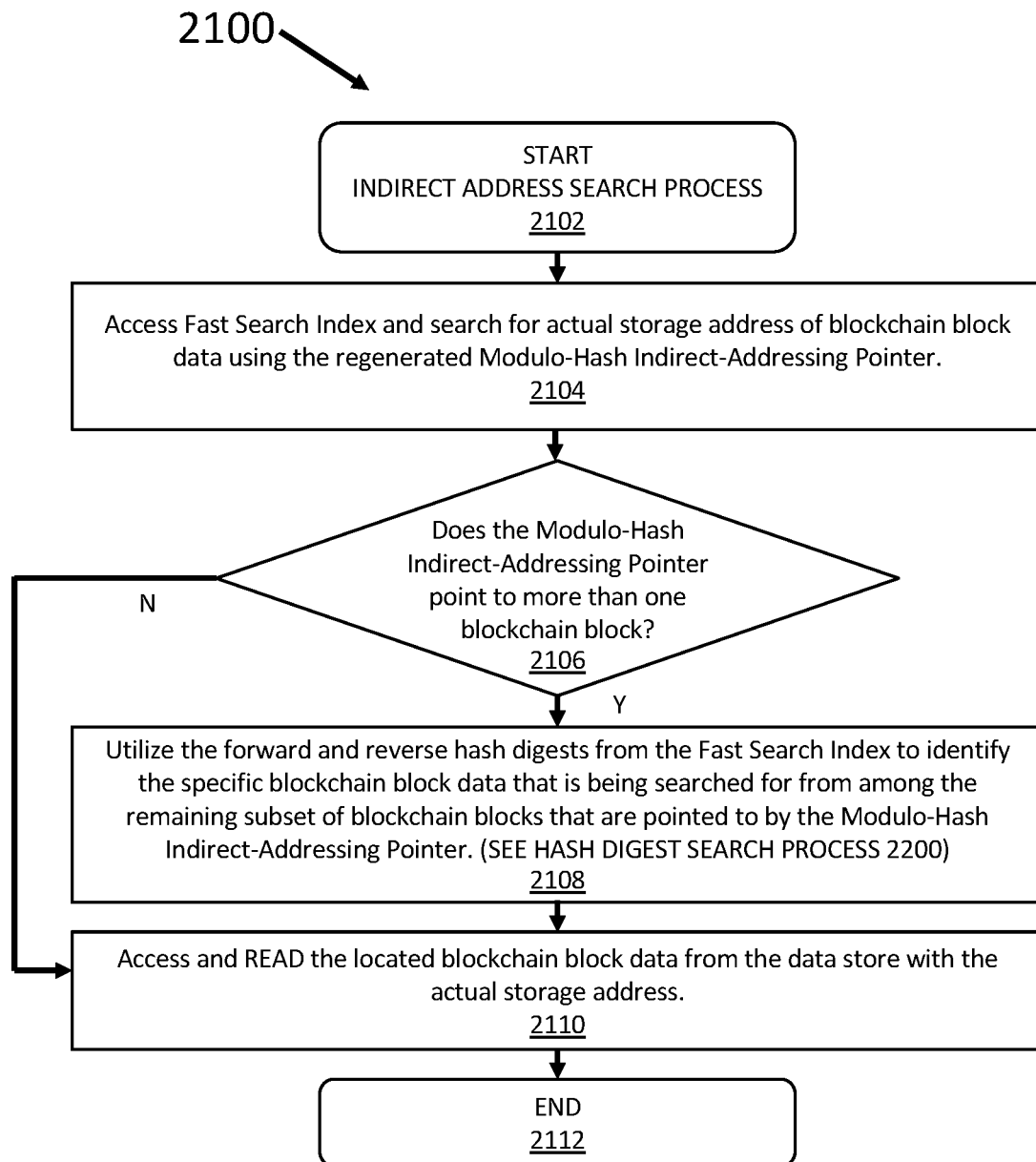
FIG. 12H depicts a flow chart illustrating a two-step process for searching big data blockchains using hash digests if necessary after indirect addressing pointers have narrowed the big data blockchain set to a smaller subset or single blockchain block.
Figure 12I:
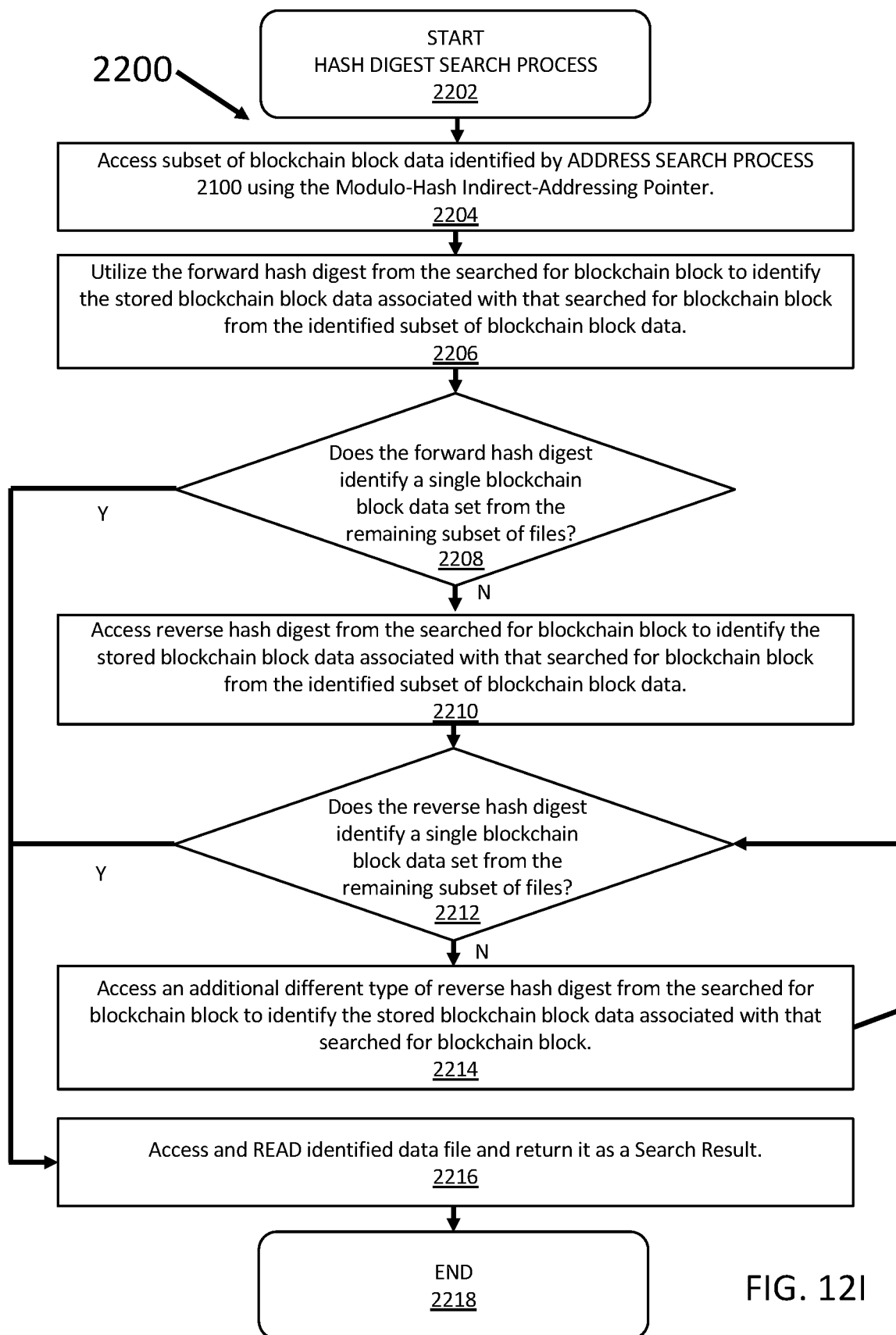
FIG. 12I depicts a flow chart illustrating a processing of using hash digests to select a single blockchain block from a subset of blockchain blocks retrieved through the use of indirect addressing pointers.
Figure 12J:
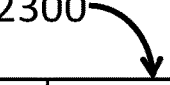
FIG. 12J illustrates a blockchain table for two indirect addressing pointers based on forward and reverse hash digests that includes columns for a blockchain block data identifier for six data messages subject to data collisions, the type of MD5 hash digest created, a listing of the hexadecimal value of the MD5 blockchain hash digest, and a listing of the modulo-hash indirect-addressing pointer where 7 is used as a common modulo prime number.
Figure 12L:
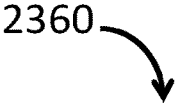
FIG. 12L illustrates a blockchain table for three indirect addressing pointers based on forward, reverse-hex, and reverse-byte hash digests that includes columns for a blockchain block data identifier for four data messages subject to data collisions, the type of MD5 hash digest created, a listing of the hexadecimal value of the MD5 blockchain hash digest, and a listing of the modulo-hash indirect-addressing pointer where 3 is used as a common modulo prime number.
Figure 12N:
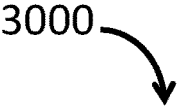
FIG. 12N illustrates a blockchain table for four indirect addressing pointers based on forward, reverse-hex, reverse-byte, and forward reverse-multiplex hash digests that includes columns for a blockchain block data identifier for two data messages subject to data collisions, the type of MD5 hash digest created, a listing of the hexadecimal value of the MD5 blockchain hash digest, and a listing of the modulo-hash indirect-addressing pointer where 5 is used as a common modulo prime number.
Figure 12S:
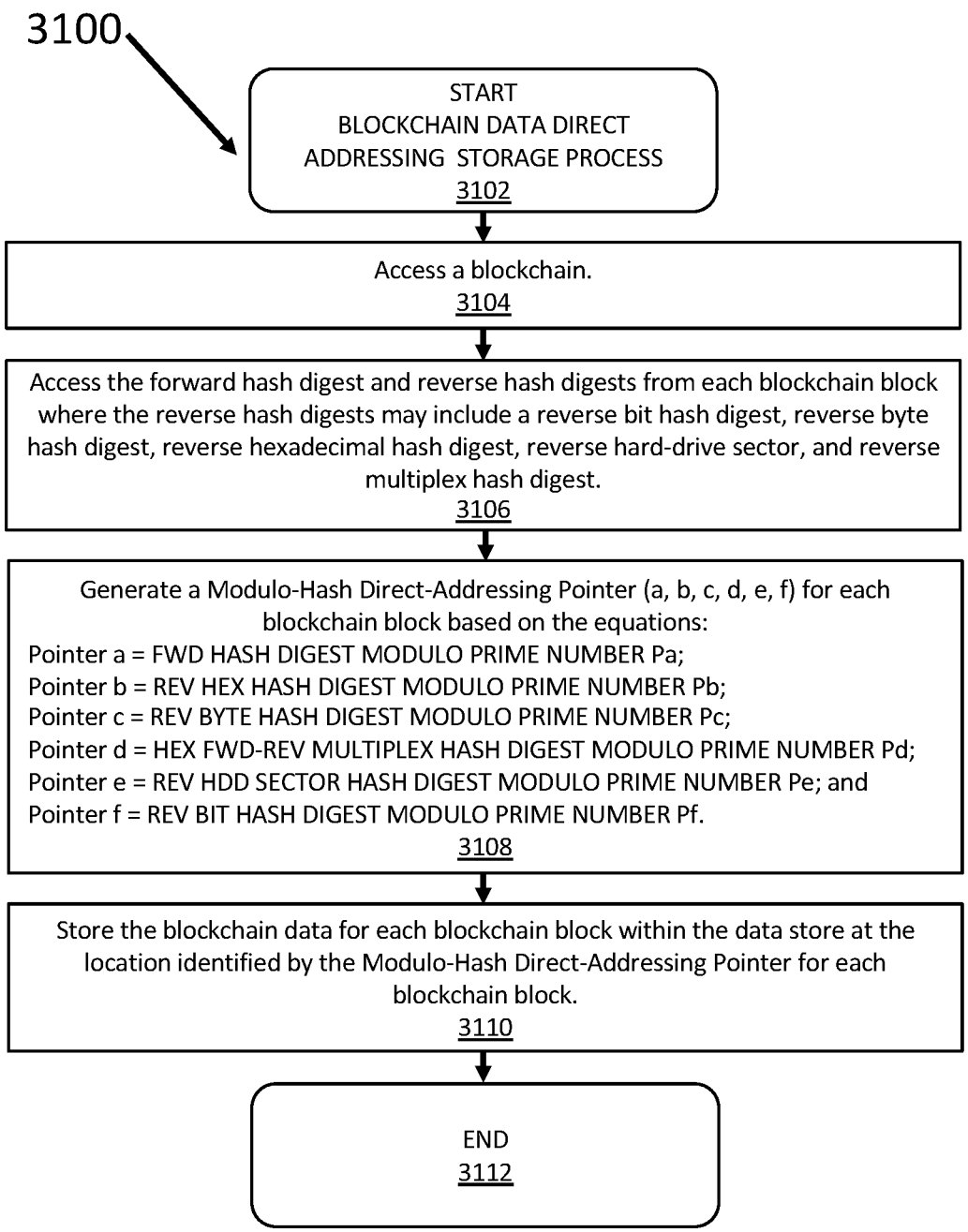
FIG. 12S depicts a flow chart illustrating a process for the storage of big data blockchains using modulo-hash direct-addressing pointers based on hash digests.
Figure 12T:
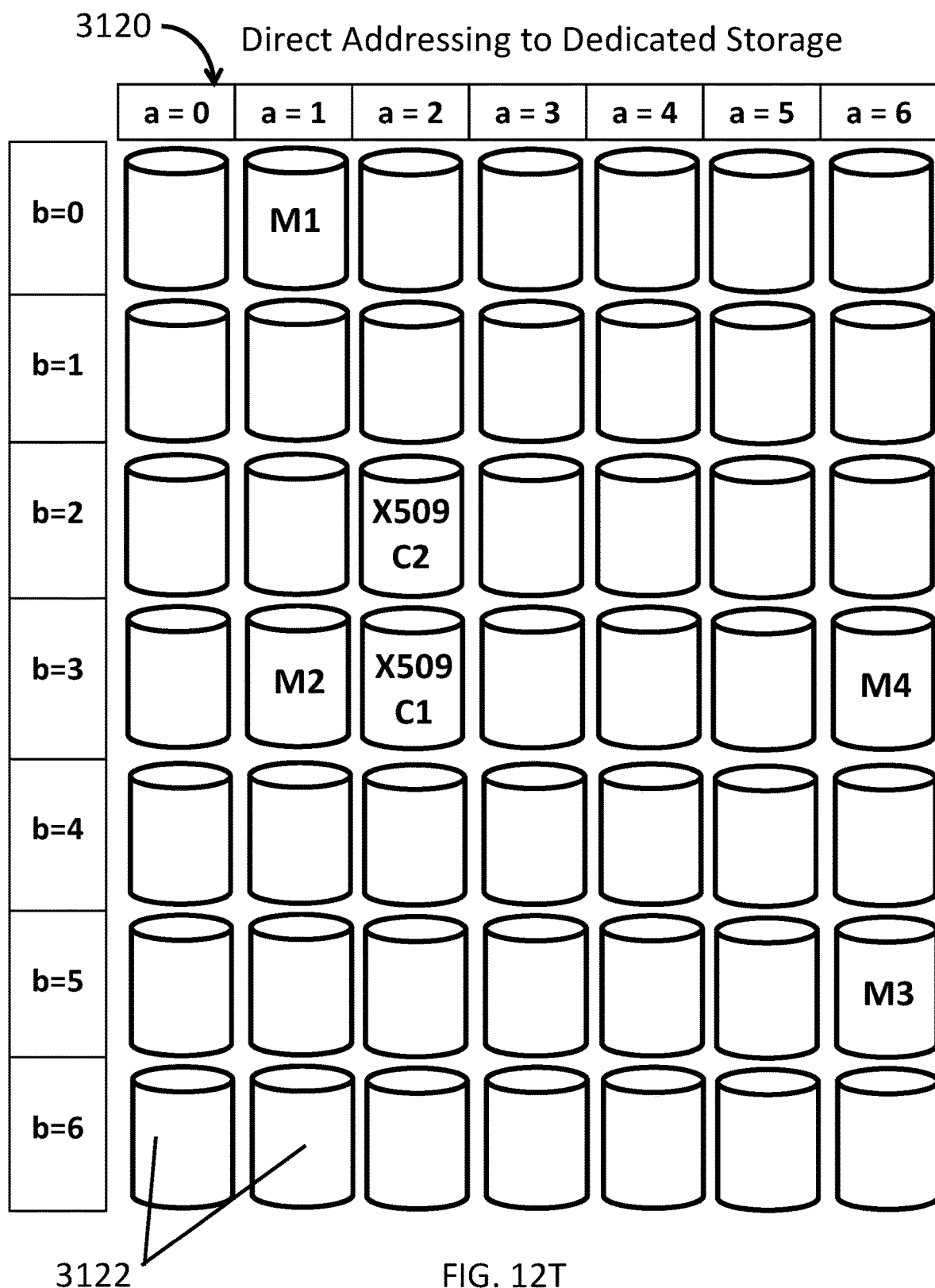
FIG. 12T illustrates a tabular block diagram showing the addressing of storage volumes and where messages are stored based on two-dimensional modulor-hash direct-addressing pointers derived from their respective forward and reverse hash digests where 7 is a common modulo prime number.
Figure 12U:
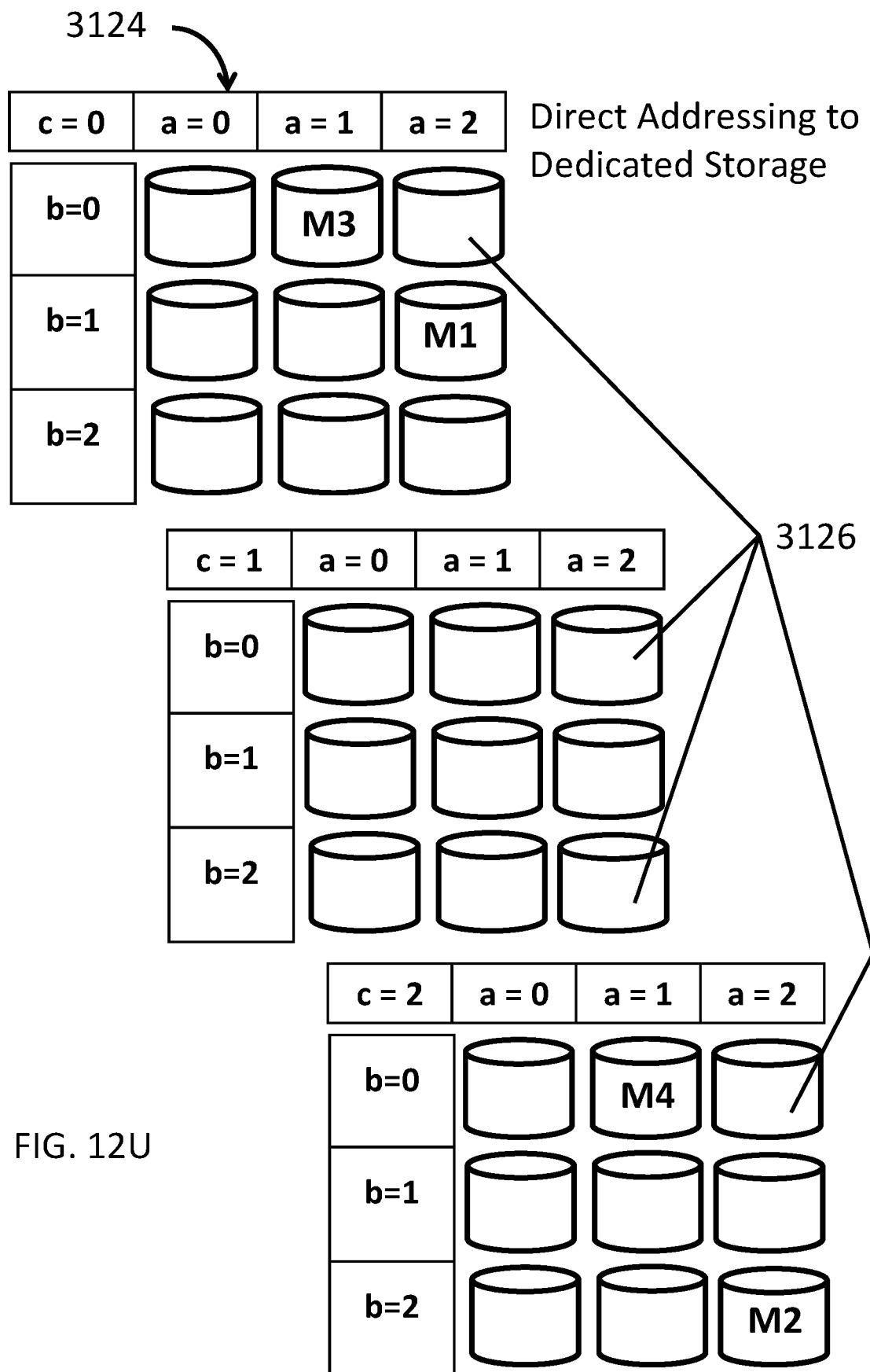
FIG. 12U illustrates a tabular block diagram showing the direct addressing of storage volumes and where messages are stored based on three-dimensional modulo-hash direct-addressing pointers derived from their respective forward, reverse-hex, and reverse-byte hash digests where 3 is a common modulo prime number.
Figure 12V:
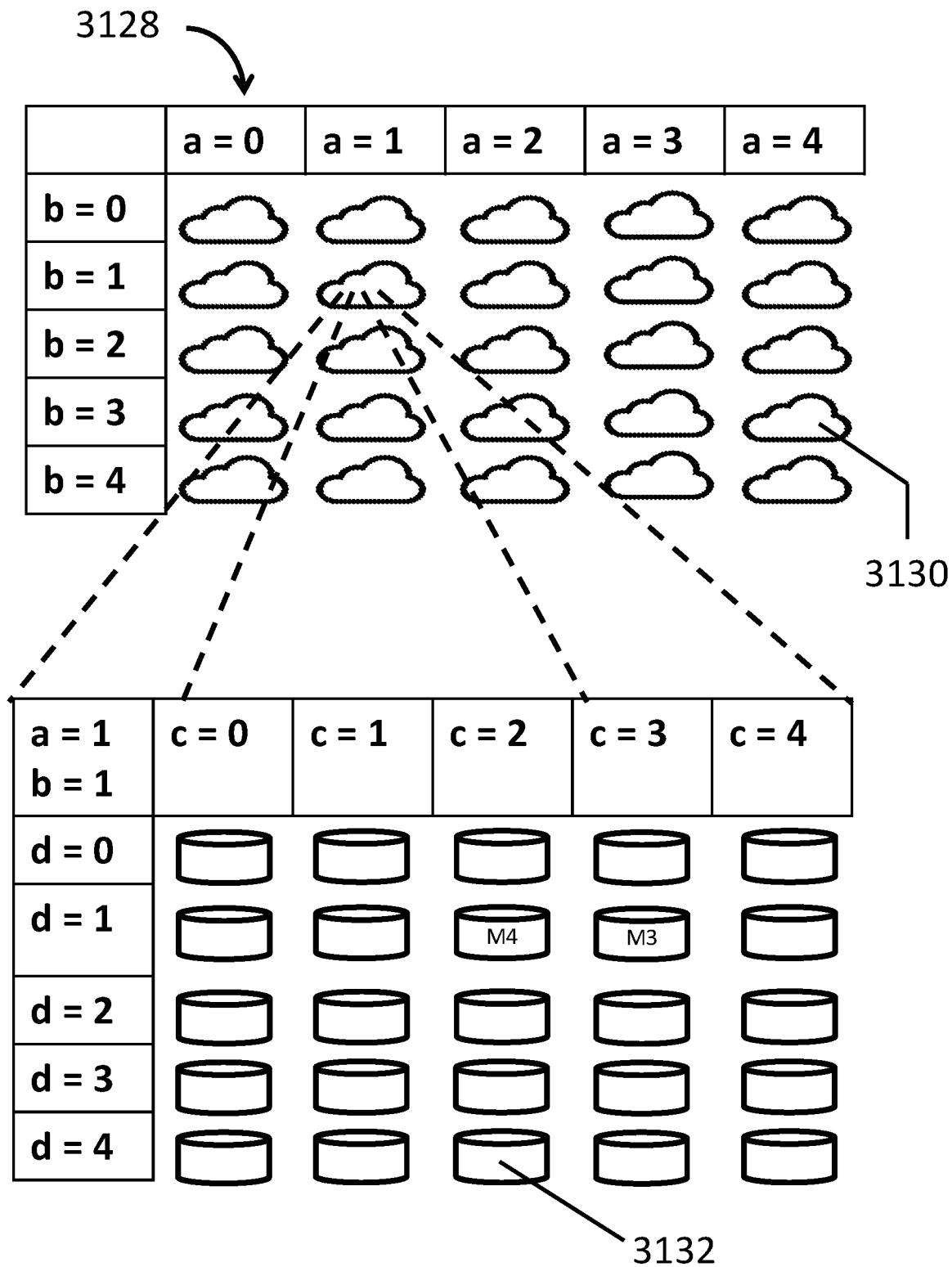
FIG. 12V illustrates a tabular block diagram showing the direct addressing of data in a two-dimensional array of clouds, each of which contains a two dimensional array of storage volumes where messages are stored based on a four-dimensional modulo-hash direct-addressing pointers derived from their respective forward, reverse-hex, reverse-byte, and forward reverse-multiplex hash digests where 5 is a common modulo prime number.
Figure 12W:
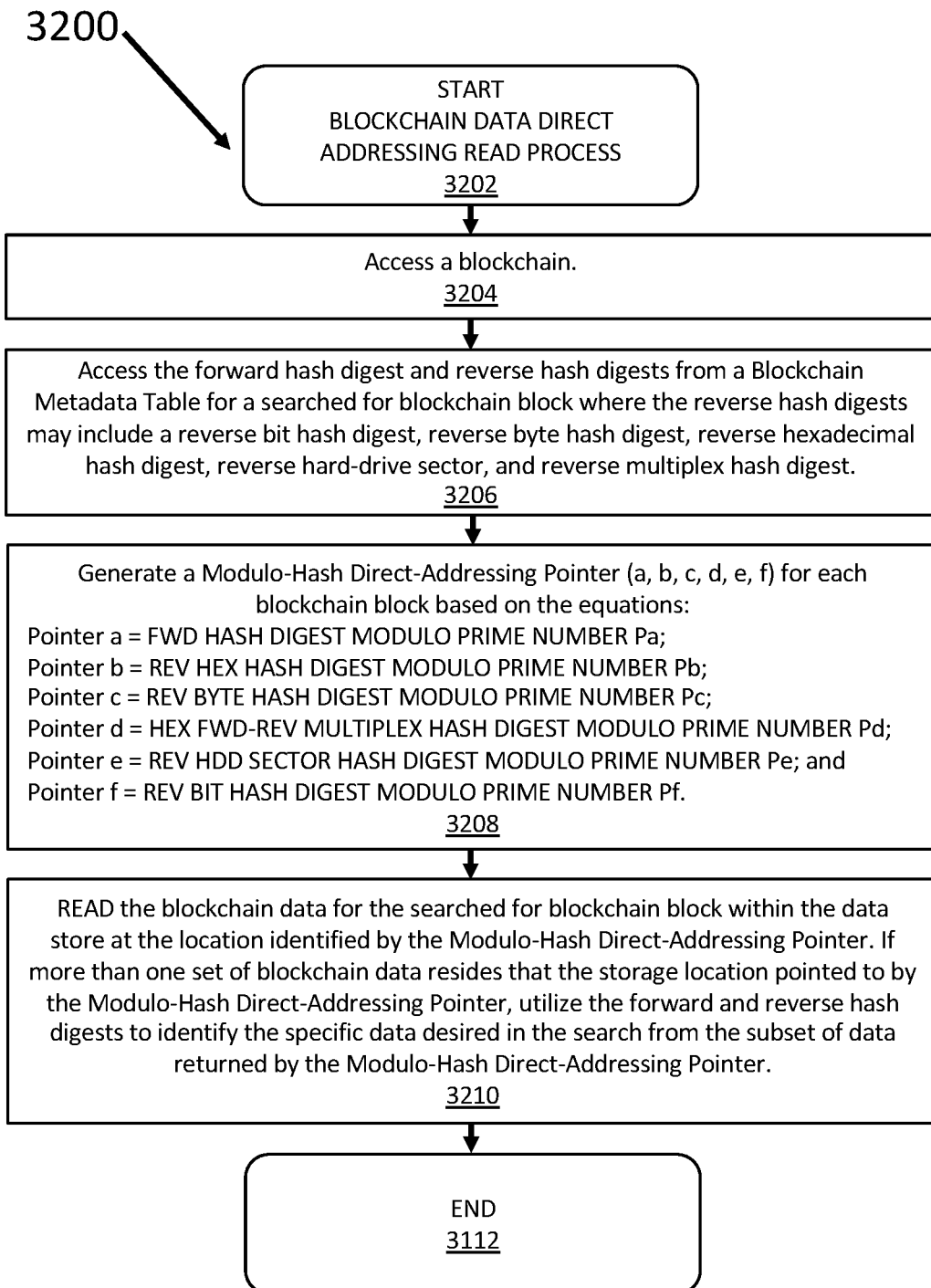

FIGS. 12A-12W illustrate a series of flow charts and diagrams depicting the storage of big data blockchains using indirect and direct data pointers that are created based on hash digests from each blockchain block that allow for fast searching of them for retrieval. This specification discloses the fast searching of millions or even billions of hashed blockchained objects based on modulo integer arithmetic performed on their hash digests. In FIGS. 12A-12W, the MD5 hash algorithm is used, although SHA-1, SHA-2 (224, 512/224, 256, 512/256, 384, 512), SHA-3 (224, 256, 384, 512), or any other hash algorithm may be used. FIGS. 12A-12W disclose the creation of a multi-dimensional space by calculating modulo integer arithmetic on two or more blockchain hash digests pertaining to each object using one or more prime numbers P, in the general form "digest mod(P)." These prime numbers P may be chosen from Fermat primes, Fp, named after the mathematician Pierre de Fermat. The only known prime Fermat numbers are the following:

$Fp(n=0)=2^1+1=3$ $Fp(n=1)=2^2+1=5$ $Fp(n=2)=2^4+1=17$ $Fp(n=3)=2^8+1=257$ $Fp(n=4)=2^16+1=65537$

These prime numbers P may alternately be chosen from the set of Mersenne primes, M, which are of the form 2n−1. The first eight exponents n which give Mersenne primes are 2, 3, 5, 7, 13, 17, 19, 31, and the resulting eight Mersenne primes are 3, 7, 31, 127, 8191, 131071, 524287, 2147483647. The largest known prime number, 282,589,933−1, is a Mersenne prime. Since 1997, all newly found Mersenne primes have been discovered by the Great Internet Mersenne Prime Search (GIMPS), a distributed computing project on the Internet.

$M(n=2)=2^2-1=3$ $M(n=3)=2^3-1=7$ $M(n=5)=2^5-1=31$ $M(n=7)=2^7-1=127$ $M(n=13)=2^13-1=8191$ $M(n=17)=2^17-1=131071$ $M(n=19)=2^19-1=524287$ $M(n=31)=2^31-1=2147483647$

These prime numbers P may alternated be chosen from the set of Sofie Germain primes, Ps. In number theory, a prime number p, is a Sophie Germain prime if 2p+1 is also prime. The number 2p+1 associated with a Sophie Germain prime is called a safe prime. For example, 11 is a Sophie Germain prime and 2×11+1=23 is its associated safe prime. Sophie Germain primes are named after French mathematician Sofie Germain, who used them in her investigations of Fermat's Last Theorem. Sophie Germain primes and safe primes have applications in public key cryptography and primality testing. The first few Sophie Germain primes, which are less than 1000, are 2, 3, 5, 11, 23, 29, 41, 53, 83, 89, 113, 131, 173, 179, 191, 233, 239, 251, 281, 293, 359, 419, 431, 443, 491, 509, 593, 641, 653, 659, 683, 719, 743, 761, 809, 911, and 953. In cryptography, much larger Sophie Germain primes like $1,846,389,521,368+11^{600}$ are required. Two distributed computing projects, PrimeGrid and Twin Prime Search, include searches for large Sophie Germain primes. The largest known Sofie Germain prime number has 388342 decimal digits. The storage, search, and addressing are huge challenges for big data blockchain. Big data blockchain stores vast amounts of information that may include millions or billions of different data objects, each of which may be stored in a different blockchain block. This present specification provides for a system of data storage for files in which addressing is based upon hash digests of the files that are being stored. The hash digests are used to produce either direct or indirect addressing pointers. As the addressing pointers are derived directly from the data, it is not necessary to create additional data structures or tables to register data pointers. Deriving data pointers directly from the subject data means that the pointer is inherent within the data and is always present and need not be created and stored separately. When millions or billions of data objects are involved, searching through millions or billions of pointers to look through the correct one in a search index can be extremely cumbersome and wasteful of precious computing resources. Instead of searching through millions or billions of data pointers for the storage location of a particular file, deriving the data pointers from the searched for data is eminently faster. While discussed with respect to blockchain, the direct and indirect addressing pointers disclosed that enable the storage and fast search of millions or billions of data objects may be used in combination with any non-blockchain data structure as well. The direct and indirect addressing pointers disclosed that enable the storage and fast search of millions or billions of data objects may be used in combination with any form of digital data that hash digests cab be generated from.

FIG. 12A depicts a flow chart 1600 illustrating a process for the storage of big data blockchains using an indirect addressing storage process. The process begins with the step START 1602. Then in step 1604, a blockchain is accessed from a storage medium or a distributed network. In step 1606, the blockchain metadata is separated from the blockchain data stored within each blockchain block. The blockchain metadata is then used to generate a Blockchain Metadata Table. This blockchain metadata extracted from the blockchain that is stored within the Blockchain Metadata Table includes an identifier for the entire blockchain, identifiers for each blockchain block within the blockchain, and hash digests for each blockchain block. It is contemplated that each blockchain block will have more than one hash digest, such as a pair of hash digests like a forward and a reverse hash digest. For example, it is contemplated that a blockchain may store a digital movie, where each blockchain block may include a Group Of Pictures that form a portion of that digital movie. The blockchain block metadata would be an identifier of that blockchain block and hash digests of the blockchain data, which would be the Group of Pictures. In this system, large data files such as the Group of Pictures may be stored separately from the rest of the blockchain. The Blockchain Metadata Table is used to identify a particular blockchain block and its associated hash digests that are based on the blockchain data contained within that blockchain block. In order to access the blockchain data that is associated within this blockchain block, it is necessary to locate the actual storage location of the blockchain data. In step 1608, a Fast Search Index is created for indirect addressing of the actual storage locations of the blockchain data within a data store or a distributed network. The Fast Search Index contains a listing of the actual storage addresses of each blockchain block data in cells pointed to by the indirect addressing pointers generated from the hash digests for each blockchain block listed in the Blockchain Metadata Table. These indirect addressing pointers are generated from the two or more hash digests that are associated with each blockchain block, such as a forward and a reverse blockchain hash digest, through the use of a modulo calculation based on a chosen prime number for each hash digest. Each hash digest produces a different addressing pointer. Multiple hash digests are used to generate multiple indirect addressing pointers, which together form an indirect addressing pointer. The prime number selected for use in the modulo calculation on each hash digest may be the same for each indirect addressing pointer, or they may be different. These indirect addressing pointers are called Modulo-Hash Indirect-Addressing Pointers. These indirect addressing pointers are given this name because they are derived from the hash digests of data through modulo mathematics. In step 1610, the blockchained data, like a Group of Pictures, is stored in a data store or a distributed network at an actual storage address. In step 1612, process 1600 generates a Modulo-Hash Indirect-Addressing Pointer for each hash digest within a blockchain block, thereby forming a Modulo-Hash Indirect-Addressing Pointer for each blockchain block. Modulo-Hash Indirect-Addressing Pointers are generated for each blockchain block within a blockchain. These Modulo-Hash Indirect-Addressing Pointers point to a cell within the Fast Search Index that stores the actual storage address of the blockchained data for that particular blockchain block within a data store or a distributed network. The process of generating Modulo-Hash Indirect-Addressing Pointers is explained more fully in process 1700 shown in FIG. 12C. In step 1614, the actual storage address of where the blockchain data is stored within the data store or distributed network is stored within the Fast Search Index within a cell pointed to by the Modulo-Hash Indirect-Addressing Pointer generated for that blockchained data from the hash digests stored within the blockchain metadata table for that particular blockchain block. The process ENDS in step 1616.

FIG. 12B illustrates a blockchain diagram 1620 along with a blockchain metadata table 1628, a big data blockchain Fast Search Index 1636, and a block diagram of an exemplary data store 1642 connected to the cloud 1644 that includes a plurality of disk drives 1646. FIG. 12B provides a schematic representation of the indirect addressing process for big data blockchains discussed in FIG. 12A. Blockchain 1620 is depicted for illustrative purposes as having three blockchain blocks 1622, 1624, and 1626. Each blockchain block 1622, 1624, and 1626 has blockchain metadata that includes an identifier for the entire blockchain 1620, an identifier for the specific blockchain block 1622, 1624, or 1626, and blockchain hash digests based on blockchain data stored within each blockchain block 1622, 1624, or 1626. Each blockchain block 1622, 1624, and 1626 desirably has two or more hash digests, such as a forward and a reverse hash digest. The blockchained data may be any form of digital data that is secured with a blockchain technology. The blockchained data may be medical records, financial records, legal records, transactions, software, media such as digital movies or music, or any other form of digital data. It is contemplated that the blockchained data may constitute very large volumes of data encompassing millions or billions of data objects, each of which would be stored in its own blockchain block resulting in blockchains possessing millions or billions of blockchain blocks. Blockchain Metadata Table 1628 and Fast Search Index are used to store these millions or billions of different blockchain data objects within data store 1642. When the millions or billions of blockchain data objects are stored within data store 1642, each blockchain data object has an actual storage address that is recorded within Fast Search Index 1636 at a cell 1638 within the Fast Search Index 1636 that is pointed to by Modulo-Hash Indirect-Addressing Pointer associated with that specific stored blockchain data object. These Modulo-Hash Indirect-Addressing Pointers are generated from the hash digests 1634 for each blockchain block that are acquired from the Blockchain Metadata Table 1628 using prime numbers 1640 listed in the Fast Search Index 1636. The Blockchain Metadata Table 1628 includes an identifier for the entire blockchain 1630, a listing of identifiers 1632 for each blockchain block 1622, 1624, and 1626 within the blockchain 1620, and the listing of all forward and reverse hash digests used for each blockchain block 1634. The Blockchain Metadata Table 1636 identifies specific blockchains and blockchain blocks within those blockchains. By first accessing the specific hash digests for a particular blockchain block, it is possible to generate the indirect addressing pointers to find the actual storage address of where the blockchained data for that particular blockchain block is stored within the data store 1642 from the Fast Search Index 1636. In this manner, it is possible to rapidly identify the actual storage address for the stored blockchained data by generating the indirect addressing pointer from the hash digests as opposed to searching through millions or billions of blockchain identifiers in a conventional search table.

FIG. 12C depicts a flow chart 1700 illustrating a process for the storage of big data blockchains using an indirect storage process. Process 1700 provides a more detailed description of the creation of the Modulo-Hash Indirect-Addressing Pointers described in FIGS. 12A and 12B. The process begins with START 1702. In step 1704, a blockchain is accessed in order to generate a Modulo-Hash Indirect-Addressing Pointer to each blockchain block for storage of the blockchain data in a data store with indirect addressing. In step 1706, the number of Dimensions (n) of the Modulo-Hash Indirect-Addressing Pointer is selected based on the number of forward and reverse hash digests stored in the blockchain blocks of the blockchain (i.e. total number of Dimensions n=the total number of forward hash digests (F)+the total number of reverse hash digests (R), n=F+R). It is possible to generate one Modulo-Hash Indirect-Addressing Pointer off of one unique hash digest, which is one Dimension of a Modulo-Hash Indirect-Addressing Pointer. Two unique hash digests allow for the generation of two different Modulo-Hash Indirect-Addressing Pointers, making for a two dimensional Modulo-Hash Indirect-Addressing Pointer. Three unique hash digests allow for the generation of three different Modulo-Hash Indirect-Addressing Pointers, making for a three dimensional Modulo-Hash Indirect-Addressing Pointer. Dimensions refers to the number of different pointers that are within the Modulo-Hash Indirect-Addressing Pointer, where each Modulo-Hash Indirect-Addressing Pointer corresponds to a dimension. In step 1708, a prime number is selected for the calculation of each of the Modulo-Hash Indirect-Addressing Pointers. A common prime number may be selected for the calculation of all of the Modulo-Hash Indirect-Addressing Pointers. Alternatively, some of the Modulo-Hash Indirect-Addressing Pointers may share a common prime number while others have a unique prime number. In a further alternative embodiment, all of the Modulo-Hash Indirect-Addressing Pointers may have different prime numbers. The prime numbers, along with the number of different hash digests available from the blockchain, determine the number of different cells that are created for the storage of actual storage addresses within a Fast Search Index. It is desirable to generate a Fast Search Index that has sufficient unique storage cells in which to store all of the different actual storage addresses for all of the blockchain blocks. Thus, the total number of blocks and unique data objects within a blockchain guides the determination as to what constitutes a minimum optimal value for the prime number based on the number of unique hash digests within the blockchain to generate a sufficiently large Fast Search Index. In step 1710, process 1700 accesses the different hash digests contained within the blockchain, which may include forward and reverse hash digests. The reverse hash digest may be more than one hash digests and include one or more of the following: a reverse bit hash digest, reverse byte hash digest, reverse hexadecimal hash digest, reverse hard-drive sector, and reverse multiplex hash digest. The forward hash digest may be one or more forward hash digests and include one or more of the following: a forward bit hash digest, forward byte hash digest, forward hexadecimal hash digest, forward hard-drive sector, and forward multiplex hash digest. Still further, the two or more different hash digests may be based off of the same or different hash algorithms. In step 1712, the Modulo-Hash Indirect-Addressing Pointer (a, b, c, d, e, f) is generated for each blockchain block based on the following equations:

Pointer $a$=FWD HASH DIGEST MODULO PRIME NUMBER $Pa$;

Pointer $b$=REV HEX HASH DIGEST MODULO PRIME NUMBER $Pb$;

Pointer $c$=REV BYTE HASH DIGEST MODULO PRIME NUMBER $Pc$;

Pointer $d$=HEX FWD-REV MULTIPLEX HASH DIGEST MODULO PRIME NUMBER $Pd$;

Pointer $e$=REV HDD SECTOR HASH DIGEST MODULO PRIME NUMBER $Pe$; and

Pointer $f$=REV BIT HASH DIGEST MODULO PRIME NUMBER $Pf$.

Each of the above listed pointers is one dimension for a Modulo-Hash Indirect-Addressing Pointer. In total, six dimensions are listed above. It is desirable to have at least two different hash digests from a blockchain to have a two-dimensional Modulo-Hash Indirect-Addressing Pointer. In step 1714 the blockchain data for a blockchain block is stored at various locations within a data store or a distributed network. The actual storage address of the blockchain data for the blockchain block is stored within a cell of the Fast Search Index that is pointed to by the Modulo-Hash Indirect-Addressing Pointer. As such, it becomes possible to provide an extremely fast search capability for locating the actual storage address of a desired blockchain data set from the data store because it is not necessary to search millions or billions of addresses for the desired address. Instead, the actual storage address is found in the Fast Search Index by generating the specific indirect addressing pointer, a Modulo-Hash Indirect-Addressing Pointer, directly from the hash digests contained within the Blockchain Metadata Table. In order to generate these Modulo-Hash Indirect-Addressing Pointers it is necessary to know the original prime numbers used to compute the pointer for each dimension. These prime numbers are stored within the Fast Search Index. The process ENDS with step 1716.

FIG. 12D depicts a flow chart 1800 illustrating a process for searching for and reading a stored big data blockchain using indirect address pointers based on blockchain hash digests. Once blockchain data for each block of a blockchain is stored within a data store or across a distributed network, it becomes desirable at a future point to be able to search for, locate, and read that stored blockchain data. FIG. 12D provides one exemplary process for searching for, locating, and reading stored blockchain data for big data blockchains. The process begins with START 1802. In step 1804, a search is initiated for blockchained data from a particular blockchain block within a blockchain. Then in step 1806, process 1800 accesses the Blockchain Metadata Table to access the forward and reverse hash digests for the desired blockchain block and also access the identifier for the blockchain that contains the blockchain block that contains the desired blockchained data. In step 1808, process 1800 accesses the Fast Search Index that corresponds to the identifier for the blockchain that contains the searched for blockchained data. From the Fast Search Index, process 1800 recovers the prime numbers previously used to generate the Modulo-Hash Indirect-Addressing Pointers in order to regenerate them for the particular blockchain block that is being searched for using the forward and reverse hash digests accessed from the Blockchain Metadata Table. Step 1808 regenerates, i.e. recalculates the Modulo-Hash Indirect-Addressing Pointers using the recovered prime numbers. In step 1810, process 1800 accesses a Fast Search Index cell using the recalculated Modulo-Hash Indirect-Addressing Pointer. The accessed Fast Search Index cell is uniquely pointed to by the recalculated Modulo-Hash Indirect-Addressing Pointer. The accessed Fast Search Index cell contains the actual storage address of the searched for blockchain data for the particular blockchain block within the blockchain. In step 1812, process 1800 accesses the data store and uses the actual storage address from the cell within the Fast Search Index to locate and read the blockchained data at that storage address. The process then ENDS in step 1814.

FIG. 12E illustrates a block diagram illustrating a process for searching for and reading a stored big data blockchain using indirect address pointers based on blockchain hash digests through the use of a blockchain diagram 1620, a Blockchain Metadata Table 1628, Fast Search Index 1636, and block diagram of a data store 1642 having storage drives 1646 and cloud access 1644. FIG. 12E is a search and read schematic process diagram that corresponds to the storage schematic process diagram shown in FIG. 12B and illustrates the process 1800 shown in FIG. 12D. Blockchain 1620 is depicted for illustrative purposes as having three blockchain blocks 1622, 1624, and 1626. Each blockchain block 1622, 1624, and 1626 has blockchain metadata that includes an identifier for the entire blockchain 1620, an identifier for the specific blockchain block 1622, 1624, or 1626, and blockchain hash digests based on blockchain data stored within each blockchain block 1622, 1624, or 1626. Each blockchain block 1622, 1624, and 1626 desirably has two or more hash digests, such as a forward and a reverse hash digest. The blockchained data may be any form of digital data that is secured with a blockchain technology. The blockchained data may be medical records, financial records, legal records, transactions, software, media such as digital movies or music, or any other form of digital data. It is contemplated that the blockchained data may constitute very large volumes of data encompassing millions or billions of data objects, each of which would be stored in its own blockchain block resulting in blockchains possessing millions or billions of blockchain blocks. Blockchain Metadata Table 1628 and Fast Search Index are used to store these millions or billions of different blockchain data objects within data store 1642. When the millions or billions of blockchain data objects are stored within data store 1642, each blockchain data object has an actual storage address that is recorded within Fast Search Index 1636 at a cell 1638 within the Fast Search Index 1636 that is pointed to by Modulo-Hash Indirect-Addressing Pointer associated with that specific stored blockchain data object. These Modulo-Hash Indirect-Addressing Pointers are generated from the hash digests 1634 for each blockchain block that are acquired from the Blockchain Metadata Table 1628 using prime numbers 1640 listed in the Fast Search Index 1636. The Blockchain Metadata Table 1628 includes an identifier for the entire blockchain 1630, a listing of identifiers 1632 for each blockchain block 1622, 1624, and 1626 within the blockchain 1620, and the listing of all forward and reverse hash digests used for each blockchain block 1634. The Blockchain Metadata Table 1636 identifies specific blockchains and blockchain blocks within those blockchains. By first accessing the specific hash digests for a particular blockchain block, it is possible to generate the indirect addressing pointers to find the actual storage address of where the blockchained data for that particular blockchain block is stored within the data store 1642 from the Fast Search Index 1636. In this manner, it is possible to rapidly identify the actual storage address for the stored blockchained data by generating the indirect addressing pointer from the hash digests as opposed to searching through millions or billions of blockchain identifiers in a conventional search table. With reference to FIGS. 12D and E, a search for blockchained data stored within data store 1642 would begin by looking up the Blockchain Metadata Table 1628 to acquire the identifier of the blockchain in question in order to access the correct Fast Search Index 1636 that corresponds to that blockchain. The search would also include accessing the blockchain hash digests for the blockchained data being searched for in order to generate the Modulo-Hash Indirect-Addressing Pointer. The generated Modulo-Hash Indirect-Addressing Pointer is created in part by using the prime numbers 1640 recorded in the Fast Search Index. The Modulo-Hash Indirect-Addressing Pointer is used to directly access the cell within the Fast Search Index 1636 that contains the actual storage location of the stored blockchain data within the data store 1642. Equipped with the actual storage address, the search process leads to a read process where the located blockchain data is accessed and read.

FIG. 12F depicts a flow chart 1900 illustrating a process for searching and reading a big data blockchain with indirect addressing pointers based on hash digests. Flow chart 1900 provides a more detailed process of search and reading stored blockchain data discussed in FIGS. 12D and 12E with respect to the generation of the Modulo-Hash Indirect-Addressing Pointers used to access the Fast Search Index for the actual storage address of searched for blockchain data stored on a data store or distributed network. The process begins with START 1902. In step 1904, a READ command is received for reading blockchain data from a particular blockchain block in a blockchain that is stored in the data store or on a distributed network. In step 1906, process 1900 accesses a Blockchain Metadata Table to acquire the identifier for the blockchain in order to access the correct Fast Search Index. Also in step 1906, process 1900 accesses that Fast Search Index corresponding to the blockchain identifier from the Blockchain Metadata Table and acquires the listed prime numbers. Also in step 1906, process 1900 accesses the hash digests for the searched for blockchain block in order to generate the Modulo-Hash Indirect-Addressing Pointer using the prime number from the Fast Search Index and the hash digests from the Blockchain Metadata Table. The hash digests used to generate the Modulo-Hash Indirect-Addressing Pointer are accessed in step 1908. These hash digests may include forward and reverse hash digests. In step 1910, the Modulo-Hash Indirect-Addressing Pointer (a, b, c, d, e, f) is regenerated for the search process based upon the following equations:

Pointer $a$=FWD HASH DIGEST MODULO PRIME NUMBER $Pa$;

Pointer $b$=REV HEX HASH DIGEST MODULO PRIME NUMBER $Pb$;

Pointer $c$=REV BYTE HASH DIGEST MODULO PRIME NUMBER $Pc$;

Pointer $d$=HEX FWD-REV MULTIPLEX HASH DIGEST MODULO PRIME NUMBER $Pd$;

Pointer $e$=REV HDD SECTOR HASH DIGEST MODULO PRIME NUMBER $Pe$; and

Pointer $f$=REV BIT HASH DIGEST MODULO PRIME NUMBER $Pf$.

In step 1912, process 1900 utilizes the regenerated Modulo-Hash Indirect-Addressing Pointer from step 1910 to directly access the cell in the Fast Search Index that stores the actual storage address of the blockchained data being searched for. If more than one set of blockchain data is located within the cell pointed to by the Modulo-Hash Indirect-Addressing Pointer, then process 1900 utilizes the hash digests accessed from the Blockchain Metadata Table to identify the correct set of data being searched for from the subset of blockchain data returned by the Modulo-Hash Indirect-Addressing Pointer. This is a two-step search process. The second step using the hash digests to identify the correct blockchain data is extremely fast as it is being performed on a small subset of data identified by the initial search process using the Modulo-Hash Indirect-Addressing Pointer. Having to search all of the blockchain data with hash digests for a big data blockchain that may encompass billions of data objects would provide prohibitively resource consuming and lengthy in time compared to this two-step process where the vast number of data objects is narrowed to a much smaller subset to search through the use of the Modulo-Hash Indirect-Addressing Pointer. This two-step search process is discussed more fully in FIGS. 12G, 12H, and 12I and processes 2100 and 2200. In step 1914, process 1900 uses the actual storage address accessed from the Fast Search Index to locate and read the blockchained data for the particular blockchain block searched for from the data store or distributed network. The process ENDS with step 1916.

FIG. 12G illustrates a block diagram 2000 for the search of blockchain block data from a large set of big data blockchain blocks 2002 using a two-step search process that first includes the use of indirect addressing pointers derived from hash digests of the blockchain blocks 2004 and then secondly includes the use of hash digests to identify the desired blockchain block data 2006 if necessary to identify a searched for set of blockchain block data 2008. FIG. 12G provides a schematic perspective of the two-step search process discussed in FIG. 12F step 1912. A large set of blockchain data 2002 is shown entering trapezoid 2004, which represents a funnel. Step 2004 represents the first search process discussed in FIG. 12F step 1912. Step 2004 discloses the use of a modulo-hash indirect-addressing pointer to reduce the large set of blockchain block data to a single set of blockchain block data set or a vastly smaller subset of the large set blockchain block data. This first search process using the a modulo-hash indirect-addressing pointer may identify a single set of blockchain data 2008, which is the searched for data set 2008, in which case the process then ends. This first search process using the a modulo-hash indirect-addressing pointer may also produce a search result that includes more than one set of blockchain block data, which is a vastly smaller subset of the large set blockchain block data 2002. A decision step 2005 determines whether the modulo-hash indirect-addressing pointer points to more than one blockchain block. If a subset of blockchain block data containing multiple blockchain blocks is returned as a search result by process 2004, that subset that must be filtered through a second process, shown as step 2006, in order to identify the desired single blockchain data set 2008 from the subset. The second search process 2006 uses the forward and reverse hash digests from the Blockchain Metadata Table to identify the desired blockchain block data 2008 from the remaining subset of blockchain blocks. The first search process 2004 is discussed more fully in FIG. 12H as process 2100. The second search process 2006 is discussed more fulling in FIG. 12I as process 2200.

FIG. 12H depicts a flow chart 2100 illustrating a two-step process for searching big data blockchains using hash digests if necessary after indirect addressing pointers have narrowed the big data blockchain set to a smaller subset or single blockchain block. The two-step search process discussed in FIG. 12G is discussed in more detail in FIGS. 12H and 12I. The indirect address search process STARTS in step 2102. In step 2104, process 2100 accessed a Fast Search Index and searches for the actual storage address of a desired set of blockchain block data using regenerated a modulo-hash indirect-addressing pointer created from the hash digests of the desired set of blockchain block data. In step 2106, process 2100 determines whether the modulo-hash indirect-addressing pointer points to more than one set of blockchain block data. If the modulo-hash indirect-addressing pointer points to a cell within the Fast Search Index with an actual storage address for a single set of blockchain block data, then the process proceeds to step 2110 where its reads the located blockchain block data from the data store with the actual storage address located from the Fast Search Index with the modulo-hash indirect-addressing pointer. However, it is possible that there may be more than one actual storage address within the cell of the Fast Search Index because the modulo-hash indirect-addressing pointer points to more than one set of blockchain block data. If the modulo-hash indirect-addressing pointer points to more than one set of blockchain block data actual storage addresses, process 2100 goes to step 2108 where it uses the hash digests for the search for set of blockchain block data from the Blockchain Metadata Table to identify the correct searched for set of blockchain block data from the subset of blockchain block data returned by step 2104. Once the single set of searched for blockchain block data is identified in step 2108 using the hash digests from the Blockchain Metadata Table, process 2100 proceeds to step 2110 where it accesses and reads the located blockchain block data from the data store using the actual storage address. The process then ENDS in step 2112.

FIG. 12I depicts a flow chart 2200 illustrating a processing of using hash digests to select a single blockchain block from a subset of blockchain blocks retrieved through the use of indirect addressing pointers. The process begins with START in step 2202. In step 2204, the search process has gone through process 2100 in FIG. 12H to step 2106 and has determined that the modulo-hash indirect-addressing pointer points to more than one blockchain block data set. In step 2204, the search process accesses a subset of blockchain block data identified by the address search process 2100 from FIG. 12H that contains more than one set of blockchain block data. In step 2206, the search process utilizes the forward hash digest from Blockchain Metadata Table used to generate the modulo-hash indirect-addressing pointer for the search to identify the specific blockchain block data set that matches it, thereby identifying the specific set of blockchain block data being searched for. In step 2208, the search process determines whether the forward hash digest from the Blockchain Metadata Table identifies a single blockchain block data set from the remaining subset of files. If the forward hash digest does identify one and only one blockchain block data set, then the process proceeds to step 2216 where it accesses and reads the identifies blockchain block data file and returns it as a search result. However, if the forward hash digest identifies more than one set of blockchain block data due to the fact that there is a collision between those identified blockchain block data sets, the process proceeds to step 2210 where it accesses a reverse hash digest for the searched for blockchain block data set from the Blockchain Metadata Table for use in identifying the specific set of blockchain block data. In step 2212, the search process determines whether the reverse hash digest is capable of identifying a single set of blockchain block data that corresponds to the reverse hash digest, thereby identifying the single set of blockchain block data being searched for. If the reverse hash digest does identify a single set of blockchain block data, the search process accesses and reads the identified blockchain block data file and returns it as a search result in step 2216. However, if there is still a collision between multiple blockchain block data files with the use of the reverse hash digest, the process proceeds to step 2214 where the search process accesses an additional different type of reverse hash digest from the first type used in step 2210 to identify the single specific blockchain block data set that is being searched for. The process then proceeds back to step 2212 to determine if this additional different type of reverse hash digest obtained from the Blockchain Metadata Table was able to identifying a single set of blockchain block data. If this additional process could not identify a single set of blockchain block data, the process continues in a loop with step 2214 gathering additional different types of reverse hash digests from the Blockchain Metadata Table to identify a single blockchain block data set. Once in step 2212 it is determined that the reverse hash digests were able to identify a single set of blockchain block data, the process proceeds to step 2216 to access and read the identified blockchain block data set and return it as a search result. The process then ENDS in step 2218.

FIG. 12J illustrates a blockchain table 2300 or two indirect addressing pointers based on forward and reverse hash digests that includes columns for a blockchain block data identifier 2301 for six data messages subject to data collisions, the type of MD5 hash digest created 2302, a listing of the hexadecimal value of the MD5 blockchain hash digest 2303, and a listing of the modulo-hash indirect-addressing pointer where 7 is used as a common modulo prime number 2304. For table 2300, the number seven, a Mersenne prime, was chosen as a common prime. Table 2300 lists in column 2302 and 2303 that two different hash digests were used, identified in 2302 as a forward hash digest and a reverse hex hash digest. As there are two different hash digests, the modulo-hash indirect-addressing pointer has two-dimensions, identified as (a, b), which are two values each separately created using modulo arithmetic on the two different hash digests listed in column 2303. Cell 2305 identifies message M1 as being the subject blockchain block data identifier. Cell 2306 identifies M1F as the forward hash digest and M1RH as the reverse hex hash digest as the hash digests that are provided in cell 2307 for message M1. Cell 2308 provides that the modulo-hash indirect-addressing pointer for M1 is (1,0) for mod(7), which is the modulo arithmetic of the hash digests using modulo(7). Cell 2309 provides M2 as the blockchain block data identifier. Cell 2310 identifies M2F as the forward hash digest and M2RH as the reverse hex hash digest as the hash digests that are provided in cell 2311 for message M2. Cell 2311 lists the forward hash digest and reverse hex hash digest for message M2. Cell 2312 provides that the modulo-hash indirect-addressing pointer for M2 is (1,3) for mod(7), which is the modulo arithmetic of the hash digests using modulo(7). Cell 2313 identifies message M3 as being the subject blockchain block data identifier. Cell 2314 identifies M3F as the forward hash digest and M3RH as the reverse hex hash digest as the hash digests that are provided in cell 2315 for message M3. Cell 2316 provides that the modulo-hash indirect-addressing pointer for M3 is (6,5) for mod(7), which is the modulo arithmetic of the hash digests using modulo(7). Cell 2317 identifies message M4 as being the subject blockchain block data identifier. Cell 2318 identifies M4F as the forward hash digest and M4RH as the reverse hex hash digest as the hash digests that are provided in cell 2319 for message M4. Cell 2320 provides that the modulo-hash indirect-addressing pointer for M4 is (6,3) for mod(7), which is the modulo arithmetic of the hash digests using modulo(7). Cell 2321 identifies message X509-C1 as being the subject blockchain block data identifier. Cell 2322 identifies X509-C1F as the forward hash digest and X509-C1RH as the reverse hex hash digest as the hash digests that are provided in cell 2323 for message X509-C1. Cell 2324 provides that the modulo-hash indirect-addressing pointer for X509-C1 is (2,3) for mod(7), which is the modulo arithmetic of the hash digests using modulo(7). Cell 2325 identifies message X509-C2 as being the subject blockchain block data identifier. Cell 2326 identifies X509-C2F as the forward hash digest and X509-C2RH as the reverse hex hash digest as the hash digests that are provided in cell 2327 for message X509-C2. Cell 2328 provides that the modulo-hash indirect-addressing pointer for X509-C2 is (2,2) for mod(7), which is the modulo arithmetic of the hash digests using modulo(7). The ordered pair (a,b) designating the modulo-hash indirect-addressing pointer is calculated with a Python program provided in FIG. 12P, the results of which are provided in FIGS. 12Q and 12R. As shown in FIGS. 12P, 12Q, 12R, the (a,b) ordered pair comprising the search pointer for Message M1 is given within the print statement as (M1F % 7, M1RH % 7), where % represents the modulo operator and the prime number is "7." M1F % 7 and M1RH % 7 can be calculated in parallel, via separate arithmetic processors, for better performance. The (a,b) ordered pair for M1 is given by the following snippet of Python code:

M1F=0x79054025255FB1A26E4BC422AEF54EB4;
M1RH=0x1FE11FD08C5AADC2B70059FB097C4433;
print(M1F % 7, M1RH % 7);

The search pointer calculated via this modulo integer arithmetic on the forward and hexadecimal-reverse blockchain hash digests is (1,0) for message M1. In the Python output provided in FIG. 12Q, the ordered pair (a,b) is shown as (1L, 0L), where the suffix "L" indicates that long-integers were used within Python to represent the blockchain hash digests due to their long lengths. The Python code used to calculate the all search pointers, such as in column 2304, is in FIG. 12P with the outputs being provided in FIGS. 12Q and 12R.

FIG. 12K illustrates a diagram of a Fast Search Index 2350 where forward and reverse hash digests of messages are used to generate two-dimensional modulo-hash indirect-addressing pointers (a,b) with 7 as a common modulo prime number. Messages M1, M2, M3, and M4 as well as X.509 certificates C1 and C2 stored in a 7×7 array 2350, which is the Fast Search Index, having forty-nine "cells" 2352 arranged in a "square," two-dimensional, "planar" array. FIG. 12K illustrates the Fast Search Index 2350 for the messages and modulo-hash indirect-addressing pointers listed in table 2300 in FIG. 12J. The columns are designated from a=0 to a=6 and the rows are designated from b=0 to b=6, due to the use of the Mersenne prime number "7" for both the forward and hexadecimal-reverse hash digests. A larger or smaller prime number could have been used. Different prime numbers could have been used for forward and hexadecimal-reverse hash digests, to create a "rectangular," two-dimensional, "planar" array. For example, a Sofie Germain prime number could be used for the modulo of one hash digest and the corresponding Sofie Germain safe prime could be used for the modulo of the other hash digest. Positive, non-prime integers could have been used as well, but prime numbers are preferred. Messages M1, M2, M3, and M4 as well as X.509 certificates C1 and C2 stored Fast Search Index 2350 based upon the two-dimensional modulo-hash indirect-addressing pointers (a,b) listed in column 2304 of table 2300 from FIG. 12J. Fast Search Index 2350 includes a blockchain identifier linking it to a particular blockchain for identification and search. Fast Search Index 2350 also includes a listing of the prime numbers used to generate the modulo-hash indirect-addressing pointers where prime number Pa=7 and prime number Pb=7. Each two-dimensional modulo-hash indirect-addressing pointer (a,b) points to a single cell 2352 of 49 cells 2352 in Fast Search Index 2350. In an indirect addressing scheme, each cell 2352 contains the actual storage addresses of the identified messages M1, M2, M3, M4 and X.509 certificates C1 and C2 in a data store or a distributed network, for example. Using the two-dimensional modulo-hash indirect-addressing pointer (a,b) in combination with the Fast Search Index therefore allows for the direct accessing of the actual storage address from the Fast Search Index. Not only are there modulo-hash indirect-addressing pointers (a,b) to messages M1, M2, M3, M4 and X.509 certificates C1 and C2, but these are fast pointers. If array 2350 held 4,900 blockchain objects, then approximately 100 blockchain objects would be in each of the forty-nine cells 2352. The (a,b) pointer identifies the cell containing the desired object. While there are invariably other objects in the same cell, it is substantially faster and less resource intensive to search through a subset of roughly 100 objects in the one cell 2352 identified via modulo(P) arithmetic, rather than all 4,900 objects. Thus, the two-dimensional modulo-hash indirect-addressing pointer (a,b) is a fast pointer. If cell 2352 contains a single set of data, such as the one (1,0), then only the two-dimensional modulo-hash indirect-addressing pointer (1,0) is required to identify the actual storage address in conformance with process 2100 and the secondary process 2200 using the hash digests is not required. If cell 2352 contained more than one set of blockchain block data, not shown in FIG. 12J, then the secondary search process 2200 using the hash digests would be needed to search through and find the desired set of blockchain block data.

FIG. 12L illustrates a blockchain table 2360 for three indirect addressing pointers based on forward, hex-reverse, and byte-reverse hash digests that includes columns for a blockchain block data identifier 2361 for four data messages subject to data collisions, the type of MD5 hash digest created 2362, a listing of the hexadecimal value of the MD5 blockchain hash digest 2363, and a listing of the modulo-hash indirect-addressing pointer 2364 where 3 is used as a common modulo prime number. Three, is a Mersenne prime and a Fermat prime number and a Sophie Germain prime number. Positive, non-prime integers could have been used as well, but prime numbers are preferred. The Python code used to calculate the all search pointers, such as in column 2364, is in FIG. 12P with the outputs being provided in FIGS. 12Q and 12R. Column 2361 provides the blockchain identifier for the messages M1 2365, M2 2369, M3 2373, and M4 2377. Column 2362 provides the type of MD5 hash digests used for each of the messages. For message M1, the hash digests M1F, M1RH, and M1RB were used as noted in cell 2366. For message M2, the hash digests M2F, M2RH, and M2RB were used as noted in cell 2370. For message M3, the hash digests M3F, M3RH, and M3RB were used as noted in cell 2374. For message M4, the hash digests M4F, M4RH, and M4RB were used as noted in cell 2378. Column 2363 provides the hexadecimal value of the MD5 hash digests. Cell 2367 provides the hexadecimal value of the MD5 hash digests for M1F, M1RH, and M1RB. Cell 2371 provides the hexadecimal value of the MD5 hash digests for M2F, M2RH, and M2RB. Cell 2375 provides the hexadecimal value of the MD5 hash digests for M3F, M3RH, and M3RB. Cell 2379 provides the hexadecimal value of the MD5 hash digests for M4F, M4RH, and M4RB. Column 2364 provides the modulo-hash indirect-addressing pointer using three as a common number in the format (a, b, c) where a is the pointer based on the forward hash digest, b is the pointer based on the reverse hexadecimal hash digest, and c is the pointer based on the reverse-byte hash digest. For message M1, the modulo-hash indirect-addressing pointer is (2, 1, 0) as shown in cell 2368. For message M2, the modulo-hash indirect-addressing pointer is (2, 2, 2) as shown in cell 2372. For message M3, the modulo-hash indirect-addressing pointer is (1, 0, 0) as shown in cell 2376. For message M4, the modulo-hash indirect-addressing pointer is (1, 0, 2) as shown in cell 2380. An example code snippet for search pointer 2372 first lists the forward blockchain hash digest M2F in hexadecimal, then lists the hexadecimal-reverse blockchain hash digest M2RH in hexadecimal, and finally the byte-reverse blockchain hash digest M2RB. The designation of the respective hash digests as hexadecimal is done by the "0x" prefix within Python. Then the (a,b,c) ordered triplet comprising the search pointer for Message M2 is given within the print statement as (M2F % 3, M2RH % 3, M2RB % 3), where % represents the modulo operator and the prime number is "3." It should be noted that M2F % 3, M2RH % 3, and M2RB % 3 may be calculated in parallel, via separate arithmetic processors, for better performance.

M2F=0x79054025255FB1A26E4BC422AEF54EB4;
M2RH=0x3573EA2BBB9AEF102E7C236A66B8028D;
M2RB=0xBF5BF87F65E79B98AF7985885F3E5EE0;
print(M2F % 3, M2RH % 3, M2RB % 3);

The search pointer calculated via this modulo integer arithmetic on the forward, hexadecimal-reverse, and byte-reverse blockchain hash digests is (2,2,2). In the Python output in FIG. 12Q and 12R, this is shown as ($2^L$, $2^L$, $2^L$), where the suffix "L" indicates that long-integers were used within Python to represent the blockchain hash digests due to their long lengths.

FIG. 12M illustrates a diagram of a Fast Search Index 2382 where forward, reverse-hex, and reverse-byte hash digests of messages are used to generate three-dimensional modulo-hash indirect-addressing pointers (a, b, c) with 3 as a common modulo prime number. FIG. 12M illustrates the Fast Search Index 2382 for the messages and modulo-hash indirect-addressing pointers listed in table 2360 in FIG. 12L. Fast Search Index 2382 includes a blockchain identifier linking it to the subject blockchain to enable the identification and searching of Fast Search Index 2382 based on an identifier from a blockchain. Fast Search Index 2382 also includes a listing of the prime numbers used for each dimension of the modulo-hash indirect-addressing pointer, where 3 is a common number: prime number Pa=3, prime number Pb=3, and prime number Pc=3. As this blockchain has three hash digests enabling for a three-dimensional modulo-hash indirect-addressing pointer, a three-sheet spreadsheet is used to form the Fast Search Index 2382. The actual storage addresses for messages M1, M2, M3, and M4 are stored within Fast Search Index 2382 at the cell pointed to by their respective modulo-hash indirect-addressing pointer. Fast Search Index 2382 is a 3×3×3 array having twenty-seven "cells" 2384 arranged in a "cubic," three-dimensional array. The actual storage address for message M1 within the data store or distributed network is stored within the cell (2, 1, 0) 2384, which is the modulo-hash indirect-addressing pointer given by cell 2368 from FIG. 12L. The actual storage address for message M2 within the data store or distributed network is stored within the cell (2, 2, 2) 2384, which is the modulo-hash indirect-addressing pointer given by cell 2372 from FIG. 12L. The actual storage address for message M3 within the data store or distributed network is stored within the cell (1, 0, 0) 2384, which is the modulo-hash indirect-addressing pointer given by cell 2376 from FIG. 12L. The actual storage address for message M4 within the data store or distributed network is stored within the cell (1, 0, 2) 2384, which is the modulo-hash indirect-addressing pointer given by cell 2380 from FIG. 12L. Modulo-has indirect addressing pointers (a,b,c) to messages M1, M2, M3, and M4 are fast pointers. If array 2382 held 2,700 blockchain objects, then approximately 100 blockchain objects would be in each of the twenty-seven cells 2384. The (a,b,c) pointer identifies the cell 2384 containing the desired object. While there are invariably other objects in the same cell 2384, it is vastly faster and less computationally intensive to search through a subset of roughly 100 objects in the one cell 2384 of 27 cells 2384 identified via modulo(P) arithmetic, rather than all 2,700 objects.

FIG. 12N illustrates a blockchain table 3000 for four indirect addressing pointers based on forward, reverse-hex, reverse-byte, and reverse-multiplex hash digests that includes columns for a blockchain block data identifier 3001 for two data messages subject to data collisions, the type of MD5 hash digest created 3002, a listing of the hexadecimal value of the MD5 blockchain hash digest 3003, and a listing of the modulo-hash indirect-addressing pointer 3004 where 5 is used as a common modulo prime number. The Python code used to calculate the all search pointers, such as in column 3004, is in FIG. 12P with the outputs being provided in FIGS. 12Q and 12R. The identifier M3 for message M3 is provided in cell 3005. In cell 3006, a listing of the types of MD5 hash digests is provided for message M3, which are a forward hash digest M3F, a reverse-hexadecimal hash digest M3RH, a reverse-byte hash digest M3RB, and a forward-reverse multiplex hash digest M3M. A listing of the hexadecimal values of the MD5 hash digests for message M3, is provided in cell 3007 for each of the four listed hash digests in cell 3006. The four different hash digests formed from message M3 allow for a four-dimensional modulo-hash indirect-addressing pointer in the form of (a, b, c, d), where dimension a is based on the forward hash digest, dimension b is based on the reverse-hexadecimal hash digest, dimension c is based on the reverse-byte hash digest, and dimension d is based on the multiplex hash digest. The four-dimensional modulo-hash indirect-addressing pointer for message M3 is given in cell 3008 as (1, 1, 3, 1). Cell 3009 contains the identifier M4 for message M4. Cell 3010 lists the four different MD5 hash digest types for message M4, which are a forward hash digest M4F, a reverse-hexadecimal hash digest M4RH, a reverse-byte hash digest M4RB, and a forward-reverse multiplex hash digest M4M. A listing of the hexadecimal values of the MD5 hash digests for message M4, is provided in cell 3011 for each of the four listed hash digests in cell 3010. The four-dimensional modulo-hash indirect-addressing pointer for message M4 is given in cell 3012 as (1, 1, 2, 1). The prime number used to create each dimension of the modulo-hash indirect-addressing pointer is 5 and is referred to as a common modulo prime. Each dimension (a,b,c,d) of the modulo-hash indirect-addressing pointer could have a different prime number. The use of primes is desirable, but not necessary. Any positive integer could be used. Five is both a Fermat prime number and a Sophie Germain prime number. The designation of the respective hash digests as hexadecimal is done by the "0x" prefix within Python. Then the (a,b,c,d) ordered quadruplet comprising the search pointer for Message M3 is given within the print statement as (M3F % 5, M3RH % 5, M3RB % 5, M3M % 5), where % represents the modulo operator and the prime number is "5." It should be noted that M3F % 5, M3RH % 5, M3RB % 5, and M3M % 5 may be calculated in parallel, via separate arithmetic processors, for better performance.

M3F=0x008EE33A9D58B51CFEB425B0959121C9;
M3RH=0x3727C41294872D676AA94C9D7AF81BFC;
M3RB=0x2058DE3D4C8C4928C530DDAD2E1EB753;
M3M=0xB4D921B30512C4541516EDABF0199A40;
print(M3F % 5, M3RH % 5, M3RB % 5, M3M % 5);

The search pointer calculated via this modulo integer arithmetic on the forward, hexadecimal-reverse, byte-reverse, and multiplex blockchain hash digests for message M3 is (1,1,3,1). In the Python output in FIGS. 12Q and 12R, this pointer is shown as (1L, 1L, 3L, 1L) for message M3, where the suffix "L" indicates that long-integers were used within Python to represent the blockchain hash digests, due to their long lengths. For message M4, the four-dimensional pointer is (1L, 1L, 2L, 1L) or simply (1,1,2,1) for message M4, per FIGS. 12Q and 12R. A larger or smaller prime number other than five could have been used for this four-dimensional analysis. Different prime numbers could have been used for forward, hexadecimal-reverse, byte-reverse, and multiplex hash digests. Positive, non-prime integers could have been used in FIGS. 12J-12W as well instead of prime numbers, but prime numbers are preferred.

FIG. 12O illustrates a diagram of a Fast Search Index 3020 having cells 3222 where forward, reverse-hex, reverse-byte, and reverse-multiplex hash digests are used to generate four-dimensional modulo-hash indirect-addressing pointers with 5 as a common modulo prime number. Fast Search Index 3020 is a four-dimensional array having 625 cells (5*5*5*5). FIG. 12O illustrates the Fast Search Index 3020 for the messages and modulo-hash indirect-addressing pointers listed in table 3000 in FIG. 12N. Fast Search Index 3020 includes the blockchain identifier for the blockchain or blockchains that are associated with the Fast Search Index 3020. Fast Search Index 3020 also includes a listing of the modulo prime numbers used to generate the modulo-hash indirect-addressing pointers for each of the blockchain blocks as listed in table 3000 from FIG. 12N. The four-dimensional modulo-hash indirect-addressing pointer for message M3 is (1, 1, 3, 1) as shown in table 3000 of FIG. 12N. The actual storage address for message M3 is listed in Fast Search Index 3020 at the cell location 3222 in the index pointed to by modulo-hash indirect-addressing pointer (1, 1, 3, 1). Using pointer (1, 1, 3, 1) with Fast Search Index 3020 gives the actual storage address for message M3. Modulo-hash indirect-addressing pointer (1, 1, 3, 1) identifies a single cell 3222 of 625 cells 3222 within Fast Search Index 3020 that contains the actual storage address of message M3. The four-dimensional modulo-hash indirect-addressing pointer for message M4 is given in table 3000 from FIG. 12N as (1, 1, 2, 1). Modulo-hash indirect-addressing pointer (1, 1, 2, 1) identifies a single cell 3222 within Fast Search Index 3020. The cell 3222 pointed to by pointer (1,1,2,1) contains the actual storage address of message M4. The prime number used to create each dimension (a,b,c,d) of the modulo-hash indirect-addressing pointers for messages M3 and M4 is 5 and is referred to as a common modulo prime. Each dimension (a,b,c,d) of the modulo-hash indirect-addressing pointer could have a different prime number. The use of primes is desirable, but not necessary. Any positive integer could be used. Five is both a Fermat prime number and a Sophie Germain prime number. The modulo-hash indirect addressing pointers (a,b,c,d) to messages M3 and M4 are not just pointers, but they are fast pointers. Fast Search Index 3020 is a four-dimensional array having 625 cells (5*5*5*5) and if it held 65,000 blockchain objects, then approximately 100 blockchain objects would be in each of the 625 cells. Each modulo-hash indirect-addressing pointer points to a single cell 3222 within Fast Search Index 3020. However, each cell 3222 may contain more than one actual storage address for more than one data object. The modulo-hash indirect addressing pointers (a,b,c,d) identify the cell of the Fast Search Index 3020 that contains the actual storage address of the desired data object in a data store for distributed network. While there are invariably other objects in the same cell in this example, it is vastly faster and computationally easier to search through a subset of roughly 100 objects in the one cell 3222 identified via modulo(P) arithmetic rather than all 65,000 objects. The use of the modulo-hash indirect-addressing pointer thereby vastly narrows the number of data objects that must be searched through. The remaining 100 objects are searched through using the actual hash digests of the sought-after data object to identify it as discussed in FIG. 12I.

FIG. 12P illustrates a PYTHON program for generating modulo-hash indirect-addressing pointers. The modulo-hash indirect-addressing pointers used for messages M1, M2, M3, M3, X.509-C1 and X.509C2 for FIGS. 12J-12O were calculated using the Python program provides in FIG. 12P. To execute the Python code in FIG. 12P on an iMAC computer, access the iMAC and go to Go→Utilities→Terminal to start a terminal session. Within the terminal session, type PYTHON to begin an online Python session. Paste the Python code from FIG. 12P into the Online Session starting at >» and the Python code will automatically execute and give the results shown in FIGS. 12J-12O, as well as FIGS. 12Q and 12R. FIGS. 12Q and 12R provide the output of the PYTHON program in FIG. 12P which is the generated sets of modulo-hash indirect-addressing pointers. The modulo-hash indirect-addressing pointers for M1, M2, M3, M3, X.509-C1 and X.509C2 in FIGS. 12J-12O are listed in FIGS. 12Q and 12R. The output for modulo-hash indirect-addressing pointers (a,b), (a,b,c), and (a,b,c,d) is given in the form (aL,bL), (aL,bL,cL), and (aL,bL,cL,dL) where the suffix "L" indicates that long-integers were used within Python to represent the blockchain hash digests, due to their long lengths. For example for message M4, the four-dimensional pointer is calculated in FIGS. 12Q and 12R as (1L, 1L, 2L, 1L), but is simplified to (1,1,2,1).

FIGS. 12S-12W illustrate processes and diagrams illustrating the use of modulo-hash direct-addressing pointers where the modulo-hash direct-addressing pointer points directly to the storage location of the desired object. In FIGS. 12S-12W, no intermediary Fast Search Index is used. FIG. 12S depicts a flow chart 3100 illustrating a process for the storage of big data blockchains using modulo-hash direct-addressing pointers based on hash digests. The process begins with START in step 3102. In step 3104, process 3100 accessing a blockchain from memory. In step 3106, process 3100 accesses the forward hash digests and reverse hash digests from each blockchain block. The forward hash digest may include one or more forward hash digests such as a hexadecimal-forward hash digest, a byte-forward hash digest, a bit-forward hash digest, a reverse-forward multiplex hash digest, or a hard disk drive sector forward hash digest. The reverse hash digest may include one or more reverse hash digests such as a hexadecimal-reverse hash digest, a byte-reverse hash digest, a bit-reverse hash digest, a forward-reverse multiplex hash digest, or a hard disk drive sector reverse hash digest. In step 3108, process 3100 generates a modulo-hash direct-addressing pointer (a,b,c,d, e,f) for each blockchain block based on the following equations:

Pointer $a$=FWD HASH DIGEST MODULO PRIME NUMBER $Pa$;

Pointer $b$=REV HEX HASH DIGEST MODULO PRIME NUMBER $Pb$;

Pointer $c$=REV BYTE HASH DIGEST MODULO PRIME NUMBER $Pc$;

Pointer $d$=HEX FWD-REV MULTIPLEX HASH DIGEST MODULO PRIME NUMBER $Pd$;

Pointer $e$=REV HDD SECTOR HASH DIGEST MODULO PRIME NUMBER $Pe$; and

Pointer $f$=REV BIT HASH DIGEST MODULO PRIME NUMBER $Pf$.

The creation of a six-dimensional modulo-hash direct-addressing pointer based on the above equations is merely exemplary. A two-dimensional modulo-hash direct-addressing pointer based on any two different hash digests on the same data message may be created. A three-dimensional modulo-hash direct-addressing pointer based on any three different hash digests on the same data message may be created. A four-dimensional modulo-hash direct-addressing pointer based on any four different hash digests on the same data message may be created. A five-dimensional modulo-hash direct-addressing pointer based on any five different hash digests on the same data message may be created and so on. In step 3110, process 3100 stores the blockchain block data for each blockchain block within a data store or a distributed network at the actual storage location indicated by the modulo-hash direct-addressing pointer for each blockchain block calculated in step 3108. The process then ENDS in step 3112.

FIG. 12T illustrates a tabular block diagram 3120 showing the addressing of storage volumes and where messages are stored based on two-dimensional modulo-hash direct-addressing pointers derived from their respective forward and reverse hash digests where 7 is a common modulo prime number. In FIG. 12T, the two-dimensional modulo-hash direct-addressing pointers have the same values as do the two-dimensional modulo-hash indirect-addressing pointers from FIG. 12J. However, where the two-dimensional modulo-hash indirect-addressing pointers point to a Fast Search Index that stores the actual storage locations of the blockchain block data, the two-dimensional modulo-hash direct-addressing pointers point directly to the actual storage location of the desired blockchain block data. As can be seen in FIG. 12T, diagram 3120 shows how the two-dimensional modulo-hash direct-addressing pointers points to dedicated memory storage volumes 3122. Dedicated memory storage volumes 3122 could be individual solid-state storage chips such as EEPROM (Electrically Erasable, Programmable, Read-Only Memory), solid state devices (SSD), hard disk drives (HDD), optical disks such as DVD, clouds, or tape cartridges. The modulo-hash direct-addressing pointers used for direct addressing in FIG. 12T are the same as their modulo-hash indirect-addressing pointer counter parts calculated in FIG. 12J, but instead point to a dedicated storage volume instead of an indirect addressing table such as the Fast Search Index. The modulo-hash direct-addressing pointers for FIG. 12T are two-dimensional and use the prime number 7 as a common modulo prime number for both dimensions of the pointer. Messages M1, M2, M3, M4, X.509-C1, X.509-C2 are shown stored in their respective dedicated storage volumes based on their respective calculated modulo-hash direct-addressing pointers.

Dedicated memory storage array 3120 with memory storage volumes 3122 may be a cloud storage, a plurality of cloud storage centers, a data store, distributed network, or any other data array. The two-dimensional modulo-hash direct-addressing pointers (a,b) for messages M1, M2, M3, M4, X.509-C1, X.509-C2 are not only direct addressing pointers, but they are fast pointers. If memory array 3120 held 4,900 blockchain objects, then approximately 100 blockchain objects would be in each of the forty-nine storage volumes 3122. The (a,b) pointer identifies the storage containing the desired data object as well as other data objects. While there are invariably other data objects in the same storage volume, it is vastly faster and computationally easier to search through a subset of roughly 100 objects in the one storage volume identified via modulo(P) arithmetic with the modulo-hash direct addressing pointer, rather than all 4,900 objects.

FIG. 12U illustrates a tabular block diagram 3124 showing the direct addressing of storage volumes and where messages are stored based on three-dimensional modulo-hash direct-addressing pointers derived from their respective forward, reverse-hex, and reverse-byte hash digests where 3 is a common modulo prime number. In FIG. 12U, the three-dimensional modulo-hash direct-addressing pointers (a,b,c) have the same values as do the three-dimensional modulo-hash indirect-addressing pointers from FIG. 12L. However, where the three-dimensional modulo-hash indirect-addressing pointers point to a Fast Search Index that stores the actual storage locations of the blockchain block data, the three-dimensional modulo-hash direct-addressing pointers point directly to the actual storage location of the desired blockchain block data. As can be seen in FIG. 12U, diagram 3124 shows how the three-dimensional modulo-hash direct-addressing pointers points to dedicated memory storage volumes 3126. Storage volumes 3126 may be individual solid-state storage chips such as EEPROM (Electrically Erasable, Programmable, Read-Only Memory), solid state devices (SSD), hard disk drives (HDD), optical disks such as DVD, clouds, or tape cartridges. The modulo-hash direct-addressing pointers used for direct addressing in FIG. 12U are the same as their modulo-hash indirect-addressing pointer counter parts calculated in FIG. 12L, but instead point to a dedicated storage volume instead of an indirect addressing table such as the Fast Search Index. The modulo-hash direct-addressing pointers for FIG. 12U are three-dimensional and use the prime number 3 as a common modulo prime number for the three dimensions of the pointer. Messages M1, M2, M3, and M4 are shown stored in their respective dedicated storage volumes based on their respective calculated modulo-hash direct-addressing pointers. Dedicated memory storage array 3124 with memory storage volumes 3126 may be a cloud storage, a plurality of cloud storage centers, a data store, distributed network, or any other data array. The three-dimensional modulo-hash direct-addressing pointers (a,b,c) for messages M1, M2, M3, and M4 are not only direct addressing pointers, but they are fast pointers. If storage array 3124 held 2,700 blockchain data objects, then approximately 100 blockchain objects would be in each of the twenty-seven storage volumes 3126. The (a,b,c) pointer identifies the storage volume 3126 containing the desired data object. While there are invariably other data objects in the same storage volume, it is vastly faster and less computationally intensive to search through a subset of roughly 100 objects in the one cell 2384 identified via modulo(P) arithmetic, rather than all 2,700 objects.

FIG. 12V illustrates a tabular block diagram 3128 showing the direct addressing of data storage in a two-dimensional array of clouds 3130, each of which contains a two-dimensional array of storage volumes 3132 where messages are stored based on four-dimensional direct-addressing pointers derived from their respective forward, reverse-hex, reverse-byte, and reverse-multiplex hash digests where 5 is a common prime number. In FIG. 12V, the four-dimensional modulo-hash direct-addressing pointers (a,b,c,d) have the same values as do the four-dimensional modulo-hash indirect-addressing pointers from FIG. 12N. However, where the four-dimensional modulo-hash indirect-addressing pointers point to a Fast Search Index that stores the actual storage locations of the blockchain block data, the four-dimensional modulo-hash direct-addressing pointers point directly to the actual storage location of the desired blockchain block data. As can be seen in FIG. 12V, diagram 3128 shows how the four-dimensional modulo-hash direct-addressing pointers points to dedicated two-dimensional arrays of clouds 3130 that each contain a two-dimensional array of memory storage volumes 3132. Storage volumes 3132 may be individual solid-state storage chips such as EEPROM (Electrically Erasable, Programmable, Read-Only Memory), solid state devices (SSD), hard disk drives (HDD), optical disks such as DVD, clouds, or tape cartridges. The modulo-hash direct-addressing pointers used for direct addressing in FIG. 12V are the same as their modulo-hash indirect-addressing pointer counter parts calculated in FIG. 12N, but instead point to a dedicated cloud and storage volume instead of an indirect addressing table such as the Fast Search Index. The modulo-hash direct-addressing pointers for FIG. 12V are four-dimensional and use the prime number 5 as a common modulo prime number for the four dimensions of the pointer. Messages M3 and M4 are shown stored in their respective dedicated clouds and storage volumes based on their respective calculated modulo-hash direct-addressing pointers. Dedicated memory storage array 3128 with clouds 3130 and memory storage volumes 3132 may be a cloud storage, a plurality of cloud storage centers, a data store, distributed network, or any other data array. The four-dimensional modulo-hash direct-addressing pointers (a,b,c,d) for messages M3 and M4 are not only direct addressing pointers, but they are fast pointers. Memory storage array 3128 is a four-dimensional array having 625 cells (5*5*5*5) and if it held 65,000 blockchain objects, then approximately 100 blockchain objects would be in each of the 625 storage volumes 3132 in each cloud 3130. Each modulo-hash direct-addressing pointer points to a single storage volume 3132 within a cloud 3130. However, each storage volume 3132 may contain more than one data object. While there are invariably other data objects in the same volume 3132 in this example, it is vastly faster and computationally easier to search through a subset of roughly 100 objects in the one volume 3132 identified via modulo(P) arithmetic rather than all 65,000 data objects. The use of the modulo-hash direct-addressing pointer thereby vastly narrows the number of data objects that must be searched through. The remaining 100 objects are searched through using the actual hash digests of the sought-after data object to identify it as discussed in FIG. 12I.

FIG. 12W depicts a flow chart 3200 illustrating a process for searching and reading big data blockchain blocks using modulo-hash direct-addressing pointers based on hash digests. Process 3200 begins with START in step 3202. In step 3204, process 3200 accesses a blockchain. In step 3206, process 3200 accesses the forward hash digest and reverse hash digests from a Blockchain Metadata Table for a searched for blockchain block where the reverse hash digests may include a reverse bit hash digest, reverse byte hash digest, reverse hexadecimal hash digest, reverse hard-drive sector, and reverse multiplex hash digest. Process 3200 uses these accessed hash digests from the Blockchain Metadata Table to generate modulo-hash direct-addressing pointers to locate the searched for blockchain block data in step 3208. The equations for generating an exemplary six-dimensional modulo-hash direct-addressing pointer are given below:

Pointer $a$=FWD HASH DIGEST MODULO PRIME NUMBER $Pa$;

Pointer $b$=REV HEX HASH DIGEST MODULO PRIME NUMBER $Pb$;

Pointer $c$=REV BYTE HASH DIGEST MODULO PRIME NUMBER $Pc$;

Pointer $d$=HEX FWD-REV MULTIPLEX HASH DIGEST MODULO PRIME NUMBER $Pd$;

Pointer $e$=REV HDD SECTOR HASH DIGEST MODULO PRIME NUMBER $Pe$; and

Pointer $f$=REV BIT HASH DIGEST MODULO PRIME NUMBER $Pf$.

The use of a six-dimensional modulo-hash direct-addressing pointer is exemplary. It is desirable to have a two-dimensional or higher modulo-hash direct addressing pointer based on two or more different types of hash digests based on the same data message. In step 3210, process 3200 reads the blockchain data for the searched for blockchain block within the data store at the location identified by the modulo-hash direct-addressing pointer. If more than one set of blockchain data resides that the storage location pointed to by the modulo-hash direct-addressing pointer, process 3200 utilizes the forward and reverse hash digests to identify the specific data desired in the search from the subset of data returned by the modulo-hash direct-addressing pointer.

Figure 12X:
FIG. 12X illustrates a table listing the number of individual data cells that are identified by the present indirect/direct addressing pointer system based on hash digests showing that up to $2.1*10^{37}$ different cells are provided with a Mersenne prime of 2147483647.

FIG. 12X illustrates a table 3220 listing the number of individual data cells that are identified by the present indirect/direct addressing pointer system based on hash digests showing that up to $2.1*10^{37}$ different cells are provided with a Mersenne prime of 2147483647. Table 3220 lists different values of prime numbers in the first column for use in modulo arithmetic. The second, third, and fourth columns of table 3220 show how the combination of those prime numbers from the first column with two-dimensional storage arrays, three-dimensional storage arrays, and four-dimensional storage arrays result in a number of unique cells or storage volumes that are pointed to by unique different pointers. FIG. 12X shows how larger Fermat and Mersenne prime numbers can result in fast pointers to massive numbers of data objects. For example, with the Fermat prime number 65537, a two-dimensional array formed has over four billion cells and pointers generated by the modulo (65537) integer arithmetic point directly to the desired location containing the desired data object based on the forward and hexadecimal-reverse hash digests. For Mersenne prime numbers larger than the Fermat prime number of 65537, the number of data objects that can have a fast pointer directly to them grows to over ten to the 37th power for a four-dimensional array, and that is not even when using the largest Mersenne or Sofie-Germain prime numbers. The prime numbers identified in table 3220 are merely exemplary, any prime number may be used for modulo arithmetic in combination with multi-dimensional storage arrays. In fact, any positive integer may be used for arithmetic in combination with multi-dimensional storage arrays. Table 3220 is merely provided to show how vast numbers of individual unique modulo-hash pointers may be created to store correspondingly large big data blockchains or other data structures and data sets. A data message may be any kind of data such as a spreadsheet, a multidimensional spreadsheet, executable code, pseudo code, email, data files, financial records, medical records, tax records, or any other form of data.

While the invention has been shown and described with reference to a particular embodiment thereof, it will be understood to those skilled in the art, that various changes in form and details may be made therein without departing from the spirit and scope of the invention.

The invention claimed is:

1. A non-transitory computer tangible medium storing instructions for a collision resistant process for signing a digital message with a digital signature, comprising the steps of:
generating a collision resistant hash digest set on a digital message that includes a first hash digest formed by hashing the entire digital message with a hash algorithm in a first order and a second hash digest formed by hashing the entire digital message with the hash algorithm in a second different order; and
appending a collision resistant digital signature based on the collision resistant hash digest set to the digital message.

2. The collision resistant process for signing a digital message with a digital signature of claim 1, whereby collisions that occur when two different digital messages are hashed in the first order do not reoccur when those two different digital messages are also hashed in the second different order, thereby enabling the collision resistant digital signature to guard against birthday attacks.

3. The collision resistant process for signing a digital message with a digital signature of claim 1, wherein the first hash digest is a forward hash digest formed from hashing the digital message front-to-back and the second hash digest is a reverse hash digest formed from hashing the digital message back-to-front.

4. The collision resistant process for signing a digital message with a digital signature of claim 3, wherein the collision resistant digital signature includes a forward digital signature based on the forward hash digest and a reverse digital signature based on the reverse hash digest.

5. The collision resistant process for signing a digital message with a digital signature of claim 4, wherein the forward digital signature is formed with the equation below where N is a public Modulus and E is a public Exponent and a prime number:

forward digital signature=(forward hash digest)$E$mod ($N$); and wherein the reverse digital signature is formed with the equation below where N is a public Modulus and E is a public Exponent and a prime number:

reverse digital signature=(reverse hash digest)$E$mod ($N$).

6. The collision resistant process for signing a digital message with a digital signature of claim 1, wherein the first and second orders are selected from the group consisting of hexadecimal-reverse, byte-reverse, bit-reverse, hard-disk-drive sector-reverse, hexadecimal-forward, byte-forward, bit-forward, hard-disk-drive sector sector-forward, and forward-reverse multiplex.

7. The collision resistant process for signing a digital message with a digital signature of claim 1, wherein the collision resistant digital signature is a concatenation of the first and second hash digests that form the collision resistant hash digest set.

8. A non-transitory computer tangible medium storing instructions for a collision resistant process for verifying a digital signature, comprising:
 accessing a data message that is digitally signed with a collision resistant digital signature that includes a first hash digest formed from hashing the entire data message in a first order with a hash algorithm and a second hash digest formed from hashing the entire data message in a second order different from the first order with the hash algorithm;
 generating a new set of hash digests based on the data message; and
 comparing the new set of hash digests to the corresponding first and second hash digests for verification.

9. The collision resistant process for verifying a digital signature of claim 8, wherein the collision resistant digital signature is verified when all of the hash digests contained within it match the new set of hash digests, wherein the collision resistant digital signature is rejected when any one of the hash digests contained within it fails have a match within the new set of hash digests.

10. The collision resistant process for verifying a digital signature of claim 9, whereby collisions that occur when two different data messages are hashed in the first order do not reoccur when those two different sets of data messages are also hashed in the second order different from the first order, thereby enabling the collision resistant digital signature to guard against birthday attacks.

11. The collision resistant process for verifying a digital signature of claim 10, wherein the collision resistant digital signature includes a forward digital signature based on the first hash digest formed by hashing the data message front-to-back and a reverse digital signature based on the second hash digest formed by hashing the data message back-to-front.

12. The collision resistant process for verifying a digital signature of claim 11, wherein the forward digital signature is formed with the equation below where N is a public Modulus and E is a public Exponent and a prime number:

forward digital signature=(forward hash digest)$E$mod ($N$); and wherein the reverse digital signature is formed with the equation below where N is a public Modulus and E is a public Exponent and a prime number:

reverse digital signature=(reverse hash digest)$E$mod ($N$).

13. The collision resistant process for verifying a digital signature of claim 8, wherein the first and second orders are selected from the group consisting of hexadecimal-reverse, byte-reverse, bit-reverse, hard-disk-drive sector reverse, hexadecimal-forward, byte-forward, bit-forward, hard-disk-drive sector sector-forward, and forward-reverse multiplex.

14. The collision resistant process for verifying a digital signature of claim 12, wherein the collision resistant digital signature is a concatenation of the first and second hash digests.

15. A non-volatile computer tangible medium storing instructions for a collision resistant process for digitally signing a data message, comprising:
 a collision resistant digital signature formed of a concatenation of a first hash digest formed from hashing an entire data message in a first order with a hash algorithm and a second hash digest formed from hashing the entire data message in a second order different from the first order with the hash algorithm.

16. The collision resistant process for digitally signing a data message of claim 15, wherein the first and second hash digests are made by inputting the data message into a hash processor for processing by the hash algorithm in different orders.

17. The collision resistant process for digitally signing a data message of claim 16, whereby collisions that occur when two different data messages are hashed in the first order do not reoccur when those two different data messages are hashed in the second order, thereby enabling the collision resistant digital signature to guard against birthday attacks.

18. The collision resistant process for digitally signing a data message of claim 17, wherein the collision resistant digital signature includes a forward digital signature based on the first hash digest formed from hashing the data message front-to-back and a reverse digital signature based on the second hash digest formed from hashing the data message back-to-front.

19. The collision resistant process for digitally signing a data message of claim 18, wherein the forward digital signature is formed with the equation below where N is a public Modulus and E is a public Exponent and a prime number:

forward digital signature=(forward hash digest)$E$mod ($N$); and wherein the reverse digital signature is formed with the equation below where N is a public Modulus and E is a public Exponent and a prime number:

reverse digital signature=(reverse hash digest)$E$mod ($N$).

20. The collision resistant process for digitally signing a data message of claim 19, wherein the first and second orders are selected from the group consisting of hexadecimal-reverse, byte-reverse, bit-reverse, hard-disk-drive sector reverse, hexadecimal-forward, byte-forward, bit-forward, hard-disk-drive sector sector-forward, and forward-reverse multiplex.

* * * * *